United States Patent
Henderson

(10) Patent No.: US 7,426,264 B1
(45) Date of Patent: Sep. 16, 2008

(54) METHOD AND APPARATUS FOR IMPROVED PERSONAL COMMUNICATION DEVICES AND SYSTEMS

(76) Inventor: Daniel A. Henderson, 11671 Putter Way, Los Altos, CA (US) 94024

( * ) Notice: Subject to any disclaimer, the term of this patent is extended or adjusted under 35 U.S.C. 154(b) by 0 days.

(21) Appl. No.: 08/726,024

(22) Filed: Oct. 4, 1996

Related U.S. Application Data

(63) Continuation-in-part of application No. 08/177,851, filed on Jan. 5, 1994, now Pat. No. 6,278,862.

(60) Provisional application No. 60/005,029, filed on Oct. 6, 1995.

(51) Int. Cl.
*H04M 1/56* (2006.01)

(52) U.S. Cl. .................. 379/142.04; 340/7.56; 455/415; 379/142.17

(58) Field of Classification Search ............... 379/88.11, 379/88.12, 88.15, 88.17, 88.19, 88.2, 88.21, 379/142, 142.17, 142.04, 142.15, 142.07; 340/825.44, 7.54; 455/415
See application file for complete search history.

(56) References Cited

U.S. PATENT DOCUMENTS

| | | |
|---|---|---|
| 3,727,003 A | 4/1973 | Paraskevakos |
| 3,787,626 A | 1/1974 | Subieta |
| 3,812,296 A | 5/1974 | Paraskevakos |
| 3,984,625 A | 10/1976 | Camras |
| 4,065,642 A | 12/1977 | McClure |
| 4,072,824 A | 2/1978 | Phillips |
| 4,075,038 A | 2/1978 | Anthony et al. |
| 4,087,638 A | 5/1978 | Hayes et al. |
| 4,103,107 A | 7/1978 | D'Amico et al. |
| 4,117,542 A | 9/1978 | Klausner et al. |
| 4,126,768 A | 11/1978 | Grenzow |
| 4,172,969 A | 10/1979 | Levine et al. |
| 4,178,475 A | 12/1979 | Taylor et al. |
| 4,178,476 A | 12/1979 | Frost |
| 4,197,526 A | 4/1980 | Levine et al. |
| 4,258,387 A | 3/1981 | Lemelson |
| 4,263,480 A | 4/1981 | Levine |
| 4,266,098 A | 5/1981 | Novak |
| 4,304,968 A | 12/1981 | Klausner et al. |
| 4,306,116 A | 12/1981 | McClure et al. |
| 4,313,035 A | 1/1982 | Jordan et al. |
| 4,330,780 A | 5/1982 | Masaki |

(Continued)

FOREIGN PATENT DOCUMENTS

DE      3315625      10/1984

(Continued)

OTHER PUBLICATIONS

Communication Base-Set With LCD Screen by Jonathan Carr et al, Jun. 1993.*

(Continued)

*Primary Examiner*—Fan Tsang
*Assistant Examiner*—Olisa Anwah
(74) *Attorney, Agent, or Firm*—Robert K. Tendler

(57) ABSTRACT

Picture messages are transmitted to a wireless device with a paging notification that includes the telephone number of a message originator and are used by the message recipient to identify who is sending the message.

29 Claims, 45 Drawing Sheets

U.S. PATENT DOCUMENTS

| | | | |
|---|---|---|---|
| 4,336,524 A | 6/1982 | Levine | |
| 4,341,926 A | 7/1982 | Chester | |
| 4,356,519 A | 10/1982 | Cogdell, Jr. | |
| 4,368,989 A | 1/1983 | Kawashima | |
| 4,378,551 A | 3/1983 | Drapac | |
| 4,382,256 A | 5/1983 | Nagata | |
| 4,388,000 A | 6/1983 | Hagihira | |
| 4,402,056 A | 8/1983 | Sado et al. | |
| 4,408,099 A * | 10/1983 | Ishii | 340/7.23 |
| 4,424,514 A | 1/1984 | Fennell et al. | |
| 4,427,848 A | 1/1984 | Tsakanikas | |
| 4,427,980 A | 1/1984 | Fennell et al. | |
| 4,438,433 A | 3/1984 | Smoot et al. | |
| 4,451,707 A | 5/1984 | Hanscom | |
| 4,477,807 A | 10/1984 | Nakajima et al. | |
| 4,479,124 A | 10/1984 | Rodriquez et al. | |
| 4,481,670 A | 11/1984 | Freeburg | |
| 4,490,579 A | 12/1984 | Godoshian | |
| RE31,789 E | 1/1985 | Hashimoto | |
| 4,536,739 A | 8/1985 | Nobuta | |
| 4,551,581 A | 11/1985 | Doughty | |
| 4,578,537 A | 3/1986 | Faggin et al. | |
| 4,582,956 A | 4/1986 | Doughty | 179/2 |
| 4,600,809 A | 7/1986 | Tatsumi et al. | |
| 4,608,460 A | 8/1986 | Carter et al. | |
| 4,618,860 A | 10/1986 | Mori | |
| 4,625,081 A | 11/1986 | Lotito et al. | |
| 4,639,225 A | 1/1987 | Washizuka | |
| 4,644,351 A * | 2/1987 | Zabarsky et al. | 340/7.21 |
| 4,654,718 A | 3/1987 | Sueyoshi | |
| 4,660,218 A | 4/1987 | Hashimoto | |
| 4,661,972 A | 4/1987 | Kai | |
| 4,680,785 A | 7/1987 | Akiyama et al. | |
| 4,682,148 A | 7/1987 | Ichikawa et al. | |
| 4,692,742 A | 9/1987 | Raizen et al. | |
| 4,704,608 A | 11/1987 | Sato et al. | |
| 4,706,272 A | 11/1987 | Nishimura et al. | |
| 4,713,808 A | 12/1987 | Gaskill et al. | |
| 4,716,583 A | 12/1987 | Groner et al. | |
| 4,720,848 A | 1/1988 | Akiyama | |
| 4,737,979 A | 4/1988 | Hashimoto | |
| 4,742,516 A | 5/1988 | Yamaguchi | |
| 4,747,122 A | 5/1988 | Bhagat et al. | |
| 4,754,473 A | 6/1988 | Edwards | |
| 4,766,294 A | 8/1988 | Nara et al. | |
| 4,766,434 A | 8/1988 | Matai et al. | |
| 4,769,764 A | 9/1988 | Levanon | |
| 4,775,999 A | 10/1988 | Williams | |
| 4,776,005 A | 10/1988 | Petriccione et al. | |
| 4,779,138 A | 10/1988 | Nomura et al. | |
| 4,796,291 A | 1/1989 | Makino | |
| 4,800,582 A | 1/1989 | D'Agosto, III et al. | |
| 4,802,200 A | 1/1989 | Murata et al. | |
| 4,802,209 A | 1/1989 | Hasegawa | |
| 4,803,726 A | 2/1989 | Levine et al. | |
| 4,806,906 A | 2/1989 | Oda et al. | |
| 4,811,379 A | 3/1989 | Grandfield | |
| 4,811,382 A | 3/1989 | Sleevi | |
| 4,812,843 A | 3/1989 | Champion, III et al. | |
| 4,814,763 A | 3/1989 | Nelson et al. | |
| 4,821,308 A | 4/1989 | Hashimoto | |
| 4,827,520 A | 5/1989 | Zeinstra | |
| 4,845,491 A | 7/1989 | Fascenda et al. | |
| 4,850,012 A | 7/1989 | Mehta et al. | |
| 4,853,688 A | 8/1989 | Andros et al. | |
| 4,853,952 A | 8/1989 | Jachmann et al. | |
| 4,868,560 A | 9/1989 | Oliwa et al. | |
| 4,868,561 A | 9/1989 | Davis | |
| 4,868,860 A | 9/1989 | Anddros et al. | |
| 4,872,005 A | 10/1989 | DeLuca et al. | |
| 4,873,520 A | 10/1989 | Fisch et al. | |
| 4,873,719 A | 10/1989 | Reese | |
| 4,878,051 A | 10/1989 | Andros et al. | |
| 4,882,579 A | 11/1989 | Siwiak | |
| 4,882,744 A | 11/1989 | Hashimoto | |
| 4,882,750 A | 11/1989 | Henderson et al. | |
| 4,884,132 A | 11/1989 | Morris et al. | |
| 4,885,577 A * | 12/1989 | Nelson | 340/7.31 |
| 4,893,335 A | 1/1990 | Fuller et al. | |
| 4,894,861 A | 1/1990 | Fujioka | |
| 4,897,835 A | 1/1990 | Gaskill et al. | |
| 4,899,358 A | 2/1990 | Blakley | |
| 4,914,624 A | 4/1990 | Dunthorn | |
| 4,914,649 A | 4/1990 | Schwendeman et al. | |
| 4,914,691 A | 4/1990 | Berger | |
| 4,918,721 A | 4/1990 | Hashimoto | |
| 4,922,221 A | 5/1990 | Sato et al. | |
| 4,922,490 A | 5/1990 | Blakley | |
| 4,924,496 A | 5/1990 | Figa et al. | |
| 4,928,096 A | 5/1990 | Leonardo et al. | |
| 4,928,302 A | 5/1990 | Kaneuchi et al. | |
| 4,940,963 A | 7/1990 | Gutman et al. | |
| 4,941,167 A | 7/1990 | Cannalte et al. | |
| 4,942,598 A * | 7/1990 | Davis | 340/7.31 |
| 4,951,043 A | 8/1990 | Minami | |
| RE33,417 E | 10/1990 | Bhagat et al. | |
| 4,961,216 A * | 10/1990 | Baehr et al. | 340/7.31 |
| 4,962,377 A | 10/1990 | Wallace et al. | |
| 4,962,545 A | 10/1990 | Klaczak et al. | |
| 4,965,569 A | 10/1990 | Bennett et al. | |
| 4,975,683 A | 12/1990 | Davis et al. | |
| 4,975,693 A | 12/1990 | Davis et al. | |
| 4,985,913 A | 1/1991 | Shalom et al. | |
| 4,985,918 A | 1/1991 | Tanaka et al. | |
| 4,994,797 A | 2/1991 | Breeden | |
| 4,996,707 A | 2/1991 | O'Malley et al. | |
| 5,007,076 A | 4/1991 | Blakley | |
| 5,014,296 A | 5/1991 | Saigano | |
| D319,053 S | 8/1991 | Atkins | |
| 5,043,721 A * | 8/1991 | May | 340/7.54 |
| 5,046,079 A | 9/1991 | Hashimoto | |
| 5,047,764 A | 9/1991 | Andros et al. | |
| 5,049,874 A | 9/1991 | Ishida et al. | |
| 5,052,943 A | 10/1991 | Davis et al. | |
| 5,057,676 A | 10/1991 | Komaki | |
| 5,063,588 A | 11/1991 | Patsiokas et al. | |
| 5,066,949 A | 11/1991 | Breeden et al. | |
| 5,070,521 A | 12/1991 | Warner et al. | |
| 5,073,767 A | 12/1991 | Holmes et al. | |
| 5,075,684 A | 12/1991 | DeLuca | |
| 5,077,786 A | 12/1991 | Hashimoto | |
| 5,090,051 A | 2/1992 | Muppidi et al. | |
| 5,093,659 A | 3/1992 | Yamada | |
| 5,095,307 A | 3/1992 | Shimura et al. | |
| 5,099,507 A | 3/1992 | Mukai et al. | |
| 5,109,220 A | 4/1992 | Breeden et al. | |
| 5,115,233 A | 5/1992 | Zdunek et al. | |
| 5,117,449 A * | 5/1992 | Metroka et al. | 455/552.1 |
| D327,059 S | 6/1992 | Chu et al. | |
| 5,119,397 A | 6/1992 | Dahlin et al. | |
| 5,121,423 A | 6/1992 | Morihiro et al. | |
| 5,124,697 A | 6/1992 | Moore | |
| 5,127,040 A | 6/1992 | D'Avello et al. | |
| 5,128,980 A | 7/1992 | Choi | |
| 5,128,981 A | 7/1992 | Tsukamoto et al. | |
| 5,134,645 A | 7/1992 | Berken et al. | |
| 5,134,717 A | 7/1992 | Rasmussen | |
| 5,142,279 A | 8/1992 | Jasinski et al. | |
| 5,144,654 A | 9/1992 | Kelley et al. | |
| 5,146,217 A | 9/1992 | Holmes | |
| 5,146,493 A | 9/1992 | Kiguchi et al. | |
| 5,148,469 A | 9/1992 | Price | |
| 5,148,473 A | 9/1992 | Freeland et al. | |
| 5,151,929 A | 9/1992 | Wolf | |

| | | | | | | |
|---|---|---|---|---|---|---|
| 5,151,930 A | 9/1992 | Hagl | | 5,331,580 A | 7/1994 | Miller et al. |
| 5,153,579 A | 10/1992 | Fisch et al. | | 5,333,179 A | 7/1994 | Yamamoto et al. |
| 5,153,582 A | 10/1992 | Davis | | 5,335,276 A | 8/1994 | Thompson et al. |
| 5,159,624 A | 10/1992 | Makita | | 5,337,044 A | 8/1994 | Folger et al. |
| 5,161,181 A | 11/1992 | Zwick | | 5,341,411 A | 8/1994 | Hashimoto |
| 5,166,973 A | 11/1992 | Hoff .............................. 379/57 | | 5,341,414 A | 8/1994 | Popke |
| 5,175,758 A | 12/1992 | Levanto et al. | | 5,343,319 A * | 8/1994 | Moore ........................ 398/115 |
| 5,175,875 A | 12/1992 | Yokaya et al. | | 5,343,516 A | 8/1994 | Callele et al. |
| 5,182,553 A | 1/1993 | Kung | | D350,345 S | 9/1994 | Lindeman et al. |
| 5,187,645 A | 2/1993 | Spalding et al. | | 5,345,258 A | 9/1994 | Matsubara |
| 5,189,632 A | 2/1993 | Paajanen et al. | | 5,348,347 A | 9/1994 | Shink |
| 5,195,130 A | 3/1993 | Weiss et al. | | 5,349,636 A | 9/1994 | Irrabarren |
| 5,195,183 A | 3/1993 | Miller et al. | | 5,349,638 A | 9/1994 | Pitroda et al. |
| 5,197,092 A | 3/1993 | Bamburak | | 5,363,429 A | 11/1994 | Fujisawa |
| 5,206,637 A | 4/1993 | Warren | | 5,371,781 A | 12/1994 | Ardon |
| 5,206,900 A * | 4/1993 | Callele .................. 379/142.06 | | 5,375,161 A | 12/1994 | Fuller et al. |
| 5,208,849 A | 5/1993 | Fu | | 5,377,326 A | 12/1994 | Murata et al. |
| 5,208,850 A | 5/1993 | Kino | | 5,381,138 A | 1/1995 | Stair et al. |
| 5,212,721 A | 5/1993 | DeLuca et al. | | 5,384,831 A | 1/1995 | Creswell et al. |
| 5,220,599 A | 6/1993 | Sasano et al. | | 5,384,910 A | 1/1995 | Torres |
| 5,222,125 A | 6/1993 | Creswell et al. | | 5,387,904 A | 2/1995 | Takada |
| 5,224,150 A | 6/1993 | Neustein | | 5,388,150 A | 2/1995 | Schneyer et al. |
| 5,225,826 A | 7/1993 | DeLuca et al. | | 5,390,236 A | 2/1995 | Klausner et al. |
| 5,227,614 A | 7/1993 | Danielson | | 5,390,346 A | 2/1995 | Marz |
| 5,228,073 A | 7/1993 | Smith | | 5,390,362 A | 2/1995 | Modjeska et al. |
| 5,228,080 A | 7/1993 | Nutter et al. | | 5,392,342 A | 2/1995 | Rosenthal |
| 5,239,577 A | 8/1993 | Bates et al. | | 5,392,452 A | 2/1995 | Davis |
| 5,241,303 A | 8/1993 | Register et al. | | 5,394,140 A | 2/1995 | Wong et al. |
| 5,241,305 A | 8/1993 | Fascenda et al. | | 5,398,279 A | 3/1995 | Frain |
| 5,247,700 A * | 9/1993 | Wohl et al. ................ 455/552.1 | | 5,402,466 A | 3/1995 | Delahanty |
| 5,251,250 A | 10/1993 | Obata et al. | | 5,404,400 A | 4/1995 | Hamilton |
| 5,252,964 A | 10/1993 | Tan et al. | | 5,408,382 A | 4/1995 | Schultz et al. |
| 5,257,307 A | 10/1993 | Ise | | 5,410,541 A * | 4/1995 | Hotto ........................ 370/496 |
| 5,258,751 A | 11/1993 | Deluca et al. | | 5,412,719 A | 5/1995 | Hamamoto et al. |
| 5,260,986 A | 11/1993 | Pershan | | 5,414,418 A | 5/1995 | Andros et al. |
| 5,263,084 A | 11/1993 | Chaput et al. | | 5,414,444 A | 5/1995 | Britz |
| 5,264,992 A | 11/1993 | Hogdahl | | 5,418,529 A * | 5/1995 | De Luigi et al. ........... 340/7.52 |
| 5,265,145 A | 11/1993 | Lim | | 5,418,835 A | 5/1995 | Frohman et al. |
| 5,272,465 A | 12/1993 | Meares, Jr. | | 5,422,656 A | 6/1995 | Allard et al. |
| 5,274,454 A | 12/1993 | Higgins, Jr. | | 5,422,942 A | 6/1995 | Kakwashima |
| 5,274,699 A | 12/1993 | Ranz | | 5,426,426 A | 6/1995 | Hymel |
| 5,276,729 A | 1/1994 | Higuchi et al. | | 5,428,663 A | 6/1995 | Grimes et al. |
| 5,276,731 A | 1/1994 | Arbel et al. | | 5,428,823 A | 6/1995 | Ness-Cohn et al. |
| 5,278,889 A | 1/1994 | Papanicolaou | | 5,430,436 A | 7/1995 | Fennell |
| 5,278,894 A | 1/1994 | Shaw | | 5,430,439 A | 7/1995 | Bodet et al. |
| 5,280,516 A | 1/1994 | Jang | | 5,432,841 A | 7/1995 | Rimer |
| 5,280,521 A | 1/1994 | Itoh | | 5,434,929 A | 7/1995 | Beernink et al. |
| 5,282,243 A | 1/1994 | Dabbahi et al. | | 5,440,559 A | 8/1995 | Gaskill |
| 5,283,818 A | 2/1994 | Klausner et al. | | 5,444,768 A | 8/1995 | Lemaire et al. |
| 5,283,824 A | 2/1994 | Shaw | | 5,444,869 A | 8/1995 | Stricklin et al. |
| 5,285,493 A | 2/1994 | Wagai et al. | | 5,448,627 A | 9/1995 | Ueno et al. |
| 5,285,496 A | 2/1994 | Frank et al. | | 5,448,632 A | 9/1995 | Iyob et al. |
| 5,289,528 A | 2/1994 | Ueno et al. | | 5,454,029 A | 9/1995 | Noda |
| 5,289,530 A | 2/1994 | Reese | | 5,455,579 A * | 10/1995 | Bennett et al. .............. 341/110 |
| 5,297,192 A | 3/1994 | Gerszberg | | 5,457,732 A | 10/1995 | Goldberg |
| 5,302,947 A | 4/1994 | Fuller et al. | | 5,459,458 A * | 10/1995 | Richardson et al. .... 340/825.52 |
| 5,303,291 A | 4/1994 | Takagi et al. | | 5,459,773 A | 10/1995 | Hwang |
| 5,307,399 A | 4/1994 | Dai et al. | | 5,465,288 A | 11/1995 | Falvey et al. |
| 5,309,512 A | 5/1994 | Backmon et al. | | 5,465,401 A | 11/1995 | Thompson |
| 5,311,570 A | 5/1994 | Grimes et al. | | 5,467,385 A | 11/1995 | Reuben et al. |
| 5,313,515 A | 5/1994 | Allen et al. | | 5,468,947 A | 11/1995 | Danielson et al. |
| 5,315,636 A | 5/1994 | Patel | | 5,469,491 A | 11/1995 | Morley, Jr. et al. |
| 5,315,642 A | 5/1994 | Fernandez | | 5,473,316 A | 12/1995 | Takaya |
| 5,317,621 A | 5/1994 | Shibayama | | 5,473,667 A | 12/1995 | Neustein |
| 5,321,742 A | 6/1994 | Stevens | | 5,473,671 A | 12/1995 | Partridge, III |
| 5,323,148 A | 6/1994 | Olazabal et al. | | 5,475,738 A | 12/1995 | Penzias |
| 5,325,419 A | 6/1994 | Connolly | | 5,479,475 A | 12/1995 | Grob et al. |
| D348,654 S | 7/1994 | Branck et al. .............. D14/100 | | 5,481,595 A | 1/1996 | Ohashi et al. |
| 5,327,480 A | 7/1994 | Breeden | | 5,483,580 A | 1/1996 | Brandman et al. |
| 5,327,486 A * | 7/1994 | Wolff et al. .............. 379/93.23 | | 5,483,595 A * | 1/1996 | Owen ........................ 380/271 |
| 5,329,427 A | 7/1994 | Hogdahl | | 5,485,504 A | 1/1996 | Ohnsorge |
| 5,329,578 A | 7/1994 | Brennan et al. | | 5,485,505 A | 1/1996 | Norman et al. |
| 5,329,581 A | 7/1994 | Friedes et al. | | 5,487,108 A | 1/1996 | Atkins et al. |

| | | | | | | |
|---|---|---|---|---|---|---|
| 5,491,507 A | 2/1996 | Umezawa | | 5,644,471 A | 7/1997 | Schultz et al. |
| 5,491,739 A | 2/1996 | Wadin et al. | | 5,644,629 A | 7/1997 | Chow |
| 5,495,284 A | 2/1996 | Katz | | 5,648,990 A | 7/1997 | Kraul et al. |
| 5,495,344 A | 2/1996 | Callaway, Jr. et al. | | 5,651,055 A | 7/1997 | Argade |
| 5,497,464 A | 3/1996 | Yeh | | 5,654,942 A | 8/1997 | Akahane |
| 5,502,761 A * | 3/1996 | Duncan et al. ............... 379/142 | | 5,655,006 A | 8/1997 | Cox et al. |
| 5,506,891 A | 4/1996 | Brown | | 5,661,788 A | 8/1997 | Chin |
| 5,509,053 A | 4/1996 | Gowda et al. | | 5,664,013 A | 9/1997 | Rossi |
| 5,510,778 A | 4/1996 | Krieter et al. | | 5,666,495 A | 9/1997 | Yeh |
| 5,511,109 A | 4/1996 | Hartley et al. | | 5,666,530 A | 9/1997 | Clark et al. |
| 5,515,303 A | 5/1996 | Cargin et al. | | 5,666,553 A | 9/1997 | Crozier |
| 5,517,557 A | 5/1996 | Tanaka | | 5,668,852 A | 9/1997 | Holmes |
| 5,524,137 A | 6/1996 | Rhee | | 5,675,524 A | 10/1997 | Bernard |
| 5,524,140 A | 6/1996 | Klausner et al. | | 5,678,042 A | 10/1997 | Pisello et al. |
| 5,526,411 A | 6/1996 | Krieter | | 5,687,227 A | 11/1997 | Cohrs |
| 5,530,740 A | 6/1996 | Irribarren et al. | | 5,689,440 A | 11/1997 | Leitch et al. |
| 5,533,095 A | 7/1996 | Kikuchi | | 5,689,654 A | 11/1997 | Kikinis et al. |
| 5,535,257 A | 7/1996 | Goldberg et al. | | 5,692,038 A | 11/1997 | Kraus et al. |
| 5,541,976 A | 7/1996 | Ghisler | | 5,701,258 A | 12/1997 | Harris et al. |
| 5,544,010 A | 8/1996 | Schultz et al. | | 5,703,571 A | 12/1997 | Cannon et al. |
| 5,544,358 A | 8/1996 | Capps et al. | | 5,703,934 A | 12/1997 | Zicker et al. |
| 5,546,447 A | 8/1996 | Skarbo et al. | | 5,712,760 A | 1/1998 | Coulon et al. |
| 5,548,477 A | 8/1996 | Kumar et al. | | 5,712,761 A | 1/1998 | Dials et al. |
| 5,548,636 A | 8/1996 | Bannister et al. | | 5,715,524 A | 2/1998 | Jambhekar et al. |
| 5,548,814 A | 8/1996 | Lorang et al. | | 5,717,741 A | 2/1998 | Yue et al. |
| 5,553,125 A | 9/1996 | Martensson | | 5,719,936 A | 2/1998 | Hillenmayer |
| 5,557,320 A | 9/1996 | Krebs | | 5,727,052 A | 3/1998 | Sizer, II et al. |
| 5,557,605 A | 9/1996 | Grupe et al. | | 5,727,053 A | 3/1998 | Sizer II et al. |
| 5,559,859 A | 9/1996 | Dai et al. | | 5,742,894 A | 4/1998 | Jambhekar et al. |
| 5,559,860 A | 9/1996 | Mizikovsky | | 5,742,905 A | 4/1998 | Pepe et al. |
| 5,559,862 A | 9/1996 | Bhagat et al. | | 5,745,852 A | 4/1998 | Khan et al. |
| 5,559,868 A | 9/1996 | Blonder ...................... 379/93 | | 5,749,071 A | 5/1998 | Silverman |
| 5,561,702 A | 10/1996 | Lipp et al. | | 5,751,793 A | 5/1998 | Davies et al. |
| 5,561,703 A | 10/1996 | Arledge et al. | | 5,757,279 A | 5/1998 | Fujiwara |
| 5,566,226 A | 10/1996 | Mizoguchi et al. | | 5,760,823 A | 6/1998 | Brunson |
| 5,572,576 A | 11/1996 | Klausner et al. | | 5,760,824 A | 6/1998 | Hicks, III |
| 5,574,481 A | 11/1996 | Lee | | 5,761,271 A | 6/1998 | Karnowski |
| 5,574,725 A | 11/1996 | Sharma et al. | | 5,764,731 A | 6/1998 | Yablon |
| 5,577,103 A | 11/1996 | Foti | | 5,764,747 A | 6/1998 | Yue et al. |
| 5,579,239 A | 11/1996 | Freeman | | 5,784,001 A | 7/1998 | Deluca |
| 5,579,375 A | 11/1996 | Ginter ........................ 379/59 | | 5,784,444 A | 7/1998 | Snyder et al. |
| 5,579,377 A | 11/1996 | Rogers | | 5,793,416 A | 8/1998 | Rostoker |
| 5,581,594 A | 12/1996 | McAfee | | 5,794,116 A | 8/1998 | Matsuda |
| 5,581,595 A | 12/1996 | Iwashita | | 5,796,806 A | 8/1998 | Birckbichler |
| 5,581,803 A | 12/1996 | Grube et al. | | 5,797,089 A | 8/1998 | Nguyen |
| 5,583,564 A | 12/1996 | Rao et al. | | 5,798,708 A | 8/1998 | Katayama |
| 5,583,920 A | 12/1996 | Wheeler, Jr. | | 5,805,981 A | 9/1998 | Sugio et al. |
| 5,584,054 A | 12/1996 | Tyneski et al. | | 5,806,005 A | 9/1998 | Hull |
| 5,584,070 A | 12/1996 | Harris et al. | | 5,809,415 A | 9/1998 | Rossmann |
| 5,588,037 A | 12/1996 | Fuller et al. | | 5,822,402 A | 10/1998 | Marszalek |
| 5,588,038 A | 12/1996 | Snyder | | 5,822,727 A | 10/1998 | Garberg et al. |
| 5,590,373 A | 12/1996 | Whitley et al. | | 5,825,048 A | 10/1998 | Arai |
| 5,590,382 A | 12/1996 | Kikinis et al. | | 5,832,435 A | 11/1998 | Silverman |
| 5,592,566 A | 1/1997 | Pagallo et al. | | 5,841,838 A | 11/1998 | Itoh |
| 5,594,658 A | 1/1997 | Lemaire et al. | | 5,841,850 A | 11/1998 | Fan |
| 5,594,952 A | 1/1997 | Virtuoso et al. | | 5,845,202 A | 12/1998 | Davis |
| 5,600,711 A | 2/1997 | Yuen | | 5,845,282 A | 12/1998 | Alley et al. |
| 5,602,456 A | 2/1997 | Cargin et al. | | 5,848,142 A | 12/1998 | Yaker |
| 5,602,908 A | 2/1997 | Fan | | 5,848,356 A | 12/1998 | Jambhekar et al. .......... 455/403 |
| 5,604,491 A | 2/1997 | Coonley et al. | | 5,850,435 A | 12/1998 | Devillier |
| 5,604,492 A | 2/1997 | Abdul-Halim | | H1772 H | 1/1999 | Akahane |
| 5,604,790 A | 2/1997 | Grimes | | 5,857,013 A | 1/1999 | Yue et al. |
| 5,606,594 A | 2/1997 | Register et al. | | 5,857,016 A * | 1/1999 | Jedlicka ................. 379/142.01 |
| 5,615,252 A | 3/1997 | Sizer, II et al. | | 5,864,612 A | 1/1999 | Strauss et al. |
| 5,625,555 A | 4/1997 | Davis | | 5,878,354 A | 3/1999 | Hasegawa |
| 5,625,673 A | 4/1997 | Grewe et al. | | 5,881,134 A | 3/1999 | Foster et al. |
| 5,625,884 A | 4/1997 | Gitlin et al. | | 5,884,186 A | 3/1999 | Hidaka |
| 5,627,875 A | 5/1997 | Kapsales | | 5,889,852 A | 3/1999 | Rosecrans |
| 5,630,205 A | 5/1997 | Ekelund | | 5,894,595 A | 4/1999 | Foladare et al. |
| 5,631,950 A | 5/1997 | Brown | | 5,896,165 A | 4/1999 | Rao |
| 5,633,892 A | 5/1997 | Krisher | | 5,896,444 A | 4/1999 | Perlman et al. |
| 5,633,920 A | 5/1997 | Kikinis et al. | | 5,903,628 A | 5/1999 | Brennan |
| 5,638,540 A | 6/1997 | Aldous | | 5,905,774 A | 5/1999 | Tatchell et al. |

| | | | | | | |
|---|---|---|---|---|---|---|
| 5,907,596 | A | 5/1999 | Karnowski | 6,335,962 B1 | 1/2002 | Ali et al. |
| 5,907,604 | A | 5/1999 | Hsu | 6,339,639 B1 | 1/2002 | Henderson |
| 5,909,647 | A | 6/1999 | Hashimoto et al. | 6,351,372 B1 | 2/2002 | Kim |
| 5,912,697 | A | 6/1999 | Hashimoto | 6,377,664 B2 | 4/2002 | Gerszberg |
| 5,926,756 | A | 7/1999 | Piosenka et al. | 6,388,560 B1 | 5/2002 | Parvulescu |
| 5,929,771 | A | 7/1999 | Gaskill | 6,393,278 B1 | 5/2002 | Buchanan et al. |
| 5,930,700 | A | 7/1999 | Pepper et al. | 6,427,064 B1 | 7/2002 | Henderson |
| 5,930,701 | A | 7/1999 | Skog | 6,430,405 B1 | 8/2002 | Jambhekar |
| 5,937,050 | A | 8/1999 | Yue et al. | 6,564,070 B1 | 5/2003 | Nagamine |
| 5,943,607 | A | 8/1999 | Singer | 6,580,784 B2 | 6/2003 | Rodriguez et al. |
| 5,950,123 | A | 9/1999 | Schwelb et al. | 6,724,867 B1 | 4/2004 | Henderson |
| 5,963,876 | A | 10/1999 | Manssen | 6,751,300 B2 | 6/2004 | Muller |
| 5,966,652 | A | 10/1999 | Coad et al. | 6,757,366 B1 | 6/2004 | Kaufman |
| 5,978,451 | A | 11/1999 | Swan et al. | 6,766,002 B1 | 7/2004 | Cannon |
| 5,987,100 | A | 11/1999 | Fortman et al. | 6,845,398 B1 | 1/2005 | Galensky |
| 5,991,383 | A | 11/1999 | Kucmerowski et al. | 6,940,955 B1 | 9/2005 | Jones |
| 5,995,596 | A | 11/1999 | Shaffer et al. | 6,961,216 B2 | 11/2005 | Chan et al. |
| 5,995,603 | A | 11/1999 | Anderson | 6,990,180 B2 | 1/2006 | Vuori |
| 5,995,666 | A | 11/1999 | Nishio | 2001/0002209 A1 | 5/2001 | Han ........................ 379/142 |
| 5,999,810 | A | 12/1999 | Fuentes | 2001/0003538 A1 | 6/2001 | Sakata ..................... 379/142 |
| 6,002,719 | A * | 12/1999 | Parvulescu et al. .......... 375/240 | 2002/0126814 A1 | 9/2002 | Awada ................ 379/142.01 |
| 6,005,870 | A | 12/1999 | Leung et al. | 2002/0186823 A1 | 12/2002 | Kikinis et al. ............ 379/88.17 |
| 6,009,082 | A | 12/1999 | Caswell et al. | 2003/0099333 A1 | 5/2003 | Castagna et al. ............. 379/70 |
| 6,009,308 | A | 12/1999 | Matsuura | | | |
| 6,011,953 | A | 1/2000 | Foldare | FOREIGN PATENT DOCUMENTS | | |
| 6,026,152 | A | 2/2000 | Cannon | | | |
| 6,028,921 | A | 2/2000 | Malik | DE | 3329267 | 2/1985 |
| 6,034,621 | A | 3/2000 | Kaufman | DE | 3421886 | 12/1985 |
| 6,038,443 | A | 3/2000 | Luneau | EP | 0 212 761 | 8/1986 |
| 6,049,713 | A | 4/2000 | Tran et al. | EP | 301740 | 2/1989 |
| 6,061,560 | A | 5/2000 | Saboorian et al. | EP | 9203891 | 3/1992 |
| 6,067,349 | A | 5/2000 | Suder et al. | EP | 0503813 A2 | 9/1992 |
| 6,085,079 | A | 7/2000 | Tabeta | EP | 0588571 A3 | 3/1994 |
| 6,094,574 | A | 7/2000 | Vance et al. | EP | 0704827 A1 | 4/1996 |
| 6,108,200 | A | 8/2000 | Fullerton | EP | 0590500 B1 | 11/1996 |
| 6,115,588 | A | 9/2000 | Nasuda | EP | 0862342 | 2/1998 |
| 6,118,994 | A | 9/2000 | Usami et al. | EP | 0862342 A3 | 2/1998 |
| 6,128,381 | A | 10/2000 | Holmstrom et al. | EP | 0898407 A2 | 2/1999 |
| 6,134,310 | A | 10/2000 | Swan et al. | EP | 0930593 A1 | 12/2001 |
| 6,134,320 | A | 10/2000 | Swan et al. | EP | 1185068 A2 | 6/2002 |
| 6,151,491 | A | 11/2000 | Farris et al. | EP | 1231762 | 8/2002 |
| 6,157,318 | A | 12/2000 | Minata | FR | 2358065 | 2/1978 |
| 6,163,274 | A | 12/2000 | Lindgren | FR | 2717975 B | 1/1998 |
| 6,163,691 | A | 12/2000 | Buettner et al. | GB | 2024567 | 5/1979 |
| 6,168,331 | B1 | 1/2001 | Vann | GB | 2140253 A | 11/1984 |
| 6,169,904 | B1 | 1/2001 | Ayala et al. | GB | 2173071 | 10/1986 |
| 6,169,911 | B1 | 1/2001 | Wagner et al. | GB | 2256113 A | 11/1992 |
| 6,175,741 | B1 | 1/2001 | Alperovich | GB | 2287856 B | 3/1994 |
| 6,181,366 | B1 | 1/2001 | Dezonno et al. | GB | 2279203 | 12/1994 |
| 6,181,915 | B1 | 1/2001 | Lewiner | GB | 2296841 | 7/1996 |
| 6,181,928 | B1 | 1/2001 | Moon | JP | 146167 | 8/1983 |
| 6,184,796 | B1 | 2/2001 | Rivero | JP | 191541 | 11/1983 |
| 6,192,218 | B1 | 2/2001 | Laufmann et al. | JP | 58191541 | 11/1983 |
| 6,192,254 | B1 | 2/2001 | Carlsen et al. | JP | 90451 | 5/1984 |
| 6,192,257 | B1 | 2/2001 | Ray | JP | 41358 | 3/1985 |
| 6,198,916 | B1 | 3/2001 | Martin | JP | 77539 | 5/1985 |
| 6,205,213 | B1 | 3/2001 | Kucmerowski | JP | 94547 | 5/1985 |
| 6,205,321 | B1 | 3/2001 | Rutledge | JP | 178730 | 9/1985 |
| 6,205,332 | B1 | 3/2001 | Novel | JP | 187141 | 9/1985 |
| 6,226,367 | B1 | 5/2001 | Smith et al. | JP | 186056 | 8/1986 |
| 6,226,368 | B1 | 5/2001 | Teich | JP | 81821 | 4/1987 |
| 6,226,379 | B1 | 5/2001 | Swan et al. | JP | 8706421 | 10/1987 |
| 6,226,665 | B1 | 5/2001 | Deo et al. | JP | 65748 | 3/1988 |
| 6,229,878 | B1 | 5/2001 | Moganti | JP | 103526 | 5/1988 |
| 6,230,003 | B1 | 5/2001 | Macor | JP | 46332 | 2/1989 |
| 6,233,315 | B1 | 5/2001 | Reformato et al. | JP | 185035 | 7/1989 |
| 6,236,971 | B1 | 5/2001 | Stefik et al. | JP | 1243655 | 9/1989 |
| 6,246,430 | B1 | 6/2001 | Peters | JP | 246947 | 10/1989 |
| 6,253,061 | B1 | 6/2001 | Helferich | JP | 13050 | 1/1990 |
| 6,266,539 | B1 | 7/2001 | Pardo | JP | 294758 | 4/1990 |
| 6,278,862 | B1 | 8/2001 | Henderson | JP | 4222145 | 8/1992 |
| 6,282,435 | B1 | 8/2001 | Wagner et al. | JP | 4225687 | 8/1992 |
| 6,327,478 | B1 | 12/2001 | Baker | JP | 4248742 | 9/1992 |

| | | |
|---|---|---|
| JP | 5327859 | 12/1993 |
| JP | 08033016 | 7/1994 |
| JP | 08097935 | 4/1996 |
| JP | 09116619 | 2/1997 |
| JP | 10336316 | 12/1998 |
| JP | 11-220551 | 8/1999 |
| JP | 11261673 | 9/1999 |
| JP | 49930 | 2/2000 |
| TW | 0385604 B | 3/2000 |
| WO | WO 90/13213 * | 11/1990 |
| WO | WO 91/11889 | 8/1991 |
| WO | WO 9408421 A1 | 4/1994 |
| WO | WO 9408421 A1 * | 4/1994 |
| WO | WO 94/13093 | 6/1994 |
| WO | WO 97/01252 | 1/1997 |
| WO | WO 0143475 A1 | 6/2001 |

OTHER PUBLICATIONS

The GSM System For Mobile Communications, Michel Mouly and Marie-Bernadette Pautet, International Standard Book No. 2-9507190-0-7, 1992.*
"SS7 and BB King"Primedia Business Magazines & Media, Inc., Mobile Radio Technology, May 1, 1999.*
Messaging: A New Direction—Awash in E-Mail troubles? A Raft Of New Products Is Coming To The Rescue., Network Computing, Oct. 1, 1996, pp. p. 58.
IdentaFone overview from website dated Oct. 17, 1996.
NetPAGE product overview.
HP TeleShare: Integrating telephone capabilities on a computer workstation, Hewlett Packard Journal, Apr. 1, 1995, pp. 69.
Hayes Europe's Smartcom Message Center Software, Newbytes News Network, Feb. 29, 1996.
AT&T Makes Big Move in Digital Race, Los Angeles Times, Oct. 3, 1996, pp. D-2.
Faster Units Due in Stores Next Year, Computer Retail Week, Oct. 14, 1996, pp. 33.
CDMA'S March Continues, Newsbytes News Network, Aug. 19, 1996.
AT&T First To Offer PCS Phones / New System bundles several wireless Servicesl, Newsday, Oct. 3, 1996, pp. A49.
Fax Software: Delrina Demos WinFax Pro 7.0 For Windows 95; Cambridge Publishing, 1995.
New Modems: New Cardinal Voice-Capable Modems Offer Innovative Telephony; Cambridge Publishing, Inc. 1995.
Toward Human Centered Design. vol. 96,Technology Review, Jul. 1, 1993, pp. 47.
How the Europeans respond to Mobile communications., vol. 31, Communications News, May 1, 1994, pp. 28.
Users seek alternatives to high cellular costs., vol. 12, Minneapolis-St. Paul City Business, Jun. 17, 1994, pp. 14.
Voicenow is Hip-pocket Answering Machine. USA Today, Apr. 5, 1995.
Multimedia Messaging: AT&T Integrates Voice & Fax Messaging At Desktop. Cambridge Telecom Report, 1994.
CID Technologies and Macpager information.
Private EyeD—MartyrWare Private Eye, v. 1.1, product overview, 1994.
Little Brother pager notification program with caller id, product overview, © 1991-1994.
CallerID Remote and CIDMan v. 1.29b, product overview, 1995.
CALLINFO: v1.0 Caller ID TSR Program product description, Oct. 28, 1994.
PageMate: v3.3 product overview, Apr. 30, 1993.
CALLLINK: v2.1 Caller ID for Windows Demo, May 17, 1994.
Page on Call, v2.1, PC program overview, Jan. 28, 1994.
BeepMe v3.1, PC program overview, Aug. 22, 1993.
*Messaging: A New Direction—Awash in E-Mail Troubles? A Raft of New Products is Coming to the Rescue*, Network Computing, Oct. 01, 1996, pp. 58.

*Identafone Overview From Website*, Dated Oct. 17, 1996.
*Netpage Product Overview*, NetPage, http://web.archive.org/web/19961221195506/http://www.net-pager.com/, Dec. 21, 1996, 2 pages.
*HP TELESHARE: Integrating Telephone Capabilities on a Computer Workstation*, Hewlett Packard Journal, Apr. 1, 1995, pp. 69.
*Hayes Europe's Smartcom Message Center Software*, Newbytes News Network, Feb. 29, 1996.
*AT&T Makes Big Move in Digital Race*, Los Angeles Times, Oct. 3, 1996, D-2.
*Faster Units Due in Stores Next Year*, Computer Retail Week, Oct. 14, 1996, pp. 33.
*CDMA's March Continues*, Newsbytes News Network, Aug. 19, 1996.
*AT&T First to Offer PCS Phones/New System Bundles Several Wireless Services*, Newsday, Oct. 3, 1996, pp. A49.
*Diamond Ships Voice Modem With Internet Phone*, Newsbytes News Network, May 18, 1995.
*Fax Software: Delrina Demos Winfax Pro 7.0 for Windows 95*, Cambridge Publishing, 1995.
*New Modems: New Cardinal Voice-Capable Modems Offer Innovative Telephony*; Cambridge Publishing, Inc., 1995.
*Toward Human Centered Design*, vol. 96, Technology Review, Jul. 1, 1993, pp. 47.
*How the Europeans Respond to Mobile Communications*, vol. 31, Communications News, May 1, 1994, pp. 28.
*Users Seek Alternatives to High Cellular Costs*, vol. 12, Minneapolis-St. Paul City Business, Jun 17, 1994, pp. 14.
*Voicenow is Hip-Pocket Answering Machine*, USA Today, Apr. 5, 1995.
*Multimedia Messaging: AT&T Integrates Voice & Fax Messaging at Desktop*, Cambridge Telecom Report, 1994.
*CID Technologies and Macpager Information*, CID Technologies, Inc., Dec. 8, 1996.
*OPON: MCI to Provide Nationwide 'Find Me/Follow Me' Communications Service*, Cambridge Publishing Inc., 1994.
*Private Eyed—Martyrware Private Eye*, vol. 1.1, Product Overview, 1994.
*Little Brother Pager Notification Program With Caller ID*, Product Overview, © 1991-1994.
*CALLERID Remote and Cidman V.1.29B*, Product Overview, 1995.
*Callerinfo: V1.0 Caller ID TSR Program Product Description*, Oct. 28, 1994.
*Pagemate: V3.3 Product Overview*, Apr. 30. 1993.
*CALLLINK: V2.1 Caller ID for Windows Demo*, May 17, 1994.
*Page on Call*, V2.1, PC Program Overview, Jan. 28, 1994.
*BEEPME V3.1*, PC Program Overview, Aug. 22, 1993.
Advantra Brochure, *Enhanced Messaging Organizer-Premier*, Texas Instruments, Jan. 1997.
Advantra Brochure, *Enhanced Messaging Organizer-Pro*, Texas Instruments, Jan. 1997.
*AVIG010, The Intelligent Organizer*, Texas Instruments—on the Go, vol. 1, No. 1, Fall 1997.
Active Data Product Catalog, Mar. 1993, p. 1, 2, 3, 5, 6.
*Apple PDA Prototype Makes Debut at CES*, PC Week, Jun. 1, 1992.
"Magic Cap Means Communication" brochure-1994.
"Magic Cap" Brochure—1994.
Mobile Office—Jan. 1994, vol. 5, No. 1, pp. 100-117, "Trio of Tommorrow" article, back cover, Evtek Corporation product advertisement, The Write Touch.
PC LapTop Magazine,Feb. 1995, vol. 7, No. 2, pp. 28-48.
It's NEW, May/Jun. 1995, vol. 1, No. 2, pp. 73-77.
NTT DoCoMo Brochure, Apr. 1, 1995.
Pen Computing Magazine, Aug. 1994, vol. 1 No. 1, pp. 15-22, 34-35.
PC Pager Advertisement—1993.
Computerworld, Dec. 21, 1992, p. 8. "*Windows link to pagers aids LAN troubleshooters*".
Computer World, Aug. 2, 1993, vol. 15,Issue 31, p. 1, "Newton arrives sans remote links".
Magic Cap Press Release, San Francisco, Jan. 6, 1994.
Comdial Tracker brochure, 1994.
Motorola Press Release, PCMCIA wireless modem technology announcement.

Hewlett Packard Press Release, Infrared communications interface announcement, Jun. 1, 1993.
Skytel Press Release—Jan. 6, 1994, "Skytel Corp. and General Magic work together to provide wireless mobile communications".
Newton Message Pad 120, product brochure—1994.
PC Magazine, Aug. 1993, "EO Falls Short AS Ultimate Handheld Communicator".
T.A.V.I.S. Talk Product Brochure, Biztel Communication Systems, Inc.
VS-401 TALKS SB product brochure.
Mobile Office Magazine, Jan. 1994, p. 76, Fujitsu PCX numeric answering machine.
PC World, Dec. 1992, Mobile Computing Section, pp. 239-265, "Nomads of the Nineties".
Mobile Data Report, Feb. 1, 1994, v6 I2, Apple, Mobilecomm offer Newton, Pager Card, airtime deal.
PC Week, May 23, 1994 v11 n20 p. A1(2), A paging party. (growing trend towards one-way messaging).
Teledynamics Catalog, Sep. 1994—Fans P161P Telesecretary Paging Device, pp. 25, 49, 51.
General Magic Press Release, Feb. 8, 1993.
Positive Communications "BEEPER" brochure, 1993.
WinID Paging System—Software manual—v. 1.0, Nov. 15, 1994.
AT&T EO 440 & 880 Personal Communicators brochure, 1993.
PC Week, Feb. 12, 1990, They're Here: Portable E-Mail and Voice Mail.
Ultravoice product brochure.
TeleLink DS5000 advertisement—1993.
PC Magazine, Jun. 15, 1993, "HP 100 LX Adds Remote E-Mail".
INFOWORLD, Jun. 7, 1993, p. 34, "Omron readies PDA for release".
INFOWORLD, Mar. 22, 1993, p. 4, "A failure to communicate: the long road to phone, PC integration".
INFOWORLD, Feb. 22, 1993, p. 29, "Today's notebooks to gain telephony".
INFOWORLD, Apr. 19, 1993, p. 1, "Microsoft, Intel team up to integrate phones, Pcs".
INFOWORLD, Jun. 14, 1993, p. 30, "Third parties to enhance OmniBook 300's communications".
INFOWORLD, Jun. 7, 1993, p. 43, "Card is all-in-one messenger".
INFOWORLD, Jun. 7, 1993, p. 3, "Alliances give Newton PDA a communications advantage".
MacWeek, Aug. 2, 1993, p. 63-68, "The MessagePad: Apple's first personal digital assistant".
INFOWORLD, Jun. 28, 1993, p. 1, "General Magic's PDA interface comes to life with realistic objects".
PC Magazine, Aug. 1993, p. 359-384, "Connecting Over the Airwaves".
Electronic News, Sep. 28, 1992, p. 11, "Motorola has dual mode RF modem".
Computer Retail Week, Nov. 16, 1992, p. 56, "Wireless messaging gets Windows version".
Business Week, May 17, 1993, Electronic Messages from Phones, PC's, even Faxes.
Telecomworldwire, Aug. 23, 1994, "Airnote pager filter to ship in North America".
Telecomworldwire, Jun. 28, 1994, "Singtel adds pager into CT2 Phone Service".
Global Communications, Sep.-Oct. 1992, v14 n5, p. 14, "Paging Taiwan".
PC Week, Oct. 24, 1994 v11 n42 p. 109, "Voice of the Future".
Motorola product brochure, "Marco Wireless Communicator", 1994.
Vomax 2000 product brochure, 1992.
PC WORLD, Feb. 1993, "TyIN 2000 Communications System Ties Data, Fax, and Voice together".
TyIN 2000 product brochure, 1993.
DIGITRAP Brochure, DTS-2040 product brochure, Nicollet Technologies 1994.
Nicollet DigiTrap DTS-1082 product brochure, 1994.
Telocator Network Paging Protocol (TNPP), v. 3.6, Oct. 20, 1993.
Telocator Data Protocol (TDP), Jun. 12, 1993.
Telocator Alpanumeric Protocol (TAP), v. 1.5, Jul. 21, 1994.

Psion Series 3 Personal Information Management product brochure, Sep. 1993.
Pagentry product brochure, 1992.
Byte Magazine, Aug. 1994, p. 34, "IBM Plans Ambitious Network".
Windows Sources, Apr. 1994, p. 106-138.
San Francisco Examiner, Aug. 1, 1993, p. E16, "Newton arriving at last".
Bellcore LSSGR ANI and ONI—FSD 20-20-0000, Issue 2, Mar. 1991.
Bellcore LSSGR TR-NWT-000030 Issue 2, Oct. 1992.
Bellcore LSSGR TR-NWT-000391, Issue 3, Sep. 1992.
Bellcore LATA TR-NWT-000031, Issue 4, Dec. 1992.
Motorola SiteMate product brochure—on-site voice paging system.
Telecomworldwire, May 31, 1994, "IBM, Paclink launch new pager in Thailand".
Newsbytes News Network, Apr. 11, 1994, "PageNet, Motorola work on advanced pager".
Newsbytes News Network, Mar. 2, 1994, "PCMCIA Card combines wireless pager / wired fax modem".
Newsbytes News Network, Dec. 21, 1993, PageCard to double as PCMCCard/Standalone pager.
Computergram International, Dec. 20, 1993, 12322, "Motorola unveils the memo express pager".
Newbytes News Network, Dec. 22, 1993, Japan—AT&T intros videophone, Motorola plans voice pager.
Edge, Nov. 14, 1994, v9 1329, "Paging: Lotus ships lotus notes pager gateway 1.1 gateway supports multiple paging vendors".
Telecommunications (TL), Report on AT&T, Nov. 21, 1994 v12 123, "AT&T Focuses on regular text messaging as pager money-maker".
Telecomworldwire, Oct. 7, 1994, "NEC introduces super 'Know-everything' pager into UK Market".
HFD-The Weekly Home Furnishings Newspaper, Jan. 31, 1994 v68 n5 p. 92.
StatelLite Communications, Sep. 1992 v16 n9 p. 29(4).
PageMaster paging application—Software help manual—v. 1.4, 1995.
Executive Page v. 1.2—Software manual—1993, 1994.
CALLLink for Caller ID v. 2.1—Software manual—Digital Systems Group, Inc., 1994.
The Business Journal, Oct. 14, 1994 v14 n50 p. 27, "Wireless message pad among new products".
Communications Daily, Jan. 30, 1991 v11 n20 p. 5.
PC Week, Sep. 20, 1993 v10 n37 p. 41.
Communications International, Jul. 1994 v21 n7 p. 16(2).
InfoRad AlphaPage software advertisement, Dec. 1992.
Mobile Data Report, Sep. 26, 1994, v6 I19, "Casio introduces nationwide availability of organizer-pager".
PC Laptop Computers Magazine, Apr. 1993, vol. 5, No. 4, pp. 31, 61-63.
Motorola brochure, "Wrist Watch Pager", 1990.
Communications Daily, Mar. 8, 1994 v14 n45, p. 3.
Radio, Computer & Telephone Corp. PocketOffice brochure, v. 1.0, Jun. 1993.
BellSouth Product Brochure, Simon, 1994.
*How to Appease a Fat Cat From a Gondola*, Mobile Office, Undated, pp. 29, 1 Page, possibly circa 1993-1994.
*How to Stay on Top of Your Business, No Matter Where You Are*, EO, Inc./AT&T Brochure, Undated, 4 Pages, possibly circa 1993-1994.
*ANI Update*, Fall 1991.
*Caller ID Service Attracts About 4000 Initial Subscribers*, Business, Feb. 26, 1994, Front Page.
*ATDI 3000 Owner's Guide*, undated.
*Enhanced Messaging Service White Paper*, Dec. 1992.
Simon—*User Manual*, Bell South 1994.
*BEEPME V3.1 Call Your Pager*, Aug. 22, 1993.
*Dear Potential Client Letter*, Biztel Communications Systems, Inc.
Bouncer by SNI Innovation Brochure, 1992.
Bouncer by SNI Innovation Brochure—Your Personal Telephone Secretary.
*Caller IF With Digital Voice*, Bel-Tronics Limited Brochure, 1994.
*A Rocket in Its Pocket*, Business Week, Sep. 9, 1996, p. 111-114.
*Frequently Asked Questions About Caller-ID*, V1.1, Mar. 1994.

*Caller-ID, ANI, DNIS, and DID*, CallerID.HTM at www.stylus.com, Oct. 23, 1997.
Pocket Organizer, IP800 Owner's Manual, Casio 1994.
Callman Model CM3 Brochure, undated.
*Caller ID Option to Become More Attractive During '95*, Twice CES Daily, Jan. 8, 1995, pp. 36-40.
Casiopeia by Casio Brochure, 1996.
Computer Link—PC Link Plus & Casio Link Brochure by Casio, Traveling Software Inc., 1991.
Caller-ID Pro 1.2, 1996.
Multi-Line Adapter Model 20040—Caller ID Mgmt System by Rochelle Communications, Inc., Jul. 1992.
*Callman Brochure*, Westlink Systems Corp., undated.
*Callman Model CM2 Brochure*, Westlink Systems Corp., undated.
*Take Back Control of Your Telephone*, Electronics Now, Jul. 1994.
*Rochelle's Caller ID Quest*, Teleconnect, Apr. 1994, p. 22.
*Commail 1,3—Caller ID Voice Mail for Windows 95/98*, From http://crews-net.com/commail, Sep. 17, 2000.
Alphanumeric Paging Advertisement, From http://www.onthewww.com/paging/options/shtml, Sep. 17, 2000.
*Callinfo: V.1.0 Caller ID*, Oct. 28, 1994.
*Creative Technologies in Modem, Phone Business*, Your Document, Mar. 27, 1995.
File Info for CIDRP.CPT, CallerID Remote 1.0.2P, Sep. 14, 1995.
*Phreaking Caller ID and ANI*, Consumertronics, 1993.
*Caller ID Could Spur Telephone Link Over Cable*, Multichannel News, Apr. 18, 1994, p. 40.
*Principles of Caller ID*, International Micropower Corporation, 1992.
Caller ID Availability Map, Byte, Jan. 1995.
*Caller ID Goes to Work*, Byte, Jan. 1995.
*Truespeech 6.3, 5.3, 4.8 KBPS Algorithm*, DSP Group, Inc., Apr. 1995.
*Truespeech 8.5 KBPS Algorithm*, DSP Group, Inc., Mar. 1995.
Boca Research Sound Expression 28.8 SRS, Your Document, 1996.
Execpage: V1.2.0108 Windows Paging Module, Jun. 16, 1995.
*The Top 10 Innovative Products for 2006: Technology With a Human Touch*, The Futurist, Jul.-Aug. 1996, p. 18.
Infotrac—National Newspaper Index, 1990-Jan. 1993.
*Glenayre Provides MVP System to Pennsel Communications Services*, Glenayre News, Oct. 3, 1996.
*Glenayre Successfully Activates Complete Inflexion Voice Messaging System*, Glenayre News, Sep. 3, 1996.
*Glenayre Launches Wireless Messaging Standard on Internet*, Glenayre News, Aug. 8, 1996.
News Release Transmitted by Canadian Corporate News, Jul. 26, 1995.
HFN Buyers' Guide, Jan. 1, 1996.
*A New Name in Pagers*, Consumer Electronics, Jan. 13, 1997, p. 161.
Hotpage by Smith Micro Software Brochure, 1997-1998.
*Hayes Office Communications Manager—This Modem is Truly Connected*, 1996 CMP Media, Inc.
*Why Just Get a Page*, Intellect, 1993.
Intellect Brochure by Innovad, 1993.
Bulletin Board—Q&A—Inc. Tech 1997, No. 3.
Intellilink Brochure, 1993-1994.
Intellect by Clearwave Communications, Inc., New Product Announcement.
*Always in Touch Relays Caller IDs to Pagers*, Mobil Computing and Communications, May 1997.
*Communications Abilities Let Newton Make the Exchange*, MacWeek, Aug. 2, 1993.
*Spoken Caller ID Trial in Baltimore is First Cellular-Based Test of Its Kind*, Mobile Phone News, Dec. 20, 1993, V11, N48, p. 3(2).
Monologue User Manual by Media Vision, 1992.
*FCC Auction to Push Paging and Messaging*, Telephony, Jul. 25, 1994 V227 N4 p. 8(1).
"PCIA Forecasts" PDA Developers 3.3, May/Jun. 1995, pp. 4-5.
"PCS Frequently Asked Questions" PCIA, 1996.
"Court Approves Caller ID Without PUC Restrictions" The Recorder, Feb. 1, 1996, p. 2.
Pager Codes Brochure by REO Enterprises, 1993-1994.
Pocketalk Brochure by Conxus, 1998.

"Pager Patterns" Dealerscope First of the Month, Jan. 1994, p. 32.
"1997-A New Page" Consumer Electronics, Jan. 1997, p. 10.
"Wireless Watch" PDA Developers 3.4, JUUAUG 1995, pp. 5-6.
"Product Announcements" PDA Developers 3.2, Mar./Apr. 1995, pp. 3-4.
"Wireless Watch" PDA Developers 3.2, Mar./Apr. 1995, pp, 6-8.
*Reviews and Previews*, PDA Developers 3.2, Mar./Apr. 1995, pp. 9-12.
"The Simon Personal Communicator" PDA Developers 3.2, Mar./Apr. 1995, pp. 13-16.
"Wireless Watch" PDA Developers 2.6, Nov./Dec. 1994, pp. 4-5.
"Wireless Data Services: Here and Now" PDA Developers 2.6, Nov./Dec. 1994, p. 32-34.
"6 Firms to Unveil High-Tech Alliance" San Jose Mercury News, Feb. 8, 1993, Front Page.
Work Ready Brochure by Smith Corona, 1997.
Skyword Advertisement by Skytel, 1993.
"Putting Email Into Your Pocket" Mobile Computing & Communications, Dec. 1998, p. 50.
Shareview 3000 Brochure by Sharevision, 1994.
"Two-Way Pagers: The Next PDA?" Byte, Jan. 1996.
"Multimedia: Sierra Announces Fully-Concurrent Sound, Data, Fax &" Cambridge Work-Group Computing Report, 1995.
Simon By BellSouth Cellular Corporation and IBM, 1994.
"Speedybase" Telephone Products, Jul. 3, 1994.
*Skytel and the Sony Magic Link Pager Card*, Skytel Corporation, 1994.
Caller Eyedee Features, 2001.
*Caller ID and ANI Primer*, CTI Magazine, Feb. 1997, vol. 2, No. 2, p. 52.
Telcomp, Inc. Caller ID (ANI) Frequently Asked Questions, 1996.
"MCI to Build Local Phone Networks" San Jose Mercury News, Jan. 5, 1994.
"Wallet Terminal Keyboard With Acoustic Coupler" IBM Technical Disclosure Bulletin, Aug. 1967, pp. 188-189.
"Electronic Reference Devices are Enjoying Greater Respect in the Marketplace" Dealerscope-Merchandising, Jun. 1992, p. 120.
Alphanumeric Paging Brochure by Pactel Paging, 1992.
Voice Express Service by Pactel Paging, 1992.
The Casio IP800 Brochure, 1994.
"Phones, PCS, is Managers Converge to Bring More Services" Infoworld, May 17, 1993, p. 4.
Metromedia, Alpha-Numeric Display Pager, undated.
*Sony Launches First Personal Communicator Based on General Magic Software Technologies*, Announcement Sep. 28, 1994.
"Office to Go" PC Laptop Computers Magazine, Apr. 1993, pp. 28-34.
"Keeping in Contact" PC Laptop Computers Magazine, Apr. 1993, pp. 36-42.
Buyers Guide, PC Laptop Computers Magazine, Apr. 1993, p. 61.
"Palmtops, Pens & Portables" PC Laptop Computers Magazine, Apr. 1993, pp. 80-81.
"Laptop Office" PC Laptop Computers Magazine, Apr. 1993, pp. 84-87.
"Compuserve's E-Mail-to-Pager Communication Helps Users get Information Anytime, Anywhere" The Compuserve Information Service, Mar. 6, 1996.
EIA/TIA Standard—Mobile Station—Land Station Compatibility Specification, Sep. 1989.
Quick Start Guide, CD USA, 1997.
User Manual, Phonedisk, Mar. 1995.
"Shareview Transforms Phones" Infoworld, Feb. 1993.
Universal Remote Controls Advertisement by Aikotec Corporation, Telecom Sources, Oct. 1995, p. 158.
N-1 Numeric Pager by GSL, Telecom Sources, Oct. 1995, p. 265.
"Pagenet's Voicenow Due in N. Cal., Nev." HFN, Apr. 14, 1997, p. 168.
"Caller ID Going National; Suppliers Eye Good Year" Twice CES Daily, Jan. 5/7, 1996.
Teledynamics Product Booklett, pp. 1-2, Jan. 3, 1994.
Skytel Message Center—"This Page Lets You Sneak out of the Office"—Business Week, Sep. 20, 1999, p. 138G.
NEC Beacon Data Pager Advertisement.

BellSouth Interactive Paging Advertisement.
Digital Palm Pilot Phone—Pen Computing, Feb. 1998.
Sony MD-7001 Alphanumeric Pager Advertisement.
"Audiovox Plans Combo Phone/PDA" RCR Wireless News, Feb. 26, 2001.
"Streaming Technologies Gather Momentum in Wireless Space" RCR Wireless News, Feb. 19, 2001.
Panasonic GD93 Advertisement.
Motorola Accompli 009 Personal Communicator, Celebrated Living, Spring 2001.
Tech-Know PDAS, American Way, Jan. 15, 2001.
Skytel Messaging Pagers Advertisement.
Texas Instruments Organizers Brochures.
*The Leader in Caller ID Technology*, Telecom Sources, Oct. 1995, p. 191.
*Fast Automatic Name/Number Systems Brochure*, Jan. 1995.
*Fans Callscreener, Telesecretary Owner's Manual*, Undated, pp. 1-27, possibly circa Sep. 1994.
*Fans Callscreener Brochure*, CES Show Jun. 1993.
"US West Requests OK for Pioneer Wireless Testing," Newsbytes News Network, Jul. 30, 1991.
*AT&T Ships Passageway*, Newsbytes News Network, Feb. 5, 1993.
*Caller ID is Taking to the Road*, The Record, Nov. 16, 1993, p. 16.
*On Time Gets Wireless Links*, Newsbytes News Network, Feb. 5, 1993.
"Intel Users not Getting Much Satisfaxtion" Newsbytes News Network, Apr. 10, 1991.
"Digital Service Launched Over Lucent Technologies Equipment" Lucent Technologies Press Release, Jul. 8, 1997.
"Technology: A Portable Office That Fits in Your Palm Cellular Phones, Faxes and E-Mail are all Coming Together in a Clever Batch of Hand-Held Computers" Time, 2, 15, 1993, p. 56.
"PCS '97: New Wireless Phone Offers Access to Advanced PCS Features" Lucent Technologies/Bell Labs Press Release, Sep. 10, 1997.
"Wireless Talking Caller ID" Lucent Technologies, 2000.
FCC Registraion for Very Early Caller ID Product, Aug. 1994.
"Lucent Technologies Introduces New Portfolio of Enhanced Services for Wireless Carriers" Lucent Technologies Press Release, Feb. 29, 2000.
"Lucent Technologies Makes Computer-Telephony Easy; Announces First PC-Based, Multi-Phone System With no Rewiring" Lucent Technologies, Mar. 4, 1997.
"Wireless Calling Name" Lucent Technologies, 2000.
*Contact Managers and PIMS*, Computer Dealer News, Mar. 23, 1994, p. 50(2).
*Rochelle Offering Caller ID Applications*, Newsbytes News Network, Mar. 7, 1994.
"Caller ID Product Explosion Coming" Computer Telephony Magazine, Apr. 1, 1995, p. 44(2).
*Puma Technology Ships Intellilink Software to Extend the NEC Beacon Data Pager to PC-Based Applications; Puma Intellilink Software Makes Smart Pager a Powerful PC Companion*, Business Wire, Jun. 12, 1998.
"Spending: How to be as Smart as Your Phone" Money, Jan. 1, 1991, p. 122.
*The Future is Now—Interview w/AT&T Consumer Products Div. President Carl S. Ledbetter*, vol. 246, Popular Science, Jan. 1, 1995, pp. 68(8), reprinted from eLibrary.
"New for PC: $79 Caller ID Device" Newsbytes News Network, Feb. 27, 1992.
Internal Research Results of FCC Applicant Query.
News Release: *McCaw Cellular Has Nation's First Wireless Caller ID Service*, Feb. 27, 1995.
"Information Technology: The Wired Executive Savings Time Around the Clock" Fortune, Dec. 13, 1993, p. 157.
*Wireless Market Players Team on New Palmpilot Paging Device*, Mobile Matters, Dec. 1, 1997.
Information Technology: *Look, Ma! No Wires!*, Fortune, Dec. 13, 1993, p. 147.
"Comdex—Galvin Keynote Pitches Motorola Technology" Newsbytes News Network, May 25, 1994.

"Novell Intros Perfect Works 2.1 for Windows" Newsbytes News Network, Apr. 4, 1995.
"Software Converts E-Mail Text to Voice" Newsbytes News Network, May 25, 1995.
"Windows 95 "Coming Soon" Program is . . . Coming Soon" Newsbytes News Network, Jul. 13, 1995.
"Ontime Scheduler Adds Phone Integration" Newsbytes News Network, Jun. 6, 1994.
"CTI: Bell Atlantic & Octus Collaborate to Integrate Computers & Telephones" Cambridge Work-Group Computing Report, Oct. 24, 1994.
"CTI: Phoenix Telephony Suite Provides PCs for Small & Home Offices With" Cambridge Work-Group Computing Report, Jun. 19, 1995.
"Symantec Offers Free Telephony Add-In for ACT!" Newsbytes News Network, Mar. 8, 1995.
"New PC: AT&T Intros the Globalyst 360TPC. First PC With True AT&T" Cambridge Work-Group Computing Report Aug. 29, 1994.
"Windows 95's New Goodies" Newsbytes News Network, Oct. 21, 1994.
*PCS: Technology With Fractured Standards*, Electronic Design, Feb. 6, 1995, p. 65.
"Priority's "One Number Service" for Paging/Phone/Fax" Newsbytes News Network, Nov. 23, 1994.
"A Roundup of Hot Games, Gadgets & Gizmos From the Consumer Electronics Show Stay Tuned . . . " Newsday, Jul. 21, 1994, p. B29.
"Connect2voice Reads Your E-Mail to You" Newsbytes News Network, Sep. 26, 1995.
"Apple's Geoport Demonstrated by VP Al Gore" Newsbytes News Network, Mar. 3, 1994.
"Online to a Revolution the Amazing- and Some say Ominous—New World of TV, Telephone and Computer is Heading Your Way" Newsday, Jul. 18, 1993, p. 4.
"New for PCS: Board and Software Work With Caller ID" Newsbytes News Network, May 11, 1992.
"Comdex: High-End Caller ID Handler Announced for PC's" Newsbytes News Network, Apr. 9, 1992.
"Supra Intros New V.32 Data/Fax Modems" Newsbytes News Network, Feb. 7, 1992.
"Comdex Preview: PCMCIA Modems" Newsbytes News Network, Nov. 13, 1992.
"Comdex: Single Board Provides Fax/Modem/Answerphone" Newsbytes News Network, Oct. 24, 1991.
"Comdex: Windows Caller ID System Announced" Newsbytes News Network, Oct. 25, 1991.
"Moscow: Computer answering Machine" Newsbytes News Network, Apr. 4, 1991.
"Technology: A Portable Office That Fits in Your Palm Cellular Phones, Faxes and E-Mail are all Coming Together in a Clever Batch of Hand-Held Computers" Time, Feb. 15, 1993, p. 56.
*Wireless Manners Needed More Than Ever*, Business Wire, May 3, 1999.
*Brace Yourself for Some Major Advances*, Internetwork, Jan. 2, 1997, p. 28(2).
"Northern Telecom: Nortel Announces Two New Digital Wireless Handsets With First-to-Market Features" Presswire, Aug. 26, 1997.
"Cover Story/Small Wonders" Newsday, Dec. 1, 1996, p. F08.
"AT&T Offers Digital PCS Service in 40 Markets" Reuters Business Report, Oct. 2, 1996.
*Four Bells Posts Strong Profits on Wave of Demand*, Rueter's Business Report, Jan. 21, 1997.
"Caller ID Service now Available to Most Airtouch Cellular Customers in Oregon" Business Wire, May 18, 1998.
*Ericsson: Wins $17 Million Contract From APC for PCS Phone; First PCS*, Cambridge Telecom Report, Aug. 21, 1995.
*AT&T Goes Nationwide With PCS*, Dallas Morning News, Oct. 3, 1996, p. 11.
"Caller ID: Skytel Confirms Apr. 15 Nationwide Launch of Caller ID" Cambridge Telecom Report, Apr. 20, 1998.
*Caller ID—R.I.P.*, Guest Editorial, Newsbytes New Network, Apr. 30, 1993.

"Regulators Vote to Review Caller ID" The Record, Jan. 23, 1993.
"Southwestern Bell Fights Caller ID Ban in Texas" Newsbytes News Network, Feb. 10, 1993.
"Caller ID on Phone Horizon—Controversial Service Shows Call Origination" Wisconsin State Journal, Dec. 3, 1993, p. 7C.
"Caller ID Service to Debut Next Week" St. Louis Post-Dispatch, Jul. 2, 1993, p. 05B.
"Caller ID Service in Trouble?" Newsbytes News Network, Mar. 24, 1992.
"Caller ID Spreading Nationwide" Newsbytes News Network, Nov. 23, 1992.
*Invasions of Privacy*, St. Louis Post—Dispatch, Jul. 14, 1993, p. 06B.
"Caller ID Moves Ahead in Indiana" Newsbytes News Network, Feb. 14, 1992.
"Pacific Bell Caller ID Just got Better—CPUC Approves Name Enhancement" Business Wire, Mar. 16, 1993.
FCC Database Research for Caller ID—ID Paging.
*US West Paging Addresses Travelers' Needs*, Weekly Home Furnishing News, Jul. 26, 1993, p. 69.
Michael Bayer *Computer Telephony Demystified*, © 2001.
*Newton's Telecom Dictionary*, pp. 143.
"Lines Between Phones, PDA'S Blur" RCR Wireless News, Sep. 10, 2001, p. 3.
"Microsoft Releases Details of Pocket PC OS Upgrade" RCR Wireless News, Sep. 10, 2001, p. 3.
Philips Home Services Brochure, "The Next Logical Step" 1994.
Philips Home Services Brochure, "The Next Generation Telephone" 1994.
Octus PTA Brochure, 1994.
"Sprint Venture Picks AT&T Network Systems, Northern Telecom as Vendors" Press Release by Lucent Technologies, Feb. 1, 1996.
"AT&T Announces Major Restructuring for 21$^{st}$ Century" Press Release, Sep. 20, 1995.
*Systems and Technology Company Headquarters—Press Release*, Nov. 20, 1995.
*Integrated Messaging Capability*, Press Release Feb. 1, 1995.
"AT&T Introduces Compact Portable Cellular Flip Phone" Press Release, Jan. 6, 1995.
*AT&T Demonstrates PCS Spectrum CDMA At Wireless '95 Tradeshow*, Press Release, Feb. 1, 1995.
"Wireless and Wireline Convergence" Bell Labs Technical Journal, Summer 1997.
Definition of Pager From APDG Telecom Books, Nov. 9, 2001.
Definition of PDA From APDG Telecom Books, Nov. 9, 2001.
"GTE Introduces Digital CDMA Wireless Service in Austin, Texas . . . " Press Release, Nov. 15, 1996.
"GTE Launches CDMA Wireless Service in California" Press Release, Mar. 3, 1997.
"AT&T to Introduce New Wireless Intelligent Network Platform" Press Release, Jan. 23, 1995.
*National Alliance Places First CDMA Calls on PCS System*, Press Release, Oct. 31, 1995.
*GTE MobilNet Using AT&T Gear For CDMA Market Trial In Texas*, Press Release, Jan. 30, 1995.
"IV. Basic Wireless Principles" New York Times, Aug. 19, 1996.
R.C. Levine *Digital Switching*, Lecture, Apr. 21, 1998.
*AT&T Digital PCS*, White Paper, May 1997.
*Wireless AT&T Digital PCS Service Launched Nationwide*, News Release, Oct. 2, 1996.
*Narrowband PCS Nationwide Auction Winners*, Aug. 17, 1994.
*Public Notice: High Bidders in Auction of Regional Narrowband Licenses*, Nov. 9, 1994.
Jackson et al. "SS7 and BB King," Primedia Business Magazines & Media, Inc., Mobile Radio Technology, May 1, 1999.
*Skytel Offers Prepaid Alpha Paging Package*, Business Wire, Aug. 18, 1998.
*What's Hot: What Number, Please?*, Information Week, Jun. 16, 1997.
*Fast and Furious: Advanced Image Comm Futuremail*, Network Computing, Apr. 15, 1998, p. 168.
*CDMA: CDMA Development Group Created*, Cambridge Telecom Report, Aug. 15, 1994.

*You Got PDA on My Cellphone*, Oct. 2, 2000.
"New Products" Wireless Review, Nov. 1, 1998.
Definition—"Advent" From Mariam-Webster's Collegiate Dictionary.
"Signaling System No. 7, IS-41 and Cellular Telephony Networking" Proceedings of the IEEE, vol. 80, No. 4, Apr. 1992.
*Answering Machine With Automatic Obtainment and Usage of Caller ID*, Sep. 1997.
*Look Who's Calling*, Wireless Review, Feb. 1, 2000.
*The Value-Add Appeal*, Wireless Review, Sep. 15, 1999.
Freudenrich, *How Personal Digital Assistants (PDAS) Work*, http://www.howstuffworks.com/pda.htm/printable, Dec. 5, 2001, pp. 1-18.
*Apple Mobile Message System*, p. 74, Sep. 1995.
*Official Gadgeteer Hands on Review: KYOCERA QCP 6035*, 2001.
*Going Global*, History of GSM, Oct. 8, 1999.
*Growing and Growing*, History of GSM, Oct. 8, 1999.
Caller ID Fact Sheet, Mar. 1997.
*Metrocall, Inc. Discloses Plans to Launch Exclusive New Messaging . . .*, Mar. 1998.
*Skytel Service Pricing and Options*, Jan. 14, 2002.
Ericsson Chatboard, 2001.
*Full Size Qwerty Keyboard for Smart Phone*, Kyocera.
*Next Messaging an Introduction to SMS, EMS and MMS*, Mobile Streams Ltd, www.NextMessaging.com, Jan. 2, 2001, 25 pages.
Skypager Advertisement, 2000.
Message Center FAQs, Skytel.com.
Executive Summary by the Strategis Group Outlining Marketing Research, 2000.
*Advanced Messaging to Boost Paging Revenues the Strategis . . .*, Jan. 2000.
*The Future of Paging* (Part 11—1998 and Beyond).
*Caller ID; Skytel Confirms*, Apr. 15, 1998.
*Success 4 SMS*, Mobil Streams White Paper, p. 17, Feb. 2001.
Wireless Communications Glossary, 1997-2001.
*The Short Message Service*, GSM World, Jun. 2001.
Chart Entitled *The GSM Milestones* states, first PCS, 1995.
Chart Entitled *The GSM Milestones*.
*Integrated Messaging Capability on AT&T Analog Cellular Phones*, Lucent Technologies, Feb. 1, 1995.
GSM Growth and Forecast to Dec. 2001.
Short Message Service Center.
*GTE MobilNet's CDMA Trial*, Press Release, New Technology, 1994.
*Short Message Service Center*, Lucent Brochure, 1999.
Keyword Search Performed on Motorola Website, 1993-1996.
Keyword Search Performed on Motorola Website for Caller ID, 1993-1996.
Keyword Search Performed on Motorola Website for Caller ID and Pager.
*The Future of Paging (ART II-1998 & Beyond)*, Oct. 1998.
*Handspring Expertly Combines Cellphone, PDA in New TREO*, 2001.
*Intelligent Phone*, IBM Technical Disclosure Bulletin, Feb. 1981.
Bellis, M. *Selling the Cell Phone—PCS Technology*, http://inventors.about.com/library/weekly/aa072199.htm, Jul. 21, 1999, 3 pages, printed Mar. 10, 2002.
*Wireless Data Over Cellular and PCS*, ASI/Price Waterhouse conference on wireless data, Mar. 27, 1997.
Nelson *The Simon Personal Communicator*, PDA Developers 3.1, Mar./Apr. 1995.
*CDMA Short Message Service Application*, Version 1.0 Aug. 22, 1994.
*Communication Base—Set with LCD Screen*, Motorola Inc. Jun. 1993.
*CDMA Development Group Completes Specifications for Data and Short Message Services*, Oct. 26, 1994.
*Messaging Card and Newtonmail: We Pick Up and Deliver*, Newton Notes 1993.
Wireless Caller ID, Message Waiting Now in Washington State, Oct. 23, 1995.
Calling Number Identification Services State 1 Description, Apr. 5, 1994.

*XIII The Digital Control Channel (DCCH) in IS-136*, Telecomwriting.com: Digital Wireless Basics: Radio Principles: IS-136 Channel, www.privateline.com/PCS/IS-136Channels.HTM, Apr. 15, 2002, pp. 1-6.
New Micro-Portable 3770 Cellphone with LCD Display from AT&T, Nov. 7, 1994.
*GTE MobilNet To Test CSMA Cellular Digital Switching in Austin*, 1995.
*Southwestern Bell and AT&T to Test TDMA Wireless System*, Mar. 1, 1994.
*Price Cuts: US West Cellular Reduces And Simplies Rates*, Jul. 4. 1994.
*US West Cell Phone*, PC Link, Jul. 1, 1993.
*New CDMA ASYNC Data/Message Spec*, Oct. 31. 1994.
Consumer Electronics Show: IBM Cellular Phone/PC, Jan. 1993.
*Bell Two—Way Paging is World's First*, Bell Mobility Service From Bell Mobile Communications, Inc. Apr. 16, 1994.
TCA Show: New Products and Voice Mail Integration, Sep. 24, 1992.
Mobilcomm Voice Organizer Pager Brochure, 1996.
*An Introduction to Paging*, By Motorola, 1993.
*Caller ID Signaling and Data Format*, Byte, Jan. 1995.
*Pagers*, Dime (Japanese General Magazine), Dec. 15. 1994.
*Flex: The Mark of Leadership*, Motorola, 1995.
Pagewriter by Motorola, 1996.
*Motorola Announces Inflexion*, Motorola, 1995.
NEP Communications Advertisement.
"Keynote Voice Memory" Motorola, 1996.
Nexus Two-Way Paging Brochure, Telecommunication Systems, Ltd.
Fonesync Software Advertisement.
"Telecraft's Pocket Faxxer is a Slicer-Dicer Among Peripherals" Computer Shopper, Jul. 1993.
Octus PTA, Version 1.54 Brochure, 1994.
"Calling Number Identification Service-Caller ID" Federal Communications Commission, CC Docket No. 91-281, FCC 95-187.
"Caller ID Rises Privacy Issues" Caller-Times Interactive News, Jun. 17, 1996.
"Caller-ID With Automatic Name Delivery . . . " ACLU Freedom Network, Feb. 6, 1995.
Electronic Privacy Information Center-Style Sheet—Cite as 96 C.D. O.S. 671.
"Motorola Cellular Phones to Offer Caller Line ID . . . " Motorola, 1997.
"Caller ID Blocking" Apr. 3, 1996.
"By the End of 1999, There Will be More Than 130 Million Paging Customers" Communications Daily, Aug. 3, 1994, V14 N149 p. 7(1).
*Letting Your PC Pick Up the Phone*, Popular Science, Mar. 1994, p. 50.
"Alphanumeric Paging" Pactel Paging, 1992.
"Wireless Phone, Pager Sales to Quadruple to Near $10 Billion" Telephone IP News, Mar. 1994, V5 13.
*EO Plans Future Devices Despite Current Delays*, News Hardware, Mar. 29, 1993, p. 36.
"Paging in Russia" Global Communications, May-Jun. 1994, V16 N3.
"Casio, Mitsui & Bharti Telecom in Indian Pager Deal" Computergram International, Jul. 12, 1994, I2455.
"Price, Branding Play Big Role in Pager Selection, Survey Says" Advanced Wireless Communications, Oct. 26, 1994, V5 122.
"Taiwanese Companies Seek to Expand Shares of Chinese Pager Market" Matsushita Weekly, Feb. 10, 1994, VI 16.
"Pager Auto-Dial Option" IBM Technical Disclosure Bulletin, Jan. 1994.
"Pen-Based Automated Interpersonal Communication System" IBM Technical Disclosure Bulletin, Mar. 1995.
*Pager Auto-Dial Option*, IBM Technical Disclosure Bulletin, Jan. 1994.
1994 PCS Market Demand Forecast, Jan.30, 1995.
Identafone Caller ID Software, Sep. 17, 2000.
"From Crosswords to Capers, Many Apps to Fill Newton Slot" Macweek, Aug. 2, 1993.
"Card Pro Drive Eases PCMCIA Data Transfer to Desktop PCS" Computer Shopper, May 1993, p. 63.

Motorola Select 2000 Brochure, 1996.
Motorola M75 Digital Cellular Telephone Brochure, 1997.
The Wireless Vision—From Motorola Annual Report.
"Low-Priced Cellular Plans" Mobile Office, 1993.
Let Your PC Page You.
"Inside This Guide" PCWorld, Dec. 1992, p. 237.
"Multitasking Phone Organizer" Mobile Computing & Communications, Dec. 1998, p. 34.
Motorola Tenor Brochure, 1996.
Multi-Line Telephone Monitor With Dial Log Brochure by Voice Data Systems, Inc.
Motorola Press Release: Motorola Introduces Full-Featured 28.8 Voicesurfr, Jun. 6, 1996.
Paging and Messaging Products From Motorola Website, 1996.
"New Caller ID Software Captures Names as Well as Phone Numbers" DM News, vol. 12, No. 20, Jun. 4, 1990.
*Ameritech and Motorola Bring ISDN To Home Professionals*, ISDN News, Jan. 17, 1995.
*Mediacom™ Software the Personal Communications Center*, Bellcore, Undated, pp. 4, possibly circa Oct. 1994.
Motorola Select 2000 Brochure, 1996.
Motorola Tenor Brochure, 1995.
Motorola Star TAC Brochure,1997.
Motorola Microtac Elite Brochure, 1996.
Skytel 2-Way Booklet by Skytel, 1995.
"Go Wireless" Brochure by Skytel, 1994.
Skytel Palmtop Messenger Brochure by Skytel Corp., 1995.
The Wizard OZ-9520FX Brochure by Sharp.
The Wizard OZ-5500 Brochure by Sharp.
Solocall Smart Center Brochure by Solopoint, 1996.
"The Enhanced 911 System at Work" Telident.
Voice Organizer Pager Owner's Manual by Voice Powered Technology, Inc., 1996.
U.S. Robotics Sportster Voice 28.8 Faxmodem, CMP Media, Inc., 1996.
Zeus Phonestuff-Caller ID Products Brochure, 1995.
The Yo Yo Caller ID and Xtension, Sep. 17, 2000.
"Zeus' Whozz Calling Caller ID Box" Computer Telephony Magazine, Nov. 1995.
"Yo Yo Adds Text-to-Speech Caller ID" Newsbytes News Network, Sep. 30, 1996.
Yo Yo User's Guide for Windows 95.
LG IPC-1000 by LG Electronics, Inc. Brochure, Jan. 1997.
Kyocera QCP 6035 User's Guide, 2000.
"Wireless PDA Com" PC Magazine, Jun. 27, 2000, p. 98.
"Wireless Data Transmission: Practical, Reliable, but not Cheap" Microtimes, Jul. 26, 1993.
Caller ID-to-DTMF Conversion, 1995.
Company Info: Fanstel—#1 Caller ID World Wide.
"Caller ID and Screen Popping for the Pizza Parlor" Telecomp, Inc. 1996.
Telcomp, Inc. Caller ID Computer Telephony Integration Home Page, 1996-2001.
My VCALLER ID Alpha 1.2X, Nov. 20, 1999.
Caller Eyedee News, Feb. 2, 2001.
"Pagers Grow More Popular in the Information Age" Philadelphia Business Journal, Feb. 4, 1994, V12 N49 P3B(1).
"Europe-Wide Paging" Global Communications, Mar.-Apr. 1991, V13 N2 p. 27(5).
"The International Growth of Paging" Global Communications, May-Jun. 1993, V15 N3.
"IBM Ready to Enter Field of 'Caller ID' Phone Systems" for Your Reference, May 2, 1989.
"Practical Multimedia Telephone Service-Today" Bellcore Exchange, Feb. 1994.
PC Caller ID 32 Help, Version 1.2, Nov. 1998.
"Opening PBX Doors" Byte, Mar. 1996.
"Have Hypercard Call a Pager" Comm Progs/Utils, May 27, 1990.
"Pagenow! 1.5-Message MAC to Pagers?" Comm Progs/Utils, Oct. 17, 1995.
Handipage by Panisonic.
"Prometheus Intros Comms & Multimedia Products" Newsbytes News Network, Jun. 21, 1995.

*Facsimile Publishing Service Using Radio Signals Planned*, Fax-Max Services, possibly circa 1990-1991.
"Paging (Broadcast)" Inc., Jun. 1993.
"Mobilecomm Slates New Pager for Retail" The Weekly Home Furnishings Newspaper, Oct. 12, 1992, p. 250(1).
"Paging Firms Scramble as Cellular Gains" The Wall Street Journal, Nov. 20, 1990, PGB1(2) PB1(E) col. 3.
Voice Recognition Diary Brochure by Parrot.
Palm Connect Brochure by Palm Computing, Inc., 1993.
"Networking, Wireless Communications" PC Magazine, Aug. 1993, pp. 362-384.
"Because Every Message is Important" Pactel Paging, 1992.
Imagine how far You Could go Without Limits.
Beam Link Advertisement, JP Systems, Inc.—Pen Computing Magazine, Dec. 1998.
"The Information Skyway is Coming Soon to a Wireless Device Near You" Popular Science, Nov. 1995, p. 57.
"Wireless Ways" PDA Developers 3.1, Jan./Feb. 1995, pp. 5-6.
"Wireless Watch" PDA Developers 3.5, Sep./Oct. 1995, p. 4.
"Desktop Communications Made Easty (Part 1)" PDA Developers 3.5, Sep./Oct. 1995, pp. 23-28.
Prototype and Design, Sep.-Oct. 1992LE Newton GPS.
*Cellular Carriers Issue Specs For Enhanced Data Networks*, Wednesday Jul. 21, 1993.
Atari Portfolio, First Palmtop 1989.
Windows CE Computers, Mar. 1993, Pulsar Was A Second Attempt.
AT&T EO, Available Since Apr. 1993, Jul. 30, 1993.
*Your Personal Digital Assistant*, Popular Science, Sep. 1992.
Method for Assigning Message Numbers and Sorting Numeric Canned Messages, Mar. 1993.
Timeline, Newton Connection, PC Connection, Sep. 1993.
*Computers Without Keys*, Popular Science, Aug. 1990.
Applecare Archive: Document, *Messagepad 120: Upgrading German MessagePad 120 in U.S.*, Jun. 5, 1996.
AppleCare Knowledge Archive: Results, This Message Describes the Newton Messaging Card, Jul. 29, 1993.
*Newton Messagepad: List of Accessories Available*, Applecare Archive: Document, KBASE Document 18814, Jan. 23, 1998, pp. 1-6.
*Firm Unveils 1st Personal Communicator*, Google.com, Nov. 4, 1992.
*Developers Line up to do PDA Hookups*, Google.com, Jun. 8, 1992.
*Pen-Based Automated Interpersonal Communication System*, IBM Technical Disclosure Bulletin, Mar. 1995.
*Motorola's Micro Digital Elite™ Cellular Telephone Debuts at 1994 Summer Consumer Electronics Show*, Motorola, Libertyville, IL, Jun. 23, 1994, 3 pages, printed Apr. 14, 2002.
Charny, *Phones getting cozy with photos*, CNET News.com, Oct. 17, 2002, 3 pages.
*Camera phone set to become commodity, but usage still too low*, Telecom.paper, Houten; The Netherlands, Jul. 5, 2004, 4 pages.
Mobile messaging market overview, Chapter 1, Baskerville Executive Briefing Mobile Messaging Update—Statistics and Data, undated, 3 pages.
Telephones: Northern Telecom's Cordless Caller ID Phone Named Product of, Cambridge Telecom Report, from www.highbeam.com, Dec. 12, 1994, 3 pages.
Nonami, GSM and PCS1900 Digital Cellular Phones, Mitsubishi Electric ADVANCE, Sep. 1998, 3 pages.
Carroll, PicturePhone (Video Phone)-Ahead of it's time—Another Bell Labs innovation!, Record, May/Jun. 1969, 24 pages.
Chakarborty, The Interworking Approach for Narrowband Access to ATM Transport-Based Multiservices Mobile Networks, IEEE Personal Communications, Aug. 1998, 12 pages.
Elstrom, Hello, Internet, Businessweek, May 3, 1999, 6 pages.
Hanzo et al., Burst-By-Burst Adaptive Wideband Wireless Video Telephony, Dept. Of Electr. and Comp. Sc., Univ. Of Southampton, 18 pages.
Wireless Multimedia Messaging Tomorrow's Killer Application, Wireless Developer Network—Daily News, Apr. 9, 2001, 3 pages.
When will video be delivered to my phone?, Northstream, Sep. 2001, 7 Pages.

MediaQ and SANYO Demonstrate Video Camera Solution for Handheld Computers And Mobile Phones, Wireless Developer Network—Daily News, Dec. 6, 2001, 3 Pages.
COMPUTERWIRE, J-Phone claims 1m video messaging subs, The Register, Feb. 2002, 2 pages.
Parker, WALT is a Newton VideoPad? (was: What is WALT??), Newton Talk, Oct. 25, 2002, 2 pages.
Papageorge, Secrets of the wireless elite: Video for handsets, www.ibm.com, Jun. 6, 2003, 6 pages.
Panel Discussion at the Fourth International Symposium on Mixed and Augmented Reality, Hand-Held Augmented Reality, ISMAR, Oct. 7, 2005, 6 pages.
Yesterday's tomorrow, today., Modern Mechanix, Dec. 24, 2005, 1 page.
News Release, Glenayre's Versera Video Solutions and Active Messaging Capability to be Highlighted at CTIA Wireless 2006, Glenayre, Mar. 31. 2006, 2 pages.
Phonotelephote, Technovelgy.com, 1889, 1 page.
SK Telecom and Thin Multimedia Team to Launch Wireless Video Messaging Service, www.mobic.com, Oct. 24, 2001, 2 pages.
Edison's Telephonoscope, www.terramedia.co.uk, Dec. 9, 1878, 2 pages.
www.terramedia.co.uk, Mar. 1, 1936, p. 2.
"Newton MessagePad," www.msu.edu, Mar. 21, 2002, 5 pages.
"Motorola Rings in 1995 with the Launch of the Marco® Wireless Communicator," www.motorolla.com/General/Events/Comdex/Fall95/Press, 4 pages.
"Sony's Magic Link—First Impressions," *PDA Developers*, Nov./Dec. 1994, 3 pages.
"Motorola's Envoy First Run to Magic Cap," www.byte.com, May 1994, 9 pages.
"EO Personal Communicator," David Tebbutt, Personal Computer World, www.presshere.com, Feb. 1993, 4 pages.
"Simonizing the PDA," Chris O'Malley, www.byte.com, Dec. 1994, 8 pages.
"Digital Ink-Introducing the Zaurus," wwww.parra.com, printed Apr. 9, 2002, 5 pages.
"Microsoft Windows CE: History and Design," Robert O'Hara, *Handheld Systems*, Jan./Feb. 1997, 3 pages.
"Connecting and Using the Newton Keyboard," Apple Computer, Inc., 1995, 3 pages.
"Nokia News: Nokia pioneers new product category with the world's first all-in-one communicator," www.nokia.com, printed Apr. 12, 2002, 2 pages.
"Electronic organizer links to your computer," www.cnn.com, Apr. 4, 1996, 2 pages.
"AT&T provides email and fax capabilities for Sharp Zaurus K-PDA," ATT&T News Release, www.att.com, Dec. 15, 1994, 2 pages.
"Firm Unveils 1st 'Personal Communicator,'" *The Washington Post*, Nov. 4, 1992, 3 pages.
"Getting Organized with PIMs," www.smartcomputing.com, Jan. 1993, vol. 4, Issue 1, 10 pages.
"Technology in Reverse," Robert J. Samuelson, *Newsweek*, Jul. 20, 1992, 2 pages.
"Intellect," brochure: Innovad Innovated Development and Manufacturing, Rev. Dec. 1993, 4 pages.
"Make Way for the HPCs: Compaq's PC Companion," Richard orochove, www.morochove.com, Jan. 9. 1997, 2 pages.
Sprint Alleviates Manually Creating and Managing Wireless Phonebooks with New Sprint PCS Contact Synchronization Software (SM), Press Release, www.biz.yahoo.com, Feb. 14, 2002, 3 pages.
"Personal Digital Assistants," © Mercury Communications Ltd—Nov. 1993, www.gare.co.uk, 9 pages.
"Comdex- Sharp Intros 'Personal Information Assistant,'" Grant Buckler, *Newsbytes News Network*, Nov. 17, 1993, eLibrary, 1 page.
1994 Sony Magic Link, 1 page.
1995 Apple Newton with Connecting Keyboard, 1 page.
"Take a Peek at the Future . . . Then Program it," 2002 Sprint PCS Application Developer's Conference, http://devcon.sprintpcs.com, 1 page.

Sprint Communications Company, L.P., Government Systems Division product authorization, questions/comments page, and "Sprint Announces Second Quarter Results," 9 pages.
"Sprint, wireless arm soar on results," Jeffry Bartash, www.marketwatch.com, Apr. 16, 2002, 4 pages.
"Sprint PCS posts operating profit, lures customers," Yukari Iwatani, Reuters Business, http://biz.yahoo.com, Apr. 15, 2002, 3 pages.
"Sprint Announces First Quarter Results," Press Release, http://biz.yahoo.com, Apr. 15, 2005, 16 pages.
"Why Sprint Could Pick Up Speed," Olga Kharif, Business Week Online, http://biz.yahoo.com, Mar. 13, 2002, 3 pages.
"Wide hardware and applications support for AT&T Hobbit chips," News Release, www.att.com, Nov. 16, 1992, 5 pages.
eBay Outbid Notice to Daniel Henderson, Apr. 9, 2002, 2 pages.
Tag-it™ RFID Smart Label Transponder information page, www.rfid.com, printed May 12, 2004, 1 page.
"Can RFID tags replace barcodes cost-effectively?" Editorial, www.transpondernews.com, printed May 14, 2004, 4 pages.
"CODESOFT™ 6 and RFID Tags, An Overview," Teklynx International Co., Sep. 29, 2000, 7 pages.
"RFID tag reader uses FSK to avoid collisions," www.elecdesign.com, 2004, 5 pages.
"Electronic Article Surveillance (EAS) An Overview of the Major Technologies," *The AIM Global Network*, www.aimglobal.org, printed May 14, 2004, 5 pages.
Electronic Article Surveillance (EAS) An Overview of the Technologies, www.tagcompany.com, printed May 14, 2004, 4 pages.
U.S. Appl. No. 08/726,024, filed Oct. 4, 1996 which is Pending claims the benefit of U.S. Appl. No. 08/177,851.
U.S. Appl. No. 09/477,167, filed Jan. 4, 2000 which is Abandoned claims the benefit of U.S. Appl. No. 08/177,851.
U.S. Appl. No. 09/632,040, filed Aug. 3, 2000 which is Abandoned claims the benefit of U.S. Appl. No. 08/177,851.
U.S. Appl. No. 09/644,954, filed Aug. 23, 2000 which is Abandoned claims the benefit of U.S. Appl. No. 08/177,851.
U.S. Appl. No. 09/732,142, filed Dec. 7, 2000 which is Abandoned claims the benefit of U.S. Appl. No. 08/177,851.
U.S. Appl. No. 09/736,919, filed Dec. 14, 2000 which is Abandoned claims the benefit of U.S. Appl. No. 08/177,851.
U.S. Appl. No. 09/746,512, filed Dec. 22, 2000 which is Abandoned claims the benefit of U.S. Appl. No. 08/177,851.
U.S. Appl. No. 09/746,517, filed Dec. 22, 2000 which is Abandoned claims the benefit of U.S. Appl. No. 08/177,851.
U.S. Appl. No. 09/773,715, filed Feb. 1, 2001 which is Abandoned claims the benefit of U.S. Appl. No. 08/177,851.
U.S. Appl. No. 09/778,644, filed Feb. 7, 2001 which is Pending claims the benefit of U.S. Appl. No. 08/177,851.
U.S. Appl. No. 09/790,772, filed Feb. 22, 2001 which is Abandoned claims the benefit of U.S. Appl. No. 08/177,851.
U.S. Appl. No. 09/802,062, filed Mar. 7, 2001 which is Abandoned claims the benefit of U.S. Appl. No. 08/177,851.
U.S. Appl. No. 09/880,349, filed Jun. 13, 2001 which is Abandoned claims the benefit of U.S. Appl. No. 08/177,851.
U.S. Appl. No. 09/898,363, filed Jul. 3, 2001 which is Abandoned claims the benefit of U.S. Appl. No. 08/177,851.
U.S. Appl. No. 09/935,239, filed Aug. 22, 2001 which is Abandoned claims the benefit of U.S. Appl. No. 08/177,851.
U.S. Appl. No. 09/935,240, filed Aug. 22, 2001 which is Abandoned claims the benefit of U.S. Appl. No. 08/177,851.
U.S. Appl. No. 09/953,315, filed Sep. 12, 2001 which is Pending claims the benefit of U.S. Appl. No. 08/177,851.
U.S. Appl. No. 10/006,590, filed Dec. 5,. 2001 which is Pending claims the benefit of U.S. Appl. No. 08/177,851.
U.S. Appl. No. 10/033,824, filed Dec. 12, 2001 which is Pending claims the benefit of U.S. Appl. No. 08/177,851.
U.S. Appl. No. 10/047,191, filed Nov. 7, 2001 which is Pending claims the benefit of U.S. Appl. No. 08/177,851.
U.S. Appl. No. 10/171,373, filed May 1, 2002 which is Pending claims the benefit of U.S. Appl. No. 08/177,851.
U.S. Appl. No. 10/613,734, filed Jul. 3, 2003 which is Abandoned claims the benefit of U.S. Appl. No. 08/177,851.
U.S. Appl. No. 10/692,179, filed Oct. 23, 2003 which is Pending claims the benefit of U.S. Appl. No. 08/177,851.
U.S. Appl. No. 10/728,440, filed Dec. 5, 2003 which is Pending claims the benefit of U.S. Appl. No. 08/177,851.
U.S. Appl. No. 11/045,677, filed Jan. 28, 2005 which is Pending claims the benefit of U.S. Appl. No. 08/177,851.
U.S. Appl. No. 11/050,370, filed Feb. 3, 2005 which is Pending claims the benefit of U.S. Appl. No. 08/177,851.
U.S. Appl. No. 11/052,560, filed Feb. 7, 2005 which is Pending claims the benefit of U.S. Appl. No. 08/177,851.
U.S. Appl. No. 11/055,846, filed Feb. 11, 2005 which is Pending claims the benefit of U.S. Appl. No. 08/177,851.
U.S. Appl. No. 11/059,121, filed Feb. 16, 2005 which is Pending claims the benefit of U.S. Appl. No. 08/177,851.
U.S. Appl. No. 11/115,445, filed Apr. 27, 2005 which is Pending claims the benefit of U.S. Appl. No. 08/177,851.
U.S. Appl. No. 11/134,669, filed May 19, 2005 which is Pending claims the benefit of U.S. Appl. No. 08/177,851.
U.S. Appl. No. 11/134,670, filed May 19, 2005 which is Pending claims the benefit of U.S. Appl. No. 08/177,851.
*Messaging: A New Direction—Awash in E-Mail Troubles? A Raft of New Products is Coming to the Rescue*, Network Computing, Oct. 1, 1996, pp. 58.
*Identafone Overview From Website*, Dated Oct. 17, 1996.
*Netpage Product Overivew*, NetPage, http://web.archive.org/web/19961221195506/http://www.net-pager.com/, Dec. 21, 1996, 2 pages.
*HP Teleshare: Integrating Telephone Capabilities on a Computer Workstation*, Hewlett Packard Journal, Apr. 1, 1995, pp. 69 [AABV].
*Hayes Europe's Smartcom Message Center Software*, Newbytes News Network, Feb. 29, 1996.
*AT&T Makes Big Move in Digital Race*, Los Angeles Times, Oct. 3, 1996, D-2.
*Faster Units Due in Stores Next Year*, Computer Retail Week, Oct. 14, 1996, pp. 33.
*CDMA's March Continues*, Newsbytes News Network, Aug. 19, 1996.
*AT&T First to Offer PCS Phones/New System Bundles Several Wireless Services*, Newsday, Oct. 3, 1996, pp. A49.
*Diamond Ships Voice Modem With Internet Phone*, Newsbytes News Network, May 18, 1995.
*Fax Software: Delrina Demos Winfax Pro 7.0 for Windows 95*, Cambridge Publishing, 1995.
*New Modems: New Cardinal Voice-Capable Modems Offer Innovative Telephony*; Cambridge Publishing, Inc., 1995.
*Toward Human Centered Design*, vol. 96, Technology Review, Jul. 1, 1993, pp. 47.
*How the Europeans Respond to Mobile Communications*, vol. 31, Communications News, May 1, 1994, pp. 28.
*Users Seek Alternatives to High Cellular Costs*, vol. 12, Minneapolis-St. Paul City Business, Jun. 17, 1994, pp. 14.
*Voicenow is Hip-Pocket Answering Machine*, USA Today, Apr. 5, 1995.
*Multimedia Messaging: AT&T Integrates Voice & Fax Messaging at Desktop*, Cambridge Telecom Report, 1994.
*CID Technologies and Macpager Information*, CID Technologies, Inc., Dec. 8, 1996.
*Opon: MCI to Provide Nationwide 'Find Me/Follow Me' Communications Service*, Cambridge Publishing Inc., 1994.
*Private Eyed—Martyrware Private Eye*, vol.1.1, Product Overview, 1994.
*Pagemate: V3.3 Product Overview*, Apr. 30, 1993.
*Calllink: V2.1 Caller ID for Windows Demo*, May 17, 1994.
*Page on Call*, V2.1, PC Program Overview, Jan. 28, 1994.
Advantra Brochure, *Enhanced Messaging Organizer-Premier*, Texas Instruments, Jan. 1997.
Advantra Brochure, *Enhanced Messaging Organizer-Pro*, Texas Instruments, Jan. 1997.
*AVIG010, The Intelligent Organizer*, Texas Instruments—on the Go, vol. 1, No. 1, Fall 1997.
Active Data Product Catalog, Mar. 1993, p. 1,2,3,5,6.
*Apple PDA Prototype Makes Debut at CES*, PC Week, Jun. 1, 1992.
"Magic Cap Means Communication" brochure-1994.
"Magic Cap" Brochure—1994.

Mobile Office—Jan. 1994, vol. 5, No. 1, pp. 100-117, "Trio of Tommorrow" article, back cover, Evtek Corporation product advertisement, The Write Touch.
PC LapTop Magazine,Feb. 1995, vol. 7, No. 2, pp. 28-48.
It's NEW, May/Jun. 1995, vol. 1, No. 2, pp. 73-77.
NTT DoCoMo Brochure, Apr. 1, 1995.
Pen Computing Magazine, Aug. 1994, vol. 1, No. 1, pp. 15-22, 34-35.
PC Pager Advertisement—1993.
Computerworld, Dec. 21, 1992, p. 8, "*Windows link to pagers aids LAN troubleshooters*".
Computer World, Aug. 2, 1993, vol. 15,Issue 31, p. 1, "Newton arrives sans remote links".
Magic Cap Press Release, San Francisco, Jan. 6, 1994.
Comdial Tracker brochure, 1994.
Motorola Press Release, PCMCIA wireless modem technology announcement.
Hewlett Packard Press Release, Infrared communications interface announcement, Jun. 1, 1993.
Skytel Press Release—Jan. 6, 1994, "Skytel Corp. and General Magic work together to provide wireless mobile communications".
Newton Message Pad 120, product brochure—1994.
PC Magazine, Aug. 1993, "EO Falls Short AS Ultimate Handheld Communicator".
T.A.V.I.S. Talk Product Brochure, Biztel Communication Systems, Inc.
VS-401 TALKS SB product brochure.
Mobile Office Magazine, Jan. 1994, p. 76, Fujitsu PCX numeric answering machine.
PC World, Dec. 1992, Mobile Computing Section, pp. 239-265, "Nomads of the Nineties".
1992US-0957659, Oct. 7, 1992, Gao, X; Electronic pager with specified telephone number alert and capable of receiving FSK encoded non-voice signals—generates audible tones for automatic dialing of specified number, and voice tone announcement of number, and uses logic array voice synthesizer[1].
Mobile Data Report, Feb. 1, 1994 v6 12, Apple, Mobilecomm offer Newton, Pager Card, airtime deal.
PC Week, May 23, 1994 v11 n20 p. A1(2), A paging party. (growing trend towards one-way messaging).
Teledynamics Catalog, Sep. 1994—Fans P161P Telesecretary Paging Device, pp. 25, 49, 51.
General Magic Press Release, Feb. 8, 1993.
Positive Communications "BEEPER" brochure, 1993.
WinID Paging System—Software manual—v. 1.0, Nov. 15, 1994.
AT&T EO 440 & 880 Personal Communicators brochure, 1993.
PC Week, Feb. 12, 1990, They're Here: Portable E-Mail and Voice Mail.
Ultravoice product brochure.
TeleLink DS5000 advertisement—1993.
PC Magazine, Jun. 15, 1993, "HP 100 LX Adds Remote E-Mail".
INFOWORLD, Jun. 7, 1993, p. 34, "Omron readies PDA for release".
INFOWORLD, Mar. 22, 1993, p. 4, "A failure to communicate: the long road to phone, PC integration".
INFOWORLD, Feb. 22, 1993, p. 29, "Today's notebooks to gain telephony".
INFOWORLD, Apr. 19, 1993, p. 1, "Microsoft, Intel team up to integrate phones, Pcs".
INFOWORLD, Jun. 14, 1993, p. 30, "Third parties to enhance OmniBook 300's communications".
INFOWORLD, Jun. 7, 1993, p. 43, "Card is all-in-one messenger".
INFOWORLD, Jun. 7, 1993, p. 3, "Alliances give Newton PDA a communications advantage".
MacWeek, Aug. 2, 1993, p. 63-68, "The MessagePad: Apple's first personal digital assistant".
INFOWORLD, Jun. 28, 1993, p. 1, "General Magic's PDA interface comes to life with realistic objects".
PC Magazine, Aug. 1993, p. 359-384, "Connecting Over the Airwaves".
European Telecommunication Standard Institute, European Telecommunication Standard, Oct. 1993; European digital cellular telecommunications system (Phase 2); Technical realization of Short Message Service Point to Point (PP) (GSM 03.40)[1].

European Telecommunication Standard Institute, European Telecommunication Standard, Oct. 1993; European digital cellular telecommunications system (Phase 2); Technical realization of Short Message Service Cell Broadcast (SMSCB) (GSM 03.41)[1].
Electronic News, Sep. 28, 1992, p. 11, "Motorola has dual mode RF modem".
Computer Retail Week, Nov. 16, 1992, p. 56, "Wireless messaging gets Windows version".
Business Week, May 17, 1993, Electronic Messages from Phones, PC's, even Faxes.
Telecomworldwire, Aug. 23. 1994, "Airnote pager filter to ship in North America".
Telecomworldwire, Jun. 28, 1994, "Singtel adds pager into CT2 Phone Service".
Global Communications, Sep.-Oct. 1992, v14 n5, p. 14, "Paging Taiwan".
PC Week, Oct. 24, 1994 v11 n42 p. 109, "Voice of the Future".
Motorola product brochure, "Marco Wireless Communicator", 1994.
Vomax 2000 product brochure, 1992.
PC WORLD, Feb. 1993, "TyIN 2000 Communications System Ties Data, Fax. and Voice together".
TyIN 2000 product brochure, 1993.
Digitrap Brochure, DTS-2040 product brochure, Nicollet Technologies 1994.
Nicollet DigiTrap DTS-1082 product brochure, 1994.
Telocator Network Paging Protocol (TNPP), v. 3.6, Oct. 20, 1993.
Telocator Data Protocol (TDP), Jun. 12. 1993.
Telocator Alpanumeric Protocol (TAP), v. 1.5, Jul. 21, 1994.
Psion Series 3 Personal Information Management product brochure, Sep. 1993.
Pagentry product brochure, 1992.
Byte Magazine, Aug. 1994, p. 34, "IBM Plans Ambitious Network".
Windows Sources, Apr. 1994, p. 106-138.
San Francisco Examiner, Aug. 1, 1993, p. E16, "Newton arriving at last".
Bellcore LSSGR ANI and ONI-FSD 20-20-0000, Issue 2, Mar. 1991.
Bellcore LSSGR TR-NWT-000030 Issue 2, Oct. 1992.
Bellcore LSSGR TR-NWT-000391, Issue 3, Sep. 1992.
Bellcore LATA TR-NWT-000031, Issue 4, Dec. 1992.
Motorola SiteMate product brochure—on-site voice paging system.
Telecomworldwire, May 31, 1994, "IBM, Paclink launch new pager in Thailand".
Newsbytes News Network, Apr. 11, 1994, "PageNet, Motorola work on advanced pager".
Newsbytes News Network, Mar. 2, 1994, "PCMCIA Card combines wireless pager / wired fax modem".
Newsbytes News Network, Dec. 21, 1993, PageCard to double as PCMCCard/Standalone pager.
Computergram International, Dec. 20, 1993, 12322, "Motorola unveils the memo express pager".
Newbytes News Network, Dec. 22, 1993, Japan—AT&T intros videophone, Motorola plans voice pager.
Edge, Nov. 14, 1994, v9 1329, "Paging: Lotus ships lotus notes pager gateway 1.1 gateway supports multiple paging vendors".
Telecommunications (TL), Reports on AT&T, Nov. 21, 1994 v12 123, "AT&T Focuses on regular text messaging as pager moneymaker".
Telecomworldwire, Oct. 7, 1994, "NEC introduces super 'Knoweverything' pager into UK Market".
HFD-The Weekly Home Furnishings Newspaper, Jan. 31, 1994 v68 n5 p. 92.
StatelLite Communications, Sep. 1992 v16 n9 p. 29(4).
PageMaster paging application—Software help manual—v. 1.4, 1995.
Executive p. v. 1.2—Software manual—1993, 1994.
CALLLink for Caller ID v. 2.1—Software manual—Digital Systems Group, Inc., 1994.
The Business Journal, Oct. 14, 1994 v14 n50 p. 27, "Wireless message pad among new products".
Communications Daily, Jan. 30, 1991 v11 n20 p. 5.
PC Week, Sep. 20, 1993 v10 n37 p. 41.
Communications International, Jul. 1994 v21 n7 p. 16(2).
InfoRad AlphaPage software advertisement, Dec. 1992.

Mobile Data Report, Sep. 26, 1994, v6 I19, "Casio introduces nationwide availability of organizer-pager".
PC Laptop Computers Magazine, Apr. 1993, vol. 5, No. 4, pp. 31, 61-63.
Motorola brochure, "Wrist Watch Pager", 1990.
Communications Daily, Mar. 8, 1994 v14 n45, p. 3.
BellSouth Product Brochure, Simon, 1994.
*How to Stay on Top of Your Business, No Matter Where You Are*, EO, Inc./AT&T Brochure, Undated, 4 Pages, possibly circa 1993-1994 [AADW].
*ANI Update*, Fall 1991.
*Caller ID Service Attracts About 4000 Initial Subscribers*, Business, Feb. 26, 1994, Front Page.
*ATDI 3000 Owner's Guide*, undated.
*Enhanced Messaging Service White Paper*, Dec. 1992.
*Simon—User Manual*, Bell South 1994.
*Beepme V3.1 Call Your Pager*, Aug. 22, 1993.
*Dear Potential Client Letter*, Biztel Communications Systems, Inc.
Bouncer by SNI Innovation Brochure, 1992.
Bouncer by SNI Innovation Brochure—Your Personal Telephone Secretary.
*Caller IF With Digital Voice*, Bel-Tronics Limited Brochure, 1994.
*A Rocket in Its Pocket*, Business Week, Sep. 9, 1996, p. 111-114.
*Frequently Asked Questions About Caller-ID*, V1.1, Mar. 1994.
*Caller-ID, ANI, DNIS, and DID*, callerid.htm at www.stylus.com, Oct. 23, 1997.
Pocket Organizer, IP800 Ower's Manual, Casio 1994.
Callman Model CM3 Brochure, undated.
*Caller ID Option to Become More Attractive During '95*, Twice CES Daily, Jan. 8, 1995, pp. 36-40.
Casiopeia by Casio Brochure, 1996.
Computer Link—PC Link Plus & Casio Link Brochure by Casio, Traveling Software Inc., 1991.
Caller-ID Pro 1.2, 1996.
Multi-Line Adapter Model 20040—Caller ID Mgmt System by Rochelle Communications, Inc., Jul. 1992.
*Callman Brochure*, Westlink Systems Corp., undated.
*Callman Model CM2 Brochure*, Westlink Systems Corp., undated.
*Take Back Control of Your Telephone*, Electronics Now, Jul. 1994.
*Rochelle's Caller ID Quest*, Teleconnect, Apr. 1994, p. 22.
*Commail 1.3—Caller ID Voice Mail for Windows 95/98*, From http://crews-net.com/commail., Sep. 17, 2000.
Alphanumeric Paging Advertisement, From http://www.onthewww.com/paging/options/shtml, Sep. 17, 2000.
*Callinfo: V.I.0 Caller ID*, Oct. 28, 1994.
*Creative Technologies in Modem, Phone Business*, Your Document, Mar. 27, 1995.
File Info for CIDRP.CPT, CallerID Remote 1.0.2P, Sep. 14, 1995.
*Phreaking Caller ID and ANI*, Consumertronics, 1993.
*Caller ID Could Spur Telephone Link Over Cable*, Multichannel News, Apr. 18, 1994, p. 40.
*Principles of Caller ID*, International Micropower Corporation, 1992.
Caller ID Availability Map, Byte, Jan. 1995.
*Caller ID Goes to Work*, Byte, Jan. 1995.
*Truespeech 6,3, 5,3, 4.8 KBPS Algorithm*, DSP Group, Inc., Apr. 1995.
*Truespeech 8.5 KBPS Algorithm*, DSP Group, Inc., Mar. 1995.
Boca Research Sound Expression 28.8 SRS, Your Document, 1996.
Execpage: V1.2.0108 Windows Paging Module, Jun. 16, 1995.
*The Top 10 Innovative Products for 2006: Technology With a Human Touch*, The Futurist, Jul.-Aug. 1996, p. 18.
Infotrac—National Newspaper Index, 1990-Jan. 1993.
*Glenayre Provides MVP System to Pennsel Communications Services*, Glenayre News, Oct. 3, 1996.
*Glenayre Successfully Activates Complete Inflexion Voice Messaging System*, Glenayre News, Sep. 3, 1996.
*Glenayre Launches Wireless Messaging Standard on Internet*, Glenayre News, Aug. 8, 1996.
News Release Transmitted by Canadian Corporate News, Jul. 26, 1995.
HFN Buyers' Guide, Jan. 1, 1996.
*A New Name in Pagers*, Consumer Electronics, Jan. 13, 1997, p. 161.
Hotpage by Smith Micro Software Brochure, 1997-1998.
*Hayes Office Communications Manager—This Modem is Truly Connected*, 1996 CMP Media, Inc.
*Why Just Get a Page*, Intellect, 1993.
Intellect Brouchure by Innovad, 1993.
Bulletin Board—Q&A—Inc. Tech 1997, No. 3.
Intellilink Brochure, 1993-1994.
Intellect by Clearwave Communications, Inc., New Product Announcement.
*Always in Touch Relays Caller IDs to Pagers*, Mobil Computing and Communications, May 1997.
*Spoken Caller ID Trial In Baltimore is First Cellular-Based Test of Its Kind*, Mobile Phone News, Dec. 20, 1993, V11, N48, p. 3(2).
Monologue User Manual by Media Vision, 1992.
*FCC Auction to Push Paging and Messaging*, Telephony, Jul. 25, 1994 V227 N4 p. 8(1).
"PCIA 1995 Forecasts" PDA Developers 3.3, May/Jun. 1995, pp. 4-5.
"PCS Frequently Asked Questions" PCIA, 1996.
"Court Approves Caller ID Without PUC Restrictions" The Recorder, Feb. 1, 1996, p. 2.
Pager Codes Brochure by REO Enterprises, 1993-1994.
Pocketalk Brochure by Conxus, 1998.
"Pager Patterns" Dealerscope First of the Month, Jan. 1994, p. 32.
"1997-A New Page" Consumer Electronics, Jan. 1997, p. 10.
"Wireless Watch" PDA Developers 3.4, JUUAUG 1995, pp. 5-6.
"Product Announcements" PDA Developers 3.2, Mar./Apr. 1995, pp. 3-4.
"Wireless Watch" PDA Developers 3.2, Mar./Apr. 1995, pp. 6-8.
*Reviews and Previews*, PDA Developers 3.2, Mar./Apr. 1995, pp. 9-12.
"The Simon Personal Communicator" PDA Developers 3.2, Mar./Apr. 1995, pp. 13-16.
"Wireless Watch" PDA Developers 2.6, Nov./Dec. 1994, pp. 4-5.
"Wireless Data Services: Here and Now" PDA Developers 2.6, Nov./Dec. 1994, pp. 32-34.
"6 Firms to Unveil High-Tech Alliance" San Jose Mercury News, Feb. 8, 1993, Front Page.
Work Ready Brochure by Smith Corona, 1997.
"AT&T's Vision for Mobile Computing".
Skyword Advertisement by Skytel, 1993.
"Putting Email Into Your Pocket" Mobile Computing & Communications, Dec. 1998, p. 50.
Shareview 3000 Brochure by Sharevision, 1994.
"Two-Way Pagers: The Next PDA?" Byte, Jan. 1996.
"Multimedia: Sierra Announces Fully-Concurrent Sound, Data, Fax &" Cambridge Work-Group Computng Report, 1995.
Simon By BellSouth Cellular Corporation and IBM, 1994.
"Speedybase" Telephone Products, Jul. 3, 1994.
*Skytel and the Sony Magic Link Pager Card*, Skytel Corporation, 1994.
Caller Eyedee Features, 2001.
*Caller ID and ANI Primer*, CTI Magazine, Feb. 97, vol. 2, No. 2, p. 52.
Telcomp, Inc. Caller ID (ANI) Frequently Asked Questions, 1996.
"MCI to Build Local Phone Networks" San Jose Mercury News, Jan. 5, 1994.
"Wallet Terminal Keyboard With Acoustic Coupler" IBM Technical Disclosure Bulletin, Aug. 1967, pp. 188-189.
"Electronic Reference Devices are Enjoying Greater Respect in the Marketplace" Dealerscope-Merchandising, Jun. 1992, p. 120.
Alphanumeric Paging Brochure by Pactel Paging, 1992.
Voice Express Service by Pactel Paging, 1992.
The Casio IP800 Brochure, 1994.
"Phones, PCS, IS Managers Converge to Bring More Services" Infoworld, May 17, 1993, p. 4.
Metromedia, Alpha-Numeric Display Pager-undated.
*Sony Launches First Personal Communicator Based on General Magic Software Technologies*, Announcement Sep. 28, 1994.
"Keeping in Contact" PC Laptop Computers Magazine, Apr. 1993, pp. 36-42.

Buyers Guide, PC Laptop Computers Magazine, Apr. 1993, p. 61.
"Palmtops, Pens & Portables" PC Laptop Computers Magazine, Apr. 1993, pp. 80-81.
"Laptop Office" PC Laptop Computers Magazine, Apr. 1993, pp. 84-87.
"Compuserve's E-Mail-to-Pager Communication Helps Users get Information Anytime, Anywhere" The Compuserve Information Service, Mar. 6, 1996.
EIA/TIA Standard—Mobile Station—Land Station Compatibility Specification, Sep. 1989.
Quick Start Guide, CD USA, 1997.
User Manual, Phonedisk, Mar. 1995.
"Shareview Transforms Phones" Infoworld, Feb. 1993.
Universal Remote Controls Advertisement by Aikotec Corporation, Telecom Sources, Oct. 1995, p. 158.
N-1 Numeric Pager by GSL, Telecom Sources, Oct. 1995, p. 265.
"Pagenet's Voicenow Due in N. Cal., Nev." HFN, Apr. 14, 1997, p. 168.
"Caller ID Going National; Suppliers eye Good Year" Twice CES Daily, Jan. 5/7, 1996.
Teledynamics Product Booklett, pp. 1-2, Jan. 3, 1994.
Skytel Message Center—"This Page Lets You Sneak out of the Office"—Business.
Week, Sep. 20, 1999, p. 138G.
NEC Beacon Data Pager Advertisement.
BellSouth Interactive Paging Advertisement.
Digital Palm Pilot Phone—Pen Computing, Feb. 1998.
Sony MD-7001 Alphanumeric Pager Advertisement.
"Audiovox Plans Combo Phone/PDA" RCR Wireless News, Feb. 26, 2001.
"Streaming Technologies Gather Momentum in Wireless Space" RCR Wireless News, Feb. 19, 2001.
Panasonic GD93 Advertisement.
Motorola Accompli 009 Personal Communicator, Celebrated Living, Spring 2001.
*Tech-Know PDAS*, American Way, Jan. 15, 2001.
Skytel Messaging Pagers Advertisement.
Texas Instruments Organizers Brochures.
*The Leader in Caller ID Technology*, Telecom Sources, Oct. 1995, p. 191.
*Fast Automatic Name/Number Systems Brochure*, Jan. 1995.
*Fans Callscreener, Telesecretary Owner's Manual*, Undated, pp. 1-27, possibly circa Sep. 1994 [AAMP].
*Fans Callscreener Brochure*, CES Show Jun. 1993.
"US West Requests OK for Pioneer Wireless Testing," Newsbytes News Network, Jul. 30, 1991.
*AT&T Ships Passageway*, Newsbytes News Network, Feb. 5, 1993.
*Caller ID is Taking to the Road*, The Record, Nov. 16, 1993, p. 16.
*On Time Gets Wireless Links*, Newsbytes News Network, Feb. 5, 1993.
"Intel Users not Getting Much Satisfaxtion" Newsbytes News Network, Apr. 10, 1991.
"Digital Service Launched Over Lucent Technologies Equipment" Lucent Technologies Press Release, Jul. 8, 1997.
"Technology: A Portable Office That Fits in Your Palm Cellular Phones, Faxes and E-Mail are all Coming Together in a Clever Batch of Hand-Held Computers" Time, 2, 15, 1993, p. 56.
"PCS '97: New Wireless Phone Offers Access to Advanced PCS Features" Lucent Technologies/Bell Labs Press Release, Sep. 10, 1997.
"Wireless Talking Caller ID" Lucent Technologies, 2000.
FCC Registraion for Very Early Caller ID Product, Aug. 1994.
"Lucent Technologies Introduces New Portfolio of Enhanced Services for Wireless Carriers" Lucent Technologies Press Release, Feb. 29, 2000.
"Lucent Technologies Makes Computer-Telephony Easy; Announces First PC-Based, Multi-Phone System With no Rewiring" Lucent Technologies, Mar. 4, 1997.
"Wireless Calling Name" Lucent Technologies, 2000.
*Contact Managers and PIMS*, Computer Dealer News, Mar. 23, 1994, p. 50(2).
*Rochelle Offering Caller ID Applications*, Newsbytes News Network, Mar. 7, 1994.

"Caller ID Product Explosion Coming" Computer Telephony Magazine, Apr. 1, 1995, p. 44(2).
*Puma Technology Ships Intellilink Software to Extend the NEC Beacon Data Pager to PC-Based Applications; Puma Intellilink Software Makes Smart Pager A Powerful PC Companion*, Business Wire, Jun. 12, 1998.
"Spending: How to be as Smart as Your Phone" Money, Jan. 1, 1991, p. 122.
*The Future is Now—Interview w/AT&T Consumer Products Div.* President Carl S. Ledbetter, vol. 246, Popular Science, Jan. 1, 1995, pp. 68(8), reprinted from eLibrary.
"New for PC: $79 Caller ID Device" Newsbytes News Network, Feb. 27, 1992.
Internal Research Results of FCC Applicant Query.
News Release: *McCaw Cellular Has Nation's First Wireless Caller ID Service*, Feb. 27, 1995.
"Information Technology: The Wired Executive Savings Time Around the Clock" Fortune, Dec. 13, 1993, p. 157.
*Wireless Market Players Team on New Palmpilot Paging Device*, Mobile Matters, Dec. 1, 1997.
Information Technology: *Look, Ma! No. Wires!*, Fortune, Dec. 13, 1993, p. 147.
"Comdex—Galvin Keynote Pitches Motorola Technology" Newsbytes News Network, May 25, 1994.
"Novell Intros Perfect Works 2.1 for Windows" Newsbytes News Network, Apr. 4, 1995.
"Software Converts E-Mail Text to Voice" Newsbytes News Network, May 25, 1995.
"Windows 95 "Coming Soon" Program is . . . Coming Soon" Newsbytes News Network, Jul. 13, 1995.
"Ontime Scheduler Adds Phone Integration" Newsbytes News Network, Jun. 6, 1994.
"CTI: Bell Atlantic & Octus Collaborate to Integrate Computers & Telephones" Cambridge Work-Group Computing Report, Oct. 24, 1994.
"CTI: Phoenix Telephony Suite Provides PCS for Small & Home Offices With" Cambridge Work-Group Computing Report, Jun. 19, 1995.
"Symantec Offers Free Telephony Add-In for Act!" Newsbytes News Network, Mar. 8, 1995.
"New PC: AT&T Intros the Globalyst 360TPC. First PC With True AT&T" Cambridge Work-Group Computing Report Aug. 29, 1994.
"Online to a Revolution the Amazing- and Some say Ominous—New World of TV, Telephone and Computer is Heading Your Way" Newsday, Jul. 18, 1993, p. 4.
"New for PCS: Board and Software Work With Caller ID" Newsbytes News Network, May 11, 1992.
"Comdex: High-End Caller ID Handler Announced for PC's" Newsbytes News Network, Apr. 9, 1992.
"Supra Intros New V.32 Data/Fax Modems" Newsbytes News Network, Feb. 7, 1992.
"Comdex Preview: PCMCIA Modems" Newsbytes News Network, Nov. 13, 1992.
"Comdex: Single Board Provides Fax/Modem/Answerphone" Newsbytes News Network, Oct. 24, 1991.
"Comdex: Windows Caller ID System Announced" Newsbytes News Network, Oct. 25, 1991.
"Moscow: Computer Answering Machine" Newsbytes News Network, Apr. 4, 1991.
"Technology: A Portable Office That Fits in Your Palm Cellular Phones, Faxes and E-Mail are all Coming Together in a Clever Batch of Hand-Held Computers" Time, Feb. 15, 1993, p. 56.
*Wireless Manners Needed More Than Ever*, Business Wire, May 3, 1999.
*Brace Yourself for Some Major Advances*, Internetwork, Jan. 2, 1997, p. 28(2).
"Northern Telecom: Nortel Announces Two New Digital Wireless Handsets With First-to-Market Features" Presswire, Aug. 26, 1997.
"Cover Story/Small Wonders" Newsday, Dec. 1, 1996, p. F08.
"AT&T Offers Digital PCS Service in 40 Markets" Reuters Business Report, Oct. 2, 1996.
*Four Bells Posts Strong Profits on Wave of Demand*, Rueter's Business Report, Jan. 21, 1997.

"Caller ID Service now Available to Most Airtouch Cellular Customers in Oregon" Business Wire, May 18, 1998.
*AT&T Goes Nationwide With PCS*, Dallas Morning News, Oct. 3, 1996, p. 11.
*Caller ID—R.I.P.*, Guest Editorial, Newsbytes New Network, Apr. 30, 1993.
"Regulators Vote to Review Caller ID" The Record, Jan. 23, 1993.
"Southwestern Bell Fights Caller ID Ban in Texas" Newsbytes News Network, Feb. 10, 1993.
Caller ID on Phone Horizon—Controversial Service Shows Call Origination, Wisconsin State Journal, Dec. 3, 1993, p. 7C.
"Caller ID Service to Debut Next Week" St. Louis Post-Dispatch, Jul. 2, 1993, p. 05B.
"Caller ID Service in Trouble?" Newsbytes News Network, Mar. 24, 1992.
"Caller ID Spreading Nationwide" Newsbytes News Network, Nov. 23, 1992.
The GSM System For Mobile Communications, Michel Mouly and Marie-Bernadette Pautet, International Standard Book No. 2-9507190-0-7, 1992.
*Invasions of Privacy*, St. Louis Post-Dispatch, Jul. 14, 1993, p. 06B.
"Caller ID Moves Ahead in Indiana" Newsbytes News Network, Feb. 14, 1992.
"Pacific Bell Caller ID Just got Better—CPUC Approves Name Enhancement" Business Wire, Mar. 16, 1993.
FCC Database Research for Caller ID—ID Paging.
*US West Paging Addresses Trvelers' Needs*, Weekly Home Furnishing News, Jul. 26, 1993, p. 69.
*Computer Telephony Demystified*, © 2001.
*Newton's Telecom Dictionary*, pp. 143.
"Lines Between Phones, PDA'S Blur" RCR Wireless News, Sep. 10, 2001, p. 3.
"Microsoft Releases Details of Pocket PC OS Upgrade" RCR Wireless News, Sep. 10. 2001, p. 3.
Philips Home Services Brochure, "The Next Logical Step" 1994.
Philips Home Services Brochure, "The Next Generation Telephone" 1994.
"Sprint Venture Picks AT&T Network Systems, Northern Telecom as Vendors" Press Release by Lucent Technologies, Feb. 1, 1996.
*Systems and Technology Company Headquarters—Press Release*, Nov. 20, 1995.
*Integrated Messaging Capability*, Press Release Feb. 1, 1995.
"AT&T Introduces Compact Portable Cellular Flip Phone" Press Release, Jan. 6, 1995.
*AT&T Demonstrates PCS Spectrum CDMA At Wireless '95 Tradeshow*, Press Release, Feb. 1. 1995.
"Wireless and Wireline Convergence" Bell Labs Technical Journal, Summer 1997.
Definition of Pager From APDG Telecom Books, Nov. 9, 2001.
Definition of PDA From APDG Telecom Books, Nov. 9, 2001.
"GTE Introduces Digital CDMA Wireless Service in Austin, Texas . . . " Press Release, Nov. 15, 1996.
"GTE Launches CDMA Wireless Service in California" Press Release, Mar. 3, 1997.
"AT&T to Introduce New Wireless Intelligent Network Platform" Press Release, Jan. 23, 1995.
*National Alliance Places First CDMA Calls on PCS System*, Press Release, Oct. 31, 1995.
*GTE MobilNet Using AT&T Gear For CDMA Market Trial In Texas*, Press Release, Jan. 30, 1995.
"IV. Basic Wireless Principles" New York Times, Aug. 19, 1996.
*Digital Switching*, Lecture, Apr. 21, 1998.
*AT&T Digital PCS*, White Paper, May 1997.
*Wireless AT&T Digital PCS Service Launched Nationwide*, News Release, Oct. 2, 1996.
*Narrowband PCS Nationwide Auction Winners*, Aug. 17, 1994.
*Public Notice: High Bidders in Auction of Regional Narrowband Licenses*, Nov. 9, 1994.
"SS7 and BB King" Primedia Business Magazines & Media, Inc., Mobile Radio Technology, May 1, 1999.
*Skytel Offers Prepaid Alpha Paging Package*, Business Wire, Aug. 18, 1998.
*What's Hot: What Number, Please?*, Information Week, Jun. 16, 1997.
*Fast and Furious: Advanced Image Comm Futuremail*, Network Computing, Apr. 15, 1998, p. 168.
*CDMA: CDMA Development Group Created*, Cambridge Telecom Report, Aug. 15, 1994.
*You Got PDA on My Cellphone*, Oct. 2, 2000.
"New Products" Wireless Review, Nov. 1, 1998.
Definition—"Advent" From Mariam-Webster's Collegiate Dictionary.
"Signaling System No. 7, IS-41 and Cellular Telephony Networking" Proceedings of the IEEE, vol. 80, No. 4, Apr. 1992.
*Answering Machine With Automatic Obtainment and Usage of Caller ID*, Sep. 1997.
*Look Who's Calling*, Wireless Review, Feb. 1, 2000.
*The Value-Add Appeal*, Wireless Review, Sep. 15, 1999.
*How Personal Digital Assistants (PDAS) Work*, http://www.howstuffworks.com/pda.htm/printable, Dec. 5, 2001, pp. 1-18.
*Apple Mobile Message System*, p. 74, Sep. 1995.
*Official Gadgeteer Hands on Review: Kyocera QCP 6035*, 2001.
*Going Global*, History of GSM, Oct. 8, 1999.
*Growing and Growing*, History of GSM, Oct. 8, 1999.
Caller ID Fact Sheet, Mar. 1997.
*Metrocall, Inc. Discloses Plans to Launch Exclusive New Messaging . . .* , Mar. 1998.
*Skytel Service Pricing and Options*, Jan. 14, 2002.
Ericsson Chatboard, 2001.
*Full Size Qwerty Keyboard for Smart Phone*, Kyocera.
*Next Messaging an Introduction to SMS, EMS and MMS*, Mobile Streams Ltd, www.NextMessaging.com, Jan. 2, 2001, 25 pages.
*Advanced Messaging to Boost Paging Revenues The Strategis . . .* , Jan. 2000.
*Caller ID; Skytel Confirms*, Apr. 15, 1998.
*Success 4 SMS*, Mobile Streams White Paper, p. 17, Feb. 2001.
Wireless Communications Glossary, 1997-2001.
*The Short Message Service*, GSM World, Jun. 2001 [ABEG].
Chart Entitled *The GSM Milestones states*, first PCS, 1995.
Chart Entitled *The GSM Milestones*.
*Integrated Messaging Capability on AT&T Analog Cellular Phones*, Lucent Technologies, Feb. 1, 1995.
GSM Growth and Forecast to Dec. 2001 [ABEL].
Short Message Service Center.
*GTE MobilNet's CDMA Trial*, Press Release, New Technology, 1994.
*Short Message Service Center*, Lucent Brochure, 1999.
Keyword Search Performed on Motorola Website, 1993-1996.
Keyword Search Performed on Motorola Website for Caller ID, 1993-1996.
Keyword Search Performed on Motorola Website for Caller ID and Pager.
*The Future of Paging (ART II-1998 & Beyond)*, Oct. 1998.
*Handspring Expertly Combines Cellphone*, PDA in New TREO, 2001.
*Intelligent Phone*, IBM Technical Disclosure Bulletin, Feb. 1981.
*Selling the Cell Phone—PCS Technology*, http://inventors.about.com/library/weekly/aa071299.htm, Jul. 21, 1999, 3 pages, printed Mar. 10, 2002.
*Wireless Data Over Cellular and PCS*, ASI/Price Waterhouse conference on wireless data, Mar. 27, 1997.
*The Simon Personal Communicator*, PDA Developers 3.1, Mar./Apr. 1995.
*CDMA Short Message Service Application*, Version 1.0 Aug. 22, 1994.
*Messaging Card and Newtonmail: We Pick Up and Deliver*, Newton Notes 1993.
Calling Number Identification Services State 1 Description, Apr. 5, 1994.
*XIII the Digital Control Channel (DCCH) in IS-136*, Telecomwriting.com: Digital Wireless Basics: Radio Principles: IS-136 Channel, www.privateline.com/PCS/IS-136CHANNELS.HTM, Apr. 15. 2002, pp. 1-6.
New Micro-Portable 3770 Cellphone with LCD Display from At&T, Nov. 7, 1994.

*GTE Mobile To Test CSMA Cellular Digital Switching in Austin*, 1995.
*Southwestern Bell and AT&t to Test TDMA Wireless System*, Mar. 1, 1994.
*Price Cuts: US West Cellular Reduces And Simplies Rates*, Jul. 4, 1994.
*US West Cell Phone*, PC Link, Jul. 1, 1993.
*New CDMA ASYNC Data/Message Spec*, Oct. 31. 1994.
Consumer Electronics Show: IBM Cellular Phone/PC, Jan. 1993.
*Bell Two-Way Paging is World's First*, Bell Mobility Service From Bell Mobile Communications, Inc. Apr. 16, 1994.
TCA Show: New Products and Voice Mail Integration, Sep. 24, 1992.
Mobilcomm Voice Organizer Pager Brochure, 1996.
*An Introduction to Paging*, By Motorola, 1993.
*Caller ID Signaling and Data Format*, Byte, Jan. 1995.
*Pagers*, Dime (Japanese General Magazine), Dec. 15, 1994.
*Flex: The Mark of Leadership*, Motorola, 1995.
Pagewriter by Motorola, 1996.
*Motorola Announces Inflexion*, Motorola, 1995.
NEP Communications Advertisement.
"Keynote Voice Memory" Motorola, 1996.
Nexus Two-Way Paging Brochure, Telecommunication Systems, Ltd.
Fonesync Software Advertisement.
"Telecraft's Pocket Faxxer is a Slicer-Dicer Among Peripherals" Computer Shopper, Jul. 1993.
Octus PTA, Version 1.54 Brochure, 1994.
"Calling Number Identification Service—Caller ID" Federal Communications Commission, CC Docket No. 92-281, FCC 95-187.
"Caller ID Rises Privacy Issues" Caller-Times Interactive News, Jun. 17, 1996.
"Caller-ID With Automatic Name Delivery . . . " ACLU Freedom Network, Feb. 6, 1995.
Electronic Privacy Information Center—Style Sheet—Cite as 96 C.D.O.S. 671.
"Motorola Cellular Phones to Offer Caller Line ID . . . " Motorola, 1997.
"Caller ID Blocking" Apr. 3. 1996.
"By the End of 1999, There Will be More Than 130 Million Paging Customers" Communications Daily, Aug. 3, 1994, V14 N149 p. 7(1).
*Letting Your PC Pick Up the Phone*, Popular Science, Mar. 1994, p. 50.
"Alphanumeric Paging" Pactel Paging, 1992.
"Wireless Phone, Pager Sales to Quadruple to Near $10 Billion" Telephone IP News, Mar. 1994, V5 13.
*EO Plans Future Devices Despite Current Delays*, News Hardware, Mar. 29, 1993, p. 36.
"Paging in Russia" Global Communications, May-Jun. 1994, V16 N3.
"Casio, Mitsui & Bharti Telecom in Indian Pager Deal" Computergram International, Jul. 12, 1994, I2455.
"Price, Branding Play Big Role in Pager Selection, Survey Says" Advanced Wireless Communications, Oct. 26, 1994, V5 122.
"Taiwanese Companies Seek to Expand Shares of Chinese Pager Market" Matsushita Weekly, Feb. 10, 1994, VI 16.
"Pager Auto-Dial Option" IBM Technical Disclosure Bulletin, Jan. 1994.
"Pen-Based Automated Interpersonal Communication System" IBM Technical Disclosure Bulletin, Mar. 1995.
*Pager Auto-Dial Option*, IBM Technical Disclosure Bulletin, Jan. 1994.
1994 PCS Market Demand Forecast, Jan. 30, 1995.
Motorola Select 2000 Brochure, 1996.
Motorola M75 Digital Cellular Telephone Brochure, 1997.
The Wireless Vision—From Motorola Annual Report.
"Low-Priced Cellular Plans" Mobile Office, 1993.
Let Your PC Page You.
"Inside This Guide" PCWORLD, Dec. 1992, p. 237.
"Multitasking Phone Organizer" Mobile Computing & Communications, Dec. 1998, p. 34.
Motorola Tenor Brochure, 1996.
Multi-Line Telephone Monitor With Dial Log Brochure by Voice Data Systems, Inc.

Motorola Press Release: Motorola Introduces Full-Featured 28.8 Voicesurfr, Jun. 6, 1996.
Paging and Messaging Products From Motorola Website, 1996.
"New Caller ID Software Captures Names as Well as Phone Numbers" DM News, vol. 12, No. 20, Jun. 4, 1990.
*Ameritech and Motorola Bring ISDN To Home Professionals*, ISDN News, Jan. 17, 1995.
*Mediacom™ Software the Personal Communications Center*, Bellcore, Undated, pp. 4, possibly circa Oct. 1994 [AAXT].
Motorola Select 2000 Brochure, 1996.
Motorola Tenor Brochure, 1995.
Motorola Star TAC Brochure, 1997.
Motorola Microtac Elite Brochure, 1996.
Skytel 2-Way Booklet by Skytel, 1995.
"Go Wireless" Brochure by Skytel, 1994.
Skytel Palmtop Messenger Brochure by Skytel Corp., 1995.
The Wizard OZ-9520FX Brochure by Sharp.
The Wizard OZ-5500 Brochure by Sharp.
Solocall Smart Center Brochure by Solopoint, 1996.
"The Enhanced 911 System at Work" Telident.
Voice Organizer Pager Owner's Manual by Voice Powered Technology, Inc., 1996.
U.S. Robotics Sportster Voice 28.8 Faxmodem, CMP Media, Inc., 1996.
Zeus Phonestuff-Caller ID Products Brochure, 1995.
The Yo Yo Caller ID and Xtension, Sep. 17, 2000.
"Zeus' Whozz Calling Caller ID Box" Computer Telephony Magazine, Nov. 1995.
"Yo Yo Adds Text-to-Speech Caller ID" Newsbytes News Network, Sep. 30, 1996.
Yo Yo User's Guide for Windows 95.
LG IPC-1000 by LG Electronics, Inc. Brochure, Jan. 1997.
Kyocera QCP 6035 User's Guide, 2000.
"Wireless PDA Com" PC Magazine, Jun. 27, 2000, p. 98.
"Wireless Data Transmission: Practical, Reliable, but not Cheap" Microtimes, Jul. 26. 1993.
Caller ID-to-DTMF Conversion, 1995.
Company Info: Fanstel—#1 Caller ID World Wide.
"Caller ID and Screen Popping for the Pizza Parlor" Telcomp, Inc. 1996.
Telcomp, Inc. Caller ID Computer Telephony Integration Home Page, 1996-2001.
My Vcaller ID Alpha 1.2X, Nov. 20, 1999.
Caller Eyedee News, Feb. 2, 2001.
"Pagers Grow More Popular in the Information Age" Philadelphia Business Journal, Feb. 4, 1994, V12 N49 p. 3B(1).
"Europe-Wide Paging" Global Communications, Mar.-Apr. 1991. V13 N2 p. 27(5).
"The International Growth of Paging" Global Communications, May-Jun. 1993, V15 N3.
"Pagenow! 1.5-Message Mac to Pagers!" Comm Progs/Utils, Oct. 17, 1995.
Handipage by Panisonic.
"Prometheus Intros Comms & Multimedia Products" Newsbytes News Network, Jun. 21, 1995.
*Facsimile Publishing Service Using Radio Signals Planned*, FaxMax Services, possibly circa 1990-1991 [AAIL].
"Paging (Broadcast)" Inc., Jun. 1993.
"Mobilecomm Slates New Pager for Retail" The Weekly Home Furnishing Newspaper, Oct. 12, 1992, p. 250(1).
"Paging Firms Scramble as Cellular Gains" The Wall Street Journal, Nov. 20, 1990, p. b1(2) p. B1(E) col. 3.
Voice Recognition Diary Brochure by Parrot, Palm Connect Brochure by Palm Computing, Inc., 1993.
"Networking, Wireless Communications" PC Magazine, Aug. 1993, pp. 362-384.
"Because Every Message is Important" Pactel Paging, 1992.
Imagine how far You Could go Without Limits.
"The Information Skyway is Coming Soon to a Wireless Device Near You" Popular Science, Nov. 1995, p. 57.
"Wireless Ways" PDA Developers 3.1, Jan./Feb. 1995, pp. 5-6.
"Wireless Watch" PDA Developers 3.5, Sep./Oct. 1995, p. 4.

"Desktop Communications Made Easty (Part 1)" PDA Developers 3.5, Sep./Oct. 1995, pp. 23-28.
Prototype and Design, Sep.-Oct. 1992LE Newton GPS.
*Cellular Carriers Issue Specs For Enhanced Data Networks*, Wednesday Jul. 21. 1993.
Atari Portfolio, First Palmtop 1989.
Windows CE Computers, Mar. 1993, Pulsar Was A Second Attempt.
AT&T EO, Available Since Apr. 1993, Jul. 30, 1993.
*Your Personal Digital Assistant*, Popular Science, Sep. 1992.
Method for Assigning Message Numbers and Sorting Numeric Canned Messages, Mar. 1993.
Timeline, Newton Connection, PC Connection, Sep. 1993.
*Computers Without Keys*, Popular Science, Aug. 1990.
Applecare Archive: Document, *Messagepad 120: Upgrading German MessagePad 120 in U.S.*, Jun. 5, 1996.
AppleCare Knowledge Archive: Results, This Message Describes the Newton Messaging Card, Jul. 29, 1993.
*Newton Messagepad: List of Accessories Available*, Applecare Archive: Document, KBase Document 18814, Jan. 23. 1998, pp. 1-6.
*Firm Unveils 1st Personal Communicator*, Google.com, Nov. 4, 1992.
*Developers Line up to do PDA Hookups*, Google.com, Jun. 8, 1992.
*Pen-Based Automated Interpersonal Communication System*, IBM Technical Disclosure Bulletin, Mar. 1995.
*Motorola's Micro Digital Elite™ Cellular Telephone Debuts at 1994 Summer Consumer Electronics Show*, Motorola, Libertyville, IL, Jun. 23, 1994, 3 pages, printed Apr. 14, 2002.
*Phones getting cozy with photos*, CNET News.com, Oct. 17, 2002, 3 pages.
*Camera phone set to become commodity, but usage will too low*, Telecom.paper, Houten, The Netherlands, Jul. 5, 2004, 4 pages.
Mobile messaging market overview, Chapter 1, Baskerville Executive Briefing Mobile Messaging Update—Statistics and Data, undated, 3 pages.
Telephones: Northern Telecom's Cordless Caller ID Phone Named Product of, Cambridge Telecom Report, from www.highbeam.com, Dec. 12, 1994, 3 pages.
GSM and PCS1900 Digital Cellular Phones, Mitsubishi Electric ADVANCE, Sep. 1998, 3 pages.
PicturePhone (Video Phone)-Ahead of it's time—Another Bell Labs innovation!, Record, May/Jun. 1969, 24 pages.
The Interworking Approach for Narrowband Access to ATM Transport-Based Multiservices Mobile Networks, IEEE Personal Communications, Aug. 1998, 12 pages.
Hello, Internet, Businessweek, May 3, 1999, 6 pages.
Burst-By-Burst Adaptive Wideband Wireless Video Telephony, Dept. Of Electr. and Comp. Sc., Univ. Of Southampton, 18 pages.
COMPUTERWIRE, J-Phone claims 1m video messaging subs, The Register, Feb. 2002, 2 pages.
WALT is a Newton VideoPad? (was: What is WALT??), Newton Talk, Oct. 25, 2002, 2 pages.
Secrets of the wireless elite: Video for handsets, www.ibm.com, Jun. 6, 2003, 6 pages.
Panel Discussion at the Fourth International Symposium on Mixed and Augmented Reality, Hand-Held Augmented Reality, ISMAR, Oct. 7, 2005, 6 pages.
Yesterday's tomorrow, today., Modern Mechanix, Dec. 24, 2005, 1 page.
News Release, Glenayre's Versera Video Solutions and Active Messaging Capability to be Highlighted at CTIA Wireless 2006, Glenayre, Mar. 31, 2006, 2 pages.
Phonotelephote, Technovelgy.com, 1889, 1 page.
SK Telecom and Thin Multimedia Team to Launch Wireless Video Messaging Service, www.mobic.com, Oct. 24, 2001, 2 pages.
Edison's Telephonoscope, www.terramedia.co.uk, Dec. 9, 1878, 2 pages.
www.terramedia.co.uk, Mar. 1, 1936, p. 2.
"Newton MessagePad," www.msu.edu, Mar. 21, 2002, 5 pages.
"Motorola Rings in 1995 with the Launch of the Marco® Wireless Communicator," www.motorolla.com/General/Events/Comdex/Fall95/ Press, 4 pages.
"Sony's Magic Link—First Impressions," *PDA Developers*, Nov./Dec. 1994, 3 pages.

"Motorola's Envoy First Run to Magic Cap," www.byte.com, May 1994, 9 pages.
"EO Personal Communicator," David Tebbutt, Personal Computer World, www.presshere.com, Feb. 1993, 4 pages.
"Simonizing the PDA," Chris O'Malley, www.byte.com, Dec. 1994, 8 pages.
"Digital Ink-Introducing the Zaurus," wwww.parra.com, printed Apr. 9, 2002, 5 pages.
"Microsoft Windows CE: History and Design," Robert O'Hara, *Handheld Systems*, Jan./Feb. 1997, 3 pages.
"Connecting and Using the Newton Keyboard," Apple Computer, Inc., 1995, 3 pages.
"Nokia News: Nokia pioneers new product category with the world's first all-in-one communicator," www.nokia.com. printed Apr. 12, 2002, 2 pages.
"Electronic organizer links to your computer," www.cnn.com, Apr. 4, 1996, 2 pages.
"AT&T provides email and fax capabilities for Sharp Zaurus K-PDA," ATT&T News Release, www.att.com, Dec. 15. 1994, 2 pages.
"Firm Unveils 1st 'Personal Communicator,'" *The Washington Post*, Nov. 4, 1992, 3 pages.
"Getting Organized with PIMs," www.smartcomputing.com, Jan. 1993, vol. 4, Issue 1, 10 pages.
"Technology in Reverse," Robert J. Samuelson, *Newsweek*, Jul. 20, 1992, 2 pages.
"Intellect," brochure: Innovad Innovated Development and Manufacturing, Rev. Dec. 1993. 4 pages.
"Make Way for the HPCs: Compaq's PC Companion," Richard orochove, www.morochove.com, Jan. 9. 1997, 2 pages.
Sprint Alleviates Manually Creating and Managing Wireless Phonebooks with New Sprint PCS Contact Synchronization Software (SM), Press Release, www.biz.yahoo.com, Feb. 14, 2002, 3 pages.
"Personal Digital Assistants," © Mercury Communications Ltd—Nov. 1993, www.gare.co.uk, 9 pages.
"Comdex- Sharp Intros 'Personal Information Assistant,'" Grant Buckler, *Newsbytes News Network*, Nov. 17, 1993, eLibrary, 1 page.
1994 Sony Magic Link, 1 page.
1995 Apple Newton with Connecting Keyboard, 1 page.
Sprint Communications Company, L.P., Government Systems Division product authorization, questions/comments page, and "Sprint Announces Second Quarter Results," 9 pages.
"Sprint, wireless arm soar on results," Jeffry Bartash, www.marketwatch.com, Apr. 16. 2002, 4 pages.
"Sprint PCS posts operating profit, lures customers," Yukari Iwatani, Reuters Business, http://biz.yahoo.com, Apr. 15, 2002, 3 pages.
"Sprint Announces First Quarter Results," Press Release, http://biz.yahoo.com, Apr. 15, 2005, 16 pages.
"Why Sprint Could Pick Up Speed," Olga Kharif, Business Week Online, http://biz.yahoo.com, Mar. 13, 2002, 3 pages.
Tag-it™ RFID Smart Label Transponder information page, www.rf-id.com, printed May 12, 2004, 1 page.
"Can RFID tags replace barcodes cost-effectively?" Editorial, www.transpondernews.com, printed May 14, 2004, 4 pages.
"CODESOFT™ 6 and RFID Tags, An Overview," Teklynx International Co., Sep. 29, 2000, 7 pages.
"RFID tag reader uses FSK to avoid collisions," www.elecdesign.com, 2004, 5 pages.
"Electronic Article Surveillance (EAS) An Overview of the Major Technologies," *The AIM Global Network*, www.aimglobal.org, printed May 14, 2004, 5 pages.
Electronic Article Surveillance (EAS) An Overview of the Technologies, www.tagcompany.com, printed May 14, 2004, 4 pages.
Messaging: A New Direction—Awash in E-Mail Troubles? A Raft of New Products is Coming to the Rescue, Network Computing, Oct. 1, 1996, pp p. 58.
Identafone Overview From Website Dates Oct. 17, 1996.
Netpage Product Overview.
HP Teleshare: Integrating Telephone Capabilities on a Computer Workstation, Hewlett Packard Journal, Apr. 1, 1995, pp. 69.
AT&T Makes Big Move in Digital Race, Los Angeles Times, Oct. 3. 1996, D-2.

Faster Units due in Stores Next Year, Computer Retail Week, Oct. 14, 1996 pp. 33.
CDMA's March Continues, Newsbytes News Network, Aug. 19, 1995.
AT&T First to Offer PCS Phones/New System Bundles Several Wireless Services, Newsday.
Diamond Ships Voice Modem with Internet Phone., Newsbytes News Network, May 18, 1995.
Fax Software: Delrina Demos Winfax Pro 7.0 for Windows 95; Cambridge Publishing, 1995.
New Modems: New Cardinal Voice-Capable Modems Offer Innovative Telephony; Cambridge.
Toward Human Centered Design. vol. 96, Technology Review, Jul. 1, 1993, pp. 47.
How the Europeans Respond to Mobile Communications., vol. 31, Communications News, May 1, 1994, pp. 28.
Users Seek Alternatives to High Cellular Costs., vol. 12, Minnneapolis-St. Paul City Business, Jun. 17, 1994, pp. 14.
Voicenow is Hip-Pocket Answering Machine, USA Today, Apr. 5, 1995.
Multimedia Messaging: AT&T Integrates Voice & Fax Messaging at Desktop. Cambridge Telecom Report, 1994.
CID Technologies and Macpager Information.
Opon: MCI to Provide Nationwide 'Find Me/Follow Me' Communications Service., Cambridge Publishing Inc., 1994.
Private Eyed—Martyware Private Eye, V. 1.1, Product Overview, 1994.
Little Brother Pager Notification Program With Caller ID, Product Overview, © 1991-1994.
CallerID Remote and Cidman V. 1.298, Product Overview, 1995.
Callinfo: V1.0 Caller ID TSR Program Product Description, Oct. 28, 1994.
Pagemate: V3.3 Product Overview, Apr. 30, 1993.
Calllink: V2.1 Caller ID for Windows Demo, May 17, 1994.
Page on Call, V2.1, PC Program Overview, Jan. 28, 1994.
Beepme V3.1, PC Program Overview, Aug. 22, 1993.
"Spoken Caller ID Trial in Baltimore is First Cellular-Based Test of Its Kind" Mobile Phone News, Dec. 20, 1993, V11. N48, p. 3(2).
Monologue User Manual by Media Vision, 1992.
"FCC Auction to Push Paging and Messaging" Telephony, Jul. 25, 1994, V227 N4 p. 8(1).
Simon by Bellsouth Cellular Corporation and IBM, 1994.
Skytel and the Sony Magic Link Pager Card, by Skytel Corporation, 1994.
"Sony Launches First Personal Communicator Based on General Magic Software Technologies" Announcement, Sep. 28, 1994.
"The Leader in Caller ID Technology" Telecom Sources, Oct. 1995, p. 191.
Fast Automatic Name/Number Systems Brochure, Jan. 1995.
Fans Callscreener, Telesecretary Owner's Manual.
Fans Callscreeners Brochure, Jun. 1993 CES Show.
"AT & T Ships Passageway," Newsbytes News Network, Jun. 18. 1993.
Caller ID is Taking to the Road—The Record, Nov. 16, 1993, p. 16.
"On Time Gets Wireless Links" Newsbytes News Network, Feb. 5, 1993.
"Contact Managers and PIMS" Computer Dealer News, Mar. 23, 1994, p. 50(2).
"Rochelle Offering Caller ID Applications" Newsbytes News Network, Mar. 7, 1994.
The Future is Now—Interview w/ AT&T Consumer Prod Div Pres Carl Ledbetter.
News Release: McCaw Cellular has Nation's First Wireless Caller I.D. Service, Feb. 27, 1995.
Information Technology: Look Ma! No Wires!—Fortune, Dec. 13, 1993, p. 147.
PCS: Technology With Fractured Standards—Electronic Design, Feb. 6, 1995, p. 65.
Technology: A Portable Office That Fits in Your Palm Cellular Phones . . . Time, Feb. 15, 1993, p. 56.
"Ericsson: Wins $17 Million Contract From APC for PCS Phones; First PCS" Cambridge Telecom Report, Aug. 21, 1995.
"Invasions of Privacy" St. Louis Post-Dispatch, Jul. 14, 1993, p. 06B.

US West Paging Addresses Travelers' Needs—Weekly Home Furnishings News, Jul. 26, 1993, p. 69.
Newton's Telecom Dictionary, p. 143.
Systems and Technology Company Headquarters . . . —Press Release, Nov. 20, 1995.
Press Release: Integrated Messaging Capability . . . —Feb. 1. 1995.
Press Release: AT&T Demonstrates PCS Spectrum CDMA at Wireless '95 Trade Show, Feb. 1. 1995.
National Alliance Places First CDMA Calls on PCS System, Press Release, Oct. 31. 1995.
"GTE Mobilnet Using AT&T Gear for CDMA Market Trial in Texas" Press Release, Jan. 30, 1995.
Narrowband PCS Nationwide Auction Winners, Aug. 17, 1994.
Public Notice: High Bidders in Auction of Regional Narrowband Licenses, Nov. 9, 1994.
CDMA: CDMA Development Group Created, Cambridge Telecom Report, Aug. 15, 1994.
"Answering Machine With Automatic Obtainment and Usage of Caller ID" Sep. 1997.
"How Personal Digital Assistants (PDAS) Work".
Apple Mobile Message System, p. 74, Sep. 1995.
Next Messaging.
Chart Entitled "The GSM Milestones" States, First PCS, 1995.
Chart Entitled "The GSM Milestones". 1994.
"Integrated Messaging Capability on AT&T Analog Cellular Phones" 1995.
Press Release GTE Mobilnet's CDMA Trial . . . New Techology, 1994.
"Intelligent Phone" IBM Technical Disclosure Bulletin, Feb. 1981.
Wireless Data Over Cellular and PCS, The Result was Cellular Digital Packet Data Which Began to be Deployed in 1993.
The Truth is That Simon is a Breakthrough Product . . . PDA Developers 3.1, Mar./Apr. 1995.
CDMA Short Message Service Application, Version 1.0, Aug. 22, 1994.
Communication Base—set With LCD Screen, Motorola Inc, Jun. 1993.
CDMA Development Group Completes Specifications for Data and Short Message Services, Oct. 26, 1994.
Newton Notes, Messaging Card and Newtonmail: We Pick up and Deliver, 1993.
Wireless Caller ID, Message Waiting now in Washington State, Oct. 23, 1995.
Calling Number Identification Services State 1 Description, Apr. 5, 1994.
XIII The Digital Control Channel(DCCH) in IS—136.
New Micro-Portable 3770 Cellphone With LCD Display From AT&T, Nov. 7, 1994.
GTE Mobilnet to Test CDMA Cellular Digital Switching in Austin, 1995.
Southwestern Bell and AT&T to Test TDMA Wireless System, Mar. 1, 1994.
Price Cuts: U S West Cellular Reduces and Simplifies Rates, Jul. 4, 1994.
US West Cell Phone—PC Link, Jul. 1, 1993.
New CDMA Async Data/Message Spec, Oct. 31, 1994.
Consumer Electronics Show: IBM Cellular Phone/PC. Jan. 1993.
Bell Two—Way Paging is "World's First." (Bell Mobility Service From Bell Mobile Communications Inc) Apr. 16, 1994.
TCA Show: New Products and Voice Mail Integration, Sep. 24, 1992.
Pen Computing Magazine, Aug. 1994, vol. 1, No. 1, pp. 15-22, 34-35.
Computerworld, Dec. 21, 1992, p. 8, "Windows Link to Pagers Aids LAN Troubleshooters".
"An Introduction to Paging" by Motorola, 1993.
"Caller ID Signaling and Data Format" Byte, Jan. 1995.
"Pagers" Dime (Japanese General Magazine), Dec. 15, 1994.
"Flex: The Mark of Leadership" Motorola, 1995.
"Motorola Announces Inflexion . . . " Motorola, 1995.
"Letting Your PC Pick up the Phone" Popular Science, Mar. 1994, p. 50.
"Pager Auto-Dial Option" IBM Technical Disclosure Bulletin, Jan. 1994.

Numbers, Jun. 4, 1990.
ISDN News, Ameritech and Motorola Bring ISDN to Home Professionals, Jan. 17. 1995.
Bellcore, Mediacom Software, The ISDN Personal Communicaitons Command Center.
Caller ID-to-DTMF Conversion, 1995.
Facsimile Publishing Service Using Radio Signals Planned.
Prototype and Design, Sep.-Oct. 1992LE Newton GPS.
Cellular Carriers Issue Specs for Enhanced Data Networks, Wednesday Jul. 21, 1993.
Atari Portfolio, First Palmtop 1989.
Windows CE Computers, Mar. 1993, Pulsar was a Second Attempt.
AT&T EO, Available Since Apr. 1993, Jul. 30, 1993.
Popular Science, Your Personal Digital Assistant, Sep. 1992.
Method for Assigning Message Numbers and Sorting Numeric Canned Messages, Mar. 1993.
Timeline, Newtown Connection, PC Connection, Sep. 1993.
Computers Without Keys, Popular Science, Aug. 1990.
Applecare Archive: Document, Messagepad 120: Upgrading German MessagePad 120 in U.S. Jun. 5, 1996.
Applecare Knowledge Archive: Results, This Message Describes the Newton Messaging Card., Jul. 29. 1993.
Applecare Archive: Document, Some Accessories are Only Available With the Newton 2.0 OS.
Google.com, Firm Unveils 1st Personal Communicator, Nov. 4. 1992.
Google.com, Developers Line up to do PDA Hookups, Jun. 8, 1992.
"Pen-Based Automated Interpersonal Communication System" IBM Technical Disclosure Bulletin, Mar. 1995.
Nicollet Digitrap DTS-2040 Product Brochure, 1994.
The GSM System For Mobile Communications, Michel Mouly and Marie-Bernadette Pautet, International Standard Book No. 2-9507190-0-7, 1992.
"SS7 and BB King" Primedia Business Magazines & Media, Inc., Mobile Radio Technology, May 1, 1999.

* cited by examiner

CALLER ID MEMORY ADDRESS REGISTER

| CALL | CALLING NUMBER | CALLING NAME | TIME/DATE | VOICE DATA |
|---|---|---|---|---|
| 1 | 415-555-1212 | KAZUO HASHIMOTO | 12:23 PM 3/13/93 | ~~~ |
| 2 | BLOCKED | BLOCKED | 12:42 PM 3/13/93 | BLOCKED |
| 3 | 619-555-1212 | JACK KILBY | 02:14 PM 3/13/93 | ~~~ |
| . | . | . | . | . |
| . | . | . | . | . |
| . | . | . | . | . |
| X | 817-555-1212 | THOMAS EDISON | 01:33 AM 3/14/93 | ~~~ |

*Fig. 5C*

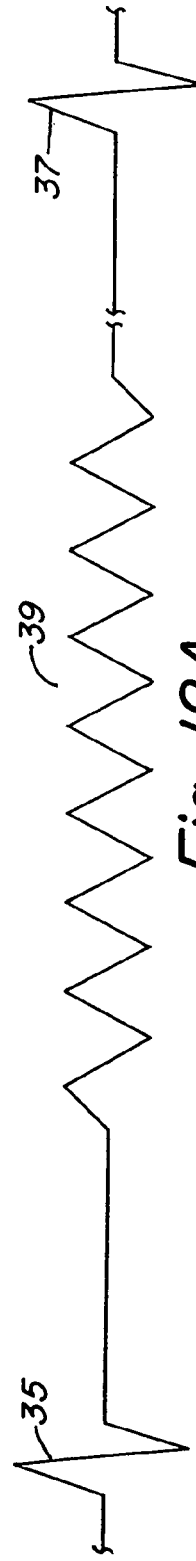
Fig. 12A (PRIOR ART)
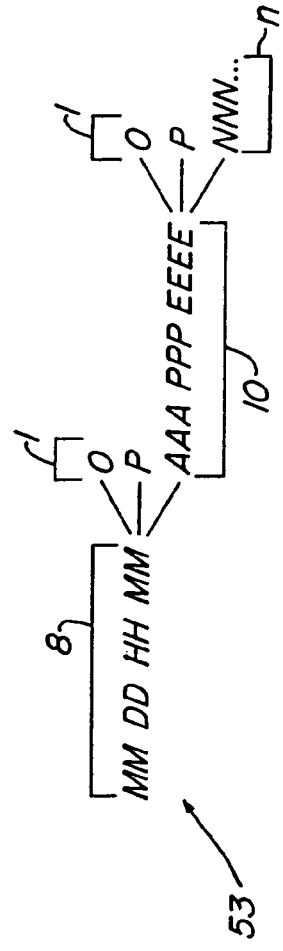
Fig. 12B (PRIOR ART)
Fig. 12C (PRIOR ART)

| MESSAGE CODE NO. | TEXTUAL MESSAGE |
|---|---|
| *1 | CALL WHEN YOU RETURN |
| *2 | VOICE MAIL RECEIVED |
| *3 | FAX MAIL RECEIVED |
| *4 | ELECTRONIC MAIL RECEIVED |
| *5 | IMAGE DATA RECEIVED |
| *6 | OTHER DATA RECEIVED |
| *911 | CALL IMMEDIATELY |
| ⋮ | |

Fig. 15

| CALLER LOCATION DATA (NUMERIC CALLER ID DATA FROM TEL. CO.) | CALLER IDENTIFICATION DATA (DTMF ENTRY BY CALLER) | CALLER MESSAGE CODE (DTMF ENTRY) |
|---|---|---|
| 1 | | |
| NNNN... | ABC... | NN |
| 2 | | |
| MMMMM... | DEF | MM |
| 49 | | |
| XXXX... | LMN... | ZI... |
| 50 | | |
| KKKK... | WXY... | 02 |

Fig. 16

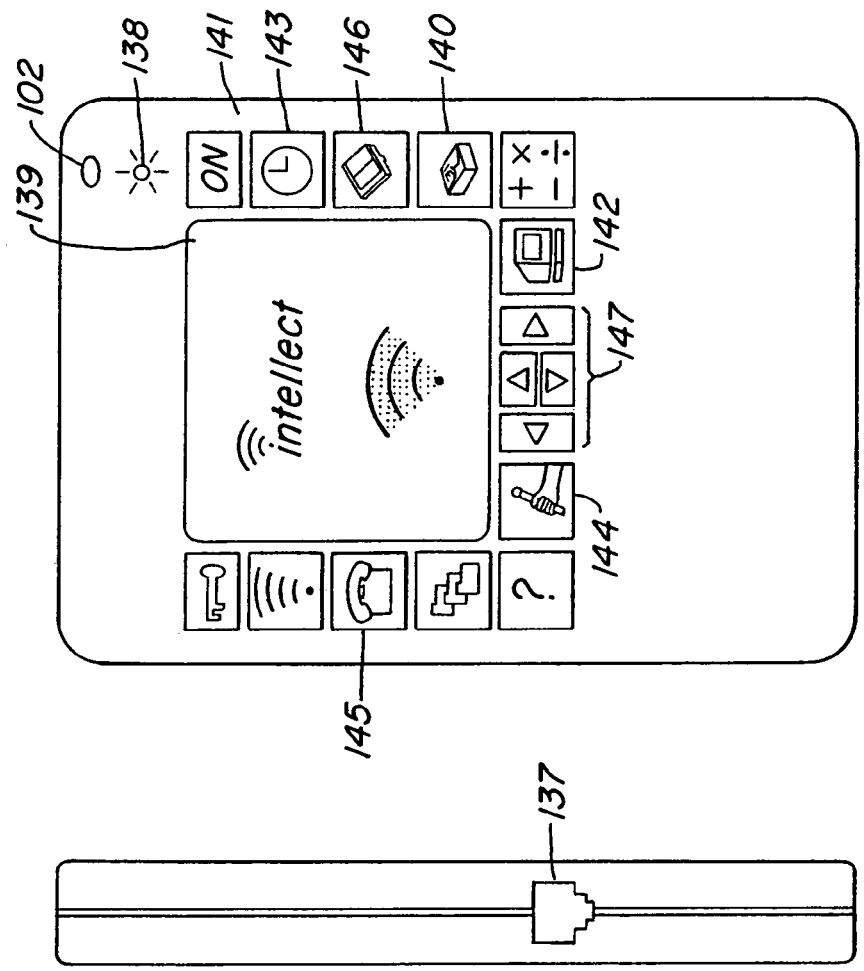
Fig. 19C
Fig. 19B
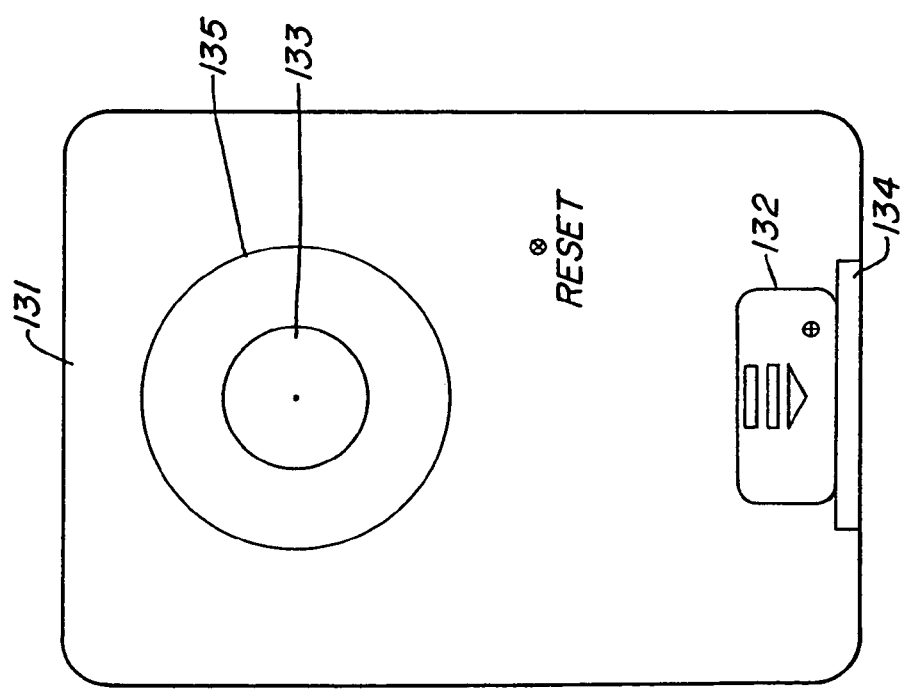
Fig. 19A

| TEL. NO. | FAX NO. | NAME | OTHER DATA | NT |
|---|---|---|---|---|
| 1-415-555-1212 | 1-415-555-2121 | KAZUO HASHIMOTO | 123 ANYWHERE ST., SAN FRANCISCO, CA | VI |
| 1-503-777-8889 | 1-503-777-8889 | ABC COMPANY | 1 TEST PLAZA, PORTLAND, OR | BL |
| 1-415-541-0500 | 1-510-444-1212 | ZYZ INC. | 8 WAY, SAN FRANCISCO, CA | T |

Fig. 22

| MESSAGE CODE | (PLEASE PRINT) |
|---|---|
| 11 | P I C K U P T H E K I D S — 611 |
| 12 | |
| . | . |
| . | . |
| . | . |
| . | . |
| . | . |
| PHONE DATA | NAME DATA |
| 613 — 5 5 5 1 2 1 2 | JOHN SMITH |
| 5 5 5 1 3 1 3 | JOHN SMITH-FAX |
| . | . |
| . | . |
| . | . |

615

*Fig. 33* ent # US 7,426,264 B1

METHOD AND APPARATUS FOR IMPROVED PERSONAL COMMUNICATION DEVICES AND SYSTEMS

CROSS-REFERENCE TO RELATED APPLICATIONS

This Application claims the benefit of the filing date under 35 USC §§119 and/or 120, and 37 CFR §§1.60 and 1.78 to the following U.S. and U.S. provisional patent applications, and is a continuation-in-part of the U.S. patent application:

1. U.S. provisional patent application Ser. No. 60/005,029, filed on Oct. 6, 1995, entitled "Method and Apparatus for Improved Paging Receiver and System";
2. U.S. patent application Ser. No. 08/177,851, filed on Jan. 5, 1994, entitled "Method and Apparatus for Enhancing the Efficient Communication of Information in an Alphanumeric Paging Network," now U.S. Pat. No. 6,278,862.

BACKGROUND OF THE INVENTION

1. Field of the Invention:

This invention relates in general to communications systems and in particular to wireless communications systems which include paging devices.

2. Description of the Prior Art:

Numerous companies are attempting to improve the manner in which people communication over wireless systems. The present invention addresses many deficiencies in the prior art systems.

The following discussion is specifically related to stored voice paging receivers and paging systems.

In stored voice paging receivers it is possible to receive voice messages which may be heard by a called party. In the prior art systems is shown a method in which voice messages may be stored at a paging center from a calling party and then the message may be transmitted to a paging receiver. These systems typically include pager ID control data along with any voice message for playback through a codec unit at the paging receiver. The codec converts the data received into an audio reproduction of the calling party's voice message that may be heard from a speaker or sound output device in the paging receiver.

Such devices are useful in that the called party may have a voice message delivered to them rather than having to call in to a message center or voice mail center.

However, in part, the popularity of such devices has been limited in that there is no means for preventing other people to whom messages are not intended from hearing voice messages of a personal or confidential nature if the message is replayed by the recipient in their presence.

It is difficult for the called party to ascertain the identity of the calling party prior to playing the message received to know who is calling prior to broadcasting the message in the presence of others in the nearby area. To review a stored message the user was required to press play and the voice message was annunciated from an integrated speaker in a communication device. This was impractical for a called party that was engaged in a meeting that wanted to discretely listen to an urgent message without having to leave or have other persons hear the message. In addition the previous stored voice paging receivers gave no visual indication of who was calling.

The previous stored voice paging receivers stored messages received based on the time the messages were received. This required that the messages had to be reviewed in the same order regardless of the possibility that an urgent message may not be heard until the very end of message review. This was very inconvenient if the message required a prompt reply from the called party. In U.S. Pat. No. 5,153,579 issued to Bennet et al. is described a method of fast forwarding through messages stored chronologically. This method, though useful, requires a user to sequentially listen to parts of all messages preceding a possible urgent message received.

In addition, in stored voice paging receivers there is no ability to sort through or organize voice messages except to listen to them sequentially. This can be inconvenient for the called communications as they may want to skip certain messages until later, but must listen to at least part of all of each message as the voice data cannot be displayed.

One particular problem with conventional paging systems using message center devices is the requirement that a caller must manually enter their call back telephone number. On such example of a manual entry system is disclosed fully in U.S. Pat. No. 4,172,969 issued to Levine et al, U.S. Pat. No. 4,072,824 issued to Phillips, and also U.S. Pat. No. 4,103,107 issued to D'Amico et al. This can be cumbersome particularly if the calling party wishes to also leave a voice message or send some other message data such as a facsimile. In addition it is especially difficult for a calling party to enter an alphanumeric message during manual entry as a great majority of communications over the PSTN originate from devices with standard numeric keypads that generate DTMF signals. One invention which attempts to address the problem of alphanumeric entry by a telephone set is U.S. Pat. No. 4,918,721 issued to Hashimoto. However such an approach is still cumbersome to use and is time consuming for the calling party. As well, the longer it takes for a calling party to enter caller identifying information, the less time a message center at the called party location is available to accept other calls. The inventive concepts herein attempt to resolve these and other problems.

SUMMARY OF THE INVENTION

The present application is directed to the following inventive concepts:

1. Voice Paging System and Device that utilizes call ID (CID) from an originating central office as textual identifying data and generates prestored audio alert prior to annunciation of a corresponding voice message from calling party. See FIG. 4a. CID could be fax header as in FIGS. 6a and 6b.

2. Alternate embodiment of the above where the entry of PIN is required to play back messages from a selected group of callers or for messages of confidential nature. See FIG. 4b.

3. Alternate embodiment of the above where DTMF audio signals and voice message is received. The device has a DTMF tone decoder generates corresponding textual data record and decoded digits for display. A text to speech synthesis can be achieved prior to annunciation of message. In another embodiment, the received DTMF signals could be used to generate call back dial signals. See FIG 4c.

4. Alternate embodiment of the above where the CID data could be applied to text to speech unit to annunciate CID data prior to the received voice message. See FIG. 4d.

5. Alternate embodiment where device has three modes of operation, namely, announce, silent and broadcast mode.

6. Alternate embodiment where device has sound input means to ack-back to caller. See FIG. 7b. The sound input means is used to prestore voice response messages for ackback which is an improvement over prior art. See FIG. 7a.

Another object is to provide an improved stored voice communication device that includes a method of transmitting voice message data with source identifier information.

Another improvement is to provide a more efficient method of fastforwarding and reversing through messages received in such a device than in the prior art.

BRIEF DESCRIPTION OF THE DRAWINGS

The novel features believed characteristics of the invention set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 5c shows a memory address register within a personal communicator device which stores caller id and voice message data received.

FIGS. 12a, 12b and 12c depict schematically caller-identification information which is transmitted over a telephone network.

FIG. 15 depicts a portion of a database which attributes textual messages to particular numeric or alphanumeric codes.

FIG. 16 depicts a memory buffer which stores paging requests received or transmitted to a portable communication device.

FIGS. 17, 18, 19a, 19b and 19c depict alternative portable communication devices in accordance with the embodiment of the invention.

FIG. 22 depicts a database with a plurality of data fields which identify information which pertains to potential communicants, and which is maintained in memory within the portable communication device.

FIGS. 29, 30, 31, 32 and 33 depict in block diagram, schematic, and flowchart form, a technique for developing a database with information pertaining to potential communicants for utilization in the portable communication device.

DETAILED DESCRIPTION OF THE INVENTION

The automatic transmission of caller id or ANI data from the PSTN to a message center, for storage and retransmission along with optional other data to a paging center to be received in a personal communicator is addressed. Other advantages and objects will be realized by the description that follows.

Figure 1A:
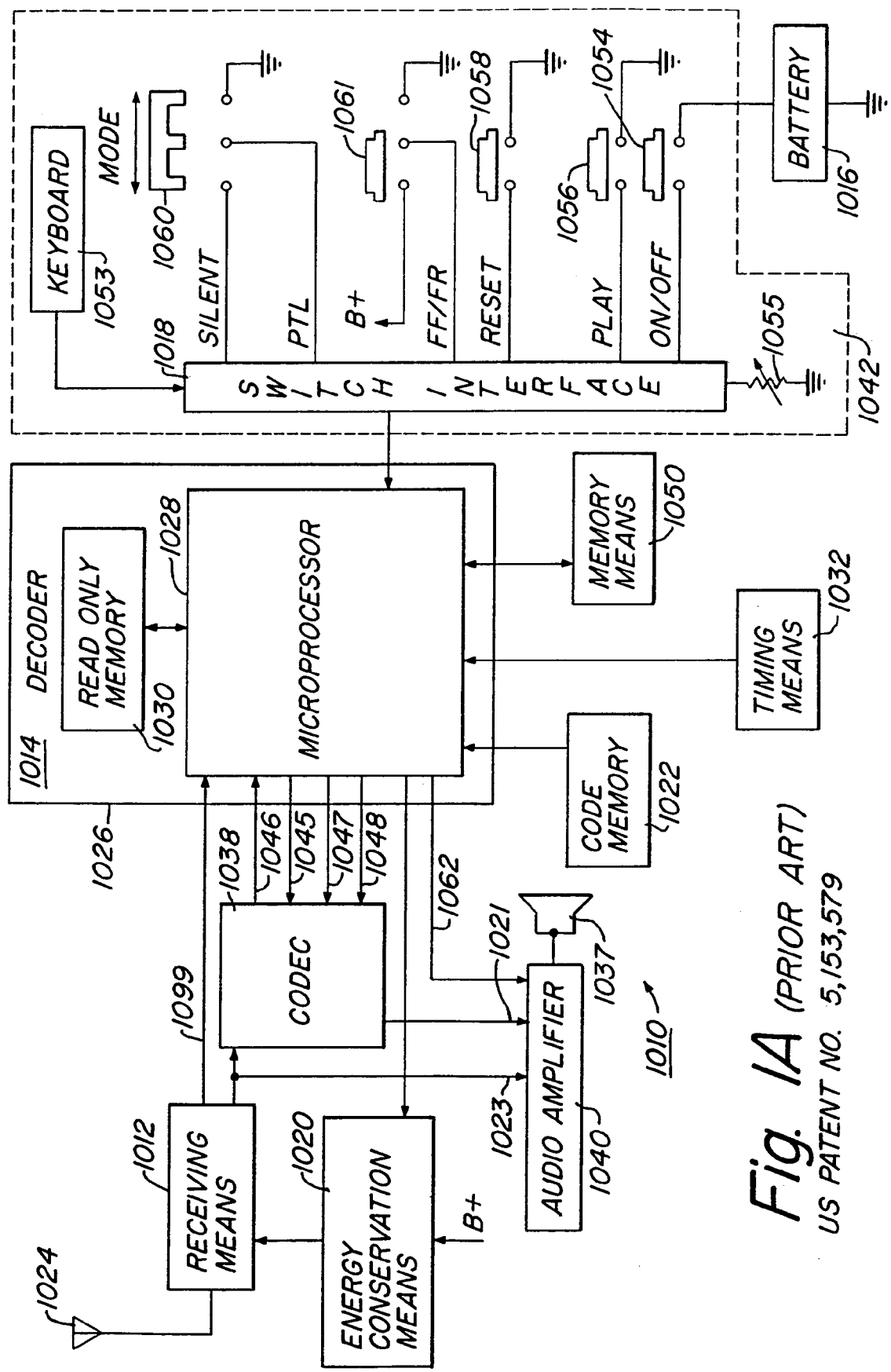
FIG. 1a shows the prior art stored voice paging receiver.

FIG. 1a shows a prior art stored voice paging receiver without a display that enables a called party to fast forward and reverse through voice messages received. Though useful, this type of device requires the called party to listen to part of each message received before determining which message to listen to. The invention described herein teaches how an improved stored voice paging receiver can include a display that shows the identity of the callers before the voice message is selected and heard by the called party.

Figure 1B:
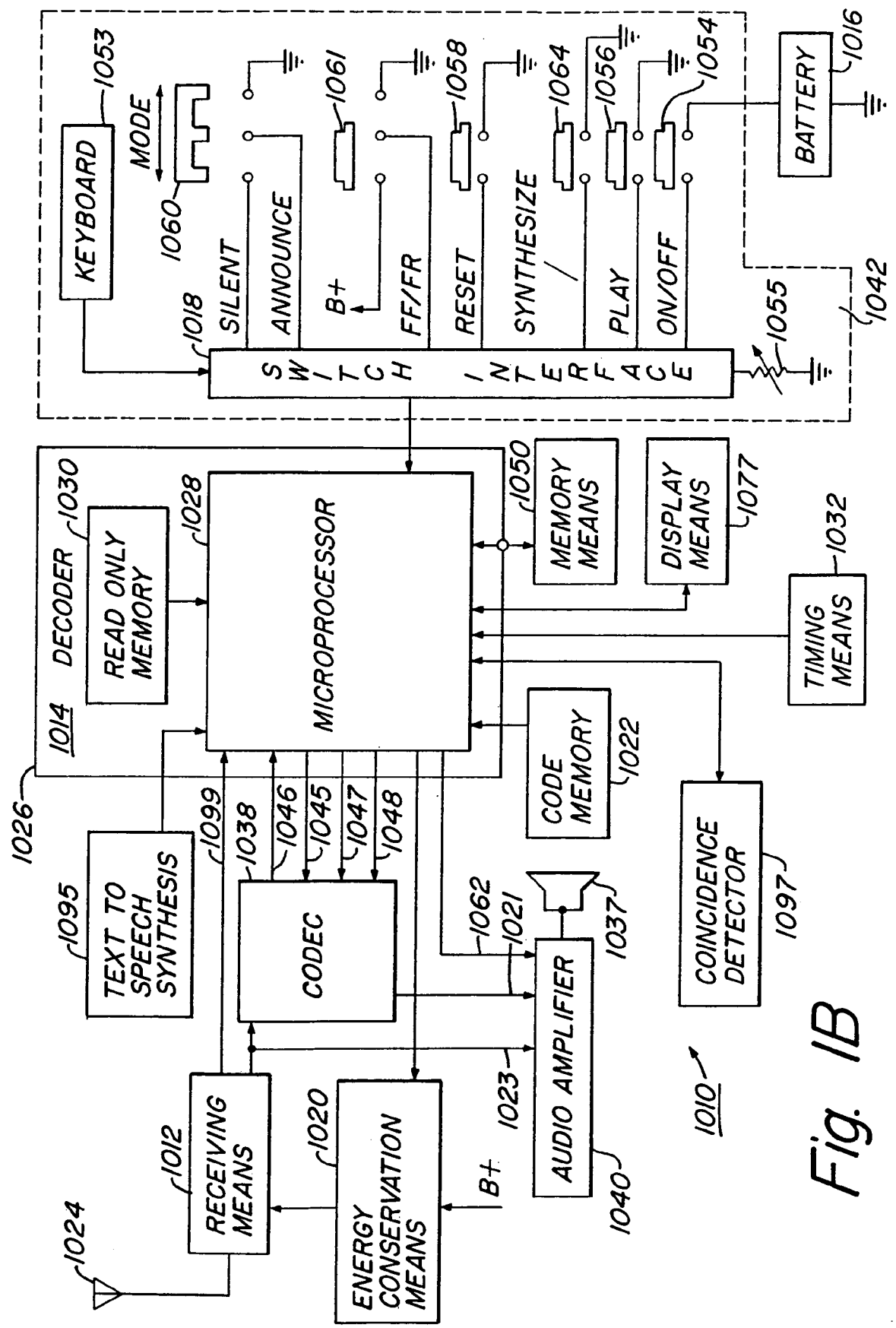
FIG. 1b shows an improved stored voice paging receiver with a text-to-speech means and a display input/output to annunciate and/or display caller identification data associated with a particular voice message received.

In FIG. 1b is shown one embodiment that may receive textual caller identifying data and display the data on a display. Additionally, received textual caller identifying data can be applied to a text to speech synthesis section for annunciation prior to the replay of a voice message. Alternatively, caller identifying information may be received in an audible voice form and played prior to the replay of a voice message.

Figure 1C:
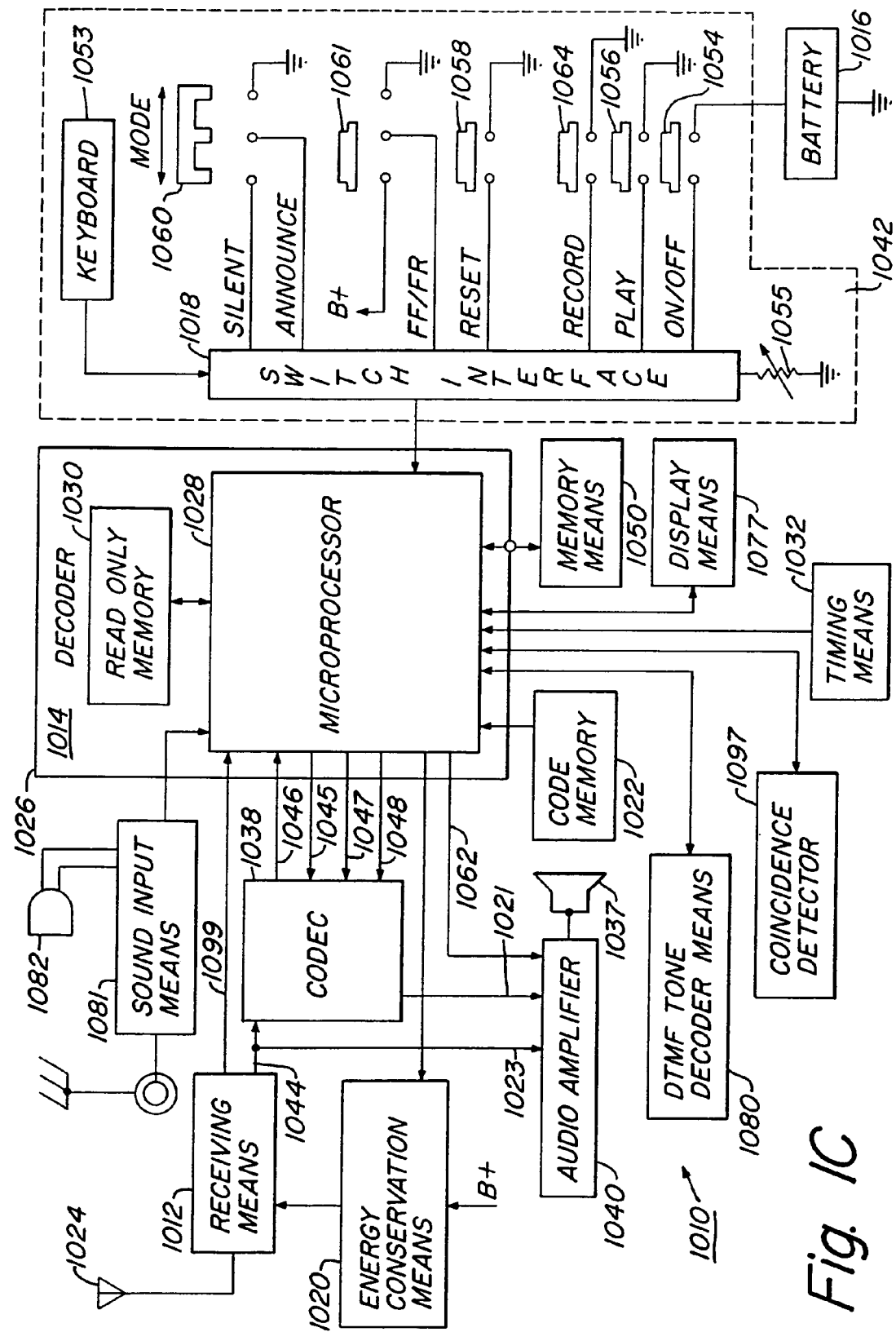
FIG. 1c shows an improved stored voice paging receiver with a sound input, a coincidence detector, a display output, a detachable input, and a DTMF tone decoder.

FIG. 1c shows an alternative embodiment of a stored voice paging receiver with prestored voice or sound signals and a coincidence detector, along with a DTMF tone decoder.

Figure 1D:
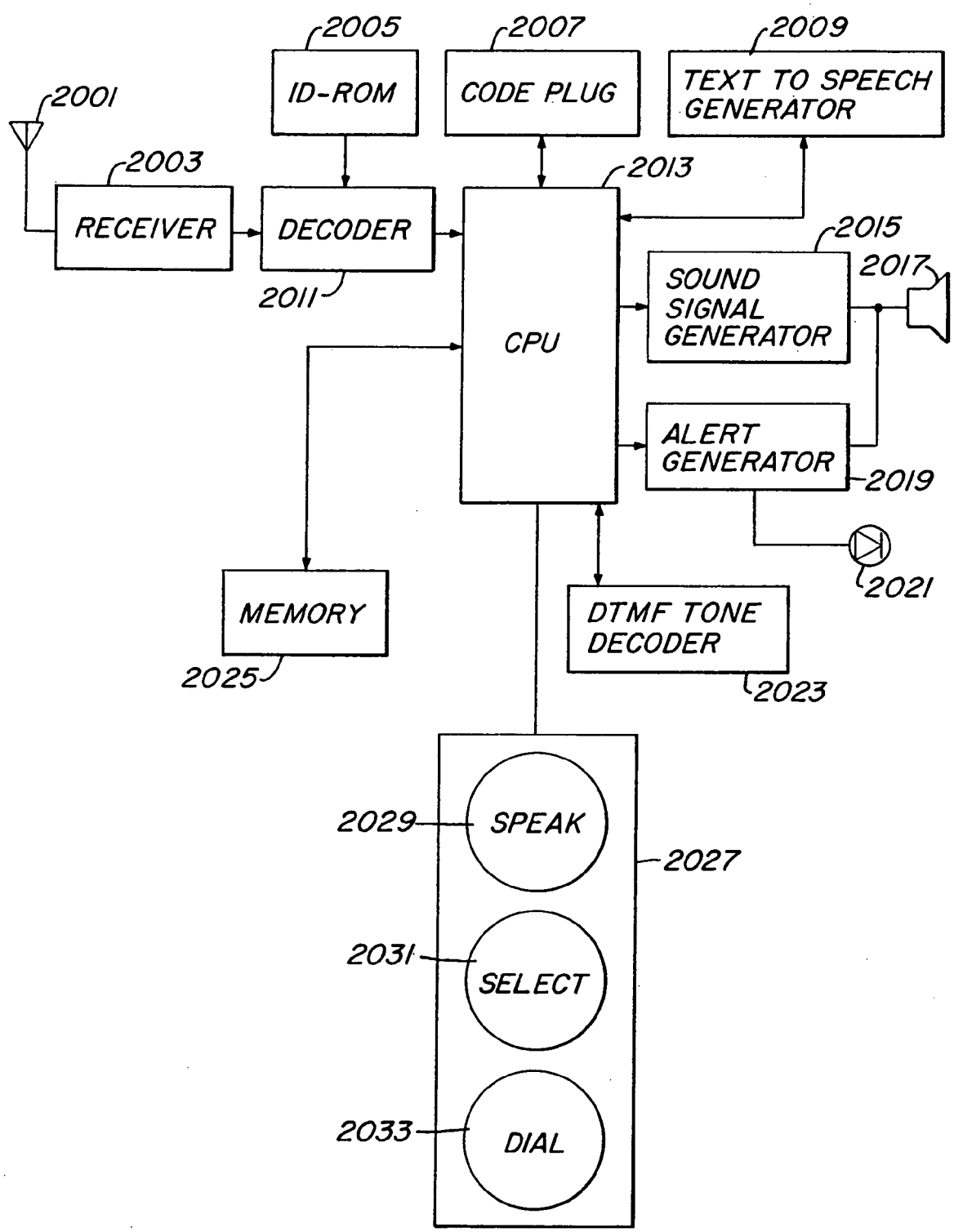
FIG. 1d shows an improved non-display autodialing type paging receiver with text to speech generator and DTMF tone decoder.

FIG. 1d shows an alternative embodiment of a non-display autodialing type paging receiver with text-to-speech synthesis.

A detailed description of the device operation in FIGS. 1b-1d will follow later in this specification.

Figure 2A:
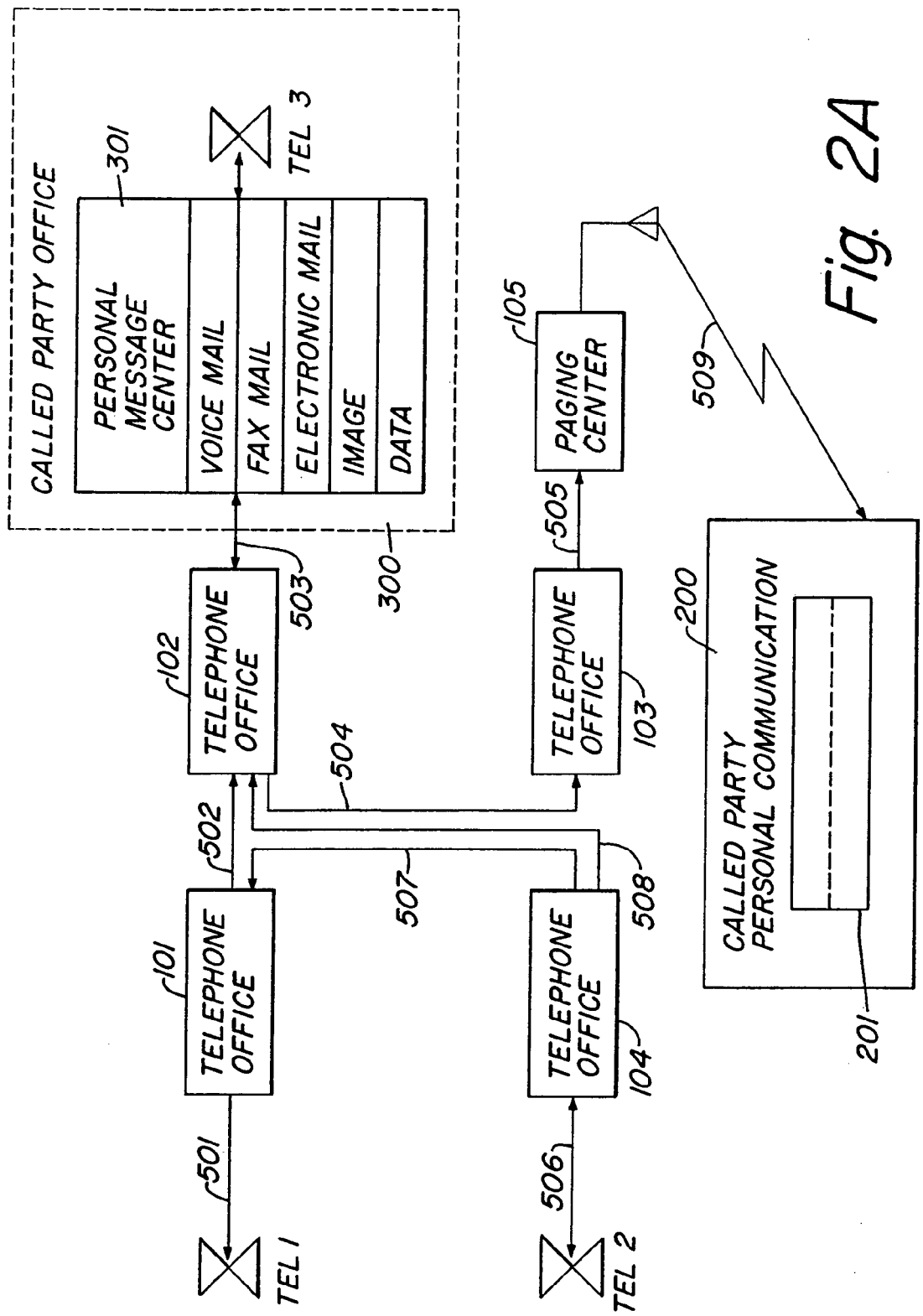
FIG. 2a shows a block diagram of a paging system described herein that has a messaging center at the called party office.

FIG. 2a shows a paging system to be described hereinafter in which caller id data is received and stored at a called station location with a message center device and retransmitted to a paging center over the public switched telephone network (PSTN).

Figure 2B:
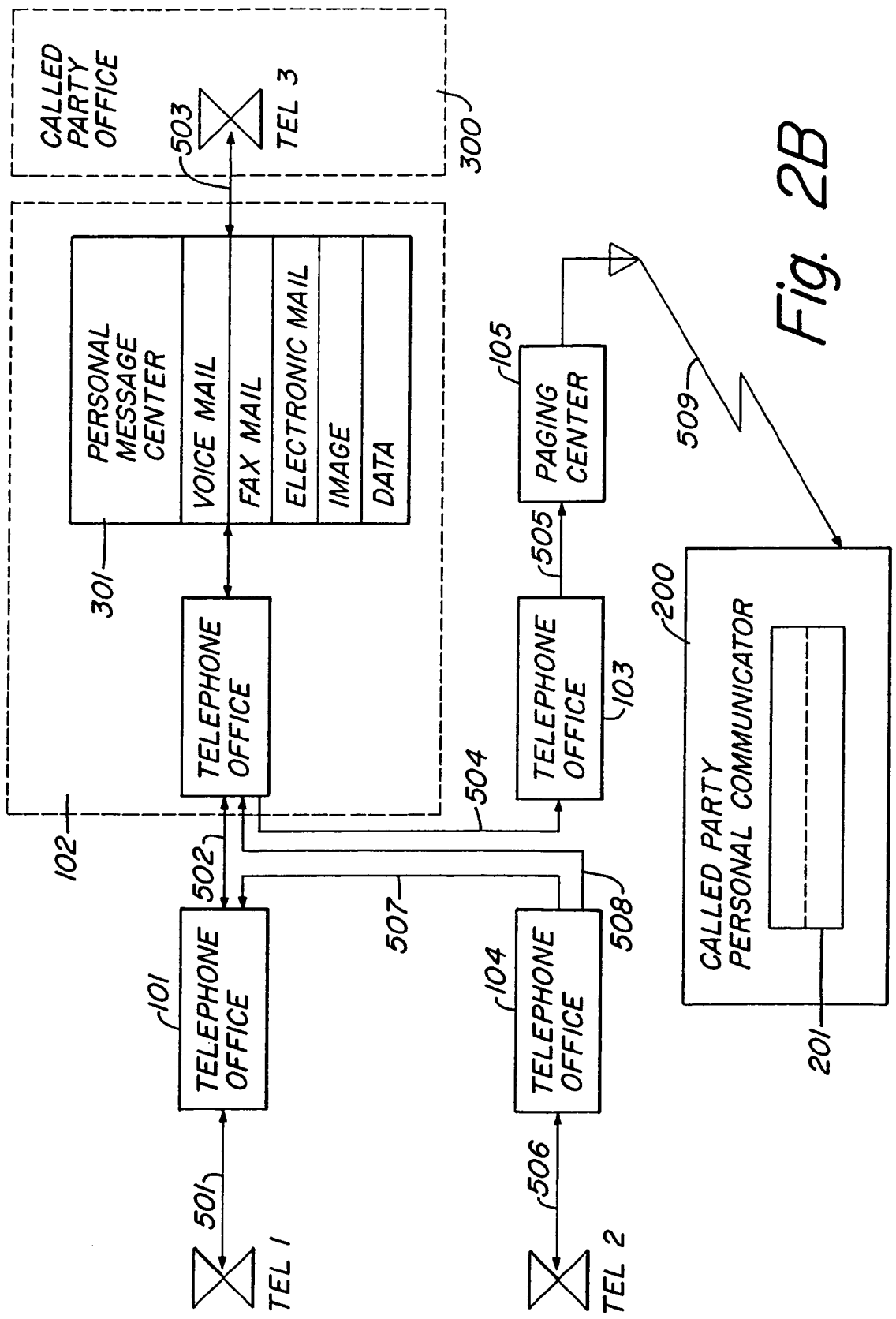
FIG. 2b shows a block diagram of a paging system described herein, that has a messaging center such as a voice mail center at the telephone office.

FIG. 2b shows an alternative embodiment in which a personal message center is located at the telephone office (102) rather than at the called party office (300), such as voice mail service offered by the Regional Bell Operating Companies such as Pacific Bell Telephone. For brevity, the discussions herein are directed to FIG. 2a although it is recognized that the embodiments described herein could be applied to a system such as described in FIG. 2b, or other similar systems.

In FIG. 2a, a calling party places TEL 1 in an off-hook condition and initiates a communication over the PSTN via telephone line (501) to an originating central office (101) through telephone line (502) to terminating central office (102). The caller id data is supplied in the conventional manner between the ringing signals from the terminating central office (102) through telephone line (503) to a called station location (300) which has a message center (301) and extension telephone TEL 3.

Alternately, caller id data in an ISDN environment can be sent as described in Bellcore document SR-NWT-002006 entitled National ISDN, U.S. Pat. Nos. 4,899,358 and 4,922,490 patents issued Blakely, and other Bellcore technical references widely available and not described but incorporated herein by reference. Typically caller identifying data supplied from custom calling services in an ISDN environment can be received and stored at a message center similar to a POTS (plain old telephone service) environment and later transmitted to a paging receiver held by a remotely located called party.

Message center device (301) may be a conventional telephone answering device, a personal computer with voice/fax mail or modem communications, or a conventional facsimile device, or some other device suitable for receiving incoming calls automatically and initiating automatic outgoing calls automatically to a paging center in response to calls received.

U.S. Pat. Nos. 4,737,979, 4,821,308, 5,333,179, 5,159,624, 5,208,850, 5,077,786, 5,014,296 and 4,985,913 and 5,128,980 as all variants of such devices and are incorporated herein by reference, though not fundamental to the claimed invention. For example, U.S. Pat. No. 4,821,308 issued to Hashimoto, requires manual DTMF entry by a calling party of the calling parties number. In U.S. Pat. No. 4,985,913, caller identifying information can be automatically received and stored to generate a particular paging notification but the actual caller identifying data received and stored is not transmitted to a called communicant through a paging center.

Fundamental circuitry for telephony and telephone related devices can be found in Understanding Telephone Electronics, Third Edition, by Bigelow, also incorporated herein by reference. Also incorporated herein by reference is a textbook entitled Voice Processing written by Gordon E. Pelton that is a useful reference for fundamental concepts discussed in this specification.

Additionally, other devices that may be incorporated in the message center include a telephone answering device with video telephone as described in U.S. Pat. No. 5,046,079, also incorporated herein by reference. Such a device is capable of receiving a picture signal sent between the ringing signals that are intended to establish the identity of the calling party similar to conventional textual or audible caller id information. The caller identifying video image may be stored on a recording medium. Telephone devices at the calling party side (TEL 1) that could be used include the AT&T VideoPhone 2500 or other popular teleconferencing products available recently on the personal computer. For example, U.S. Pat. No. 5,278,889 incorporated herein by reference describes one such implementation of a video telephony system. For purposes of brevity it is understood that methods other than those discussed at length for textual data detection and reception would be more appropriate for transmitting caller identifying video images, as is well known in the art.

Message Center device (301) may automatically initiate an off-hook condition in response to a ringing signal by using a ring detect interface circuit or some other means, as is well known in the art. The Message Center device (301) also has a caller id detection circuit which is suitable for detecting caller id data transmitted in between the first and second ringing signals. The caller id detection circuit for textual data includes a filter and demodulator circuit that is used for demodulating a 300 baud rate of incoming serial data stream using the technique of Frequency Shift keying. Data received by the circuit may include data representing the incoming telephone number, name, date and time of the current incoming call.

In a Personal Computer device equipped with a modem that can receive incoming calls, caller id can also be received. Such a device is becoming more popular with users in that a variety of modems that can receive facsimile and/or facsimile combined with voice messages are currently available. In U.S. Pat. No. 5,343,516 issued to Callele et al. is shown a computer system which can receive caller identification information supplied between the ringing signals in the conventional manner, which is incorporated herein by reference. Their invention is interesting in that it provides for the delivery of caller id information to a computer device connected to the PSTN which can transfer caller id data over a network to other computers and telephone sets that are the destination of the incoming telephone call. This patent does not teach how to communicate this information to a remote wireless personal communicator however.

In one embodiment as described in this specification, the modem monitors the phone line between the first and second ring burst without causing the data access arrangement to go off hook in the conventional sense, which would inhibit transmission of Calling Number Identification. A V.23 1200 bbs modem receiver may be used to demodulate the Bell 202 signal. The ring indicate bit (RI) may be used on a modem to indicate when to monitor the phone line for CND information. After the RI bit sets, indicating the first ring burst, the host waits for the RI bit to rest. The host then configures the modem to monitor the phone line for Calling Number Identification. The CND signalling starts as early as 300 ms after the first ring burst and ends at least 475 mS before the second ring burst.

The received calling Number Identification may then be stored in a memory in the Personal Computer as herein described. Calling name and other information could also be received, stored and transmitted using ascii character representations of the data in a similar fashion. In an alternative embodiment, the received number information could be used with a table look-up to append the prestored calling parties name in the personal computer with the received numeric caller id data for retransmission to an alphanumeric paging center. Blocked information represented by the ASCII character "P" could also be received, stored and retransmitted to a paging center, or used to inhibit a paging transmission to a personal communicator device. Alternate numbers could be specified by the calling party to be used as the Incoming Line Identification number, as is seen in U.S. Pat. No. 5,283,824 issued to Shaw and incorporated herein by reference. The calling party may be provided with the option of having the number of his calling station or some other number used as the Incoming Caller Identification number such as his/her home or business telephone number. This option could be provided to the calling party by the telephone switch in the case of a credit card or other type call, or could be provided to the calling party by the message center by means of audible voice instructions. In either case alternate data could be stored for later transmission from the message center to a paging transmitter.

The caller identifying data could also be used as described in U.S. Pat. No. 4,985,913, U.S. Pat. No. 5,278,894 and others incorporated herein by reference, in which customized greeting messages could be used when particular caller id data is received at the message center.

Alternatively, the message center device (301) may include an ANI detection circuit rather than the caller id detection circuit previously described. ANI encoding is a function performed by the network that identifies the originating phone number of the message delivered to the received telephone line. ANI encoding is currently used in "911" information systems, 800 and 900 numbers and may private PBX exchange systems. For example, in U.S. Pat. No. 4,313,035 issued to Jordan et al. incorporated herein by reference is described a paging service in which the ANI directory telephone number of the calling party may be delivered and stored at a TSPS (Traffic Service Position System) and stored in a data base. Using a paging facility such as the BELLBOY PERSONAL signalling system, a paging signal can be generated to a remote called party. The called party, in response to an alert in a paging receiver, can then initiate an inquiry call to determine the identity of the caller and return the call. In the improvements described herein, the identity of the calling party is delivered automatically to the called-party paging receiver.

ANI may also be delivered to the message center device and then retransmitted to a paging center with multi-frequency or DTMF tones using a somewhat different data transmission protocol from caller id, which will now be described.

The information delivered from ANI ranges from Level A service that provides caller area code only to Level D service that provides caller area code, city, local exchange # and phone #. Further details about ANI are shown in U.S. Pat. No. 4,942,598 issued to Davis and Bellcore Technical Reference TR-NWT-000064 and FSD 20-20-0000 entitled LATA Switching Systems Generic Requirements—Automatic Number Identification and Operator Number Identification, which are both incorporated herein by reference. Such an alternative arrangement may prove to be useful to customers utilizing inbound 800 numbers as the primary access for calling parties to a message center.

ANI DETECTOR USED IN A PAGING CENTER

In a related disclosure, ANI information instead of caller id information can be used for transmission to a called party personal communicator. By incorporating an ANI decoder directly within a paging center, calling party ANI information can be incorporated in a system similar to that shown in copending applications 08/177,550 and 08/177,551.

Hereinafter, the generic term caller id shall be used interchangeably to describe conventional number and number/name caller id, ANI, video, fax header or alternate manually entered caller identifying data.

It should be understood that when a particular implementation is referring to ANI, the necessary decoding circuitry and transmission protocol would be used as opposed to different decoding circuitry and transmission protocol used for Caller ID or other caller identifying data.

CALLER ID USED IN A PAGING SYSTEM WITH A SEPARATE MESSAGE CENTER

The message center device includes a memory to store and retrieve caller identifying data received in a memory, as is well known in the art. On such apparatus is described in U.S. Pat. No. 5,283,818 and U.S. Pat. No. 5,390,236 issued to Klausner et al and incorporated herein by reference. The message center device (301) also has prestored paging transmission data in a memory which may include at least the telephone number of the paging center and any pager id data that will ensure data transmitted will be sent to the appropriate called party. The pager id data typically ranges from 4 to 15 digits in length to uniquely identify a paging receiver. Such prestored data may be automatically recalled at the message center to generate dialing instructions to a paging center upon receipt and storage of an incoming call and optional data message.

Upon receiving caller id data supplied from the terminating central office at the called station location, the caller id data is stored in a memory or on a hard disk drive and the message center device then initiates an off-hook condition to answer the call. Then if the message center device (301) is of the type that stores voice messages, an outgoing message such as conventionally generated by a telephone answering machine or PC voice mail system or video telephone answering machine may be transmitted to the calling party and a calling party may respond by annunciating a voice or video message. The voice or video message is received and stored at the message center (301). In addition, the stored voice or video data may be encoded or compressed to conserve memory storage space in the message center device. Compression of the message data will also reduce transmission time required later when the message data is sent in a subsequent paging transmission from the message center device (301) to a paging center (105). One such compression algorithm that is known as G7.23 is slated for approval by the International Telecommunications Union (ITU). It is intended for use with real-time multimedia, simultaneous voice and data, and conferencing applications. A software solution that delivers such a compression algorithm is available from a company known as DSP Group, Inc. out of Santa Clara, Calif. known as TrueSpeech. This software currently will run on processors such as the Texas Instruments TMS320C5X, Motorola 56156 Digital Signal Processor, Intel 386/486/Pentium, Analog Devices 2100 and other processors.

The voice or other data may be stored contiguously in a memory location with caller id data received or stored in a different memory location and associated with caller id data received and stored, for later transmission to a called party personal communicator (201). After the data is stored on a recording medium at the message center device (301) the calling party at TEL 1 hangs up.

Other message data received by the message center and associated with caller id data could be received and stored in a similar fashion. For example, the message center may receive a facsimile image, or a video telephone message. Received facsimile or video image data could be stored with caller ID or caller identifying data and transmitted to a paging receiver adapted to store and view facsimiles or video images along with associated caller id or caller identifying data. Such data could be encrypted such as is described in U.S. Pat. No. 5,285,496 issued to Frank et al. and incorporated herein by reference or encoded as previously described to reduce the message size for storage and transmission.

Other textual special message data such as described in U.S. Pat. No. 4,811,382 could be captured at the message center to be transmitted to a paging center, which is herein incorporated by reference. This textual data could be sent to the message center in place of caller identifying data or along with caller identifying data that could be used as a header record for notification within a personal communicator device.

Upon detecting that the called party has disconnected, the message center device (301) hangs up. Then the message center device (301) is returned to an off hook condition and automatic paging instructions are retrieved from the prestored memory in the message center device. In the case where a paging transmitter is integral to the message center, no outward dialing to the PSTN is required but instead, a paging transmission may occur directly. In the case where a second telephone line is connected to the message center, the message data received on the first telephone line from the calling party could be sent out to a paging center over the second telephone line prior to disconnection with the calling party on the first telephone line.

Follow is described a system where a paging center is connected to the message center by a connection with the PSTN. Dialing instructions prestored typically would include the modem access # for the paging center, and a pin # associated with a particular personal communicator device or pager which is usually either 4, 7, or 15 digits in length, but could be any unique identifying data. A calling signal is sent to a paging center (105) through telephone line (503) to originating central telephone office (102) and telephone line (504), to terminating central telephone office (103).

Terminating central telephone office (103) is connected to paging center (105) by a modem adapted to establish communication using predetermined communications protocol suitable for the type of paging service provided. For example, data communication protocol may be significantly different for numeric data from that required for stored voice data communications.

The paging center (105) answers in response to a calling signal from a message center and the data representative of caller id data is sent to the paging center from the memory of the message center. The caller identifying data is sent to the paging center using the predetermined signalling protocol (to be discussed hereinafter) followed or preceded by any optional data to be transmitted. Alternatively, the message center could employ a tone or other decoder responsive to control signals generated by the paging center. Such a tone or other tone decoder could be employed prior to initiating the transmission of caller id and message data using a predetermined signalling protocol, rather than automatically transmitting the data by default or after a predetermined time period elapsed. As one example of various signalling protocols that could be used, U.S. Pat. Nos. 4,878,051 and 4,868,860 issued to Andros et al. are incorporated herein by reference.

Copending applications 08/177,550 and 08/177,851 both deal with paging centers of the type that incorporate a caller id detection circuit connected to the paging center that allow automatic detection and transmission of caller identification data to a numeric, alphanumeric, or stored voice paging receiver or personal communication device.

If the paging center is the type which allows caller id data to be detected from an incoming caller and transmitted to a paging receiver automatically as described in the above patent applications, the transmission of caller id data may be prevented by a special signal present in the data transmission from the message center or by some other means. For example by preceding the string of data sent from the message center with a # sign, the paging center will detect the "#" sign and disable storage and transmission of any caller identification data received at the caller id detector of the paging center for that particular incoming call from the message center (301). Such caller id data of the message center location would not be transmitted to the called party portable communication device (201) in this case. Instead, the caller id data of the original calling party would be sent to the pager. In another example, a caller id blocking signal could be appended to the outward dialing signal that would instruct the terminating central office to block transmission of caller id data from the message center. Alternatively, the absence of a special signal in the string of data sent from the message center (301) could indicate that the caller id data detected by the caller id detector in the paging center and the string of prestored caller identifying data from the message center would both be sent to the called party personal communicator (201). Alternatively, only the caller identification data corresponding to the message center could be sent and the caller id data corresponding to the original calling party could be prevented from transmission to a called party personal communicator. Such modifications in the preferred embodiments herein provide flexibility for the called parties to receive very diverse information at a paging receiver. Additionally receipt of, in the above case, a "#" sign could allow for the storage of the caller id data corresponding to the incoming call from the message center, but prevent the data from being transmitted along with data received from the message center. Such a feature would be useful to the operators at the paging center who might wish to know from where their call volume originated.

In yet an alternative embodiment, the paging subscriber could predetermine in advance at the paging center which calling parties they wished to receive pages from. Any other calling parties not having a corresponding caller id signal that matched the prestore preferences at the paging center would not be able to cause a paging signal to be transmitted.

If paging center (105) is not of the type that is called id enabled, then no such special code is necessary to inhibit unwanted caller id data of the message center (301) from transmission. In this case the caller id and other data received and stored at the message center (301) may be automatically, or in response to a control signal originating from the paging center (105), be transmitted to the paging center from the message center. The message center could also automatically insert other caller identifying or other data corresponding to items such as the number of facsimile pages or actual voice or fax message received, or some other useful information to be sent to a paging center along with the caller id data and optional message data.

In one preferred embodiment within the message center (301), the caller ID data is recalled from the memory of the message center and converted to DTMF signals. One device that is particularly useful for conversion of caller id data to DTMF signals is manufactured by Nicollet Technologies, Inc. is known at the DTS-2040.

Such DTMF signals representative of numeric caller id data are then transmitted from the message center to the paging center after the paging center has answered the call initiated by the message center and signalled that it is ready to receive data. This feature is especially useful in a numeric-paging environment.

Conversion at the message center of the stored caller id data to be retransmitted over the PSTN to a paging center is not limited to DTMF signals, but may also include other signalling appropriate for alphanumeric data typically received from caller id services such as name and date information. In another device manufactured by Nicollet Industries, Inc., the DTS-1082 can capture caller id rate and convert it to ascii data for storage and later retransmission from the message center to a paging center.

CALLER IDENTIFYING DATA COMPRISED OF FAX HEADER DATA TRANSMITTED TO A PAGING CENTER AND PERSONAL COMMUNICATOR DEVICE

Fax header information and the protocol for communication between facsimile message communications devices is notoriously old. For reference, see the book entitled FAX: Digital Facsimile Technology and Applications, Second Edition, and Standards developed by the CCITT (International Telegraph and Telephone Consultative Committee) including T.30 incorporated herein by reference. Other standards are widely known though not discussed in detail here.

Briefly, in a message center which is receiving a Group 3 fax from a calling party, the calling parties device can send a coded signal known as the transmit subscriber identification (TSI) after handshaking is established during what is referred to as the call set up or phase A. Typically the calling fax dials the telephone number of the message center over the PSTN. The ring signal and the CNG calling tone are received at the called message center and the CNG tone indicates the call is from a fax machine instead of a voice call. The called message center answers the call by going off hook. Then typically after a one second delay, the called message center sends its called station identification (CSI), a 3 second 2100 Hz tone, back to the calling fax machine.

Then during Phase B known as the premessage procedure, the called fax machine sends the TSI which includes at least the telephone number of the calling party fax machine. This information is typically used in the message center as fax header information. But in the embodiments herein, it could be used alternatively as caller identifying data that can be stored in a memory at the message center for transmission to a paging center to a personal communicator device similar to the methods described for other called id data. Such TSI data could be used alternatively for those areas or users that do not have caller id service. In addition, such message data in the TSI may include alphanumeric characters representing the calling party, time and data information and page number data. In a system using only number only caller id, for example, the alphanumeric data corresponding to the name of the sending party contained in the TSI could be appended to the numeric caller id data for transmission to a paging center and personal communicator device. Such a method could be activated by the detection of a CNG signal at the message center. Alternatively, a means of counting the pages received could be employed at the message center, and the total number of pages received could be appended to the caller identifying data. In another embodiment, only faxes of a certain length would be sent to a personal communicator device.

Predefined user preferences could be used within the message center along with a comparing means using the caller identifying TSI information to determine whether the image data received would be sent to a personal communicator device or just the notification data comprised of the caller identifying data.

In any case, alphanumeric caller identification data could be transmitted to a paging center or through an integral paging transmitter connected to the message center using the same alphanumeric protocol currently used in conventional alphanumeric paging systems known as TAP or IXO, incorporated herein by reference. These protocols could be suitable signalling for transmission of alphanumeric caller id data from the personal message center device to a paging service modem. Typically this conventional alphanumeric protocol operates at 300 baud and is well known in the art.

Of course in this case the paging center would require a suitable decoder that could receive and decode the alphanumeric data from the message center. This feature is especially desirable in an alphanumeric paging service in that some textual alphanumeric information may be transmitted automatically for the calling party using a conventional telephone at the TEL 1 that is typically devoid for any alphanumeric input. This is a significant improvement over the prior art. Various other signalling protocols could be used between the message center device and the modem at the paging center without departing from the spirit of the embodiments herein that may be more adapted to higher data transmission speeds, compression algorithms or the like. For example, the PCIA has made available other protocols for alternative data transmission such as image and other data referred to as TDP Protocol, issued Jun. 12, 1993, which is incorporated herein by reference. These protocols would be modified to incorporate caller identifying data fields for transmission with other optional data. Some paging centers do not adhere strictly to published protocol but instead have a variant of their own. In this case, it could be possible for the message center to establish the protocol used by the paging center dynamically by first recognizing and then selecting from among several different known protocols for subsequent transmission of the alphanumeric caller identifying data in a form recognized by the paging center. Incorporated herein by reference is a good reference entitled Understanding Data Communications, Third Edition by Held which gives a fundamental overview of various communications method and terminology.

TEXT SPEECH CONVERSION CONDUCTED AT THE TERMINATING CENTRAL OFFICE

Alternatively, the terminating central office (102) could apply a text to speech converter, similar to that shown in U.S. Pat. No. 4,899,358 issued to Blakely, in which an annunciated caller identifying signal is sent from the terminating switch to the message center device at the called station location. It is incorporated herein by reference. Such annunciated caller identifying information cold be particularly useful when used in a stored voice paging receiver similar to devices shown in U.S. Pat. No. 4,965,569 Bennett et al., U.S. Pat. No. 4,868, 560 issued to Oliwa, U.S. Pat. No. 4,873,520 issued to Fisch et al., and U.S. Pat. No. 5,153,579 Fisch et al., also incorporated herein by reference.

In one embodiment the caller id data is supplied to the message center from the terminating central office as an audible voice representation of caller id data and stored at the message center. Such data may also be encoded as previously described to conserve memory storage.

In this embodiment the audible encoded caller id data can be transferred to a paging center as previously described along with any optional data for transmission from a paging center and annunciation at a personal communication device.

TEXT TO SPEECH CONVERSION WITHIN THE MESSAGE CENTER OR PAGING CENTER

Alternatively, received and stored textual caller id data could be applied to a speech synthesizer unit contained within the message center or paging center, as partly described in U.S. Pat. No. 4,720,848 issued by Akiyama, U.S. Pat. No. 5,349,638 issued to Pitroda et al. or U.S. Pat. No. 4,742,516 issued to Yamaguchi, which deals with a communication system with a voice announcement means. They are herein incorporated by reference. Also incorporated herein by reference is a software product offered by Stylus Innovation, Inc. out of Cambridge, Mass. known as Visual Voice that runs on a personal computer. Using a digital signal processor in the personal computer, text to speech processing can be applied to caller id data. The resulting speech signals representative of the caller id data can be stored in a storage medium within the message center for transmission to a stored-voice paging center.

In addition, the Visual Voice system has an international language support that can speak the caller id data in the language desired by the called party at a personal communication device or at the message center. In any case, received textual caller identifying data which is stored at the message center is transferred to a paging center and transmitted as audible speech signals to a stored voice paging receiver. Alternatively, the textual data may be applied to a text to speech converter within a personal communication device for annunciation, as is well known in the art.

Irrespective of the signalling used after the calling party has disconnected with the message center, DTMF or other signals representing the stored caller id data are sent from the message center through the PSTN to the paging center. Any optional data such as additional voice message data, DTMF, image or other message data entered by the calling party may also be transferred from the message center (301) memory to the paging center for transmission to the called party personal communicator (210) via radio link (509). Such a feature is useful in paging systems that include stored voice paging receivers and non-voice paging systems such as described in U.S. Pat. Nos. 5,095,307 or 4,961,216, which are also incorporated herein by reference. In the case where caller id service is not available to a calling or called party, particularly in the case of stored voice paging systems, a DTMF entry could be made by the calling party to represent the caller identifying data to be transmitted with optional data such as a voice message. If the caller id detector failed to detect any caller id, a default voice message prompt could be generated by the message center that instructed the caller to enter at least their telephone number in the conventional manner using an input device at the calling party's telephone. Then the caller could be instructed to leave an optional voice message that could then be transmitted to a paging center after the caller hangs up. Such data would be stored at the message center as previously described and then the message center could automatically call the paging center. Alternatively, caller identifying data could be detected, an acknowledgement of the received and stored caller id data could be annunciated back to the caller, and an option could be given to modify or change the caller id data prior to leaving a voice or other optional data message.

Other caller identifying data that may be more readily recognized by the called party could be entered in place of the caller id data for example.

The information could then be transmitted by the paging center and received at a stored voice paging receiver for display, annunciation and used as redial data within the personal communicator device. This feature is especially useful in those cases where no caller identifying data would otherwise be associated with a voice message for transmission to a stored voice paging receiver or personal communicator device and is a significant improvement over the prior art stored voice paging receivers.

A special code such as "*" or some other special code could be used to signal the end of any DTMF or other signal data representative of caller id and to signify the beginning of transmission of optional data stored at the message center. This code could be automatically included by the personal message center or manually entered by the calling party for storage and transmission with the caller identifying data string stored at the personal message center. Optional data, such as a voice message or other data entered or sent by a calling party could then be stored and transmitted after the caller identifying data and demarcation code. Other coding methodologies that demarc the stored caller id data from other stored optional message data may be used and are not fundamental to the claimed invention herein but are considered obvious to those skilled in the art.

In the example above, wherein said optional data is a voice message, the receipt of a special code signal at the paging center (105) from the message center (301) cold enable a voice storage memory and receiving at the paging center to distinguish other data representative of caller id information from optional data such as voice messages. In addition, the data types of the caller identifying data and optional message data could be different from each other and not require any demarcation data. In one such case, caller identifying textual data could be detected by one type of detector at the paging transmitter, and voice or image data could be detected by another type of detector at the paging transmitter. The paging center could then store the data received and retransmit the data to a personal communicator device.

The paging center may receive the optional data such as a voice or textual message from the message center to be stored in a memory at the paging center. When the transmission is completed from the messaging center, the communication with the paging center is ended and the message center and the paging center hang up.

The paging center then initiates a paging transmission to the appropriate paging receiver and retrieves any stored caller id data and optional data from the memory transferred from the message center. After the pager id is decoded in the conventional fashion at the personal communicator device, the telephone number and/or number and name (if present) and optional date and time information representative of the caller id of the calling party, along with any optional data message such as a voice, text or image message, are received by the called party personal communicator.

Such received data could be stored in different memory locations or in one contiguous memory within the personal communicator device, demarced by the special coding method employed, to be accessed within a stored voice or other paging receiver held by the called party in a variety of ways known to those skilled in the art.

In one example, to access the caller id data, a called party might press a "view" button to see the caller identifying data. Or by default, the caller id data might be displayed automatically when received or after a PIN is entered by the called party. To access the actual voice message, a called party might press a "play" button. Such a personal communicator could also be responsive to voice commands annunciated by the called party into a microphone and a voice command unit within the personal communicator device which is connected to the microphone and is responsive to commands such as "PLAY", "REWIND", "FORWARD", etc. In addition, stored voice messages could be recorded on a removable memory such as a PCMCIA memory card that is now very popular in portable computing devices. Stored voice messages with or without corresponding caller identifying data could be transferred from the personal communicator device to another computing or voice message storage device in a central location such as the office of the called party.

PERSONAL COMMUNICATOR DEVICE WITH IMPROVED TIME DATA INPUT MEANS USING CALLER ID DATA

In the caller id data received and stored at the paging center or message center, time data corresponding to the time and data a communication was received could be transmitted to a personal communicator device. This could be particularly useful in a system in which several messages received were held in a queue for some time before a transmission occurred to the personal communicator device. The time data could be used as a sorting record at the paging center or message center to determine which calls were transmitted in a batch fashion as opposed to immediately transmitted upon receipt at the paging or message center.

For example, all calls received during peak periods during a certain time of day may be transmitted later off-peak to reduce congestion on the wireless communication system. Or all calls received during weekends or holidays could be transmitted in a lower priority queuing sequence than calls received during the week. In addition, message data received at the personal communicator could be organized and accessed according to the date and time the communication was completed in a very accurate and automatic fashion for the calling and called party. See related U.S. Pat. No. 4,872,005 issued to DeLuca et al. incorporated herein by reference.

In addition, such caller id time and date data could be used to initialize a time of day clock contained within a personal communicator device such as a Personal computer, cellular phone or the like. This could be beneficial in the circumstance where a power failure erased the time and data information ordinarily entered manually by a user. Other devices such as VCRs, automobile clocks and the like could be equipped with a receiver that could accept such information as well.

CALLER ID FROM A PBX WITH AN INTEGRATED OR CONNECTED TRANSMITTER TO A PERSONAL COMMUNICATOR

The message center could be directly connected to a paging transmitter that would not require a dial in via the PSTN to a paging network. In one embodiment, the message center and the paging transmitter could be an apparatus similar to that described in U.S. Pat. No. 5,151,930 issued to Hagl which describes a paging system within a telephone private branch exchange and incorporated herein by reference. Such a system could be modified such that any calls coming in from outside the PBX could be passed through a caller id detector circuit as previously described, and this information could be sent through to a personal communicator or call device.

In an alternate embodiment, caller id data could be delivered to a local paging system such as a unit offered by Motorola known as "Site-call" which is typically connected to a PBX such as the Meridan 1 manufactured by Northern Telecom.

Appropriate software and hardware at the PBX could capture and deliver ANI or Caller ID data to the "Site-Call" or similar local paging system. The prior art local paging systems require a calling party to enter their telephone number by DTMF entry, which is then transmitted by a local paging transmitter. This is limited in that only numeric data may be received and displayed to alert a called party. Alternatively in the prior art systems, a message such as "outside call" is displayed at the pager. By integrating various concepts taught in the embodiments herein, telephone number data and other caller identifying data may be automatically sent from a PBX to an onsite pager for display, annunciation, or other alerting means.

Alternatively, a call could be received at the PBX and if the call was unanswered at the called station, a message could be taken in a voice mail center and the caller id data (along with an optional voice or other message) could be delivered to a paging receiver by way of an onsite or offsite-paging transmitter.

The message center device may be directly connected to a paging terminal, thereby eliminating the necessity of a second connection to the telephone network. The paging terminal could be a "People Finder" paging terminal manufactured by Motorola, Inc.

In another implementation, the message center device is interfaced to a paging terminal such as the Modax paging terminal manufactured by Motorola, Inc. which was adapted to transmit additional caller identification information with a standard paging transmission. The interface from the message center to the paging terminal may be through a 1 or 2 telephone line interface. The interconnection to a paging terminal and the terminal's subsequent operation as well known in the art. The paging terminal transmits to a personal communicator that is capable of receiving and decoding paging signals modulated by the paging terminal in a radio frequency manner. The personal communicator also has the capability to store a message and to play back a message which may include caller identifying source indicator data as previously described that may be viewed on a display member or heard first through an annunciation means.

In FIG. 2b is described a message center which is at the telephone office rather than the called party office. The concepts previously described for a called party office based message center could also be modified and incorporated in the conventional voice mail system offered by the telephone company.

AUTOMATIC PAGING TELEPHONE SET USING CALLER ID INSTEAD OR DTMF FOR CALLER IDENTIFYING DATA

In U.S. Pat. No. 5,128,980 issued to Choi is described a system in which a calling party may enter their phone number using DTMF for automatic transmission to a paging center and is incorporated herein by reference. This method could be modified to incorporate a caller id detector that would be substituted for, or supplied in addition to, the DTMF receiver. When the device is in a pager number recording mode (either between the first and second ringing signals or after the device is placed in an off-hook position) the caller id data may be entered and stored automatically for the calling party, may be manually entered by DTMF entry by the calling party, or may be entered and stored using part of the caller id data supplied automatically and part of the data manually entered by the calling party. Then the caller identifying data can be transmitted to a paging center along with any optional data as described in the patent in an automatic, manual, or combined fashion.

COINCIDENCE DETECTION WITHIN THE MESSAGE CENTER

Optional data such as a voice message can be selectively transmitted to the called party, based on some comparator at the message center that analyzes the source identity of the calling party with prestored user preferences determined in advance by the called party. Or by default, all optional data received could either be stored for later retrieval by the called party or stored and transmitted to the called party personal communicator device along with the caller identifying data. The paging transmission can be encoded at the paging transmitter to economize on valuable transmission time, and then later decoded on a real time or delayed basis within the receiving called party personal communicator. Private flagged caller id data and optional messages may be automatically omitted from storage at the message center or omitted from transmission to a personal communicator device.

STORED VOICE COMMUNICATOR WITH TEXT HEADER INFORMATION DISPLAY

Incorporated herein by reference is U.S. Pat. No. 5,390,362 issued to Modjeska et al. This patent discloses a method of combining voice and data into a message format that can be sent to a pager capable of receiving a combination voice and data message. A called party may selectively review header information corresponding to the calling party prior to listening to any received voice message. A paging transmitter such as described in this disclosure can be modified to incorporate a caller id or ANI decoder (207) or fax signal decoder (209) in automatic telephone input (202) that can receive data automatically from the PBX or PSTN (108) and store this data in paging terminal controller memory (232). Voice synthesizer (208) can playback for the calling party a text to speech synthesized representation of caller id or ANI data and ask whether the data should be sent with the paging message. For example, the voice synthesizer (208) can receive textual caller id or ANI data such as "555-1212 John Smith" from the ANI or Caller ID decoder and then generate the following instructional message to the calling party, "Press or say 'ONE' if you wish for '555-1212 John SMith calling.' to be transmitted. Press or say 'TWO' if you wish this information to be transmitted and marked urgent. Press or say 'THREE' if you wish for this information to not be sent and you wish to enter some other data from your touchtone keypad or keyboard." The calling party, upon hearing the synthesized voice annunciation, then can select which caller identifying data should be sent. In the case of a stored voice paging system, upon hearing confirmation of the desired caller identifying data, the calling party would then be instructed to leave a voice message, which would be stored in the voice store and forward module (216). The confirmed caller identifying data would be stored in memory 232 to be linked with the voice message data stored in memory 224 for transmission from transmitter base station 226 to a selective call receiver. In the case of a paging system equipped with a fax store and forward module 216 and fax signal decoder 209, fax header information as previously described could be received and stored in memory 232, fax data could be received and stored in memory 224, and the contents of memories 224 and 232 could be transmitted by transmitter base station 226 to a selective call receiver.

In U.S. Pat. No. 5,283,818 is shown a message system which describes a system linking textual data with voice messages, and is incorporated herein by reference. Such an apparatus could be modified to incorporate the transmission of caller identifying data and voice data to a stored-voice paging receiver, via a call from the message center to a paging transmitter via the PSTN as previously described. In addition, to economize on minimizing the time spent connecting with a paging center, the messages received at the message center could be queued for batch transmission either during offpeak periods or periodically. Exceptions could be made for urgent message transmission that could occur without waiting for the message queue transmission.

Another patent incorporated herein by reference is U.S. Pat. No. 5,258,751 issued to DeLuca et al. Message storage slots can include caller identifying data display which has been transmitted to a selective call receiver or personal communication device as discussed hereinbefore. Any corresponding voice or other message data can then be displayed or annunciated after the user selects the desired message for review.

Upon receipt at the personal communicator device, the user could scroll through the received messages such as described in U.S. Pat. No. 5,285,493 issued to Wagai et al. and incorporated herein by reference, or by numerous other methods discussed in the various personal communicator apparatus described by reference or example herein.

The messages could be stored chronologically, with resequencing of the previously stored messages occurring automatically upon receipt of any new message or deletion of any previously recorded message. Alternatively, the messages with the caller id header data could be selectively stored as determined by the user in a number of ways. The messages could be stored based upon preselected criteria. For example, all messages determined to be of an urgent nature or from a particular communicant could be automatically stored in the firstmost message storage slot positions. In another embodiment, all messages could be analyzed and then stored sequentially in an ascending or descending order, based on the caller id header data presented. U.S. Pat. No. 5,225,826 is incorporated herein by reference and discloses a selective call receiver with an integral time of day clock. Messages received with identical header data records could be stored according to the time and date received within the selective call receiver, the time and date data present in the header data, or according to urgent indicators contained in the header data.

TEXT TO SPEECH CONVERSION OF CALLER ID HEADER DATA WITHIN A PERSONAL COMMUNICATOR DEVICE

In another embodiment, the textual information received at the personal communication device could be applied to a codec within the personal communicator device that is particularly suited to visually impaired persons. Application of a text to speech codec which converts received caller id signals to audible speech signals is well known in the art, as shown in U.S. Pat. No. 5,289,530 issued to Reese and incorporated herein by reference. Such a personal communicator device could be manufactured without a display member to reduce manufacturing costs for specialized purposes.

In the case of a stored voice message that is transmitted to a stored voice type called party personal communicator without a display member, textual caller identifying data could be annunciated. Such a device could also employ a display member that was capable of selectively or simultaneously displaying caller identifying data received at the personal communicator device.

COINCIDENCE DETECTION WITH A PERSONAL COMMUNICATOR DEVICE

Data representative of caller id information may be used at the called party personal communicator as key record data that could comprise the notification display or could generate some other associated notification within the called party personal communicator in response to receipt of the caller identifying portion of the message. The personal communicator device could employ a coincidence detector which may generate a number of notification events in response to a match with prestored data or user preferences compared against the caller id data received. For example, upon detecting that a coincidence existed with a prestored data record, a prestored visual image of the calling party could be displayed. In another instance, a coincidence detection within the personal communicator device could require a called party to enter a personal identifying entry before the confidential message could be reviewed. In yet another embodiment, a coincidence detection could inhibit any associated message transmitted from a message center from being reviewed by the called party at the personal communicator device. In yet other embodiments, received fax header information or Email addresses could be compared against a prestored directory within the personal communicator device to display or annunciate other corresponding data records.

EMBODIMENT USING BLOCKED CALLER ID DATA

Upon receipt of a "blocked" caller id data such as described in LSSGR—Class Feature: Calling Identity Delivery Blocking Features—FSD 01-02-1053, U.S. Pat. No. 5,341,411 issued to Hashimoto entitled Caller ID Blocking Method and Processing System, and U.S. Pat. No. 5,161,181 issued to Zwick entitled Automatic Number Identification Blocking System (all incorporated herein by reference and subject to modification with the invention herein), the personal communicator device could respond by not storing the message at the message center which would have been direction to the personal communicator device. In addition any blocked caller id data could be used at the message center to store and prevent transmission of the data to the personal communicator device. Alternatively a calling party could selectively omit the transmission of caller ID data by using the blocking signal and sending to the personal communicator device only manually entered data, such as a DTMF signal, a card swipe in a magnetic card reader, a voice message, image or other data in place of caller id data automatically supplied by the telephone company.

REDIAL MEMORY EMBODIMENT

Received caller id data can be selectively transferred to a data buffer within the called party personal communicator device for redialing, as seen in U.S. Pat. No. 4,924,496 issued to Figa and U.S. Pat. No. 4,873,719 issued to Reese, incorporated herein by reference. Logic can be incorporated into the receiving device that distinguishes either positionally or by filtering the numeric data from the alphanumeric data to ensure that only the numeric data was retrieved and transferred to a data buffer for redial instructions. Such redial instructions within a personal communicator device could include the ability to distinguish between a local dialing mode in which caller identifying data corresponds to call-back numbers within the local calling area. In this case, only the local portion of the caller id data representing the calling party's telephone number would be used to generate a dialing instruction from the personal communicator device. In other cases, the entire caller id representing the telephone number of the calling party could be used to generate a dialing signal. This is well known in the art as described in U.S. Pat. No. 4,985,918 issued to Tanaka.

Typically Caller ID data transmitted includes either 7 digit or 10 digit numeric data corresponding to the calling party's telephone. Other recent proposals related to the field of Caller Identification deal with automatic transmission of Caller identification from international callers which may consist of less than the required data to complete a return call to the original calling party but more than 7 or 10 digits.

In one embodiment, upon receipt of an interstate caller id consisting of a 10 digit numeric caller id number such as 305-555-1212, it is necessary to insert a "1" prior to converting caller id data received into a dial signal for the called party to return the call from a cellular telephone device which may be integral or connected to the personal communicator device. Such caller id data as described herein would not complete a dialing signal unless the user manually dialed the digit "1" before the remaining digits were dialed out. As a function of the improved redial circuit in this embodiment, any ten digit caller id data received and stored could automatically be preceded with a digit "1" at the personal communicator device rather than requiring manual entry by the called party prior to dialing. Additionally, in response to receipt of an international caller id numeric sequence, the international caller id data could be preceded by a country code and international calling code like "011" such as is conventionally used. In an alternative embodiment, such additional calling code data could be appended at the message center or at the paging center prior to transmission to a personal communicator device. In some cases a called party may wish to call in first to a long distance service such as 1-800-CALLATT, then enter their account code and pin, and then redial the caller id number received.

In the case where a credit call should be made as described above, the personal communicator device may not automatically insert any special calling codes to be appended to the caller id data received, but instead may use the caller id data as received for redial data after the other credit calling data is transmitted. In the case where special calling code has been appended prior to receipt at the personal communicator device, the personal communicator device could strip away or disable the calling codes such as "1" or "011" and only generate the necessary calling sequence corresponding to the telephone number of the original calling party, using the last 10 significant digits in the case of a domestic call. In any case such additional features would be very beneficial to the user of such an equipped personal communicator device with a redial feature.

Where caller identifying data received is comprised of speech signals that represent the calling parties telephone number and/or name, such data could be stored, transferred and used as a redial instruction from the personal communication device to a communication network which was well equipped to receive voice commands for a dialing instruction, such as is seen currently in the Sprint Voice Foncard service and other services, incorporated herein by reference. Selectively or in combination, the speech signals representing the name or telephone number of the calling party could be generated by the personal communicator device to communicate redial instructions to a communication system with voice recognition or with speech command capability.

MEET ME SERVICE EMBODIMENT

Such features could be useful as well in a "Meet me" service in which a calling party is placed on hold at the message center. Typically a calling party is instructed to remain on hold and may be asked to enter their telephone number by DTMF entry or entry of a special signal which constitutes a "meet" request. Then the DTMF or special signal is sent through a paging transmitter to a paging receiver. When the paged communicant receives the page, they may call back on a telephone link to the meet me center to be connected with the calling party. However it requires manual entry by the calling party of the call in number of the meet-me service and the called party cannot always remember or know who may be calling by the telephone number alone. Such information is critical for the called party to properly screen meet requests. One system incorporated herein by reference is described in U.S. Pat. No. 4,172,969 issued to Levine et al. In this system, the caller is instructed to dial his calling number. The signals are then conveyed over the telephone line to the receiver telephone answering device to be transmitted to a mobile receiver unit. Another such system is described in part by U.S. Pat. No. 5,208,849 issued to Fu, incorporated herein by reference which can be adapted to the invention herein. Another Meet me type system is described in U.S. Pat. No. 5,327,480 issued to Breeden, and U.S. Pat. No. 5,151,929 issued to Wolf incorporated herein by reference which can be adapted to the invention herein.

By incorporating the automatic transmission of calling party number and name in an alphanumeric paging network for example, the called party can more accurately determine who is calling before accepting the "meet" invitation. In the case where a voice Caller ID is supplied by the terminating central office to the meet me service at the message center, the called party can hear an annunciation of the caller's identity from a personal communicator device suitable for the replay of such information.

The called party personal communicator receives a "meet" request from the paging center which consists of at least the meet signal supplied automatically or a meet request signal initiated by the calling party. In addition to, or in place of the meet request signal, the caller id data received and stored at the message center corresponding to the calling party on hold can be transmitted to the personal communication device. The calling party could also at this time enter other additional information such as an urgent indicator or special code agreed upon between the calling party and the called party for transmission along with the caller id data and/or meet request. In any case, the calling party is instructed to remain on hold while the called party is paged for a possible meet by the paging center.

If the called party does not respond within a prescribed period of time, the calling party can then additionally be instructed to leave optional data such as a voice message that can either be retrieved later by the called party, or can be transmitted to the called party personal communicator after the caller disconnects. In another embodiment if the calling party does not wish to wait any longer for the called party to call in to the meet me center, then the called party can interrupt the meet me service by for example depressing the # sign.

At this point the message center at the meet me service can instruct the caller to enter optional data such as a voice message for storage and/or transmission to the called party. After the calling party disconnects from the message center at the meet me service, the message center can send an additional signal in a second transmission to the personal communication device through a paging center or integral paging transmitter. This signal can indicate that the calling party hung up and that a "meet" with the calling party at the message center is not possible. This transmission can also include any optional voice or other data left by the calling party.

Such data that is to be transmitted can be incorporated with the previously stored caller id data at the message center for transmission to the personal communicator device. Alternatively the optional data such as a voice message can be transmitted to the called party personal communicator device and appended to, or associated with received caller id data from the calling party.

In the above described or similar systems, the detected caller id information can be transmitted automatically to the personal communicator device in a more efficient manner that will provide more information to the called party and relieve the calling party of inconvenience.

Of course caller id blocking options cold be employed as previously described in this application. Other variants of these "meet me" services could also easily employ a caller id detector to transmit the caller identifying data automatically. For sake of brevity, these various systems are not described in detail although it is believed that those skilled in the art can adapt the methods described herein.

AUTO DIALING PERSONAL COMMUNICATOR EMBODIMENT

The paging receiver device could also be a dedicated paging receiver with a DTMF signal generator such as seen in U.S. Pat. No. 4,490,579 issued to Godoshian, U.S. Pat. No. 5,099,507 issued to Mukai et al. U.S. Pat. No. 5,280,516 issued to Jang or U.S. Pat. No. 5,212,721 issued to DeLuca et al., incorporated herein by reference. Received caller id data received could be used to generate a dialing signal in an acoustically coupleabale dialer device, or via an external telephone line connector within the called party personal communicator. The received caller identifying data could be digital data representative of numeric information. corresponding to the call-back number of the calling party. Such received digital data could be applied to a DTMF generator to output a dialing signal.

Alternatively, the received caller identifying data could be audible DTMF signals that were recorded as audible signals at the message center after manual entry by a calling party. In another embodiment, textual caller id data could be converted to audible DTMF signals at the message center to be transferred to a voice-paging center as audible signal. Upon receipt at the paging center, the audible signals could be transmitted to a personal communication device along with any optional data. The audible DTMF sounds and optional data could be stored and replayed through a speaker.

Alternatively the DTMF sounds could be converted to a dial signal for a cellular telephone device or via a telephone line connector. The received audible DTMF signals could be applied to a DTMF decoder and character generator within the personal communicator device to display the audible DTMF sounds received. This method could be particularly useful in that the personal communication device would not require a DTMF generator to create a dialing signal. In addition, audible DTMF sounds could be prestored into a personal communication device or dialing apparatus by means of a computer download interface that releasably electrically or acoustically coupled to a dialing apparatus or personal communicator with a memory, controller and data input receiver.

These audible DTMF sounds could then be used as described previously to generate an audible dial signal for acoustical coupling, or converted to an electrical signal for other dialing.

In a different embodiment, the received and stored DTMF sounds could be applied to a DTMF decoder and character generator and optional text to speech unit to display or annunciate the data received. The personal communicator or dialing apparatus could interpret the stored audible DTMF signals within the personal communicator or dialing device and generate a display or voice annunciation of the telephone number information. This could be accomplished by a standard DTMF decoder circuit and character generator such as described in U.S. Pat. No. 4,882,750 issued to Henderson et al. incorporated herein by reference and a text to speech unit well known to those skilled in the art.

This improvement could be useful in autodialer devices such as described in this patent. For example, a circuit commonly used to store voice signals such as the Radio Shack, part number 276-1324 or Radio Shack part number 276-1325 could be used to store and replay the received DTMF signals through a transducer in a conventional autodialer. The audible DTMF signal could be received by a sound input which was connected to the circuit during a programming mode. During a replay mode, the DTMF signals previously programmed could be replayed through a transducer attached to the autodialer, or the DTMF signals could be transferred to a transmitting means that could generate the DTMF signal to a communication link such as in a cellular or landline communication system.

COMBINED PAGER/RADIOTELEPHONE EMBODIMENT

The paging receiver device could alternatively be contained within a cellular telephone device as in U.S. Pat. No. 5,117,449 issued to Metroka et al. or in U.S. Pat. No. 5,148,473 issued to Freeland et al. in which a paging and cellular radio telephone function are combined in a single device. These patents are also incorporated herein by reference.

When the paged party receives a page, the caller id data can be stored for later use and an alert tone, a vibration, a visual indication or a voice message can alert the called party who may be engaged in a telephone conversation on the cellular telephone. When the paged party wishes to return the call from the calling party after hanging up, the stored caller id data can be selected and recalled for dialing at the touch of a button.

Of particular utility, alphanumeric caller id data received can textually identify a calling party to aid in selection of a desired callback number and the included numeric caller id information can be utilized to generate a dialing signal. In a number only caller id transmission the number only will be supplied to the combined pager/radiotelephone. In this case, the received numeric information can be transferred to a comparing means and compared against a prestored directory in the device. In this manner, the paged party can more easily identify the caller and return the call more efficiently. U.S. Pat. No. 4,924,496 issued to Figa describes one such method in greater detail and has already been incorporated herein by reference.

PCMCIA PAGING RECEIVER EMBODIMENT

Another alternative embodiment using the claimed invention can be seen in U.S. Pat. No. 5,043,721 issued to May that discloses a paging accessory using a PCMCIA interface which is connected to a personal computer or integrated in a computing device. This patent is incorporated herein by reference.

STORED-VOICE PAGING RECEIVER AND SYSTEM EMBODIMENT

Caller identifying data received may include textual data representative of caller id data automatically supplied from the PSTN as described previously, or may include some other textual data such as received from a DTMF entry by the caller at a message center or paging center, an E-Mail message or document received with an embedded or compressed voice message, or other data. For example, textual data representing the identify of the sending party could be represented by an E-mail address. The message could be transmitted to a selective call receiver along with a voice message that was sent by a calling party's personal computer equipped with a sound board with appropriate software. In addition, the caller identifying information could be a particular iconographic representation of the calling party such as described in the Magic Cap software environment using so called Telescript technology available from General Magic and incorporated herein by reference, or a still video image of the calling party transmitted with the voice message by the calling party premises equipment.

For example, visually displayable images transmitted after the message center device has gone offhook in response to a ringing signal could be received and stored with an associated voice message. One such implementation particularly adapted to simultaneous voice and visual data transmission that is currently being implemented is known as VoiceView, incorporated herein by reference, and manufactured and licensed by Radish Communications Systems, Inc. out of Boulder, Colo. VoiceView lets calling parties transmit visual images along with voice data in a standard POTS environment, which in the preferred embodiment could be captured and stored in a memory at the message center for later transmission to a paging receiver or personal communication device. Alternatively, in an ISDN environment, simultaneous transmission of voice and image data could occur in a similar fashion such that message or caller identifying visual data could be stored along with a voice message for later transmission to a communication device.

This information could be displayed on a display member upon receipt of the message at the stored voice communication device in advance of annunciating, or simultaneous with, annunciation of the voice message.

Alternatively, the caller identifying information could be used to generate an audible alert such as prestored sound data contained within the communication device and applied to a comparing means that corresponds to choices made by the called party. Or received caller identifying data could be applied to a text-to-speech generator contained within the paging receiver and annunciated to the caller party. U.S. Pat. No. 4,975,963 issued to Davis et al. is incorporated herein by reference.

Alternatively, the caller identifying data received at a paging center or message center could be applied to a data generator which would compare the caller identifying data received and generate predetermined character strings for transmission to a communication device such as described in U.S. Pat. No. 4,962,377 issued to Wallace et al. and incorporated herein by reference.

Alternatively, the received textual data could be converted to a text to speech converter at the paging center prior to transmission to the stored voice communication device.

Upon receipt of a message at the communication device, only the caller identifying data may be displayed or annunciated prior to annunciation of the voice message after selection by the called party. In addition, such voice messages received from certain parties could be marked as of a confidential nature by the calling party so that a password could be required by the called party to hear the message.

In another preferred embodiment, the personal message center could comprise a voice mail center, a personal computer or a conventional telephone answering machine as previously described and well known in the art. In such systems, the receiver caller id data could be used with a comparing means at the voice mail center, personal computer or conventional telephone answering machine to selectively transmit associated voice message data without the caller identifying data. Such a feature is a substantial improvement over existing paging systems. This is a departure over the prior art in that prior art voice message systems do not transmit voice data to conventional stored voice paging receivers. One of the main advantages of such an approach is that the cost of the stored-voice paging receiver is reduced because there is no display required in the voice paging receiver.

Alternatively, the called party could preselect which calling party could require a password upon receipt and prior to playback. Callers from a particular calling group could be assigned with an automatic annunciation attribute in which any received calls from this group would automatically be broadcast, no matter when the message was received. See. U.S. Pat. No. 5,073,767 issued to Holmes et al. and U.S. Pat. No. 5,146,217 issued to Holmes et al. that are incorporated herein by reference.

In one embodiment the stored voice communication device may receive all voice messages and based upon the caller identifying data or password data also received, may selectively broadcast through a speaker or playback only through a sound output accessory such as an earphone, based upon the desired mode of annunciation predetermined by the called party with annunciation mode instructions. Such instructions could be as data associated with prestored caller identifying data and the voice message, or by an annunciation mode switch that was connectable to a comparing means.

If for example, a message received was determined to be of a private nature not available for broadcast, the message could not be heard unless an earphone was first attached to the communication device and the message was selected for playback. Alternatively, the communication device could sense that the earphone was attached and automatically playback the message through the earphone without any further selection. See. U.S. Pat. No. 5,075,684 issued to DeLuca and incorporated herein by reference.

In addition, it may be useful for messages received and stored in the personal communication device to be transferred for archival at a personal computer. Such a personal communicator could be fitted with a serial, parallel, infrared or other communication link and appropriate data transfer capability so that received messages could be transferred to another device for speech to text transcription, archival voice message storage or other functions.

The stored voice communication device includes a means for receiving transmitted voice messages, receiver identifying control information, and source identifier information such as caller id, ANI, synthesized caller id, DTMF, image, or the like. Further the device may include a first audio output such as an integrated speaker, an optional second audio output such as an earphone jack, a third optional text to speech output and a codec to convert data received into audible voice data. Further the device may include a selection and storage medium for pre-storing called party annunciation selections, and a comparing means to match caller-identifying data received with the prestored called party annunciation preferences.

A first switch allows a received voice messages to be delivered using the first audio output by default, unless otherwise directed by prestored called party preferences.

A second switch allows received voice messages to be delivered using the second output by default, unless otherwise directed by prestored called party preferences.

A third switch allows caller identifying data received to be delivered to a text to speech converter, although it is recognized that such data could also be applied to such a converter automatically by default rather than based on the switching means. U.S. Pat. No. 4,742,516 issued to Yamaguchi shows one method of text to speech translation and is incorporated herein by reference. Another U.S. Pat. No. 4,716,583 issued to Groner shows another method of text to speech translation and is also incorporated herein by reference.

The stored voice paging receiver also includes a selection and storage medium to allow a user to predetermine which corresponding source identifiers will utilize the first audio output, the second audio output or the third text to speech converter. In addition, based upon the caller identifying data received, the communication device could determine which order voice messages would be stored and accessed in a message storage medium. For example, all the messages marked urgent could be accessable first, or the messages could be retrievable based upon the time sent, or based on the identity of the caller. All callers that were determined to be family members may be prioritized differently than callers that were business contacts.

A password means in the communication device allows for preselection of a password by the called communicant and entry of a password prior to annunciation of messages determined to be from a calling party that may be of a private nature.

A comparator in the stored voice communication device compares the received and/or stored voice message source identifier with predetermined user preferences and stores and delivers the received messages based on the predetermined user preferences.

Further as previously described, the stored voice personal communicator could also include a dial function in which the speaker or transducer used to annunciate voice messages could also be used to acoustically couple the communicator and to generate a dial signal as has been described hereinbefore. Audible DTMF signals received at the stored-voice paging receiver, or digital numeric data converted to DTMF at the communicator could generate a dialing signal.

In FIG. 1*b* is shown an improved stored-voice paging receiver with a display for caller-identifying textual or image data and a text-to-speech unit for converting textual data received into audible voice signals. Also the device may include a coincidence detector to compare caller identifying data received with prestored data records.

In the functional block diagram in FIGS. 1*a*, 1*b* and 1*c* the paging receiver 1010 of the preferred embodiments include a receiver 1012, a decoder controller 1014, a memory 1050, an audio amplifier 1040, a sound output 1037, an input switch module 1042, an energy conservation means 1020, and a converting means 1038. An antenna 1024 receives paging information in the form of selective call signals, information comprised of speech signals representative of a voice message and information comprised of caller identification data for display or annunciation before, during or after annunciation of the voice message. The antenna 1024 is coupled to receiver 1012 that is subject to the control of decoder 1014. The decoder 1014 not only controls receiver 1012, but may also operate receiver 1012 on an intermittent basis to extend the life of battery 1016 through energy conservation means 1020. The receiver 1012 detects the presence of electromagnetic energy representing the paging information and applies the information to the converting such as coder-decoder 1038. Operating under control from decoder 1014 (line 1045), the coder-decoder 1038 converts the received signals, such as an audio speech signal to a stream of binary bits and reconverts the stored binary bits to a replica of the original received analog signal, such as synthesized audio speech signals. A microcomputer 1026 functions as the decoder 1014 and is comprised of a microprocessor 1028 and a read only memory (ROM) 1030. ROM 1030 includes the necessary instructions to operate microprocessor 1028 to perform the functions as described below. The microcomputer 1026 uses microprocessor 1028 as a software decoder for processing the received signal in real time according to predetermined software routines. Such routines could provide for detection of specific demarcation codes that distinguish audio or textual caller identification data from audio voice messages for storage, annunciation and replay.

After the paging receiver is selectively identified, microprocessor 1028 accesses ROM 1030 for determining the correct instructions contained in that memory for processing the received signals, converting the analog voice signals to digital form, storing the digital form of the voice signal, storing the caller identification data, displaying the caller identification data on the display 1077 and other functions. For example, text to speech synthesis means 1075 can convert bit representations of textual caller identification data received with voice data into synthesized voice signals to be annunciated through audio amplifier 1040 and sound output 1037 under the direction of microprocessor 1026 and input switch module 1042. For example, upon hearing a default alert signal from sound output 1037 indicating receipt of a message, the subscriber could press "PLAY" 1056 and the synthesized voice annunciation of caller identification information would be retrieved from the memory and annunciation, such as "John Smith—555-1212 called". Then upon a second depression of the "PLAY" button, the stored voice message may be retrieved from the memory 1050 and replayed for the subscriber. In another embodiment, caller identification data received could be displayed on a display 1077 when a message was received, or in response to scrolling through a list of messages previously received and selected using key input selector 1061, touch-screen input from display 1077 or other keyboard selections and software as is known in the art.

Upon selection of a particular caller identifying record, the microcomputer 1026 could retrieve the corresponding voice message from the memory 1050 for annunciation. Additionally under the direction of the microcomputer 1026, a coincidence detector 1097 could be employed to compare caller identifying data with prestored data records in memory 1050. Upon determining a matching record, microcomputer 1026 could cause caller identifying data and/or any associated record or annunciation alert to be automatically displayed on display 1077 or annunciated using sound output 1037. Additionally, key input module 1042 could include a synthesize mode key 1078 in which textual data entered by keyboard 1053, stored on memory 1050 or received from receiver 1012 could be selectively converted from text-to-speech for annunciation.

In the illustrated embodiment, the coder-decoder 1038 (hereinafter referred to as CODEC) provides for the digital-to-analog and analog-to-digital conversion of speech signals. The CODEC 1038, such as an adaptive delta modulator, converts or encodes an audio input signal (line 44) to a digital data stream (line 1046) for storage in memory 1050, and reconverts or decodes a digital data stream (line 1048) to reconstruct an audio signal (line 1021). Under control of decoder 1014, the CODEC's digital output is stored in memory 1050 and retrieved on line 1048 to reconstruct a synthesized audio signal on line 1021, thus closely replicating the real time audio signal in both amplitude and frequency. One example of such a coder-decoder is disclosed by N. S. Jayant in the publication "Adaptive Delta Modulation with a One-Bit Memory", Bell System Technical Journal, Vol. 49, No. 2, March 1970. To conserve power, most of the CODEC 1038 is turned off when there are no read/write operations to the memory. The receiver 1012 is further coupled by line 1023 to an audio amplifier 1040. Operating in response to decoder 1014, the real time audio signal on line 1023 is applied to audio amplifier 1040 that supplies the analog signals to sound output 1037. In particular, decoder 1014 controls audio amplifier 1040 via line 1062 to apply either the real time audio signal on line 1023 or the synthesized audio signal on line 1021 to sound output 1037.

Decoder 1014 is coupled to memory 1050 that serves to include information for decoding the received information and for storing information received from CODEC 1038. The CODEC 1038 provides the analog-to-digital conversion in memory 1050 as digital voice messages. In this embodiment each digital voice message is stored in conjunction with associated caller identifying data. As previously described, such data could be textual, synthesized audio or graphical data. This associated caller identifying data can be used to selectively access voice message records before selecting a particular voice record for replay. A plurality of digital voice messages can be stored in memory 1050. The decoder 1014 functions to alert the paging user, and to store, recall, and playback voice messages, as well as to store, recall, and playback caller identification data.

The paging receiver of FIGS. 1b and 1c has a capacity of storing voice messages and providing them to audio amplifier 1040 according to the state of a plurality of inputs, such as the state of the control switches of input module 1042, the state of annunciation instructions ascertained by coincidence detector 1097 and prestored data records contained in memory 1050, and particular encoded annunciation instructions received by receiver 1012 that comprise part of the message data.

A switch interface 1018 provides input capability for control switches 1054-1078 and keyboard 1053. Display 1077 also may employ a switch interface to allow for touch screen selection for data input, menu selection and the like. Illustratively, control switch 1054 is an on/off switch for controlling power from battery 1016. Control switch 1056 is a play switch for playing back voice messages previously digitized and stored in memory 1050. Control switch 1058 is a reset switch to reset the paging receiver system and to monitor any real time audio signals currently being received. Control switch 1060 is a mode switch for operating the decoder in one of three modes. These modes are the silent, push to listen (PTL) and normal modes.

The battery 1016 is shown connected to decoder 1014 through switch interface 1018. Battery 1016 provides power to decoder 1014 through an energy conservation means 1020, such as a DC to DC converter. Decoder 1014 is additionally connected to a code memory 1022 that stores predetermined address information to which the paging receiver is responsive. Code memory 1022 can also store such information as the sampling rate for digitizing the received audio messages. Output 1062 from decoder 1014 controls whether real time audio signals on line 1023 from receiver 1012 or synthesized audio signals on line 1021 from CODEC 1038 are applied to audio speaker 1037. Communication between receiver 1012 and a decoder 1014 is achieved via line 1047. Selective call signals for the decoder 1014 are received by receiver 1012 and passed to decoder 1014 through line 1047.

The operation of the paging receiver shown in FIG. 1*b* is such that the receiver 1012 is capable of receiving messages in any of several message formats through antenna 1024. The decoder 1014 responds to the received signals to analyze the data and select one of several decoding schemes, for appropriately decoding the incoming information received by receiver 1012. As is well known with paging devices, the resulting decoded signal is tested for comparison with a designated pager address contained in code memory 1022. On detecting correspondence between the received and decoded signal and the address in code memory 1022, the decoder 1014 instructs the CODEC 1038 to digitize the real time analog voice signals that follows for storage in one memory 1050. The preferred embodiments described herein are not specifically limited to analog systems but could also be adapted to a digital stored voice paging system in which voice or image data was transmitted in a compressed or uncompressed format. An alert output signal may be produced by the decoder 1014 to generate an alert indication to the pager user that a message has been received and stored. In particular, the alert output signal from the decoder 1014 is supplied to audio amplifier 1040 to produce an audible signal from the sound output 1037 indicative of receipt of a message. Alternatively the decoder 1014 can supply alert signals or data to audio amplifier 1040 and sound output 1037 and/or display 1077 in response to alert output instructions contained in prestored data records in the memory 1050 used in conjunction with coincidence detector 1097, or in response to alert instructions or caller identifying data received as part of the message from receiver 1012 via line 1047.

If the user responds to the message alert, the user has the ability to hear the message in real time, depending upon the position of mode switch 1060, or has the ability to hear only the associated caller identifying data until the play key 1056 is depressed again. In another alternative embodiment, calls received which are determined to be confidential by the coincidence detector 1097 and memory comparing against the received caller identifying data can be inhibited from playback until such time as a personal identification code is entered by the user using the keyboard 1053 or display 1077 for example. In another embodiment, the message received could include a code with the message data that creates a confidential condition such that a personal identification code must be entered before the particular message can be annunciated. Alternatively, the user could require all messages received to require entry of a personal identification code. Such security features are particularly useful in case the user wishes to prevent other persons in the immediate vicinity from inadvertently hearing confidential messages or in the case where the paging receiver is lost.

If the mode switch is in the normal mode, upon receipt of a voice message, the user hears an alert followed by the voice message. Simultaneously, the message is stored into a storage area in the memory 1050, depending upon the bit rate of the CODEC 1038.

Referring to FIG. 1*c*, another embodiment illustrates a sound input 1081 which may have an integrated microphone 1082 or a releasably connectable sound input 1083. This allows sound data such as spoken voice or personal computer files such as .WAV files to be uploaded to the paging receiver device 1010 for storage in the memory 1050 for alert annunciation. Such custom annunciations could be generated in response to particular caller identifying data received as determined by the coincidence detector 1097 and prestored data records in memory 1050, or could be stored in code memory for default alert annunciation signals upon receipt of a message or a particular condition within the paging receiver 1010 controlled by microcomputer 1026. Input switch module 1042 includes a "RECORD" function key 1079 which can be used to start recording or uploading of any sound through the sound input 1081 when the paging receiver 1010 is in a sound recording/uploading mode.

In addition, FIG. 1*c* includes a DTMF tone decoder 1080 which can decode DTMF audio signals received as part of the message data from receiver 1012. The audio signals received can be supplied to the decoder 1080 and corresponding numeric textual data can be displayed on the display 1077 or supplied to a coincidence detector 1097 for comparison against prestored data in memory 1050. Corresponding matching data records can then be annunciated and/or displayed prior to annunciation of the voice message.

In FIG. 1*d* is shown an autodialing type paging receiver in which DTMF data received can be applied to a DTMF tone decoder and text to speech generator in a similar manner as described hereinbefore. The embodiments, herein are especially useful in that a display member is not necessary for the user to determine the identity of the calling party as the telephone number may be annunciated. Such a device may be used in a stored voice paging system, in which DTMF entries are manually entered in conjunction with a voice message for transmission to an autodialing type paging receiver. The DTMF tones can be annunciated as voice representations of DTMF digits received. For example, if the DTMF tone detector receives the dual tone frequencies of 1209 Hz and 697 Hz then the text to speech generator will receive instructions from the tone decoder and the synthesized voice annunciation "ONE" will be heard. Different corresponding synthetic voice messages can be stored in ROM in the text to speech generator for each of the various DTMF tone combinations and generated in response to a depression of the "SPEAK" button or automatically generated in response to receipt of a message when decoded by the DTMF tone decoder. The DTMF signals received may be stored in a memory as DTMF audio signals for playback through a sound signal generator and speaker or may be converted to digital representations of the DTMF signals for application to a DTMF generator (not shown) for later redial.

In one preferred embodiment, textual caller identifying data such as name and telephone number information is received by the receiver along with any associated voice message in a stored voice paging receiver. The microprocessor can apply the received caller id data to a text to speech unit and display for annunciation and display. Each subsequent message received can be stored in a memory contained in a detachable memory as described in FIG. 5*a*. The detachable memory may be a PCMCIA memory card that may allow transfer for voice messages received from a voice mail center for subsequent archiving in a personal computer or the like.

The stored-voice paging receiver can also have a detachable keyboard or other input to allow for entry of memory records that can be used by a coincidence detector within the pager, as in a copending application. Upon receipt of caller identifying data, the coincidence detector can compare the caller identifying data against prestored memory records to annunciate or display associated caller identifying data prior to annunciation of the voice message received.

Figure 3A:
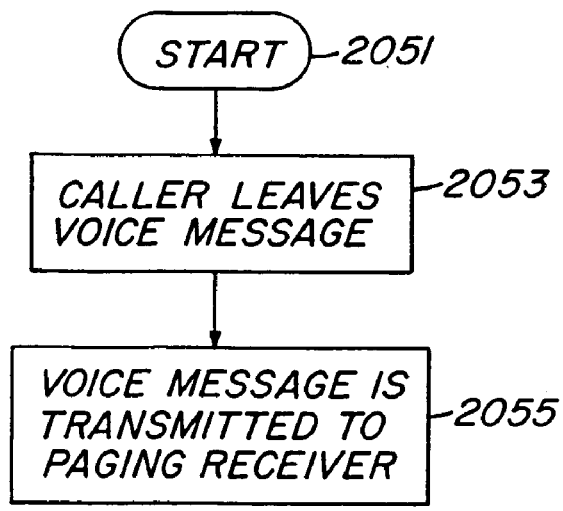
FIG. 3a shows the prior art method of transmitting a voice message to a stored voice paging receiver.
Figure 3B:
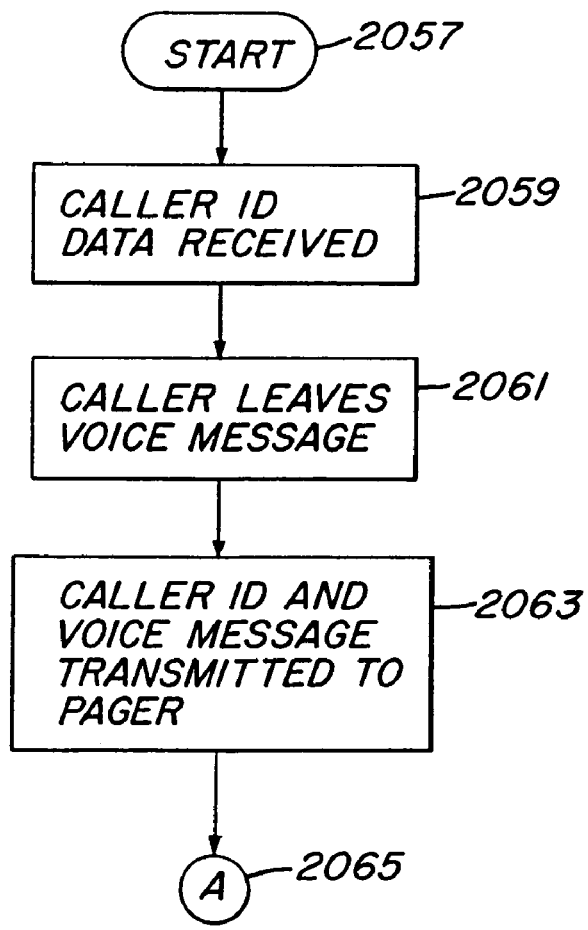
FIG. 3b shows an improved method of transmitting a voice message to a stored voice paging receiver along with caller identifying data according to one embodiment of the invention.

In FIG. 3a is shown the prior art method of receiving and transmitting a voice message to a stored-voice paging receiver. In FIG. 3b is shown an improvement over the prior art method in which caller-identifying data is received, stored and associated with a voice message for transmittal to a stored-voice paging receiver.

In FIGS. 4a through 4e are shown various alternative embodiments in which caller id data can be utilized within a stored voice paging receiver.

Figure 4A:
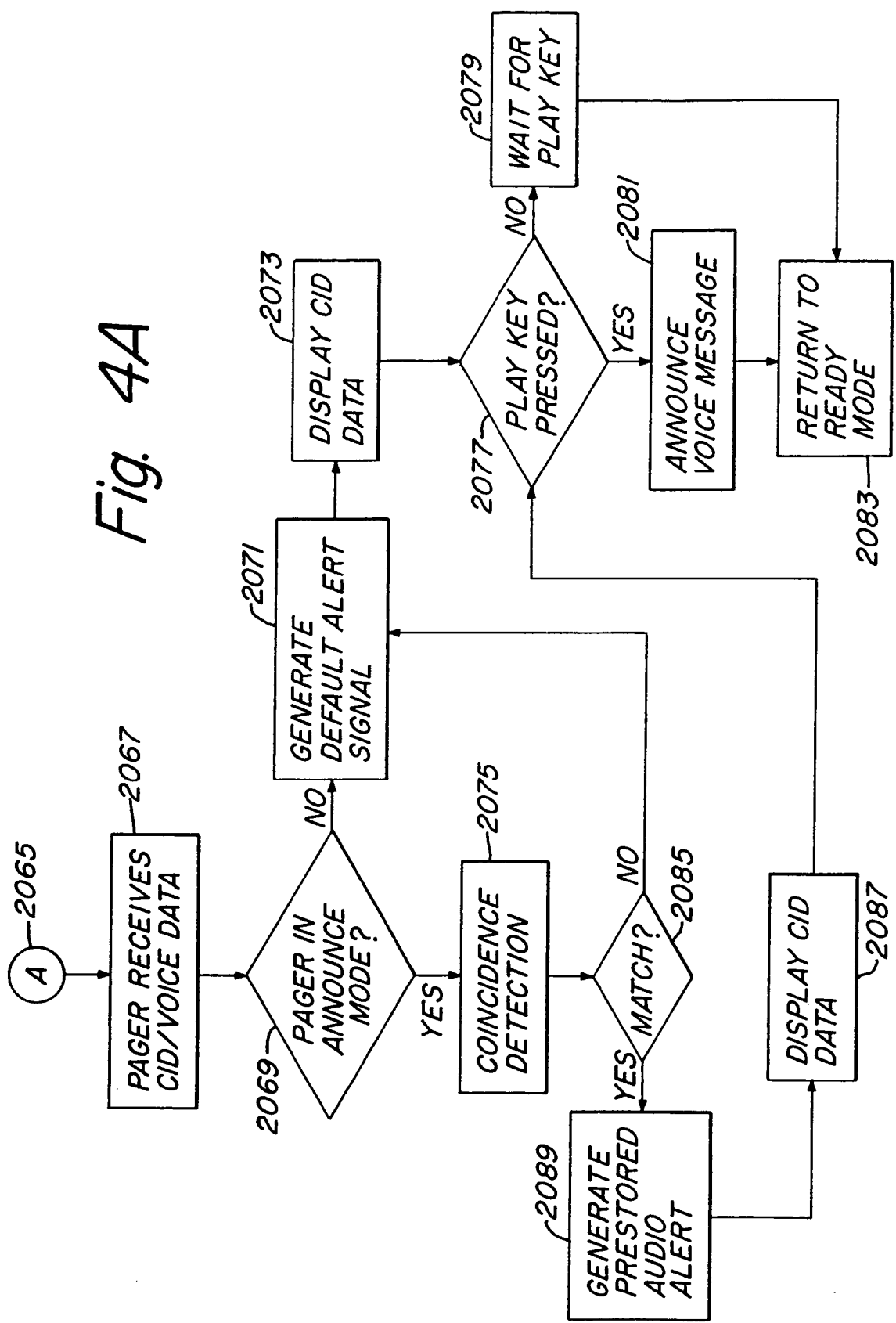
FIG. 4a is a flowchart of one embodiment of the invention in which caller id data is applied to a coincidence detector and display within a stored voice paging receiver to generate a prestored audio alert signal.

For example, in FIG. 4a when a stored voice paging receiver receives a message, a coincidence detector can generate a prestored audio alert. First, the called party enters textual data and a corresponding audio announcement into the pager in advance. In this case, the number 555-1212 could be entered by a data entry into the pager, and a voice entry such as "home office" could be spoken into a sound input accessory, for storage in the pager memory. If the caller id data such as 555-1212 were received, a coincidence detector would determine a match with the previously entered number and the previously entered audio alert "home office" would be heard by the called party. Upon depression of a play key, the voice message could be heard. In the case where a match with the previously entered number was not determined, "unknown caller", could be heard. The caller id data could be displayed and upon depression of a play button, the voice message could then be heard.

Figure 4B:
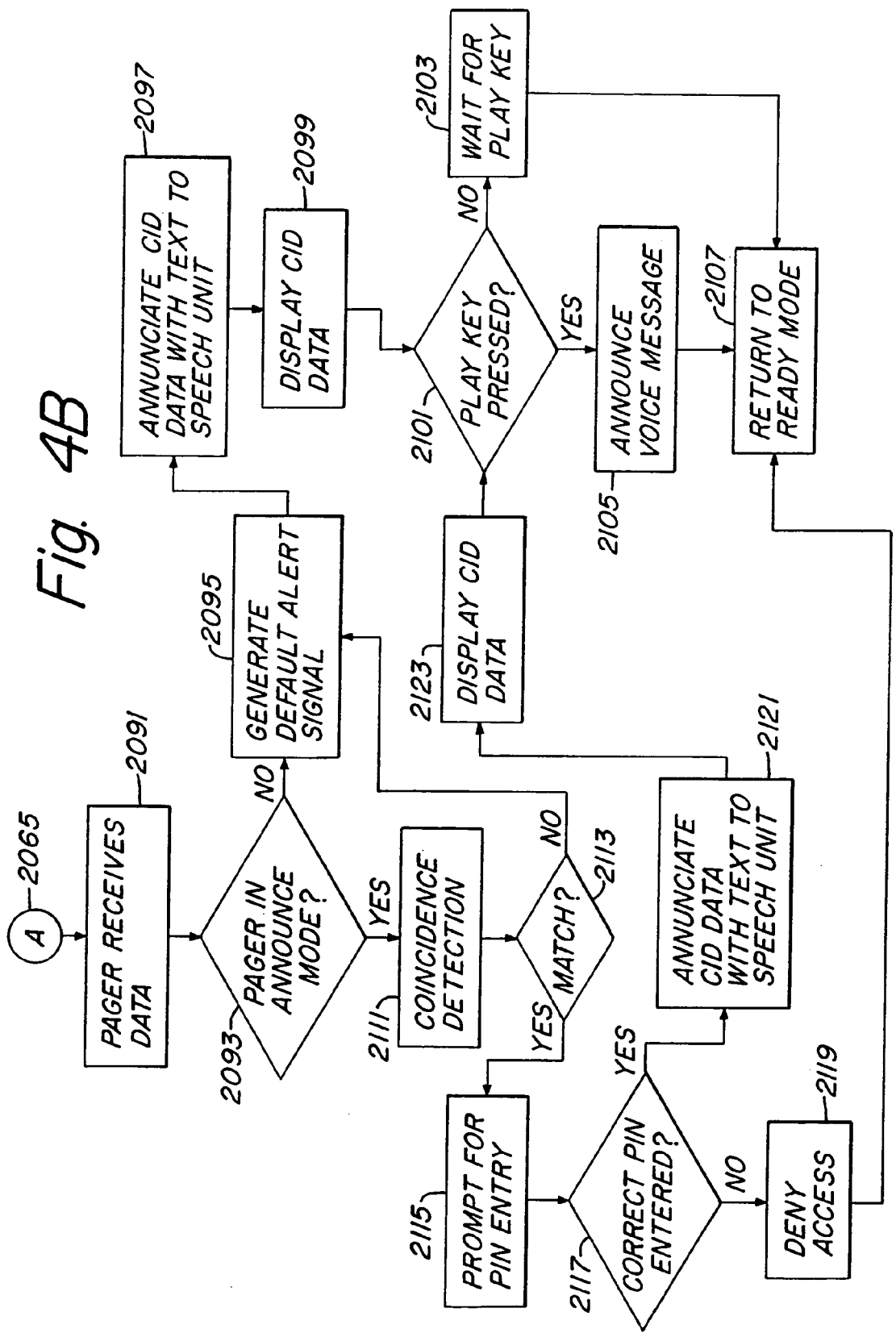
FIG. 4b is a flowchart of one embodiment of the invention in which caller id and additional data entered by the caller using DTMF entry is sent with a voice message to a stored voice paging receiver with a text to speech alerting means and/or display.

In FIG. 4b is shown another alternative embodiment in which a voice pager allows a called party to associate certain pin numbers with calling parties. For example, some callers may typically be of a personal or confidential nature. The playback of messages from these callers may require entry of a PIN code prior to annunciation of any message. In this case, a coincidence detector could be employed which analyzes caller id data received and compares against a pre-stored caller list. When a match is determined, particular caller messages would not be heard until the proper PIN code was entered by the calling party. When the correct code was entered, the caller id data could be annunciated or displayed until such time as the play key was depressed. Of course, the caller id data could be inhibited from display or annunciation until such time as the proper pin code was entered by the called party. In this case then, a default alert signal could be generated in response to receipt of a message that did not indicate the identity of the calling party until the pin code was entered properly. Alternatively, the prompt for the pin code entry could be generated by the pager after the receipt, display and annunciation of caller id data but prior to annunciation of the voice message from the calling party.

Figure 4C:
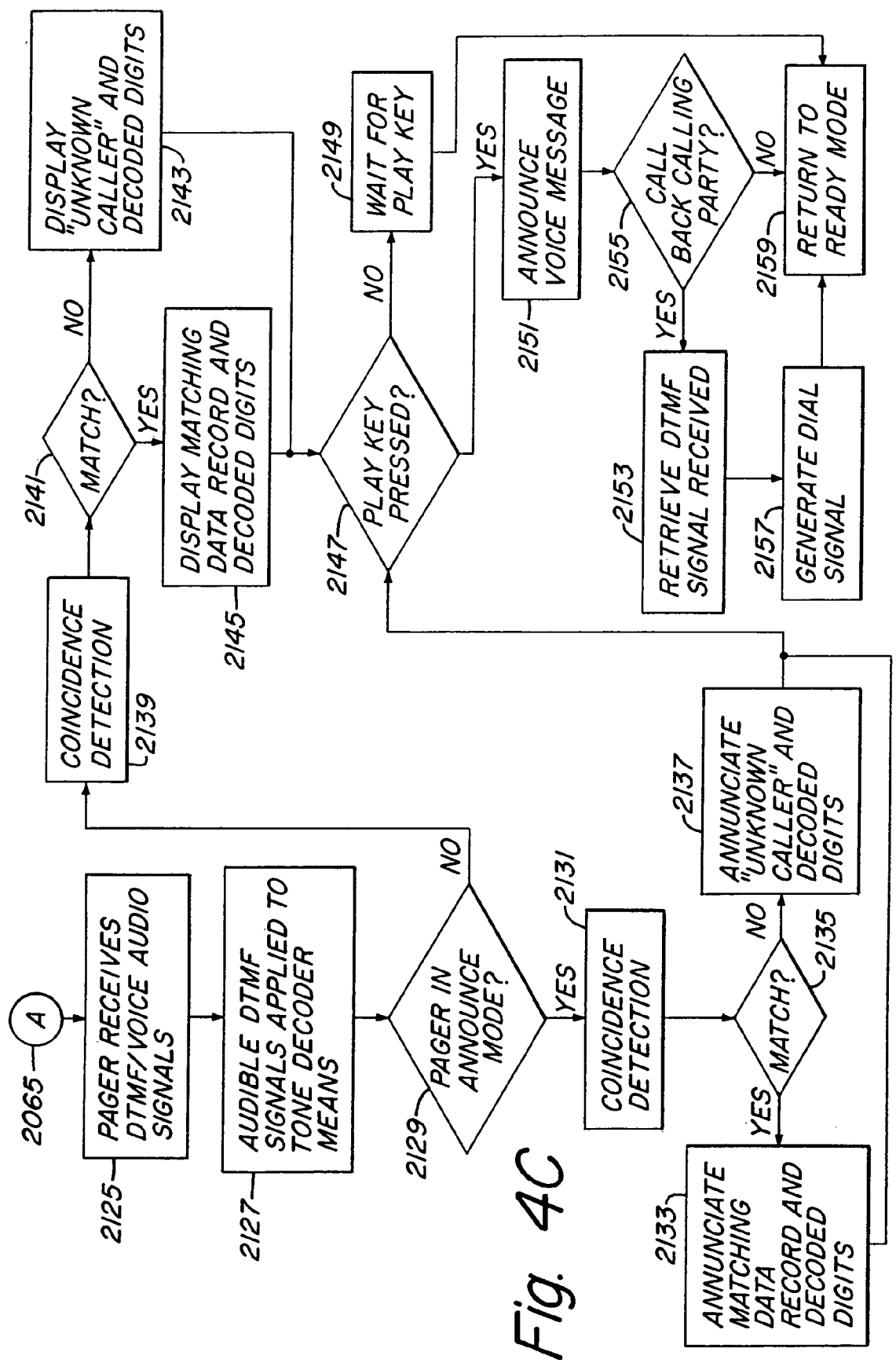
FIG. 4c is a flowchart of one embodiment of the invention in which canned display alerts can be generated and improved dial signal generation can be employed in an improved stored voice pager.

In FIG. 4c is shown another alternative embodiment in which a voice pager receives DTMF audio signals along with a voice message. The voice pager could distinguish DTMF signals from the voice message data by use of a DTMF tone decoder within the pager. The DTMF tone decoder could generate a corresponding textual or synthesized voice alert corresponding to the caller id of the calling party. In addition, the decoded DTMF signals could be employed with a coincidence detector or display or annunciate previously stored matching data records as previously described in FIG. 4a. Further, the received audio DTMF signals received could be used in place of a more conventional DTMF generator to generate a corresponding dialing signal for call back to the calling party.

Figure 4D:
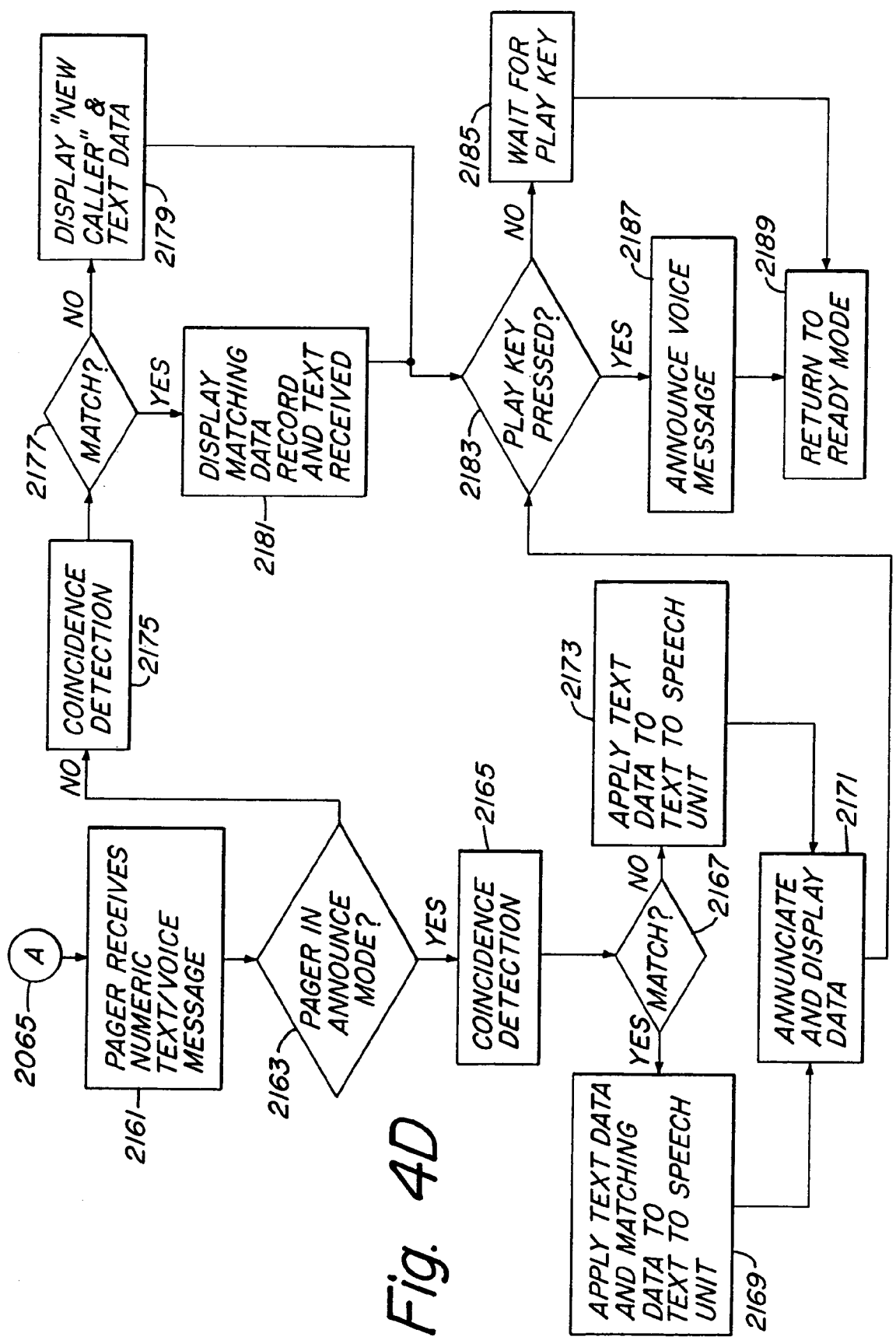
FIG. 4d is a flowchart of another embodiment of the invention.

In FIG. 4d is shown another alternative embodiment in which a voice pager can utilize a text-to-speech unit within the pager to annunciate textual caller identifying data received.

Figure 4E:
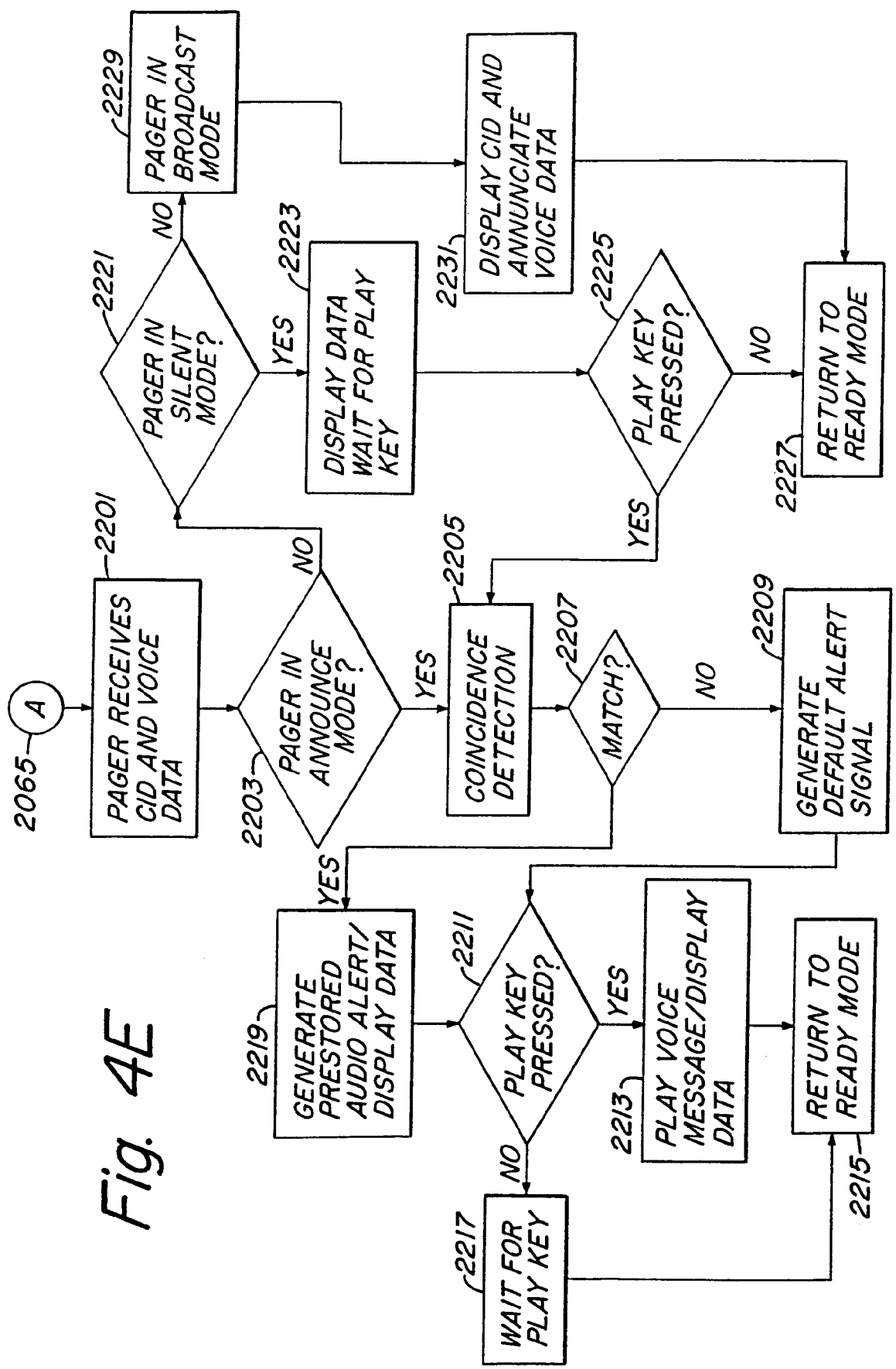
FIG. 4e is a flowchart of one embodiment of the invention in which a stored voice paging receiver can have various modes for operation.

In FIG. 4e is shown another alternative embodiment in which a stored voice pager can operate in one of three different modes: Announce mode in which a coincidence detector is employed against all caller id data received automatically upon receipt; silent mode in which a coincidence detector is employed against all caller id data received only upon depression of a play key; and a broadcast mode in which caller id data is displayed and/or annunciated and the voice data is annunciated automatically, without use of any coincidence detector. For example upon receipt of a message when in the announce mode, a coincidence detector could be employed before an alert signal was generated. Upon detection or non-detection of a matching record, the appropriate alert signal would be generated and the unit would play the associated voice message upon depression of the play key. Upon receipt of a message when in silent mode, the caller id data could be displayed but not annunciated. When the called party scrolled through the message received by viewing the display of various caller id data associated with voice messages, he could then press a play key and the coincidence detector could generate an appropriate alert signal. If the play key was depressed again, the voice message could be heard by the called party. Alternatively, a single depression of the play key could cause the annunciation of the caller id data and subsequent annunciation of the voice message. If the pager were in broadcast mode, the caller id data could be displayed and the voice message received would be broadcast to be heard by the called party.

Figure 5A:
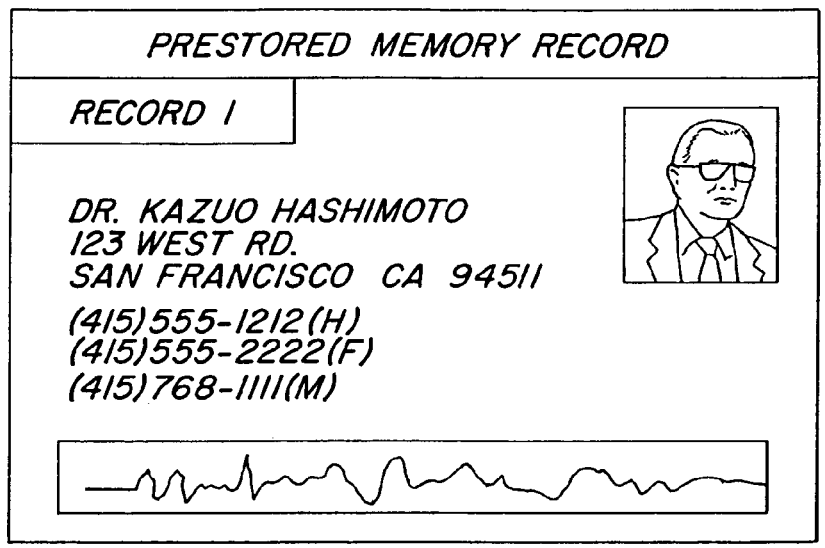
FIG. 5a shows a sample data record that can be prestored and contained within a personal communication device.

In FIG. 5a, caller identifying data such as name and number data, particular voice or sound data for message alerting, pin code data, iconographic data such as logos or meaningful graphic images, photo images of a calling party or other data is stored in a memory that is integral to or detachable from the paging receiver. This data could be transferred from a PCMCIA memory card attached to the pager, or an integrated memory within the pager that received data from an input such as an infrared, serial or parallel connection with another device, or a data input means integrated in the pager such as a touch screen, sound input accessory, keyboard, or some other means.

Figure 5B:
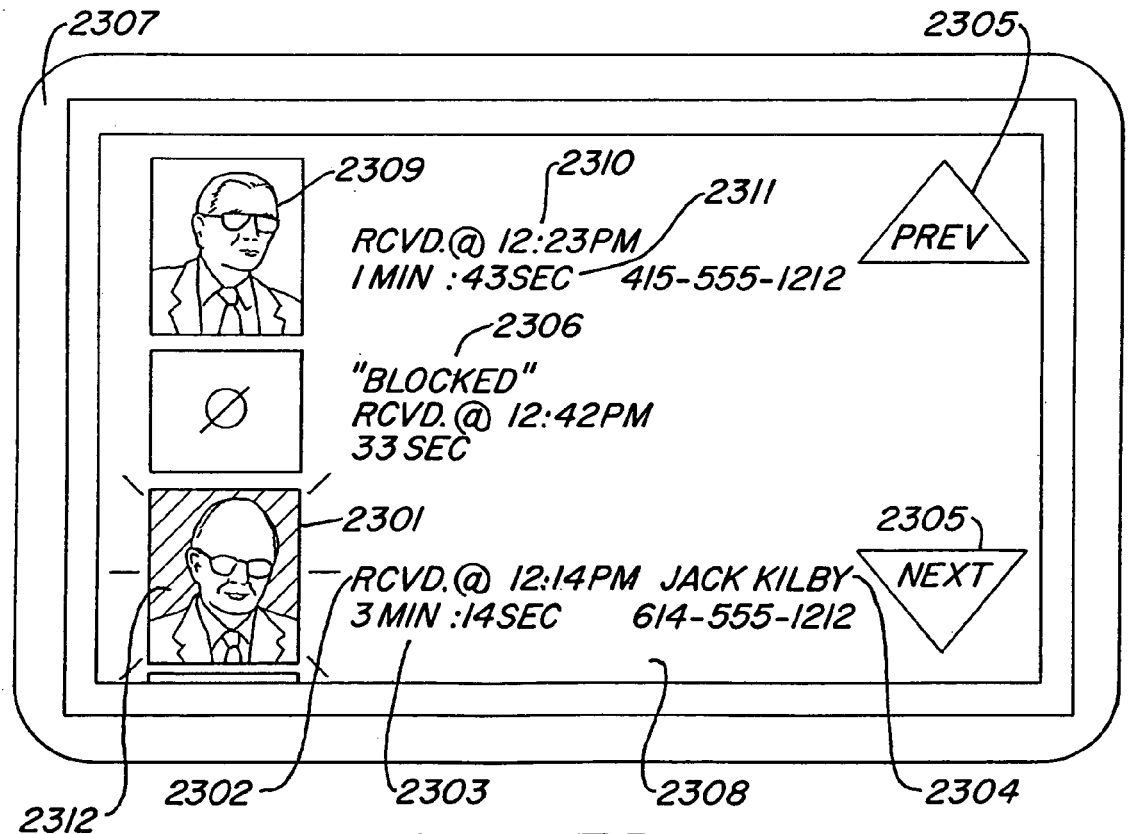
FIG. 5b shows a sample display of message notifications received at a personal communication device.

In FIG. 5b is shown one embodiment of a display member (2308) within a stored voice paging receiver (2307) in which caller identifying information can be scrolled through prior to selecting a particular message for annunciation. Such a display could be of the type known as a touch screen which allowed also for programming of softkeys for various functions to be performed such as scrolling, data entry, message selection and the like. The particular urgency of a message received could be indicated on such a display by a flashing iconographic indicator (2301), the caller id name and number data (2304) could be displayed, the duration of the voice message received could be shown (2303) and the time the message was received could be displayed (2302). In such cases where blocked caller id indicators were received, default message such as "blocked" (2306) or "unknown" could be displayed.

In FIG. 5c is shown a caller id memory address register in which caller id data associated with voice messages received can be stored for later recall and display in a stored voice pager. This memory for the caller id data could be contiguous or separate from the memory used for the voice messages received and could be applied to a display as described previously. The voice message stored in memory can be annunciated after selection of a displayed caller identifying record by the called party.

Figure 6A:
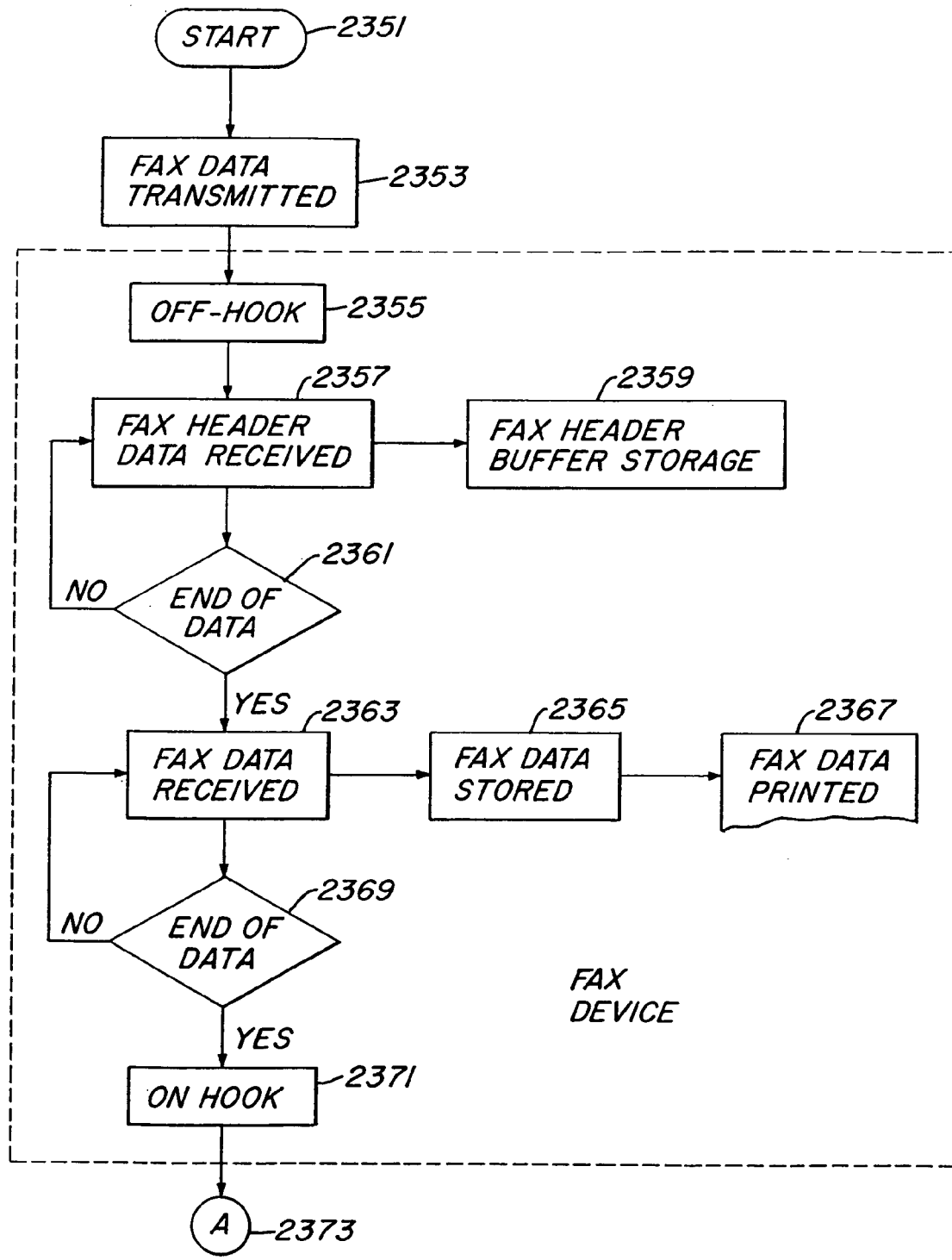
FIGS. 6a and 6b are block diagrams of received fax header information transmitted as caller identifying information.
Figure 6B:
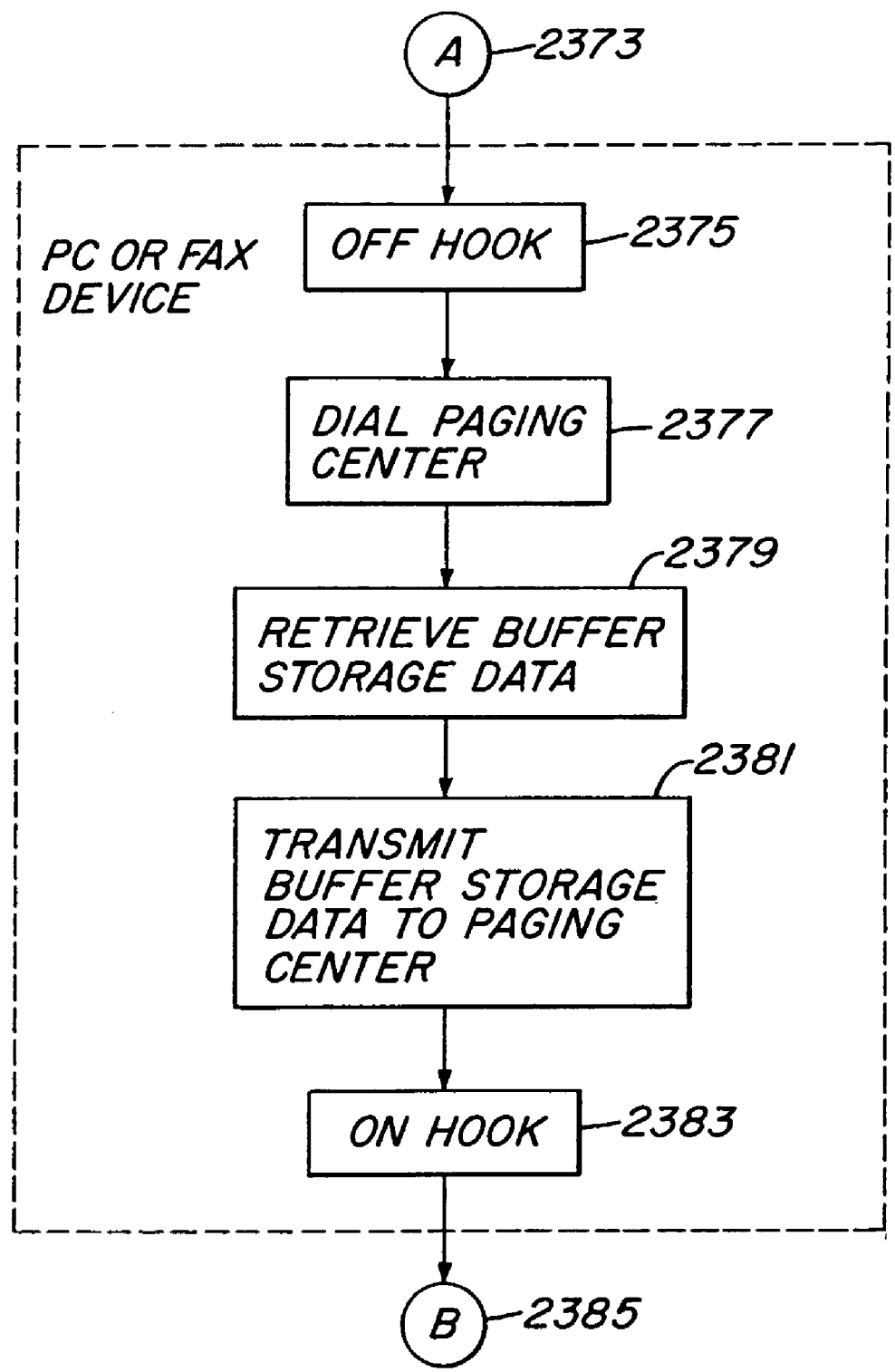

In addition, fax header or E-mail information received at the message center could be used alternatively as caller identifying information. FIGS. 6a and 6b summarize one embodiment of this concept. The message center could, for example, upon detection of a CNG tone, store conventional fax header information received for retransmission to a paging center or for transmission to a personal communicator directly from a paging transmitter integral or directly connected to the message center. The fax header or Email information could be transmitted to a personal communicator device that has pre-stored caller data contained in a memory along with a comparing means. The caller data could include a variety of information corresponding to frequent callers, including name, address, telephone number, fax number, and E mail addresses for each calling party. Additionally, a prestored voice annunciation corresponding to the identity of a caller or a prestored video image representative of the calling party could also be included in each caller record. Upon detection of a coincidence between the fax or E mail or other data received, the other associated data from the corresponding data record could be made available to the called party.

Figure 11:
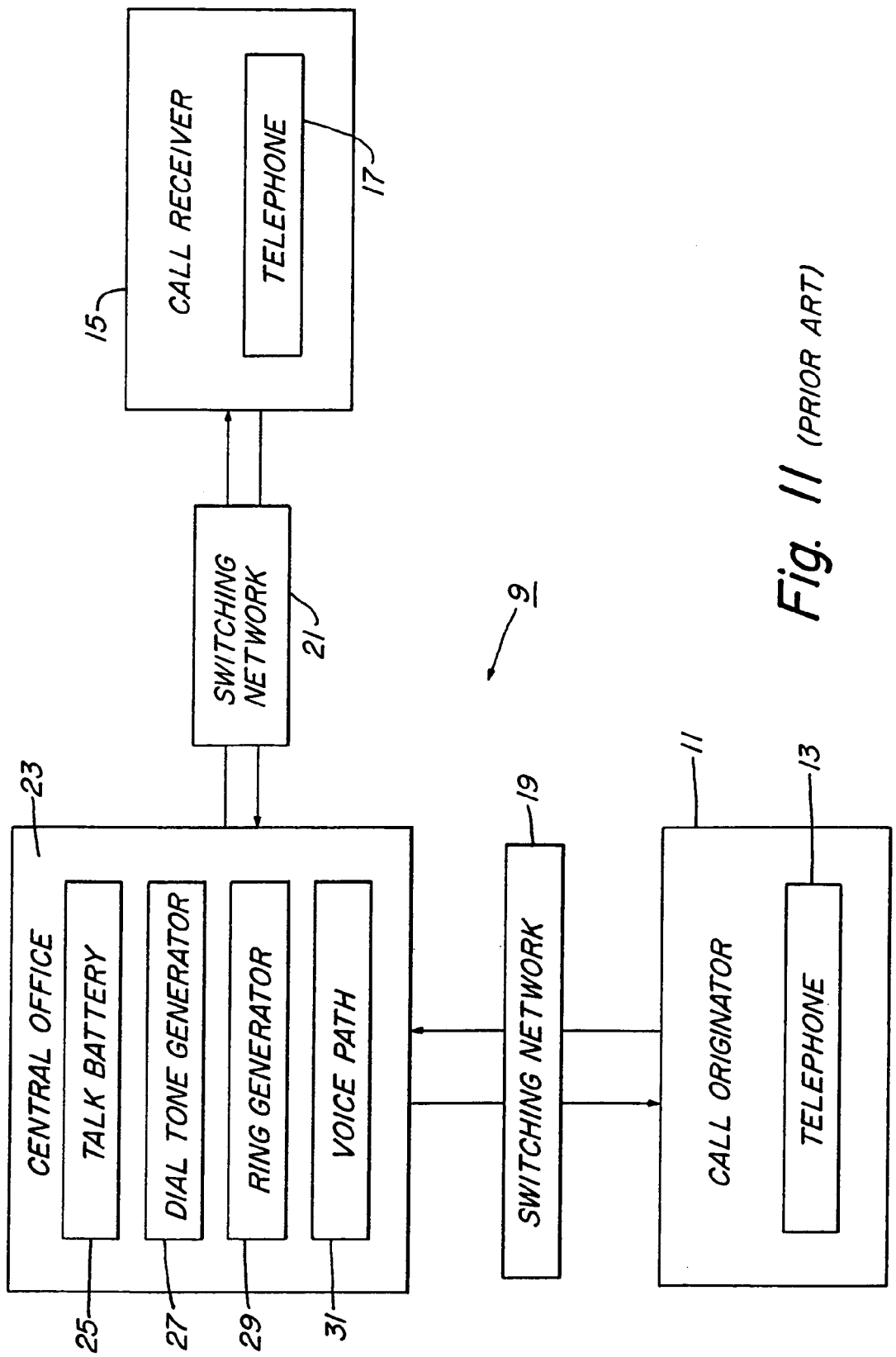
FIG. 11 depicts a prior art telephone communication network.

FIG. 11 provides a simplified block diagram of a telephone network, in accordance with the prior art, which will be utilized to describe some fundamentals of telephony which may be necessary to understand the invention herein. As is shown, telephone network 9 can be utilized to allow call-originator 11 to utilize telephone 13 to place a telephone call to call-receiver 15, which utilizes telephone 17 to receive such a call. Fairly elaborate switching networks 19 and 21 connect call-originator 11 and call-originator 15 to central office 23 of telephone network 9.

In central office 23, there is a source of electrical current, identified as talk battery 25, which is utilized to determine whether or not a particular telephone (i.e., telephone 13 or 15) is in the "on-hook" or "off-hook" condition. If the handset of a particular telephone is lifted from the cradle of the telephone, the telephone goes from an on-hook condition to an off-hook condition. When a particular telephone is in an off-hook condition, dial tone generator 27 at central office 23 of telephone network 9 is utilized to generate an audible dial tone which indicates to the telephone operator that an outgoing call may be initiated. For example, call-originator 11 may lift the handset from the cradle of telephone 13, and receive an audible dial tone through the operation of dial tone generator 27 and central office 23.

After call-originator 11 dials the telephone number of call-receiver 15, ring generator 29 at central office 23 generates a plurality of ring signals that are sent through switching network 21 to telephone 17 to alert call-receiver 15 that a call is incoming. Once call-receiver 15 lifts his or her handset off of the cradle of telephone 17, voice path 31 is established between call-originator 11 and call-receiver 15.

In accordance with current Bell standards, caller-identification information may be transmitted, automatically, between call-originator 11 and call-receiver 15, through telephone network 9, in a manner that will be described below with reference to FIGS. 12a, 12b, and 12c. In the United States of America, in accordance with the Bellcore Specification No. 220, the transmission must occur between the first and second rings. In FIG. 12a, such caller-identification information signals transmitted to call-receiver 15 are depicted in simplified form, with caller-identification information 39 occurring between first ring 35 and second ring 37. The Bellcore Specification requires that caller-identification information 39 occurs at least 500 milliseconds after first ring 35 ceases. Thus, the signal that represents the caller-identification information will begin transmission one-half of one second, or longer, after the termination of first ring 35. Caller-identification information 39 is transmitted serially, utilizing a frequency-shift-keying technique, which is well known in the prior art.

The Bellcore Specification also requires that the transmission of caller-identification information 39 end at least 427 milliseconds prior to the commencement of second ring 37. Typically, there is a four second interval between first ring 35 and second ring 37, so a significant amount of time is available for the communication of caller-identification information. Altogether, there is available a period of 2,570 milliseconds for the transmission of caller-identification information, not including pauses required by the Bellcore Specification (such pauses or periods of silence are required at the beginning and end of the message). At 1,200 baud, this message interval is sufficient to transmit 3,084 bits, or 308 bytes.

The blocks of data which make-up the caller-identification information 39 is set forth in block diagram form in FIG. 12b. The first component of the caller-identification information is a synchronization signal 41 which comprises a channel seizure signal having a duration of 250 milliseconds of frequency-shift-keying encoding of a bit pattern of alternating zeros and ones. Such a synchronization signal is utilized to provide a recognizable pattern to alert applicable caller-identification decoding equipment that caller-identification information allows. Pre-message pause 43 follows synchronization signal 41, and has a duration of 150 milliseconds, plus or minus 25 milliseconds. The purpose of such a pre-message pause 43 is to condition the receiver for the data that follows.

Next, message-type identifier 45 follows synchronization signal 41. Message type identifier 45 is typically one byte of data that identifies the type of caller-identification message which is being sent. There are two basic types of caller-identification messages, including: (1) only numeric data, which identifies the telephone number for the source of the telephone call; and (2) numeric data, which identifies a telephone number for the source of the telephone call, along with hexadecimal representation of alphabetic characters that contain the directory name associated with the telephone number of the source telephone. In accordance with the Bellcore Standard, 04 hexadecimal identifies a single message caller-identification message, while 80 hexadecimal identifies a caller-identification message that includes both a telephone number and a name.

Next, message byte count 47 provides an indication of the total length of the caller-identification information. This is important because the directory name associated with the source telephone number will have a different length for each particular name.

Thereafter, sub-message type 49 identifies the type of sub-message that is transmitted with the caller-identification information. Sub-message link 51 identifies the length of the sub-message which follows.

Message 53 consists of information that is described in more detail below with respect to FIG. 12c. Message 53 is followed by checksum byte 55 that, in accordance with the prior art techniques, provides a checksum total to ensure that data received has not been lost or altered in any way during the transmission. The receiving unit of a caller-identification decoder generates a checksum in response to the entire caller-identification bit stream, and thereafter compares this checksum with checksum byte 55. If these checksums match, then no bits were lost in the transmission; however, if the checksum generated by the caller-identification decoder does not match checksum byte 55 received at the decoder, then one or more data bits may have been lost in the transmission, and the information may be unreliable or unusable.

The final component of a caller-identification message is post-message pause 57, which is a quiescent period prior to second ring 37 of FIG. 12*a*.

With reference now to FIG. 12*c*, message 53 will be described in greater detail. The first eight bits of the message include month bits "MM", day bits "DD", hour bits "HH", and minute bits "MM". These eight bits provide the month and date, along with the hour and minute, in military time, of the telephone call. Note that no information is provided regarding the year.

The next portion of message 53 is either (1) a ten digit telephone number, or (2) a single digit that identifies that caller-identification information is either (a) not available, or (b) has been blocked to maintain the caller's privacy.

If caller-identification information is not available, the ASCII character "0" is transmitted. If the caller-identification information has been blocked for reasons of privacy, the character P is transmitted. However, if the caller-identification information is neither unavailable nor blocked, then a ten digit bit stream follows. The first three bits, "AAA" identify the area code; the next three bits, "PPP", identifying the prefix; and the final four bits, "EEEE", identify the exchange. For example, if the source phone number is 702-731-1113, then AAA=702, PPP=731, and EEEE=1113.

The next portion of message 53 is caller-identification information which identifies the name associated with the particular preceding telephone number. If this information is unavailable, a single character "0" is provided. If this information is blocked for reasons of privacy, a single character "P" is provided. However, if this information is both available and not blocked, a multi-bit string follows which sets forth a name associated with the particular preceding telephone number (for example, "John Doe").

Therefore, considered broadly, caller-identification information may be solely data which identifies a telephone number associated with the telephone unit utilized to place a call, or the telephone number associated with the telephone unit utilized to place the call in combination with alphabetic characters identifying a name associated with that particular number in a telephone directory (i.e., a telephone directory data base). In either event, whether the directory name is provided or not, this information can be considered to be the "caller-identification information." The particular details of the caller-identification standards in the United States of America are set forth in the publications of the Bell Communications Research Laboratories, which are identified as "Bellcore", and include (1) Technical Reference No. TR-TSY-00032, issued Nov. 1, 1986, and entitled "CLASS(sm) Feature: Bulk Calling Line Information"; (2) Technical Reference No. TR-TSY-000030, issued Jan. 1, 1990, entitled "CLASS(sm) Feature: Calling Number Delivery"; and (3) Technical Reference No. TANWT-001188, issued Mar. 1, 1991, entitled "CLASS (sm) Calling Name Delivery and Related Features Generic Requirements"; all of which are incorporated herewith by reference as if fully set forth.

Figure 13:
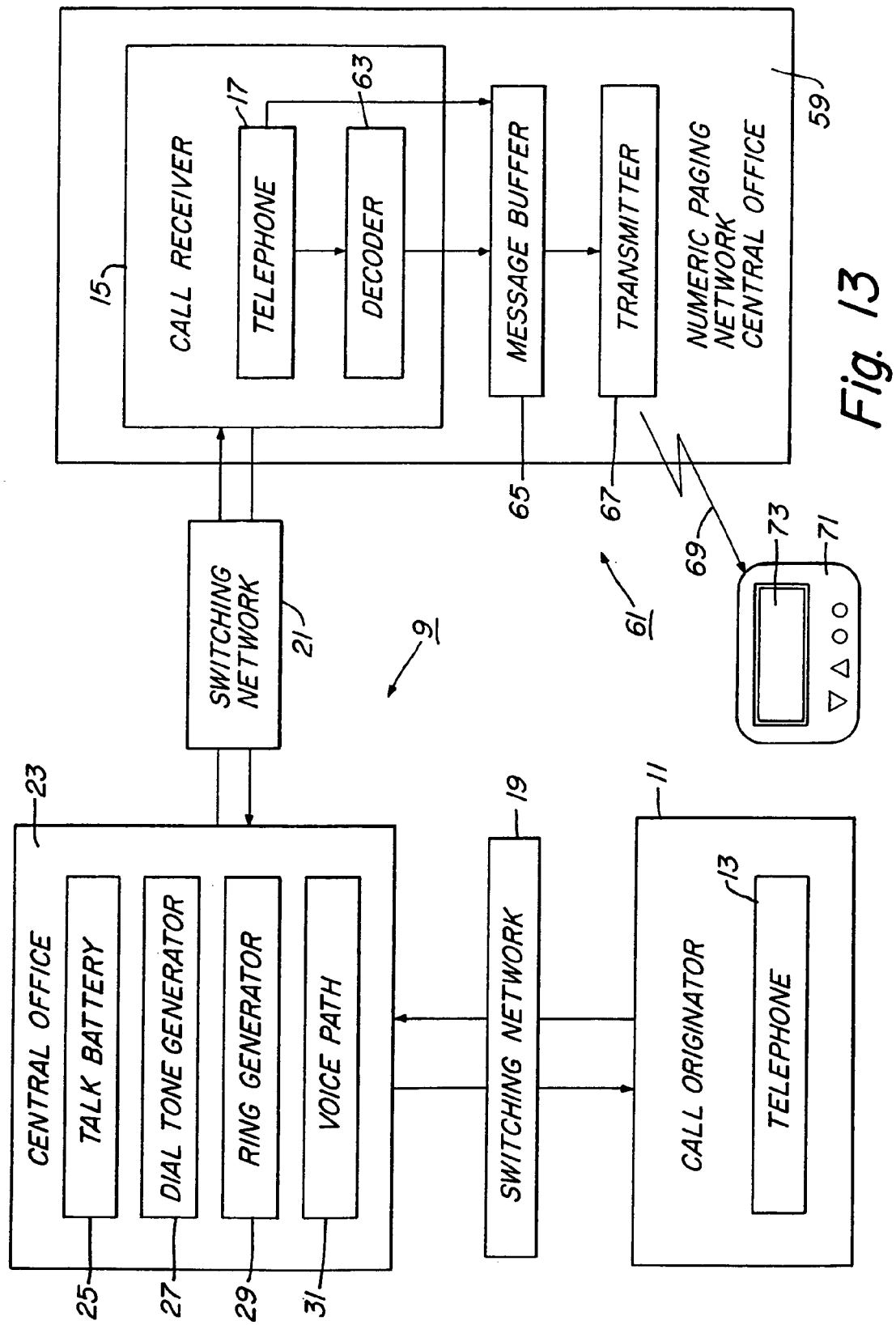
FIG. 13 depicts a numeric paging network in accordance with the embodiment of the invention, which is coupled to a conventional telephone network.

FIG. 13 depicts one embodiment wherein numeric paging network 16 is utilized to receive caller-identification information via interaction with telephone network 9 in response to call-originator 11 communicating through telephone network 9 with central office 59 of numeric paging network 61. In the configuration, numeric paging network 61 may be utilized to transmit the numeric portions of caller-identification information, and not the alphanumeric portions. FIG. 13 includes telephone network 9, which includes components identical to those discussed above in connection with FIG. 11, with the only difference being that a page request telephone call is received by call receiver 15, which is located within numeric paging network central office 59. Between the first and second rings received by call receiver 15, the caller-identification information is routed through telephone 17 to decoder 63.

Decoder 63 comprises a conventional caller-identification decoder capable of receiving the frequency-shift-keyed caller-identification signal, and decoding it into a bit stream representative of the information described above in connection with FIGS. 12*b* and 12*c*. The portion of information corresponding to the telephone number of particular telephone 13 being utilized by call originator 11 is provided as an input to decoder 63. Additionally, telephone 17 is utilized to receive any optional numeric message that is input by call-originator 11 and transmitted over voice path 31 during the time interval provided.

The decoded numeric information which corresponds to the telephone number of the telephone utilized by call-originator 11, and any numeric message input by call-originator 11, are assembled in message buffer 65, which pushes the serial bit stream to transmitter 67 in accordance with a pre-defined protocol. The invention may utilize the predefined communication protocol identified as the Post Office Code Standardization Advisory Group (POGSAG) code. Such a code comports with the formats provided by the International Committee CCIR, which has standardized message coding for radio frequency transmissions. Both the POCSAG code and CCIR standards are well known for those skilled in the art, and both are incorporated herein by reference as if fully set forth, but are not essential to the main concepts of the embodiments.

Transmitter 67 provides a radio frequency communication link 69 that communicates information from numeric paging network central office 59 to personal communication device 71. Personal communications device 61 may be a receive-only device, such as paging device, or a more sophisticated bi-directional communication device, such as a personal communication device or personal digital assistant, such as the personal digital assistant sold under the trademark "Macintosh Netwon" by Apple Computer, or the product sold by AT&T under the trademark "EO". Preferably, personal communication device 71 at least includes display 73, which is utilized to display information based, at least in-part, upon information contained within a database resident within personal communication device 71, or in-part upon information transmitted over radio frequency communication link 69 from central office 59 of numeric paging network 61.

Figure 14:
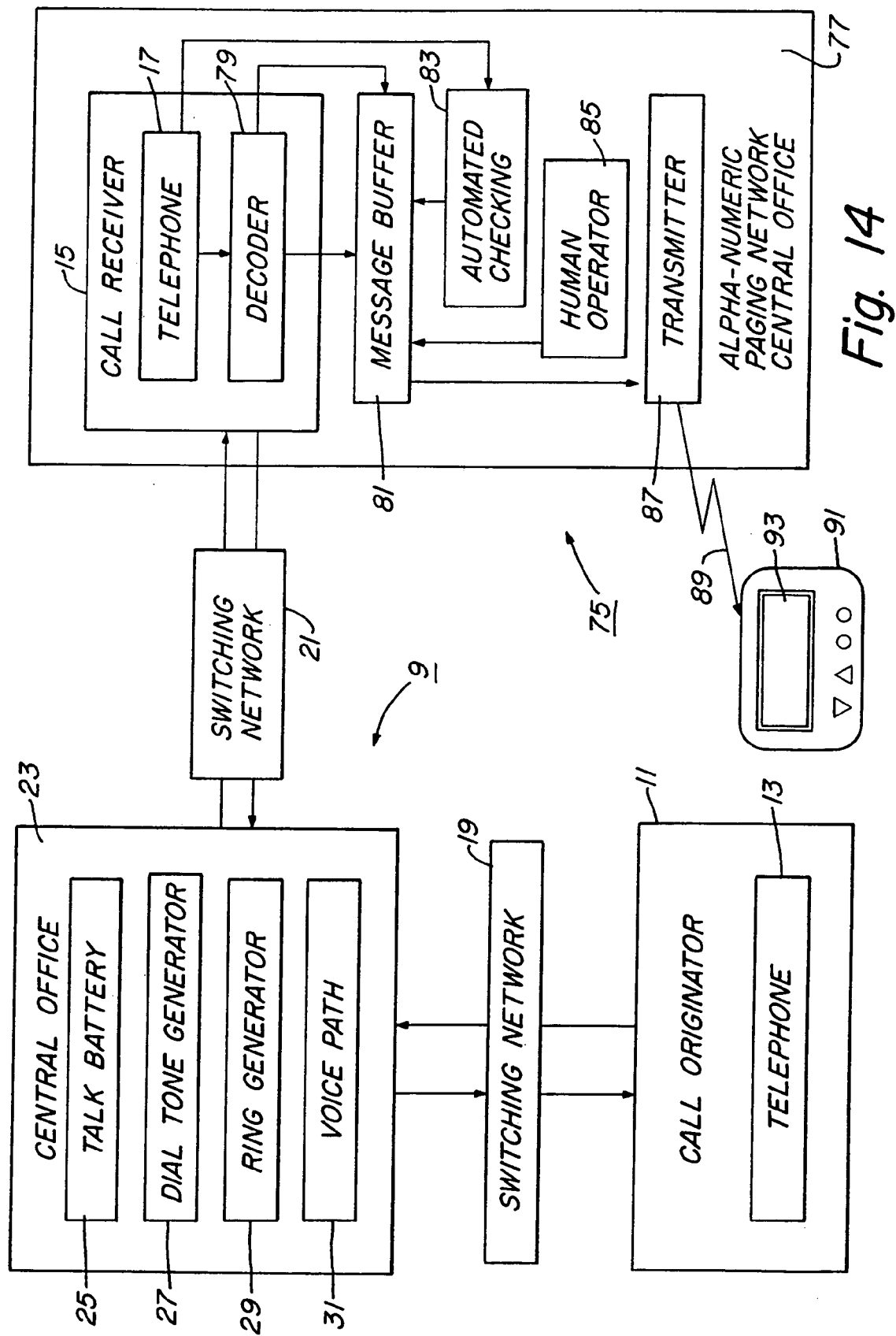
FIG. 14 depicts an alphanumeric paging network in accordance with the embodiment of the invention, which is coupled with a conventional telephone network.

FIG. 14 provides a block diagram representation of another embodiment wherein alphanumeric paging network 75 is utilized to receive caller-identification information. Such caller-identification information which may be received includes numeric information corresponding to the telephone number of telephone 13 utilized by call originator 11 to engage alphanumeric paging network 75, and alphanumeric text which identifies the "entity" listed in a telephone directory (i.e., a database) as the owner of the particular telephone number assigned to telephone 13. Call-receiver 15 receives the incoming call through switching network 21 on behalf of alphanumeric paging network 75. Call-receiver 5 is located within alphanumeric paging network central office 77.

The caller-identification information is routed from telephone 17 to decoder 79, where it is converted from the frequency-shift-key format transmitted within telephone network 9, to an acceptable binary or hexadecimal format. Such decoded caller-identification information includes numeric caller-identification information which corresponds to telephone 13 utilized by call-originator 11 to engage alphanumeric paging network 75, as well as alphanumeric textual information which identifies the "entity", as listed within the telephone directory database, which has ownership of that particular telephone number, along with other additional formatting information which was described above in connection with FIGS. 12a, 12b, and 12c.

This decoded caller-identification information is pushed from decoder 79 to message buffer 81, and may also be provided to automated checking routine 83. Automated checking routine 83 receives caller-identification information and formulates a textual or synthesized voice query, which may then be utilized to communicate with call-originator 11 to verify the telephone number for telephone 13 (which was derived from the caller-identification information) as well as the "entity" identity (which was also derived from the caller-identification information). The query may include the following questions:

(1) The caller-identification information provided to us through the telephone network indicates that the telephone number from which you are placing this call is AAA-PPP-EEEE; please depress your telephone key pad number "1" if this information is correct, or depress telephone key pad "2" if this information is incorrect.

(2) Your previous response has indicated to us that the telephone number provided through the caller-identification is incorrect. Please enter your correct telephone number at this time beginning with the area code.

(3) The caller-identification information provided to us through the telephone network indicates that this telephone number is assigned to "NNNNNNN", please press "1" if this information is correct. If this information is not correct, please hold for an operator.

(4) Please stand by for an operator if you desire to leave a detailed message; otherwise, please hang-up and your page will be directed to the intended recipient which you should now identify by depressing the keys on your telephone key pad, with the area code being entered first.

(5) If no detailed message is desired, hang-up and your page will be directed to area code "AAA", telephone number "PPP-EEEE". Thank you.

After this automated verification of the caller-identification number occurs, human operator 85 may be made available to call-originator 11 to take a detailed alphanumeric textual message. Human operator 85 keys a particular message into message buffer 81 prior to transmission of the message by transmitter 87, via radio frequency communication link 89, to a remotely located personal communication device 91 that includes display 93. Upon receipt of the page, personal communication device 91 generates information for display in display 93 based at least in part on at least one of: (1) information communicated via radio frequency communication link 89; or (2) information contained within a database maintained within personal communication device 91.

While FIGS. 13 and 14 have been described with reference to a numeric paging network and an alphanumeric paging network, the embodiments may be utilized with an alphanumeric paging network which allows for communication of a variety of page-originator generated messages, in a variety of formats. Such messages may be provided to the portable personal communication device in a variety of formats; including:

(1) textual information which include either numeric only, or alphanumeric data;

(2) digitized voice or audio information which may be communicated in analog form through the telephone network to the central office of the alphanumeric paging network, where the information is then digitized, and transmitted in a digital format which, upon reception, may be reconstructed to define an analog voice or audio signal which drives an audio output device resident in the personal communication device; or (3) digitized image information, such as a video image or an iconographic representation of information, which may be transmitted over the voice channel of the telephone network and received at the central office of the alphanumeric paging network, where it is then digitized, and transmitted to the remotely located personal communication device, where the digital information is reconstructed into an image which may be displayed on a display resident in the personal communication device.

Given this variety of message-format inputs, the personal communication device can provide an equally impressive array of display options. Textual input (including numeric and alphanumeric characters) can be displayed in a conventional manner on a simple and relatively inexpensive alphanumeric LCD display. Additionally, text that is provided as input to the personal communication device via the radio frequency communication link, may be utilized with a voice synthesizer to provide synthesized voice as an output from an output device resident in, or coupled to, the personal communication device.

Alternatively, an alphanumeric or numeric input supplied to the personal communication device may be utilized to recall one of a plurality of prestored audio output messages. For example, a table may be provided which identifies particular alphanumeric codes as corresponding to particular audio output messages. The binary characters "1111" may correspond to the audio output message "phone home now". Alternatively, a different code, such as "001", may correspond to the audio output message "phone your office now". The prerecorded and predetermined audio output messages may define a plurality of messages which alert the page-receiving communicant that a page has been received from a particular source, and indicating a particular urgency or requesting a level of diligence in response thereto.

Of course, as another option, digitized audio or voice data may be reconstituted into analog format to provide an audio output corresponding almost directly to the audio input provided by the page-originating communicant over the telephone lines to the central office of the paging network.

Digitized images may also be transmitted to the personal communication device in this manner for display on a more elaborate display, such as a personal computer-type display. Finally, digitized audio may be provided as an input to the personal communication device, which, in turn, may be utilized to generate a combination of signals, which may include an audible signal, or a preselected image, such as an icon, which may be placed on the display.

FIG. 15 provides one example of the utilization of a numeric message code, which is input at the personal communication device, to generate a textual message which provides to the page-receiving communicant, information that allows him or her to respond in an appropriate manner to the page. As is shown in FIG. 15, the message code number column on the left corresponds to a textual message code on the right. Receipt of the "*1" message code results in the display of the message "call when you return" on the personal communication device. The receipt of the message, code "*2", results in the display of the textual message "voice mail received" on the personal communication device. Receipt of the "*3" message code results in the display of the textual message "fax mail received" on the personal communication device. Receipt of the "*4" message code results in the display of the textual message "electronic mail received" on the personal communication device. Receipt of the "*5" message code at the personal communication device results in the display of the textual message "image data received". Receipt of the "*6" message code results in the display of the textual message "other data received" on the personal communication device. Finally, receipt of the "*911" message code at the personal communication device results in the display of the textual message "call immediately".

Of course, other various preselected and predefined textual messages are possible. To facilitate the use of this system, the paging network may provide a synthesized-voice and keypad driven exchange between the call-originating communicant and the central office of the paging network. Such an interface may be utilized until the various page-originating communicants learn one or more of the most useful message codes. After such message codes are learned, a user may thereafter bypass the synthesized-voice menus. Preferably, the information provided to the page-receiving communicant is stored in memory within the personal communication device for review at a later time. Typically, the personal communication device includes memory buffers sufficient to hold a selected number of messages received via the paging network, and other corresponding data.

FIG. 16 provides a view of one way in which the data received from the page-originating communicant may be organized. Such organized data may be stored at either the central office of the paging network or within the memory allocated for such purpose within the personal communication device. As illustrated, a plurality of locations are provided for storing caller-identification information (i.e., locations in the first column), DTMF data which may be entered by the page-originating communicant by utilizing the telephone handset (the second column), and caller message data which may be provided by the page-originating communicant through utilization of a variety of messaging techniques, but in this example, an alphanumeric messaging technique, such as that discussed above with respect to FIG. 15.

FIGS. 17, 18, 19a, 19b, and 19c provide views of three alternative physical configurations for the personal communication device. Personal communication device 101 of FIG. 17 allows for two-way communication with the paging network. Personal communication device 101 includes display 103, which is preferably a display of the type utilized in portable personal computers, such as notebook computers. Display 103 may be utilized to display information, such as caller-identification information 105. Caller-identification information 105 may include an alphabetic identification of the name associated with the telephone number transmitted with the caller-identification information, or may include optional message 107 input by the page-originating communicant during the request for a page via the telephone network.

Figure 17:
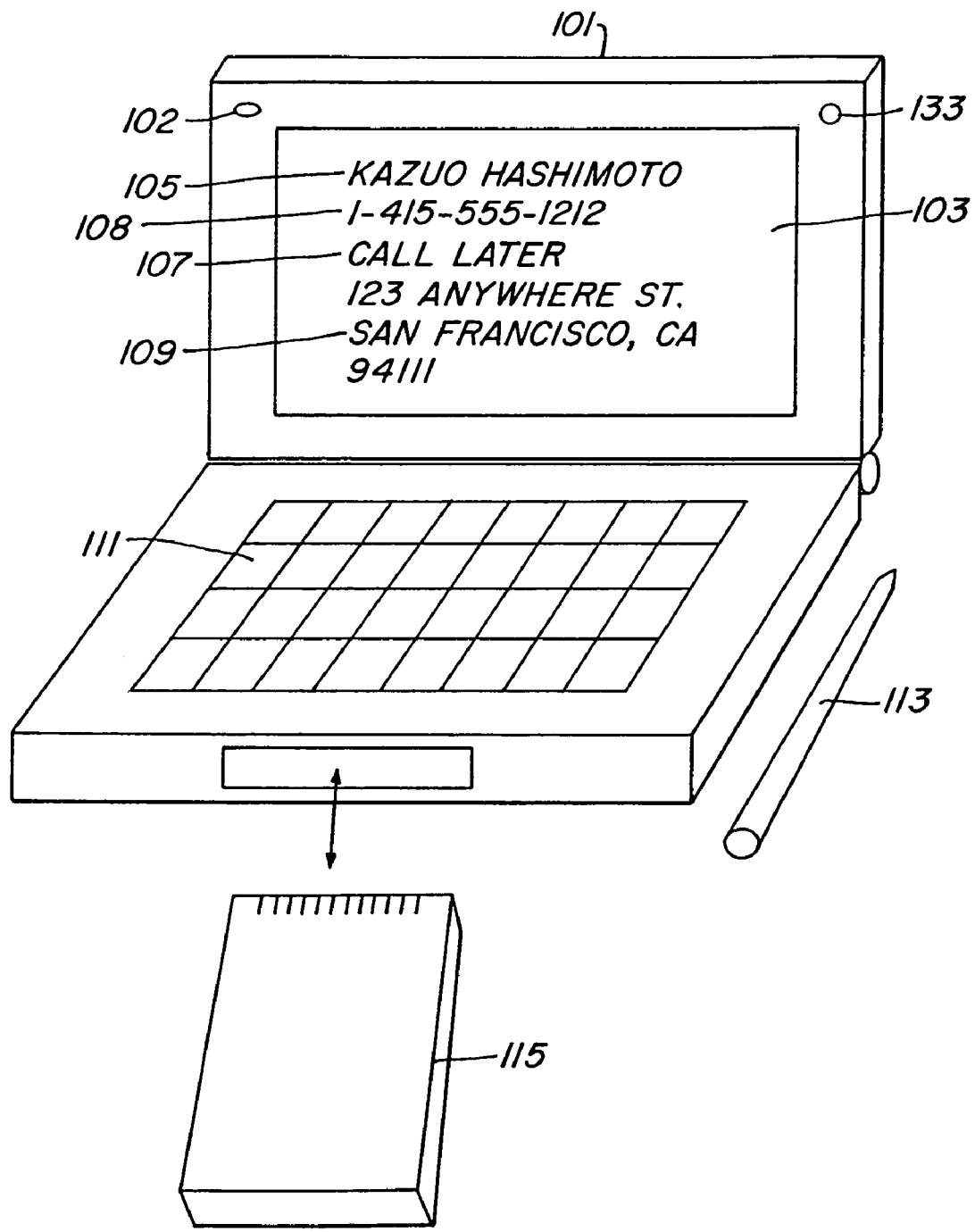

In FIG. 17 is shown telephone number data 108 extracted from data shown as in FIG. 22 which is displayed on display 103.

As is shown, other information 109, such as an address associated with the page-initiating communicant 105, may be retrieved from a database in the memory of the personal communication device and displayed along with the caller-identification information on display 103.

Personal communication device 101 of FIG. 17 also includes keyboard 111 and graphical pointing device 113, such as a touch pen, which may be utilized to select icons, menu buttons, or other items displayed in a graphical user interface. Preferably, personal communication device 101 allows two-way communication, and includes a cellular link to the telephone network and/or paging network. Additionally, data card 115 may be provided to load personal communication device 101 with a preconfigured database containing information pertaining to parties with which frequent communication may occur.

Figure 18:
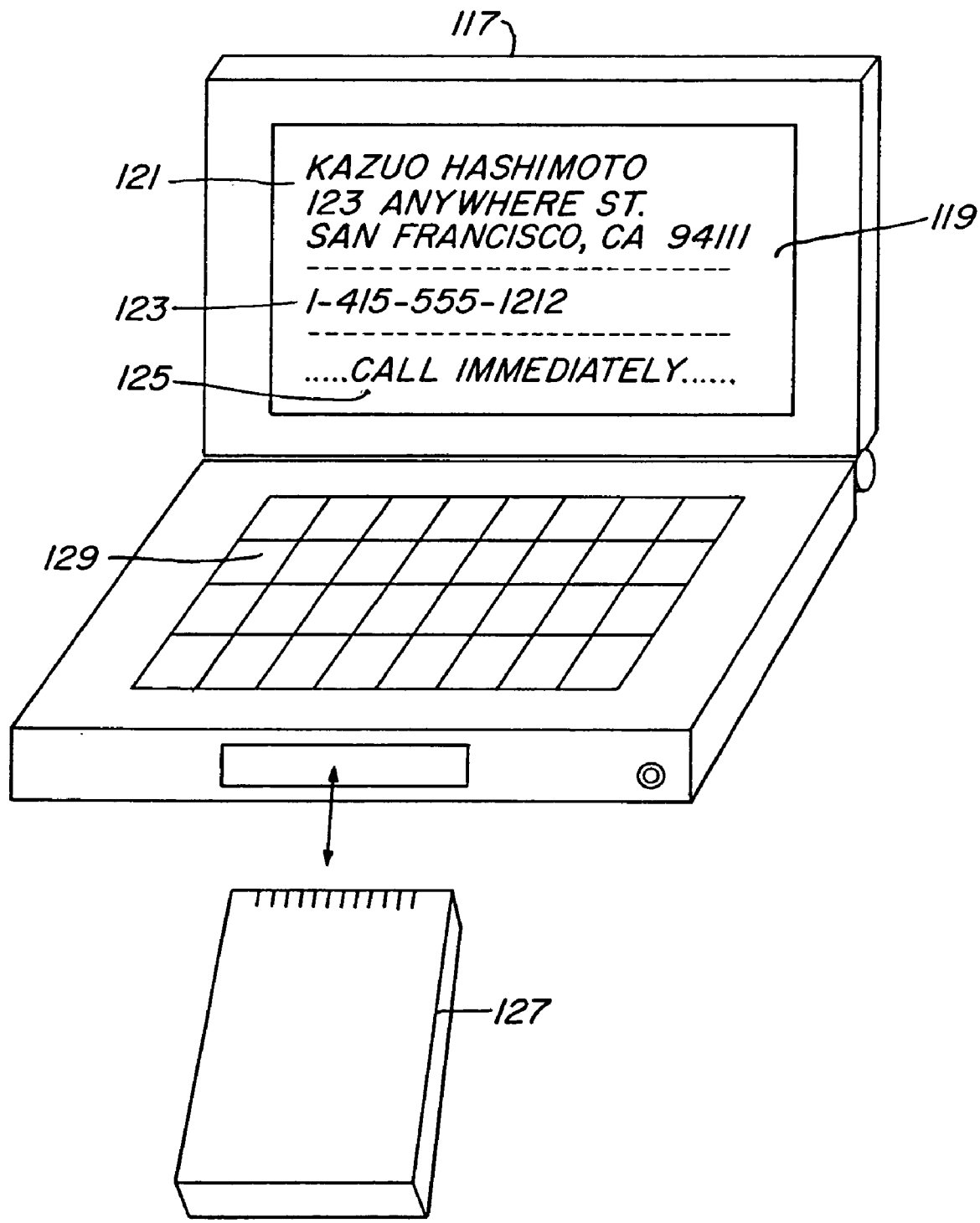

FIG. 18 provides a view of an alternative personal communication device 117, which allows only one-way communication; personal communication device 117 may receive information from the paging network, but may not directly originate an outgoing communication with the telephone network, or with the paging network. As is shown, personal communication device 117 includes display 119, which may display identification 121 of the page-originating communicant, along with his or her address. Telephone field 123 is also provided for displaying a telephone number at which the page-originating communicant may be reached. Furthermore, short message 125 may be provided to indicate either (1) the type of information that has been received at the paging network, or (2) the degree of urgency attached to the particular information received.

Data card 127 may be utilized to load personal communication device 117 with additional database information. In the preferred embodiment of the present invention, the information displayed in display 119 is based at least in-part upon caller-identification information, and at least in-part upon information recalled from the database resident in the memory of personal communication device 117 or within data card 127. As is shown in FIG. 18, keyboard 129 is provided to allow the page-receiving communicant a means to enter or manipulate data within the database.

A third, and still different, embodiment of the present invention is depicted in FIGS. 19a, 19b, and 19c. FIG. 19a provides a view of the bottom portion of personal communication device 131. Note that audio output device 133 is provided. Mechanical coupler 135 provides a means for acoustically coupling personal communication device 131 to any telephone equipment, particularly the mouthpiece of a telephone handset, against which audio output device 133 is disposed.

In FIG. 19a data connector 134 and battery cover 13 is shown.

FIG. 19b provides a side view of personal communication device 131 of FIG. 19a. Note that RJ11 telephone jack power switch 137 is provided to connect the telephone line to personal communication device 131.

FIG. 19c provides a view of the top portion of personal communication device 131. Display 139 is provided to receive and display numeric data, alphanumeric data, and images. A plurality of icons 141 are provided about display 139, each of which is dedicated for the communication of particular information. For example, icon 143 is representative of a clock, and may be utilized to indicate to the page-receiving communicant that time-sensitive information has been communicated to the paging network. For an alternative example, icon 145, which depicts a telephone, is provided to indicate to the page-receiving communicant that a telephone message has been received by the paging network. A variety of other dedicated iconographic representations are provided about display 139, each of which is dedicated to communicate particular, predefined information to the page-receiving communicant pertaining to information deposited at the paging network.

The device depicted in FIGS. 19a, 19b, and 19c allows only the receipt of information from the paging network, and utilizes the dedicated icons to communicate particular types of information to the page-receiving communicant. This allows the small display 139 to be utilized for less-routine types of information.

Figure 20:
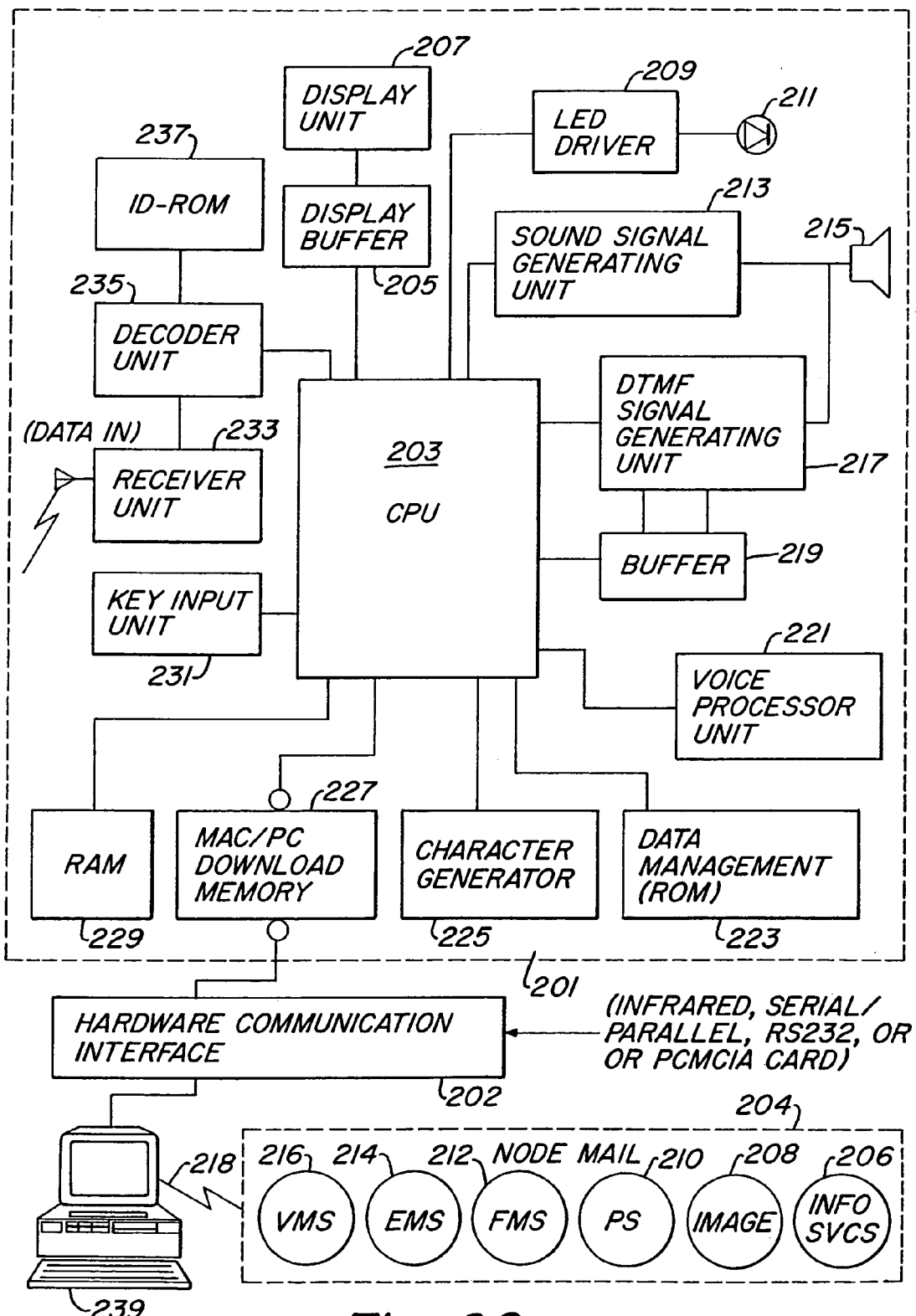
FIG. 20 depicts in block diagram form the operational blocks of a portable communication device in accordance with the embodiment of the invention.

FIG. 20 provides a block diagram view of portable communication device 201. As is shown, portable communication device 201 includes central processing unit 203, which preferably comprises a microprocessor. The microprocessor of central processing unit 203 interacts with the plurality of hardware and software components. Key pad input unit 231 communicates with central processing unit 203 to allow for the operator to depress particular keys on a keyboard thereby inputting data into portable communication device 201. Receiver unit 233 is utilized to receive radio frequency communication from the paging central office. Decoder unit 235 is utilized to decode radio frequency signals received from receiver unit 233. Decoder unit 235 communicates with central processing unit 203 to power-up central processing unit 203 when a page notification intended for portable communication device 201 is received at receiver unit 233. ID-ROM 237 is utilized to record in memory a particular numeric or alphanumeric identifying information that is provided to code each particular portable communication device in a paging network so that it is responsive to a particular radio frequency transmission. ID-ROM 237 records the particular identification code assigned to that particular communication device.

Figure 7A:
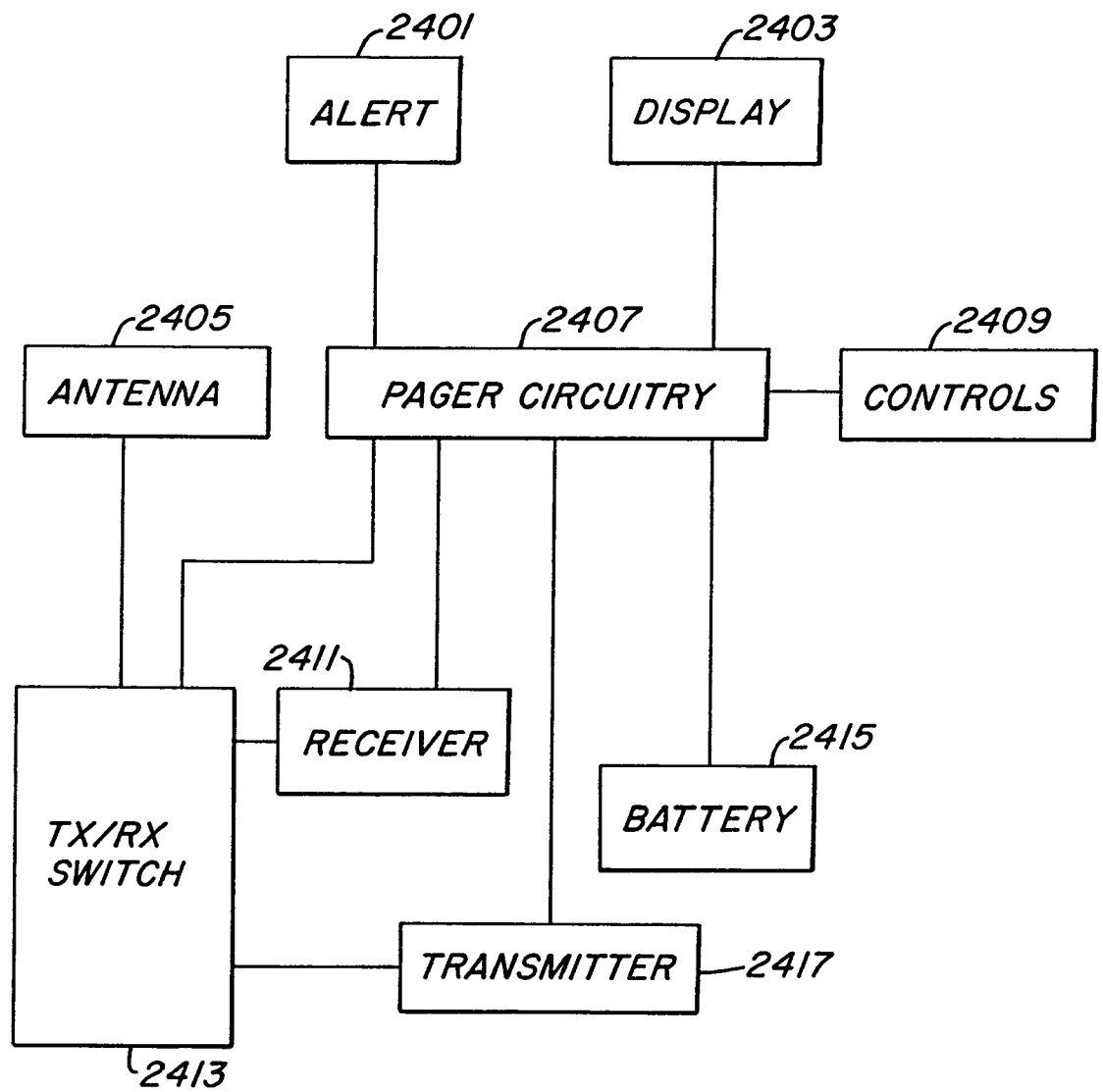
FIGS. 7a and 7b show improved ACK-BACK stored voice devices.
Figure 7B:
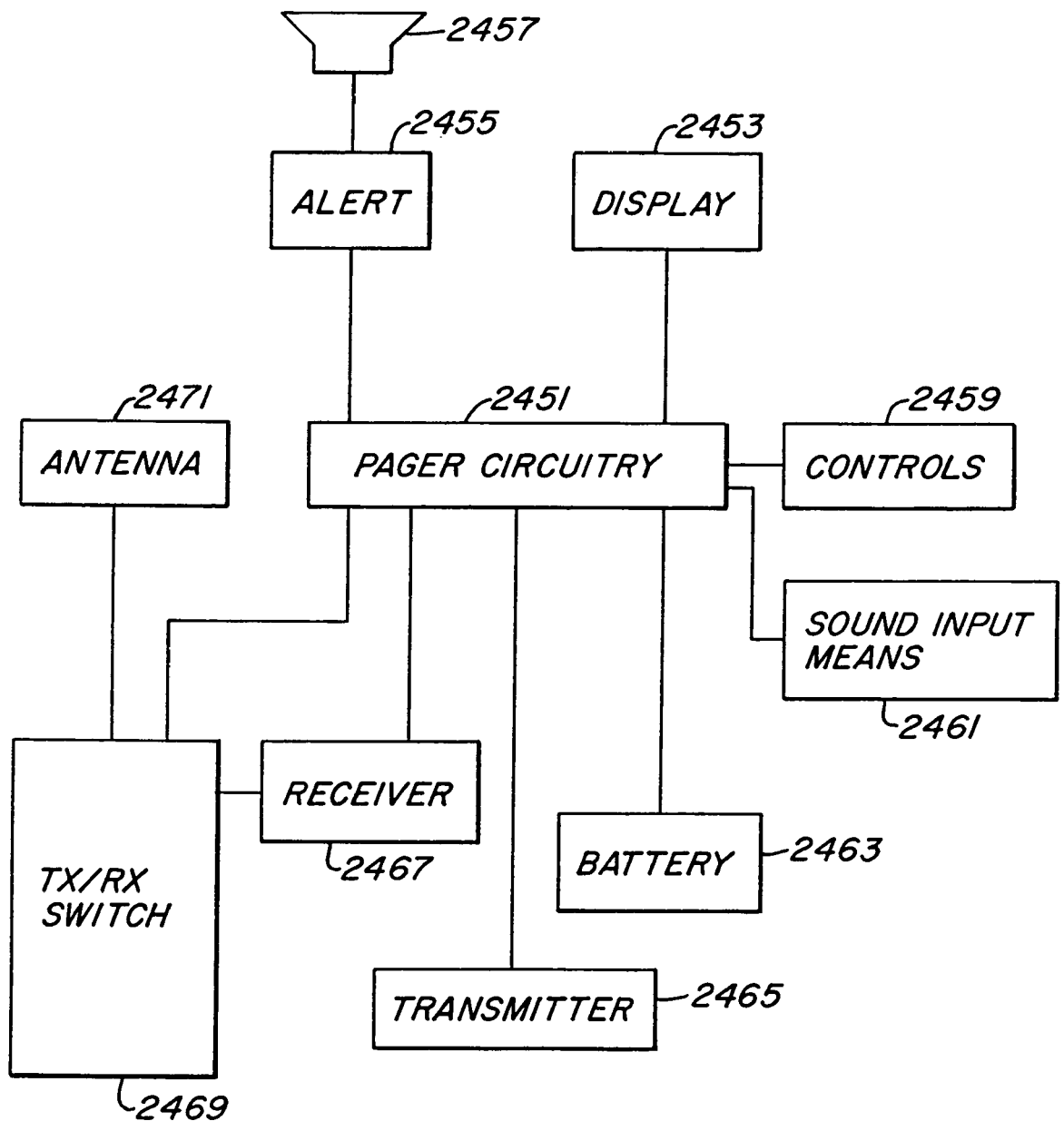
Figure 8A:
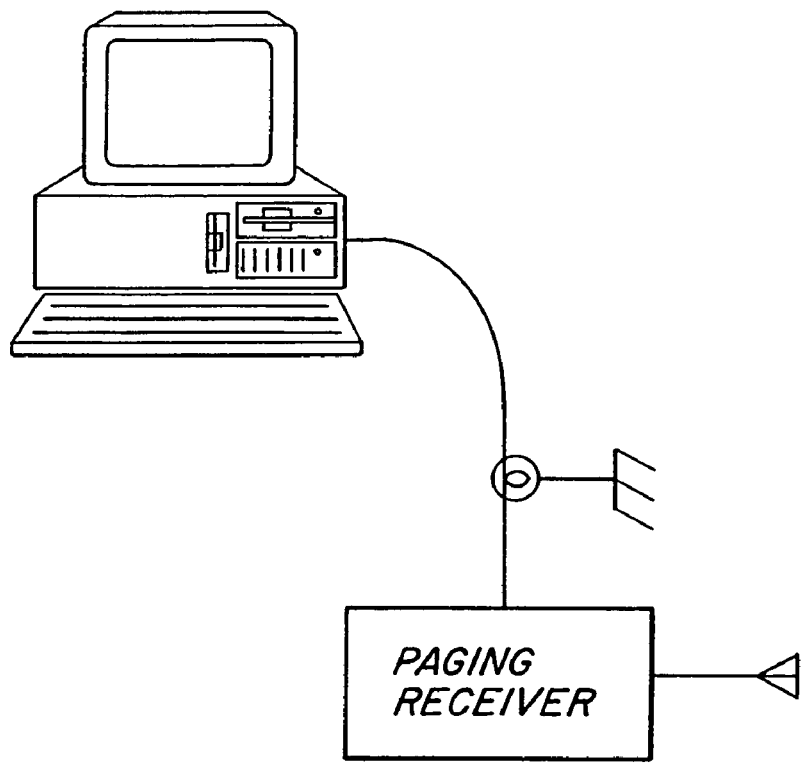
FIG. 8a shows a data connection between a personal computer and paging receiver suitable for transfer of sound files to or from a portable communication device.
Figure 8B:
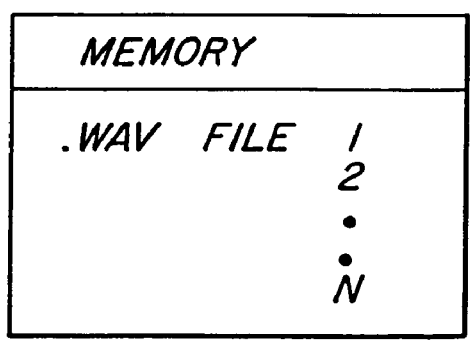
FIG. 8b shows one preferred embodiment of a stored sound file that can be transferred to a portable communication device.
Figure 9A:
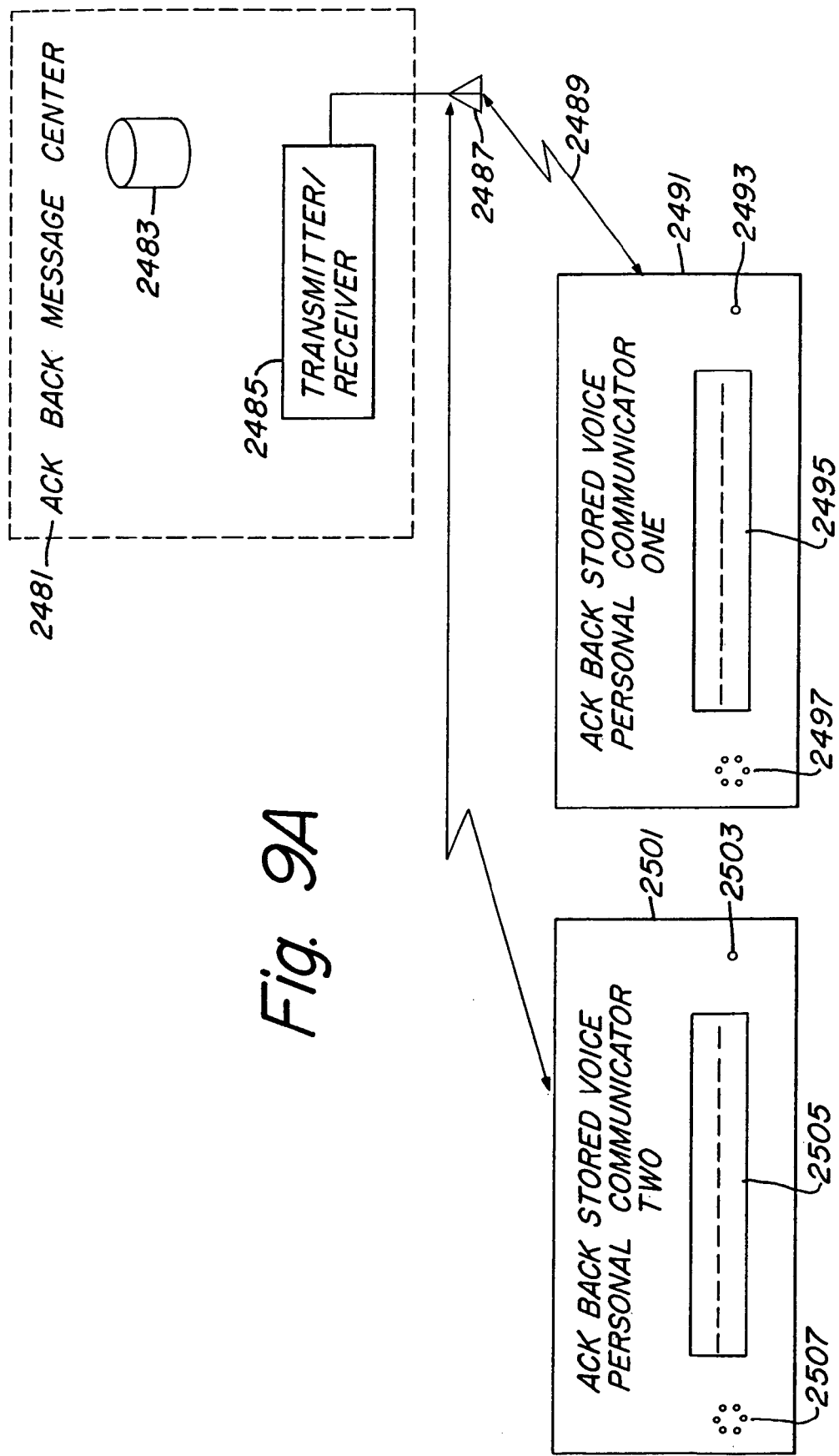
FIGS. 9a and 9b depict improved ACK-BACK systems adapted to the inventions herein.
Figure 9B:
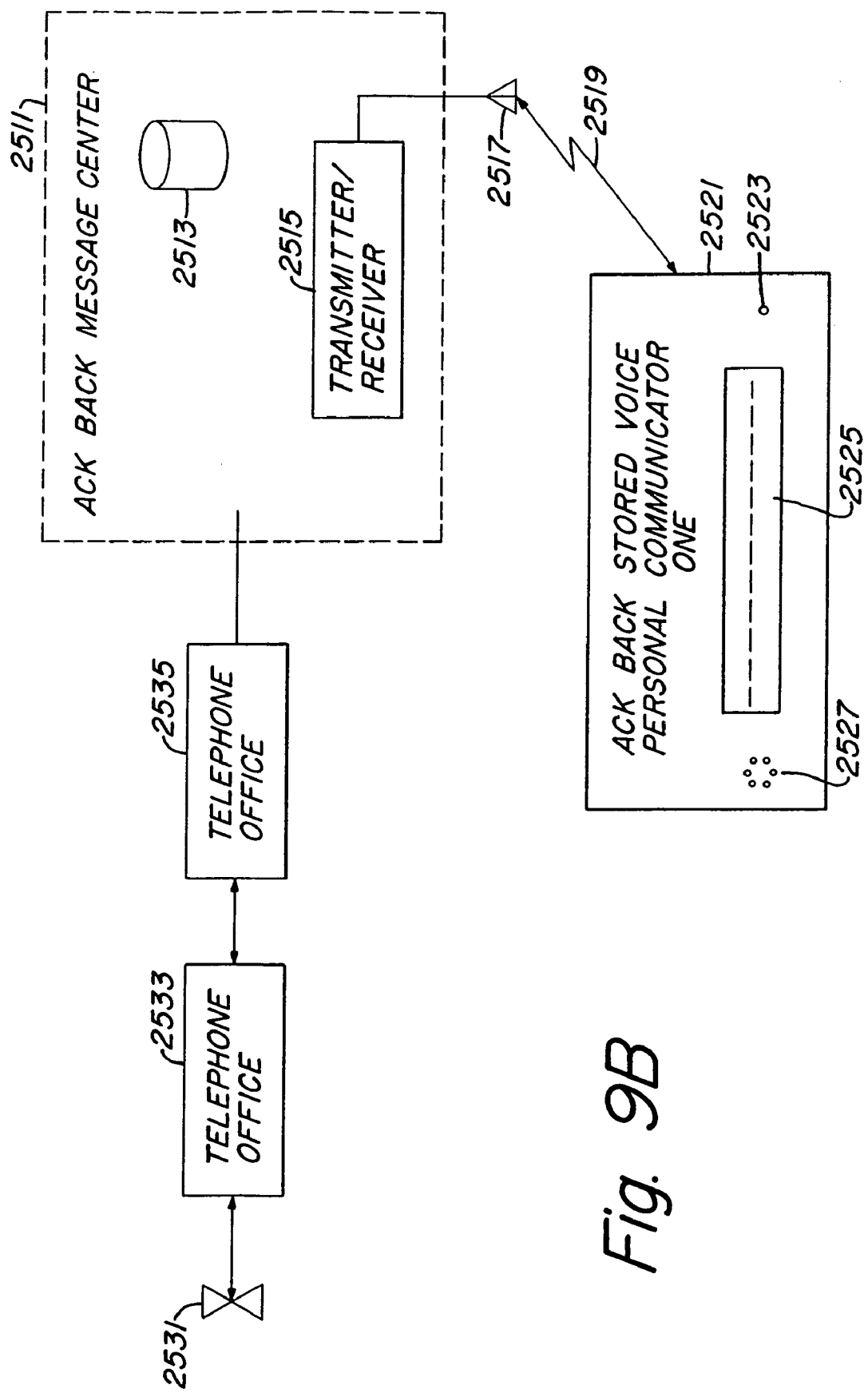
Figure 10:
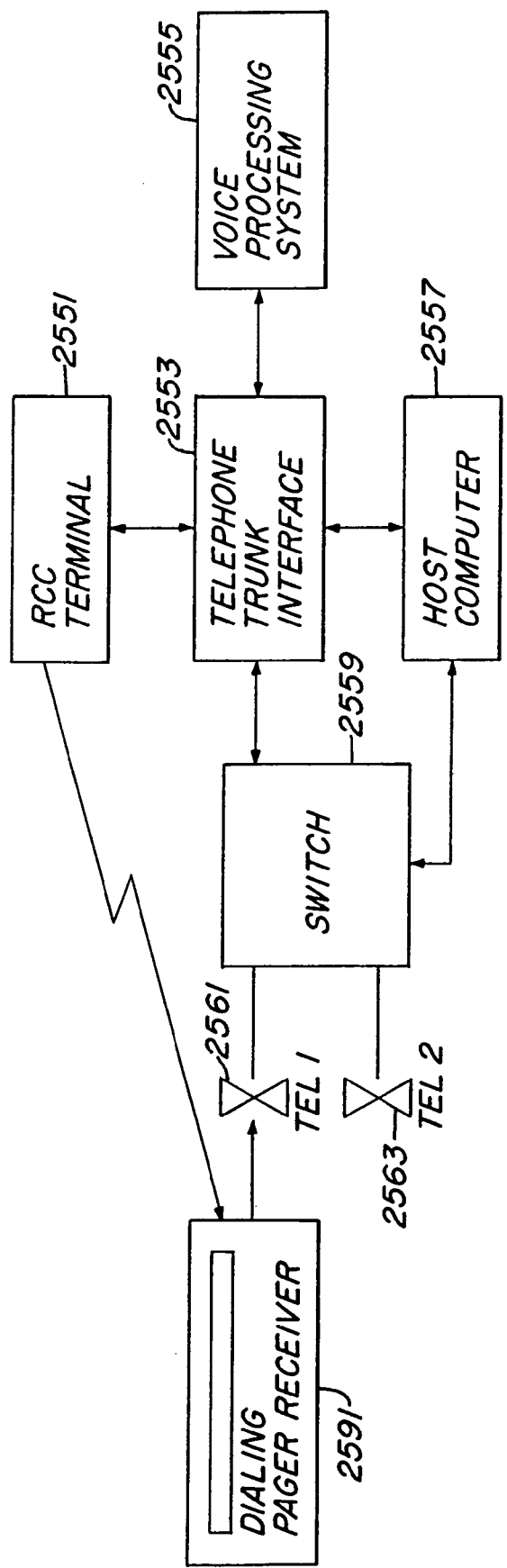
FIG. 10 is a block diagram of a system utilizing a dialing pager receiver adapted to the invention.

Central processing unit 203 communicates through display buffer 205, in a conventional manner, to place numeric data, alphanumeric data, and images, such as icons, on display unit 207. Light-emitting-diode 211 is provided to provide a flashing indication of the receipt of a page. LED driver 209 is positioned intermediate central processing unit 203 and LED 211, to allow central processing unit 203 to drive LED 211 in a variety of flashing patterns. Sound-signal generating unit 213 is coupled between central processing unit 203 and audio output device 215. Central processing unit 203 provides binary control signals to sound-signal generating unit 213 that result in the output of a particular tone, at a particular volume and a particular frequency. DTMF signal generating unit 217 is coupled between central processing unit 203 and audio output device 215. It is utilized, when desired, to generate dialing tones which may be communicated through audio output device 215 to the mouthpiece of a telephone to place a call utilizing the telephone network. Buffer 219 is coupled to central processing unit 203 and DTMF signal generating unit 217, and is provided for queuing of DTMF generating signals. Voice processing unit 221 is coupled to central processing unit 203 to allow the analog-to-digital and digital-to-analog conversion of speech and other audio input 102 of FIG. 7 and 102 of FIG. 9c or output 133 of FIG. 7 and 133 of FIG. 9a.

Several housekeeping functional blocks are also provided in the view of FIG. 20. RAM 229 is provided as a memory cache. In the preferred embodiment of the present invention, a database including a plurality of fields that identify actual or potential communicants by name, address, and appropriate telephone and facsimile numbers, is resident within RAM 229. Character generator 225 communicates with central processing unit 203 to generate particular alphanumeric characters in response to commands from central processing unit 203. MAC/PC download memory 227 operates a data exchange buffer to allow for the communication of data between central processing unit 203 and personal computer 239. Personal computer 239 may be utilized to store in memory the database that is intermittently downloaded through MAC/PC download memory 227 for storage in RAM 229. As is shown in FIG. 20, personal computer 239 is coupled in a node mail network which allows for voice mail service (VMS), fax mail service (FMS), electronic mail service (EMS), paging system (PS), images, and connection to information services.

Figure 21:
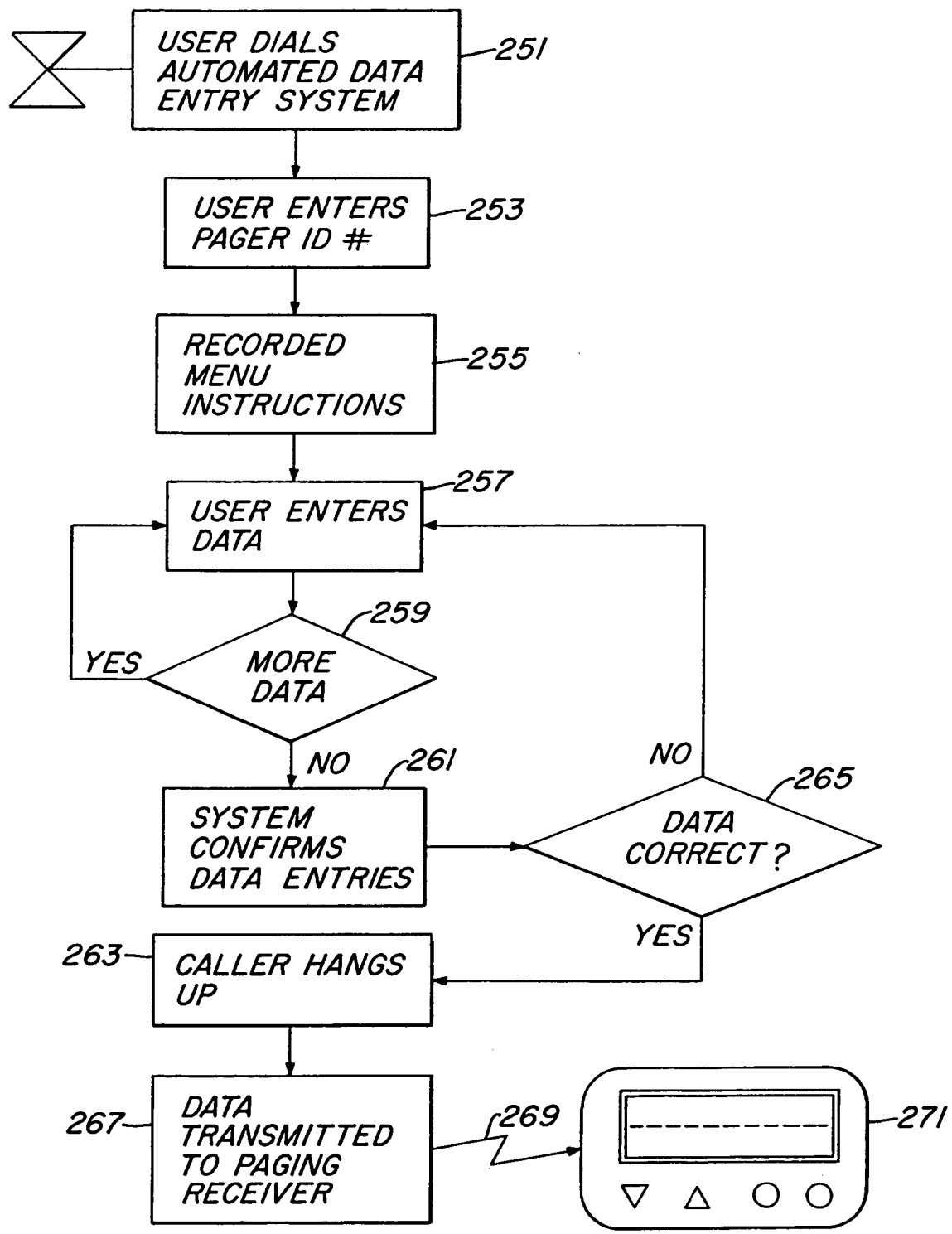
FIG. 21 depicts in flowchart form the process of engaging a paging network via a telephone network.

FIG. 21 provides a flowchart representation of the technique in accordance with an embodiment for communicating information between a page-originating communicant and a page-receiving communicant. The process starts at software block 251, wherein the page-originating communicant (user) utilizes the telephone network to access an automated data entry system. As discussed above, upon establishment of a voice circuit between the telephone unit utilized by the page-originating communicant and the paging center, the caller identification information, if any exists, is automatically transferred to the central office, where it is decoded and preferably utilized in accordance with software block 255 in a recorded menu exchange, wherein the information is verified and/or corrected and/or supplemented.

In software block 257, the page-originating communicant enters optional data. This optional data may be numeric data, alphanumeric data, digitized speech, facsimile messages, or images. In accordance with software block 259, the paging system identifies when the data entry has been completed, and confirms the data entry in accordance with software block 261. In accordance with software block 265, the paging network verifies the data, preferably by displaying it or otherwise making it available to the page-originating communicant. In accordance with software block 263, the page-originating communicant hangs-up, and then, in accordance with software block 267, the data, including the caller-identification information and any optional or other data attached to the page information, is transmitted via radio frequency communication link 269 to portable communication device 271.

The most common application of an embodiment requires that the page-originating communicant enter either numeric or alphanumeric data which is identified with the caller-identification information. Upon receipt by portable communication device 271, at least one of either the numeric caller-identification information, or the alphabetic caller-identification information, or the optional data entered by the page-originating communicant is compared to one or more data fields in a database which is maintained within memory (preferably RAM 229 of FIG. 20) of portable communication device 271 (of FIG. 21).

FIG. 22 depicts one example of such a database. As shown, there are five data fields associated with each entry: a telephone number field, a fax number field, a name field, an "other data" field (preferably utilized for addresses) and a notification type and intensity field.

In one particular embodiment of the present invention, the numeric or alphanumeric data entered by the page-requesting communicant is compared to an appropriate data field. For example, if the page-originating communicant entered numeric telephone data as part of the page request, this numeric telephone data is compared to numeric data fields that are representative of telephone numbers in order to determine if one or more matches exist. If a match exists, it is probable that the page-requesting communicant is the entity identified in an associated data field. For example, if a telephone number is entered in the page request which corresponds to the first number in the database, it is highly likely that Mr. Hashimoto, the first name in the database, is the page-originating communicant.

The caller-identification information is also compared with one or more data fields in the database. In one specific embodiment, numeric telephone data from the caller-identification information is compared to numeric fields which represent telephone numbers, in order to determine if one or more matches exists. If no matches exist, it is highly likely that Mr. Hashimoto is calling from a telephone which is not ordinarily associated with him. The page-receiving communicant can then decide to either return the call immediately, or defer it to a later time. In this event, the page-receiving communicant knows that Mr. Hashimoto is the likely page-originating communicant, and that he can be reached at this particular time at the number identified in the caller-identification information. In this manner, a protocol can be devised which automatically access one or more of: (1) numeric or alphabetic characters that are located within the caller-identification signal; and/or (2) numeric or alphanumeric characters entered by the page-originating communicant into one or more data fields, in order to identify the likely identity of the page-originating communicant, and to further to identify whether the likely page-originating communicant is calling from a familiar telephone or an unfamiliar telephone.

In instances where the caller-identification information fails to produce a match, the page-receiving communicant may be provided with a particular type of notification to indicate that a person is contacting him or her, or attempting to contact him or her, and such a person is not listed within the database at this time. This may prompt the owner of the personal communication device to utilize a key pad or alternative means to enter that entity upon return of the telephone call.

The notification type field is interesting, insofar as it is user configurable, allowing the page-receiving communicant to identify a particular type, or subtype, of paging notification with one or more particular likely communicants. For example, LED displays from LED 201 (of FIG. 20) may be utilized to identify work associates, while audio tones emitted from audio output device 215 (of FIG. 20) may be utilized to indicate that friends or family are attempting to notify the page-receiving communicant.

Preferably, the user may establish intensity levels or sequence levels for particular types of page alert notifications. For example, the notation "VI" indicates a visual indication with a high intensity. In contrast, the notation "BL" may denote a beep (that is, audio output) of a low intensity. Still, in further contrast, the notation "T" may identify that, for this particular potential communicant, only textual messages should be utilized to identify receipt of the page. In this hierarchical structure, the entity which is assigned the "T" notification type and intensity, is a fairly low priority potential communicant, while the communicant which has the "VI" notification type and intensity indicator identified therewith is a relatively high priority communicant. In this manner, the page-receiving communicant may be able to prioritize his or her return phone call activities.

A variety of mechanisms by which the owner of the portable communication device may enter data, revise data, or review data are depicted graphically in FIGS. 23, 24, 25, and 26.

Figure 23:
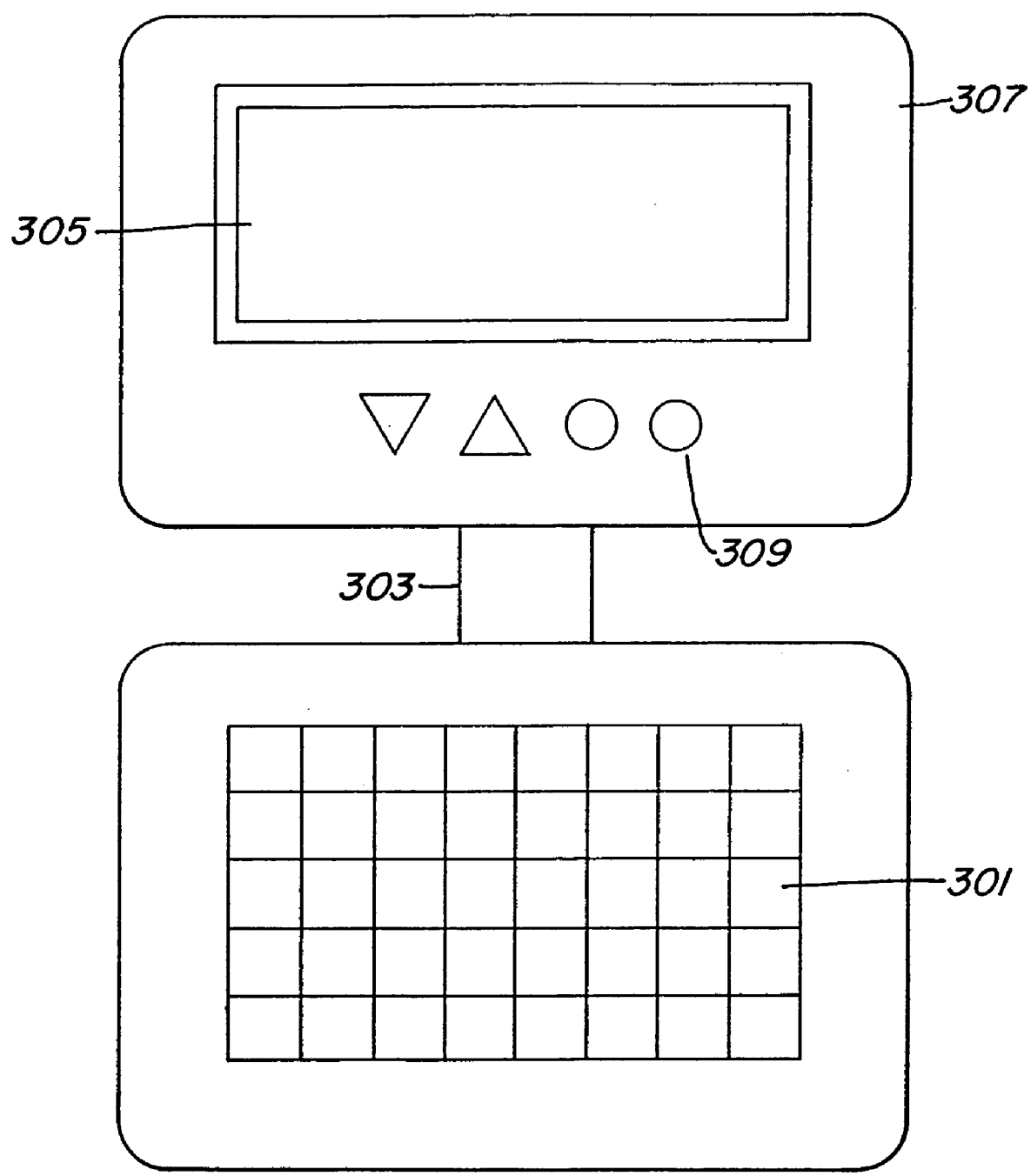
FIGS. 23, 24, 25 and 26 depict alternative configurations of the portable communication device in accordance with alternative embodiments of the invention.
Figure 24:
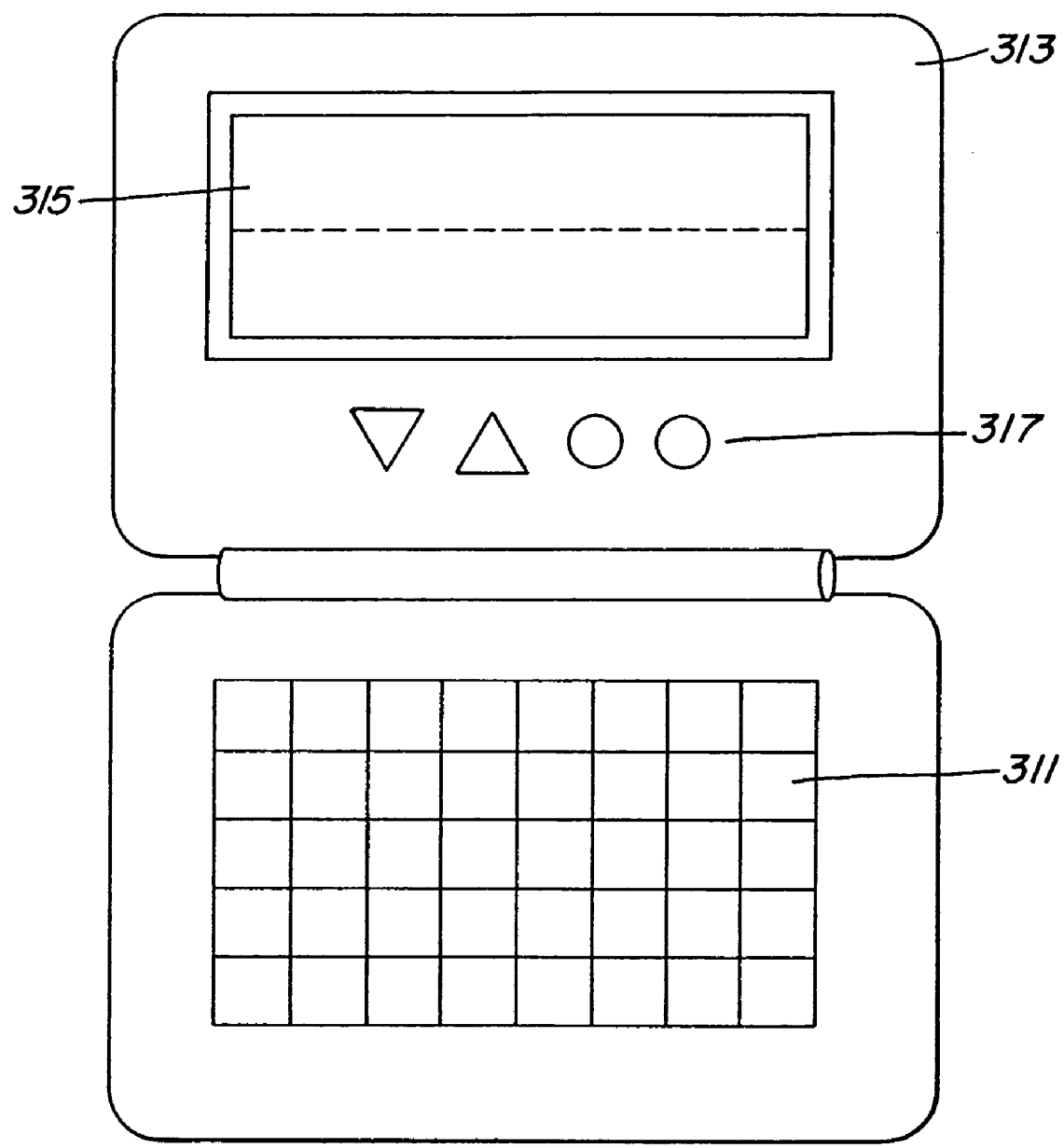

FIG. 23 depicts a portable communication device with a detachable input interface, such as keyboard 301, which releasably connects through connector 303 to paging receiver 307. Display 305 is also included in paging receiver 307. Paging receiver 307 also includes pager operation switches 309. The owner of this paging device may selectively releasably connect keyboard 301 to paging receiver 307, and then depress one or more keys on keyboard 301 to enter data at a cursor location which is presented within display 305. This device stands in sharp contrast with the device of FIG. 24, which includes keyboard 311 that is substantially permanently coupled to paging receiver 313. Paging receiver 313 also includes display 315. Paging receiver 313 preferably includes pager operation switches 317. The operator may utilize keyboard 311 to enter or modify data within display 315. More particularly, the operator may utilize keyboard 311 to add or modify data contained in the plurality of fields of the database maintained within the memory of the portable communication device.

Figure 25:
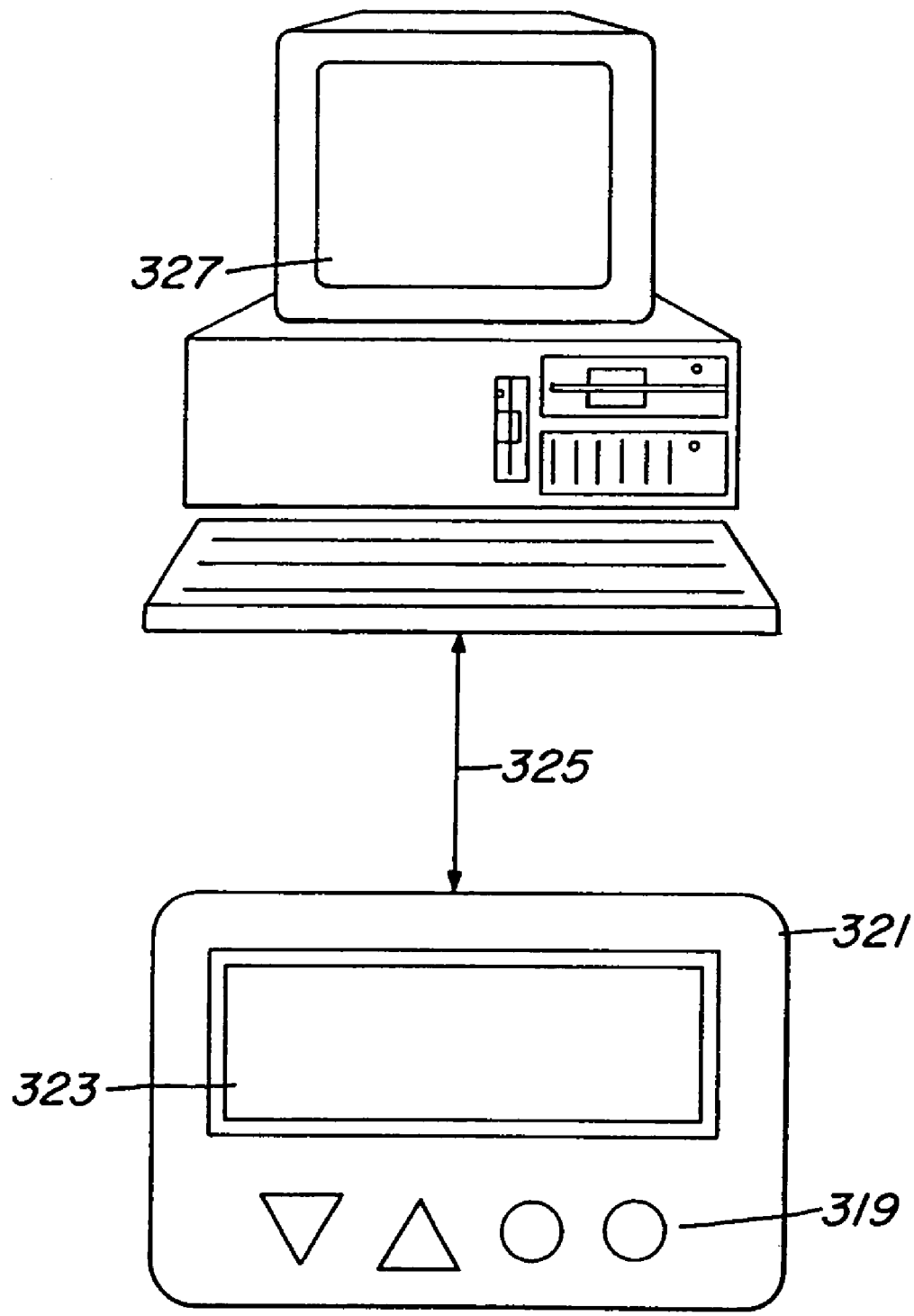

FIG. 25 provides yet another alternative embodiment contemplated. As is shown, paging receiver 321 is provided, and can be selectively and releasably coupled to a personal computer 325 via a serial hardwire line, a parallel hardwire line, an infrared link, or a radio frequency link. Personal computer 327 may be utilized to create and maintain the database with a plurality of data fields, including such fields as communicant's name, communicant's telephone number, communicant's fax number, communicant's address, and a field containing an operator-selectable notification attribute or type. Such data may be intermittently transferred between personal computer 327 and paging receiver 321, and maintained within a random access memory within paging receiver 321.

Paging receiver 321 includes display 323 and pager operation switches 319, which allow for conventional paging functions. In this embodiment, the data contained within the database of paging receiver 319 is periodically refreshed by the owner by conducting memory dumps from personal computer 327 to paging receiver 321. Upon receipt of page notification, the caller identification information and/or optional data input by the page-originating communicant is compared with one or more fields of the database contained within the memory of paging receiver 321.

Figure 26:
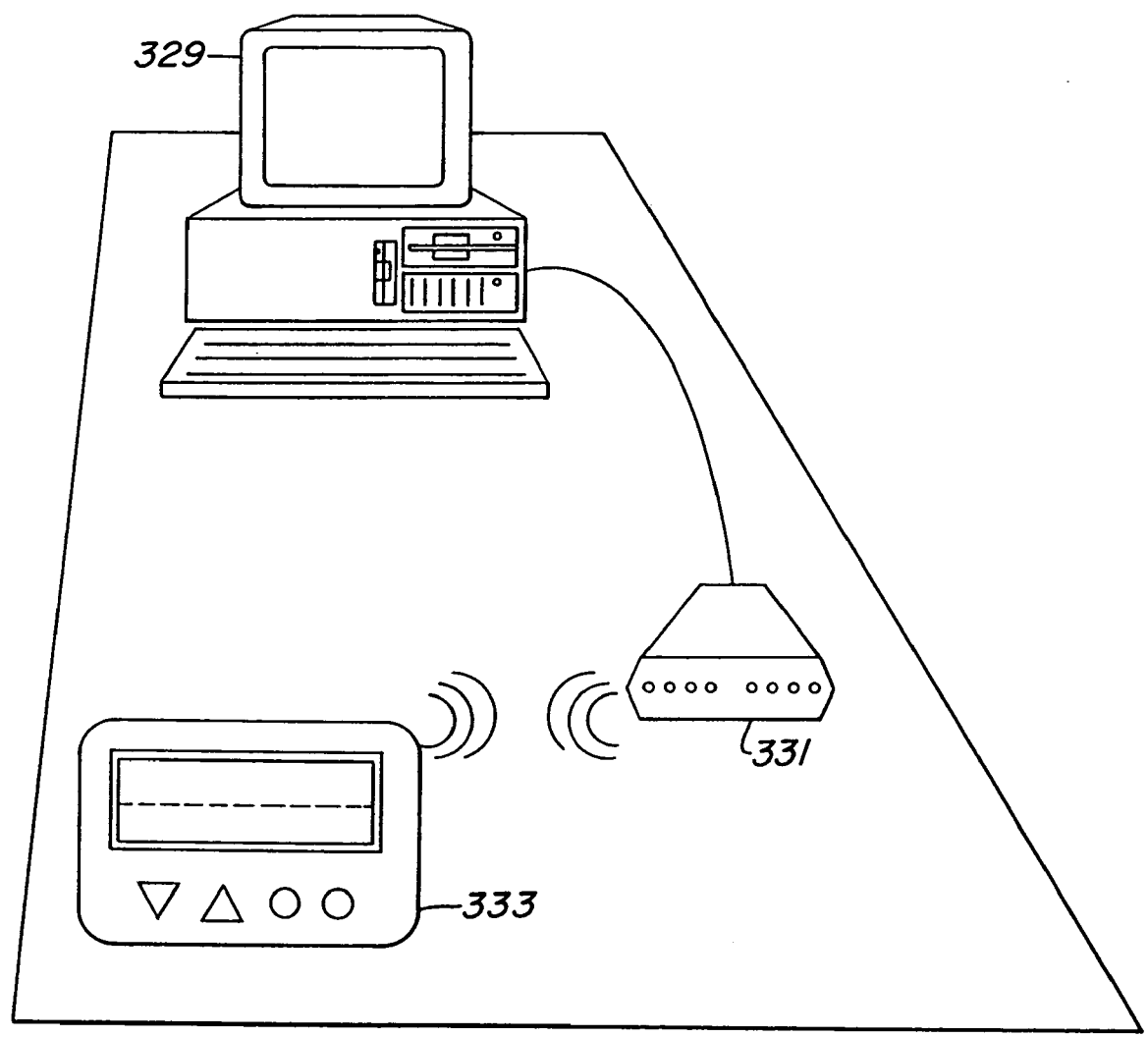

FIG. 26 provides a view of yet another alternative embodiment contemplated in the present invention. In this system, a very inexpensive paging unit, with limited display capabilities, includes a memory for the receipt of the database with a plurality of data fields including communicant's names, communicant's phone numbers, communicant's fax numbers, communicant's addresses, and any user-selected notification attribute identified to that particular communicant. The communication is periodically dumped in a methodical fashion from personal computer 329 via wireless infrared communicator 331 to portable paging receiver 333.

Figure 27:
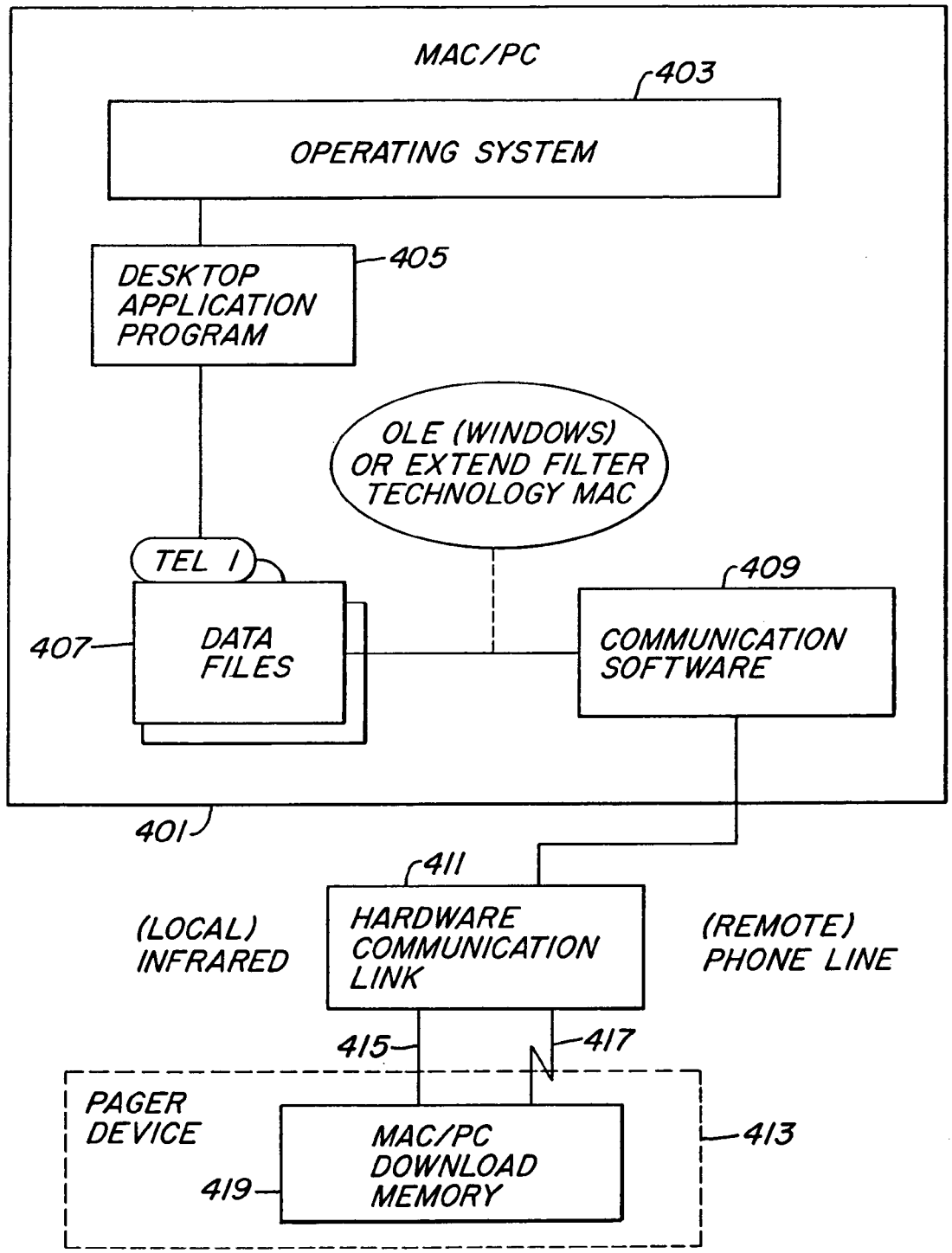
FIG. 27 is a block diagram representation of the hardware and software components which are utilized to exchange data between a computing device and the portable communication device in accordance with the embodiment of the invention.
Figure 28:
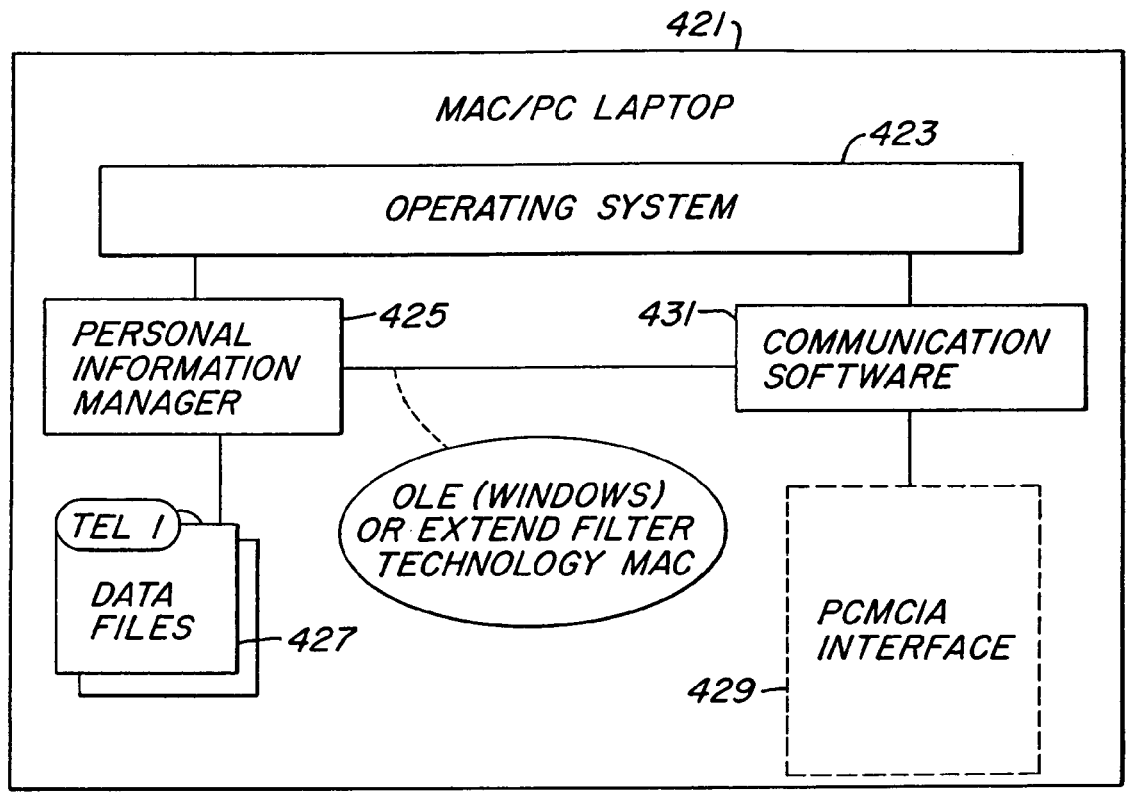
FIG. 28 depicts yet another configuration of the components which cooperate to transmit data between a computing device and the portable communication device.
Figure 28:
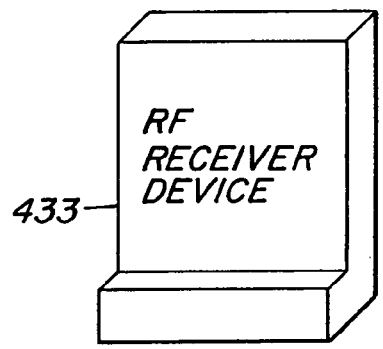

FIGS. 27 and 28 provide block diagram views of the software and hardware components which facilitate the communication of the database between a computing device, such as a personal computer, and the portable communication device. In accordance with FIG. 27, the personal computing device 401 includes operating system 403, desktop application programs 405, data files 407, and intellect communication software 409 which is resident in memory within the computing device, and which is utilized in the transfer of information between computing device 401 an the portable communication device 413, which includes download memory 419 which is adapted to receive the database information. As is shown, the portable communication device 413 may be connected via either hardware communication link 411, local infrared communication 415 or remote telephone input 417. In FIG. 28, a laptop architecture is displayed for laptop 421, which includes operating system 423, personal information manager 425, data files 427, PCMCIA interface 429 and communication software 431 which facilitates the transfer of information from the memory of the laptop computing device 421 to the portable computing device 433.

Figure 29:
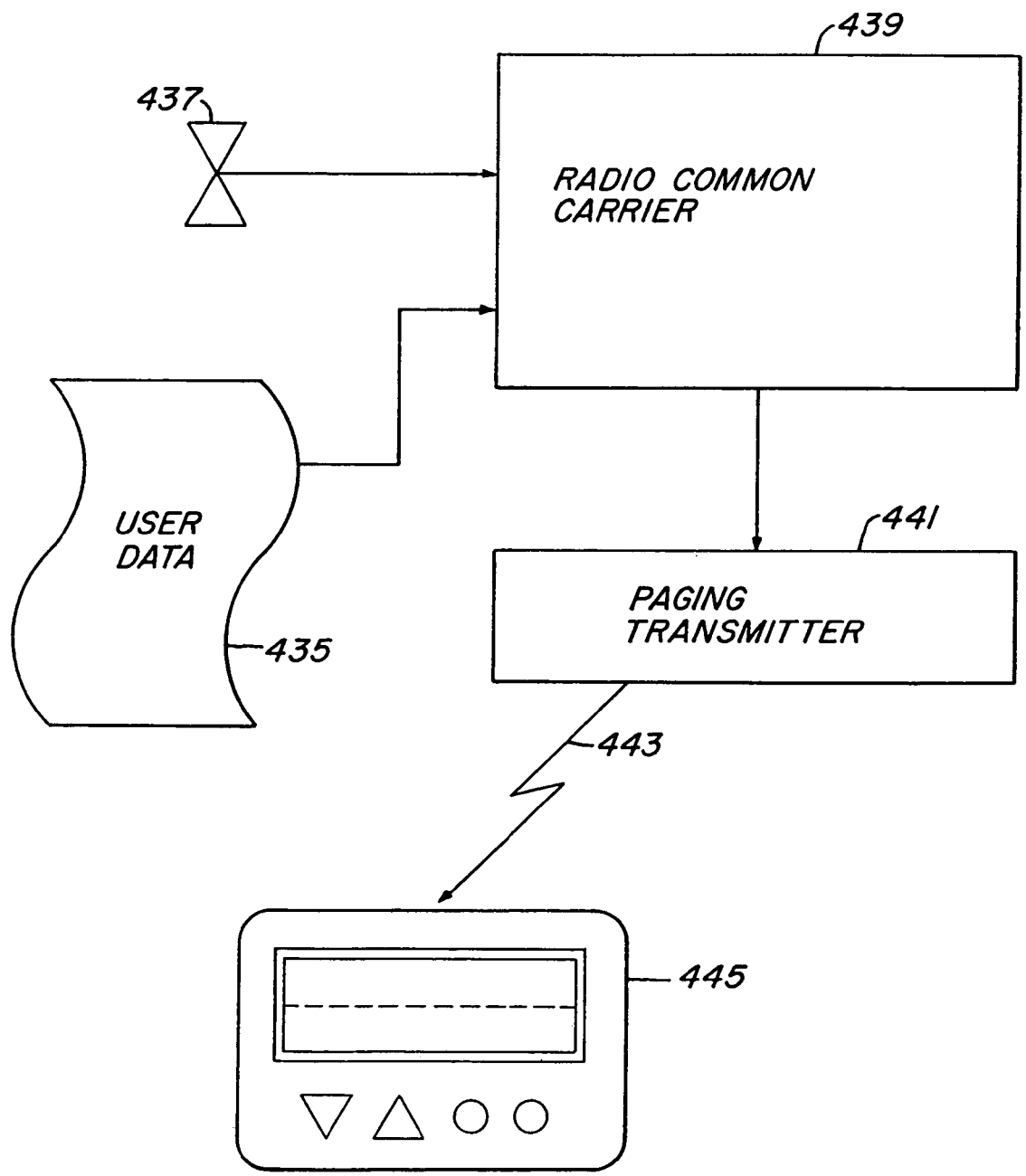
Figure 30:
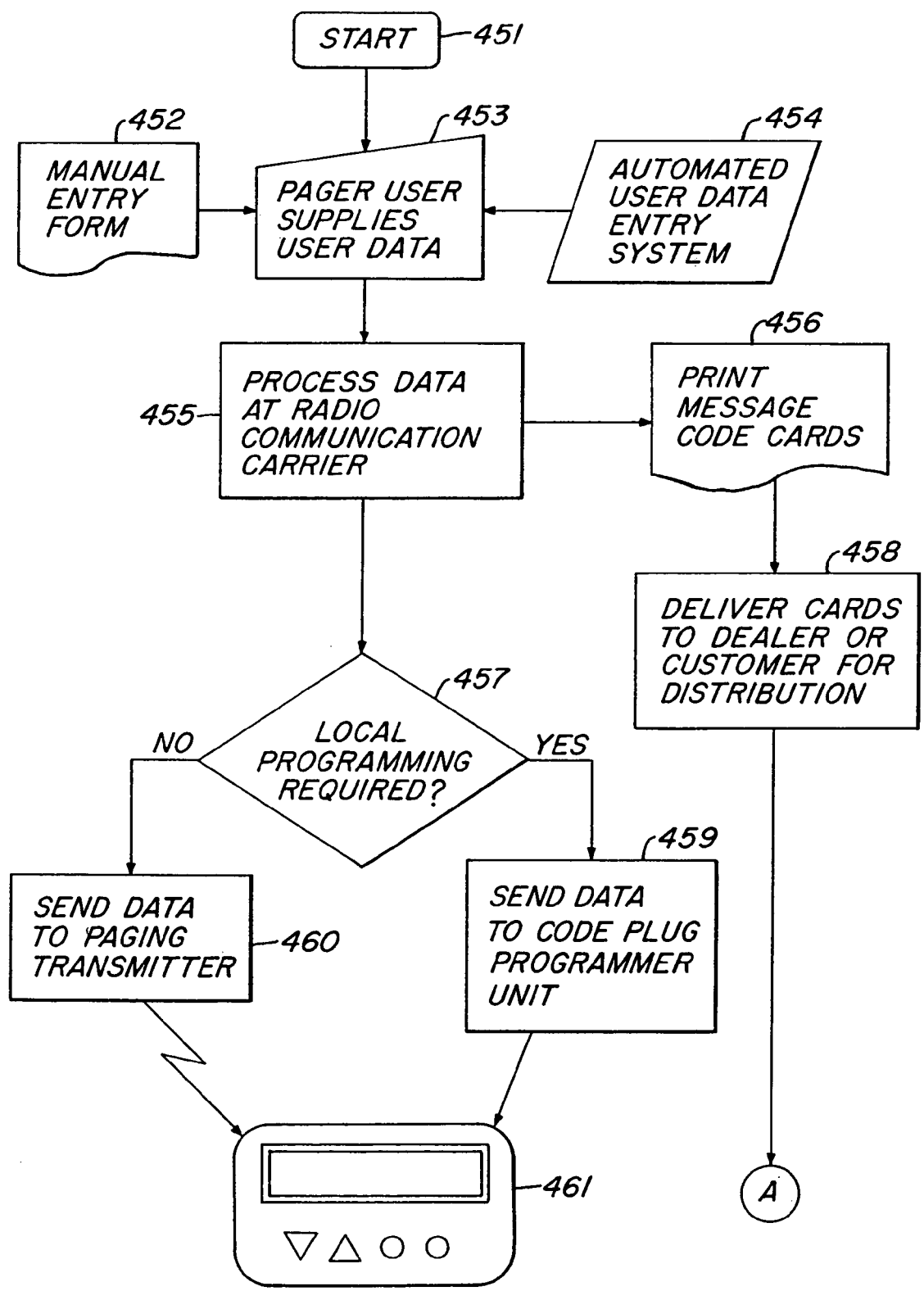
Figure 31:
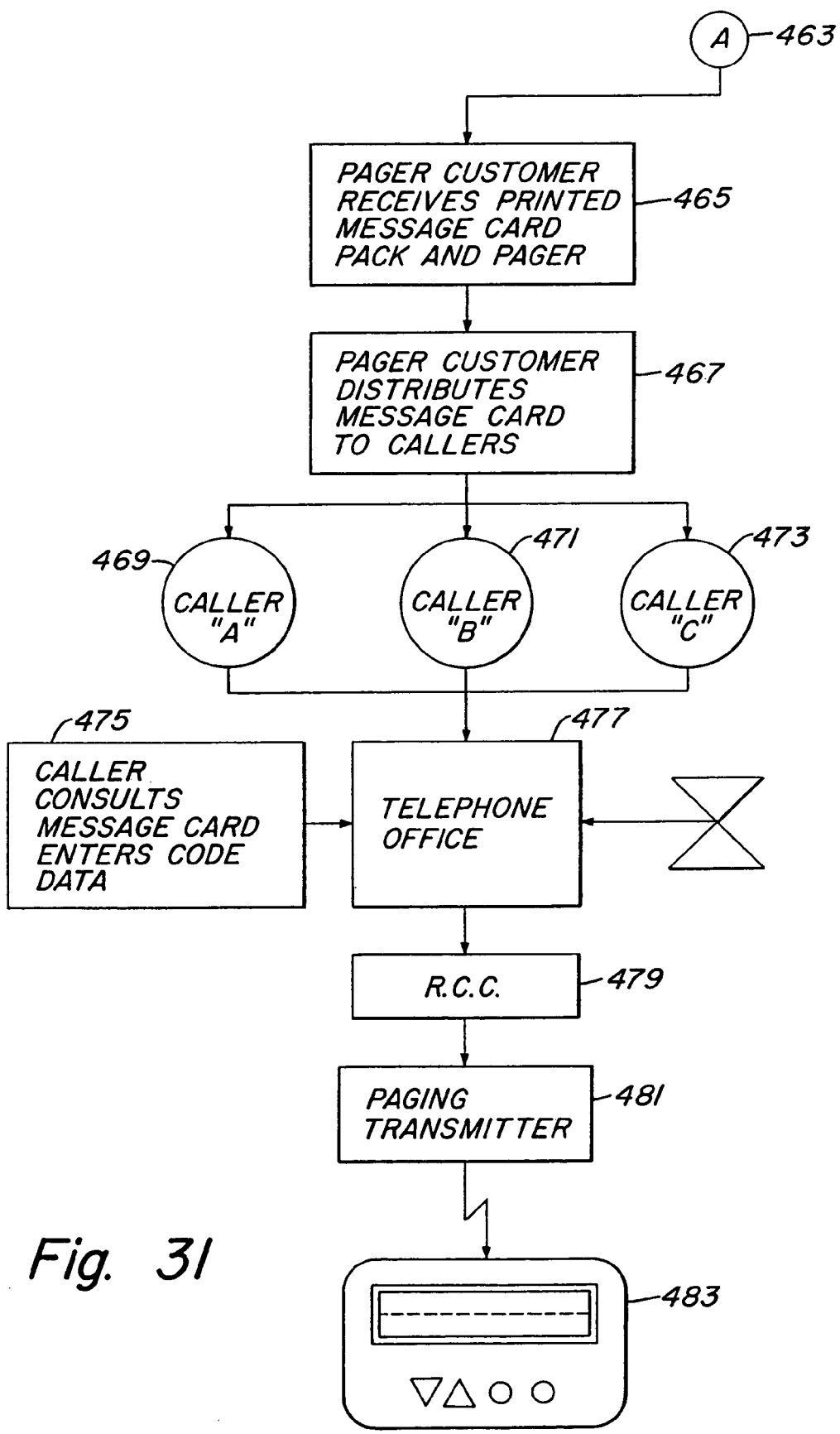

FIG. 29 depicts yet another technique for entering and modifying data which is present within the database present within the memory of the portable communication device. As is shown, the page-receiving communicant inputs data on a physical form 435, which identifies communicant's names, communicant's telephone numbers, communicant's fax numbers, communicant's addresses, and any associated notification attribute for that particular communicant. Alternatively, information is provided via an automated user input request system 437 which preferably utilizes either a portable computing device, a stationary computing device, or a telephone to input data which is to be communicated via radio common carrier 439 to paging transmitter 441, which communicates via radio frequency communication link 443 to paging receiver 445. The techniques for modifying the database are depicted in flowchart form in FIG. 30. The process starts at software block 451, and continues at software blocks 452, 453, and 454, wherein data is either manually entered or automatically entered and routed through software block 453. In accordance with software block 455, data is processed at a radio common carrier, and transmitted to software block 457, where it is determined whether local programming is required, if so, the process continues at software block 459; if not, the process continues at software block 460. In either event, data is communicated to portable communication device 461 for creation, supplementation, or modification of the database contained in memory in portable communication device 461. In accordance with the flowchart of FIG. 30, software block requires that message code cards be printed, and delivered in accordance with software block 458 to a dealer or customer. The software steps associated with the utilization of these code cards is depicted in flowchart form in FIG. 31. In accordance with software block 465, the page customer receives the printed message card along with the pager at the beginning of pager service. In accordance with software block 467, the page customer distributes the message cards to callers, and instructs them to fill the data fields in the cards. In the flow of FIG. 31, the cards are distributed to callers A, B, and C in accordance with software blocks 469, 471, and 473. The callers consult their message cards, and enter the code data, and transmit it through telephone office 477 to radio common carrier 479, which forwards it to paging transmitter 41, which establishes a radio frequency link with portable communication device 43.

Figure 32:
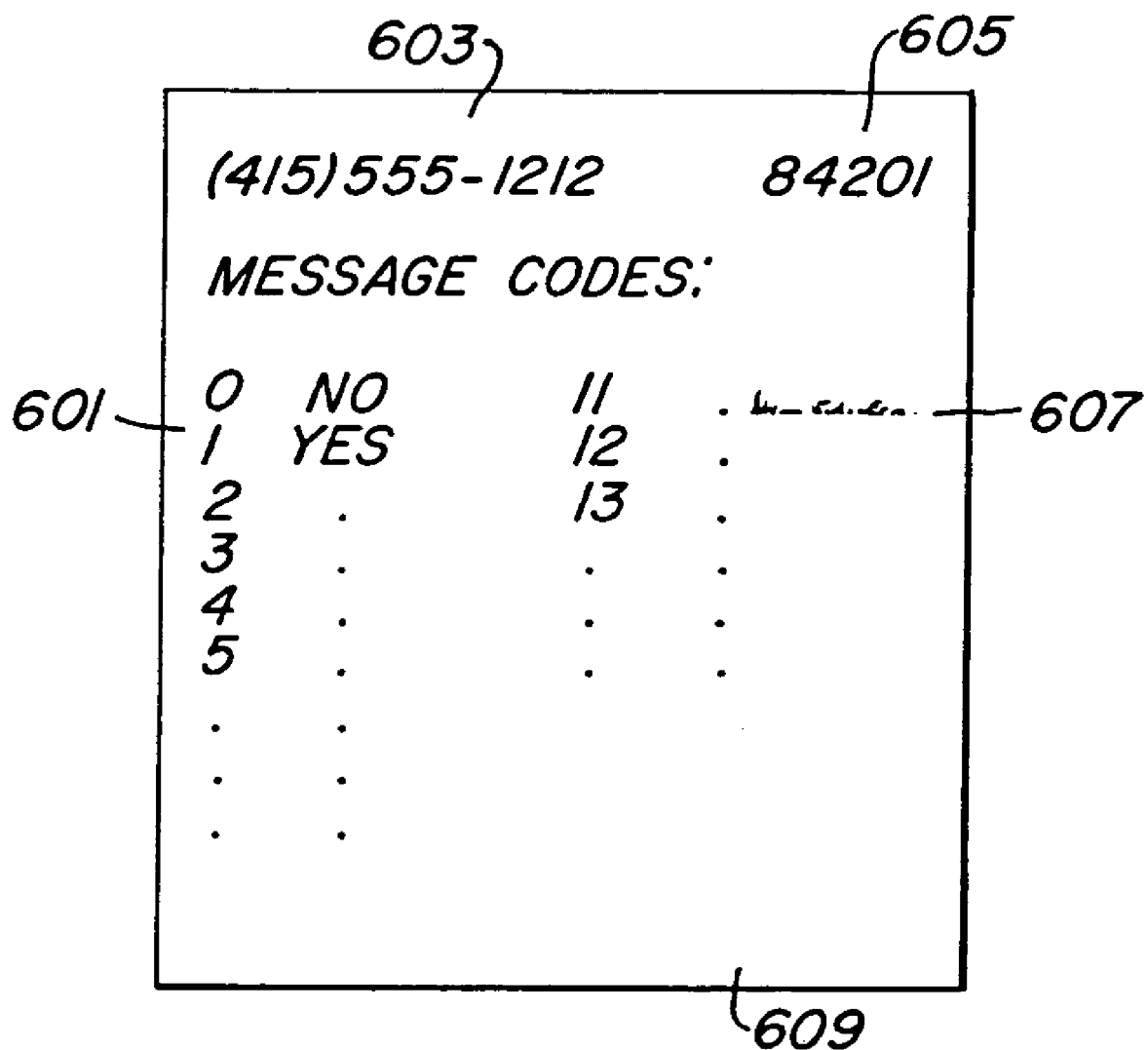

FIGS. 32 and 33 depict two types of standardized message code cards. The card of FIG. 32, the call-receiving communicant's pager ID number 605 is identified, along with the telephone number for the paging center 603. Then, a plurality of numeric or alphanumeric codes are provided in a field 601, with an area to the right for providing numeric or alphanumeric messages 607 which correspond to the numeric or alphanumeric codes. For example, the numeric value "0" may corresponds to the answer "no", while the numeric value "1" may correspond to the answer "yes". In the view of FIG. 33, an alternative standardized message code card is provided, which provides alphanumeric or numeric characters with alphabetic textual messages. For example, the numeric code "11" corresponds to the message "pick up the kids". Additionally, the potential communicant can enter phone data and fax data in fields which are dedicated for that purpose. This information is entered on a wide number of cards by people who are likely to communicate with the paging subscriber. They are mailed in or entered in by the potential communicants, to form a database which is periodically communicated to the page receiving apparatus.

While the invention has been shown in only one of its forms, it is not thus limited but is susceptible to various changes and modifications without departing from the spirit thereof.

What is claimed is:

1. Under message originator control as to when a page including a message can be sent to a message center, a method of communicating information from a message originator having a telephone connected to a communication network that automatically provides caller identification information and a picture to a message recipient having a wireless portable communication drive that is pageable over the communications network in communication with a message center, such message center in communication with the communications network, comprising the steps of:

initiating a message from a message originator to page a message recipient, the page being under the control of the message originator as to when the page is sent to a message center;

receiving at the message center as a result of the page message originator identification information provided automatically by the communications network as a caller ID identifying the telephone number of the message originator and a picture obtained from the message originator prior to transmitting the caller ID to the wireless portable communication device; and, causing the communications network to wirelessly transmit the caller ID and the picture to the wireless portable communication device.

2. The method of Claim 1, wherein the caller ID comprises numeric data.

3. The method of Claim 1, wherein the caller ID comprises alphanumeric data.

4. The method of Claim 1, wherein the caller ID is provided as FSK data.

5. The method of Claim 1, wherein the caller ID is provided from an ISDN connection.

6. The method of Claim 1, further including the step of:
   obtaining verification from message originator prior to transmitting the caller ID to the wireless portable communication device.

7. The method of Claim 1, further comprising:
   obtaining optional data message originator prior to transmitting the caller ID to the wireless portable communication device; and
   transmitting the optional data to the wireless portable communication device.

8. The method of Claim 1, further including the step of:
   compressing the picture prior to transmission to the wireless portable communication device.

9. The method of Claim 1, further including the step of:
   encrypting the picture prior to transmission to the wireless portable communication device.

10. The method of Claim 1, wherein the picture includes a voice or video message which is transmitted to the wireless portable communication device.

11. The method of Claim 10, wherein the voice or video message is compressed prior to transmission to the wireless portable communication device.

12. The method of Claim 10, wherein the voice or video message is encrypted prior to transmission to the wireless portable communication device.

13. The method of Claim 7, further including the step of:
    storing the caller ID and the optional data in contiguous memory locations in the wireless portable communication device.

14. The method of Claim 7, further including the step of:
storing the caller ID and the optional data in associated non-contiguous memory locations in the wireless portable communication device.

15. The method of Claim 7, further including the step of:
comparing the received caller ID with information stored in an associated memory in the message center; and
selectively transmitting the caller ID and the optional data to the wireless portable communication device as a result of the comparison.

16. The method of Claim 15, wherein the caller ID is transmitted to the wireless portable communication device only if the received caller ID matches an entry in the associated memory.

17. The method of Claim 1, further including the step of:
at the wireless portable communication device, annunciating the caller ID.

18. The method of Claim 17, further including the step of:
simultaneously displaying the caller ID on a display of the wireless portable communication device.

19. The method of Claim 1, further including the step of:
storing the caller ID within the wireless portable communication device; and
initiating a new connection over the communication network by transmitting the stored caller ID to the communications network.

20. The method of Claim 1, and further including the step of:
storing the caller ID within the wireless portable communication device; and
initiating a new connection over a cellular telephone network by transmitting the stored caller ID to the cellular telephone network.

21. The method of Claim 1, wherein the communication network includes a cellular communication network and the wireless portable communication device-comprises a combined cellular telephone device and pager device.

22. The method of Claim 21, wherein the communications network transmits the caller ID to the wireless portable communication device utilizing the cellular communication network.

23. The method of Claim 1, further including the step of:
indicating to the message recipient that a message has been received;
accepting a password entered by the message recipient into the wireless portable communication device; and
providing voice signals representative of the caller ID to the message recipient only upon entry of a valid password.

24. The method of Claim 1, wherein the wireless portable communication device includes a portable computing device having radio communications capabilities.

25. The method of Claim 24, wherein the wireless portable computing device includes a personal digital assistant.

26. The method of Claim 24, wherein the wireless portable computing device has two-way radio communications capabilities.

27. The method of Claim 1, further including the step of:
applying the caller ID to a voice synthesizer unit to generate voice signals representative of the caller ID at the wireless portable communication device.

28. The method of Claim 1, further including the step of:
storing the caller ID and the picture in contiguous memory locations by the message center.

29. The method of Claim 1, further including the step of:
storing the caller ID and the picture in associated non-contiguous memory locations by the message center.

\* \* \* \* \*